US011256267B2

(12) United States Patent
Sheng et al.

(10) Patent No.: US 11,256,267 B2
(45) Date of Patent: Feb. 22, 2022

(54) AUTONOMOUS LAWN MOWER, SELF-MOVING DEVICE, AND METHOD FOR RECOGNIZING OBSTACLE BY SAME

(71) Applicant: Positec Power Tools (Suzhou) Co., Ltd., Jiangsu (CN)

(72) Inventors: Xiaochu Sheng, Jiangsu (CN); Yuanzhong Ran, Jiangsu (CN); Yanjun Pang, Jiangsu (CN); Jiang Du, Jiangsu (CN); Xinghong Li, Jiangsu (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 298 days.

(21) Appl. No.: 16/287,309

(22) Filed: Feb. 27, 2019

(65) Prior Publication Data

US 2019/0265724 A1 Aug. 29, 2019

Related U.S. Application Data

(63) Continuation of application No. PCT/CN2017/099698, filed on Aug. 30, 2017.

(30) Foreign Application Priority Data

Aug. 31, 2016 (CN) .......................... 201610789844.8

(51) Int. Cl.
*G05D 1/02* (2020.01)
*G05D 1/00* (2006.01)
(Continued)

(52) U.S. Cl.
CPC ........... *G05D 1/0255* (2013.01); *A01D 34/00* (2013.01); *A01D 34/008* (2013.01);
(Continued)

(58) Field of Classification Search
CPC .............. G05D 1/0255; G05D 1/0088; G05D 2201/0208; A01D 34/00; A01D 34/008;
(Continued)

(56) References Cited

U.S. PATENT DOCUMENTS

| 5,204,814 A | 4/1993 | Noonan et al. |
| 6,173,233 B1 | 1/2001 | Janutka et al. |

(Continued)

FOREIGN PATENT DOCUMENTS

| CN | 101091428 A | 12/2007 |
| CN | 202026599 U | 11/2011 |

(Continued)

OTHER PUBLICATIONS

Mun-cheon et al., "A Robust Obstacle Detection Method for Robotic Vacuum Cleaners," 2014, vol. 60, Publisher: IEEE.*

(Continued)

*Primary Examiner* — Tuan C To
(74) *Attorney, Agent, or Firm* — Middleton Reutlinger

(57) ABSTRACT

The present invention relates to a non-contact obstacle-avoiding autonomous lawn mower, including a housing, a moving module, a drive module, and a control module. An ultrasonic sensor assembly is disposed on the housing. The ultrasonic sensor assembly includes at least two ultrasonic sensors, including a first ultrasonic sensor and a second ultrasonic sensor. When a distance between an obstacle detected by the ultrasonic sensor assembly and the autonomous lawn mower is less than a preset distance, the control module controls the autonomous lawn mower to execute a preset obstacle-avoidance measure. Compared with the prior art, the present invention uses an ultrasonic sensor to detect an obstacle and sets a preset distance to prevent the autono- (Continued)

mous lawn mower from colliding with the obstacle, thereby implementing non-contact obstacle avoidance of the autonomous lawn mower.

17 Claims, 66 Drawing Sheets

(51) Int. Cl.
*A01D 34/00* (2006.01)
*G01S 15/931* (2020.01)
*A01D 101/00* (2006.01)

(52) U.S. Cl.
CPC .......... *G01S 15/931* (2013.01); *G05D 1/0088* (2013.01); *A01D 2101/00* (2013.01); *G01S 2015/937* (2013.01); *G05D 2201/0208* (2013.01)

(58) Field of Classification Search
CPC .............. A01D 2101/00; G01S 15/931; G01S 2015/937
USPC .......................................................... 701/23
See application file for complete search history.

(56) References Cited

U.S. PATENT DOCUMENTS

| | | | | |
|---|---|---|---|---|
| 8,594,840 B1* | 11/2013 | Chiappetta | ........... | G05D 1/0225 700/245 |
| 8,788,092 B2* | 7/2014 | Casey | ................ | G05D 1/0238 700/245 |
| 9,310,806 B2* | 4/2016 | Romanov | ........... | G05D 1/0242 |
| 9,442,488 B2 | 9/2016 | Shamlian et al. | | |
| 9,632,505 B2 | 4/2017 | Hickerson et al. | | |
| 10,705,533 B1* | 7/2020 | Bishel | ................. | G05D 1/0231 |
| 2006/0161318 A1* | 7/2006 | Aldred | .................. | B60L 9/00 701/23 |
| 2012/0083982 A1* | 4/2012 | Bonefas | .............. | G05D 1/0223 701/70 |
| 2012/0232696 A1* | 9/2012 | Tang | .................... | G05D 1/0238 700/258 |
| 2014/0058611 A1 | 2/2014 | Borinato | | |
| 2014/0324269 A1* | 10/2014 | Abramson | ........... | G05D 1/0212 701/26 |
| 2014/0330496 A1 | 11/2014 | Crouse et al. | | |
| 2015/0094879 A1* | 4/2015 | Pari | ......................... | B25J 5/007 701/2 |
| 2016/0000287 A1* | 1/2016 | Tsuboi | ..................... | A47L 7/04 15/319 |
| 2016/0075015 A1* | 3/2016 | Izhikevich | .............. | B25J 9/163 700/253 |
| 2016/0075017 A1* | 3/2016 | Laurent | .................... | B25J 9/163 700/264 |

FOREIGN PATENT DOCUMENTS

| | | | | | |
|---|---|---|---|---|---|
| CN | 102759924 | A | * | 10/2012 | ........... A01D 34/008 |
| CN | 102759924 | A | | 10/2012 | |
| CN | 104252176 | A | * | 12/2014 | ........... G05D 1/0246 |
| CN | 104737698 | A | | 7/2015 | |
| JP | 2012105557 | A | * | 6/2012 | |
| JP | 2016131744 | A | * | 7/2016 | ................ H05F 3/02 |
| KR | 20160079540 | A | * | 7/2016 | ........... A47L 9/2805 |
| KR | 20160086183 | A | * | 7/2016 | |
| WO | 2015064780 | A1 | | 5/2015 | |
| WO | WO-2016103066 | A1 | * | 6/2016 | ........... A01D 34/008 |

OTHER PUBLICATIONS

Guo-Shing et al., "Intelligent Auto-Saving Energy Robotic Lawn Mower," 2010, Publisher: IEEE.*
Andreas et al., "Ultrasonic Transducer Interface-Circuit for Simultaneous Transmitting and Receiving," 2009, Publisher: IEEE.*
State Intellectual Property Office of the P.R. China, International Search Report and Written Opinion (English translation included) for PCT/CN2017/099698 dated Nov. 1, 2017.

* cited by examiner

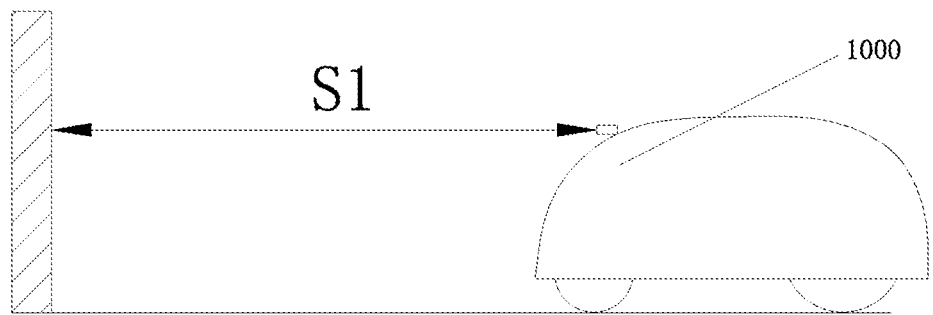
(a)
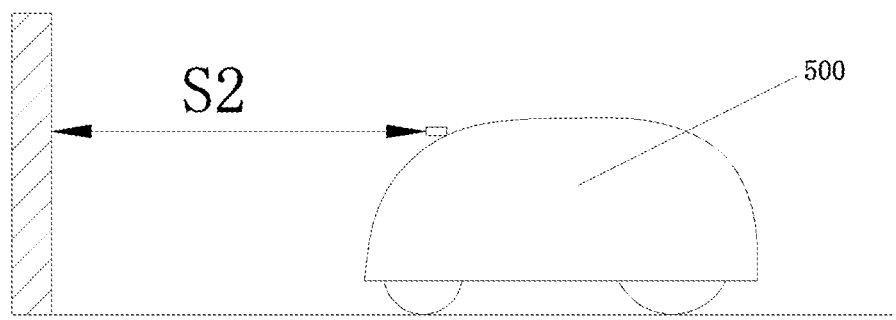
(b)
FIG. 43

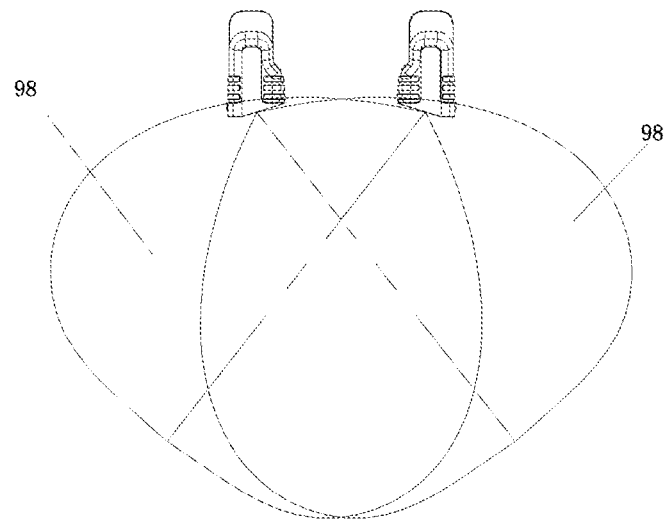
(a)
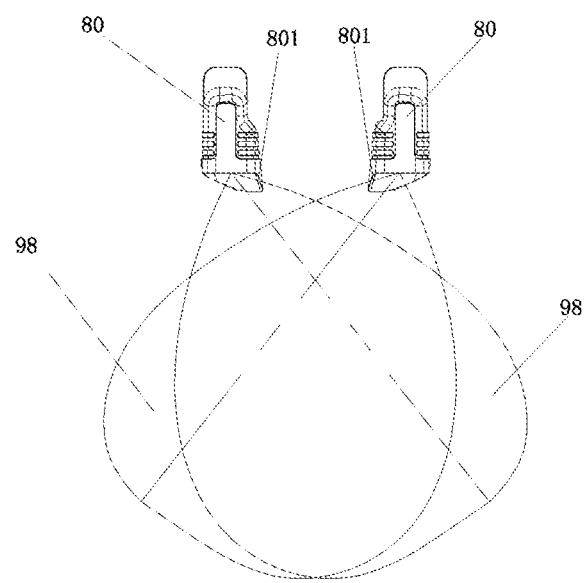
(b)
FIG. 53

AUTONOMOUS LAWN MOWER, SELF-MOVING DEVICE, AND METHOD FOR RECOGNIZING OBSTACLE BY SAME

BACKGROUND

Technical Field

The present invention relates to a self-moving device, and in particular, to a non-contact obstacle-avoiding self-moving device and a method for recognizing an obstacle by same.

Related Art

With ongoing development of computer technologies and artificial intelligence technologies, self-moving robots similar to smart devices start to enter people's lives. Companies such as Samsung and Electrolux have developed and put fully-automatic vacuum cleaners on the market. Such a fully-automatic vacuum cleaner usually has a small volume and integrates an environmental sensor, a self-driving system, a vacuum cleaning system, a battery, and a charging system. The vacuum cleaner can navigate and vacuum a working area automatically without manual manipulation. When the battery is low, the vacuum cleaner returns to a charging station automatically and is docked for charging, and later continues with navigation and vacuum cleaning. In addition, companies such as Husqvarna have developed a similar autonomous lawn mower. The autonomous lawn mower can cut grass on a user's lawn automatically and can be charged automatically without intervention of the user. Such a self-moving robot no longer needs to be manually managed after being set once, so that users are freed from tedious and time- and labor-consuming housework such as cleaning and lawn maintenance, and therefore the self-moving robot becomes highly popular.

An obstacle that hinders the movement of a self-moving robot often exists in a working area. The self-moving robot needs to have a function of recognizing an obstacle to avoid an obstacle automatically before or when encountering the obstacle.

In conventional technologies, a self-moving robot uses a contact obstacle-avoidance means. In the technology, a collision sensor is disposed on the body of the self-moving robot. When the self-moving robot collides with an obstacle, the collision sensor generates a collision signal. A control module of the self-moving robot receives the collision signal, determines that an obstacle exists in a forward movement direction of the self-moving robot, and then controls the self-moving robot to steer or reverse to perform obstacle avoidance. In a contact obstacle-avoidance mode, the self-moving robot needs to collide with an obstacle before the self-moving robot can recognize the obstacle. This mode requires that the body of the self-moving robot has relatively high collision intensity, and the costs of the self-moving robot are increased. In addition, this mode cannot adapt to some working conditions in which collisions are considered inappropriate.

SUMMARY

The present invention provides a self-moving device that can implement non-contact obstacle avoidance. The present invention further provides a self-moving device that can improve machine reachability and can determine a location of an obstacle to implement targeted obstacle-avoidance measures and a method for recognizing an obstacle by same.

To achieve the foregoing objective, the technical solution of the present invention is:

An autonomous lawn mower includes:
a housing;
a moving module, disposed below the housing, and configured to drive the housing to move;
a drive module, configured to drive the moving module to move; and
a control module, configured to control the autonomous lawn mower, where
an ultrasonic sensor assembly configured to recognize an obstacle in a forward movement direction of the autonomous lawn mower is disposed on the housing, the ultrasonic sensor assembly includes a first ultrasonic sensor, the first ultrasonic sensor receives and transmits ultrasound in a first transceiver region, and when a distance between an obstacle detected by the ultrasonic sensor assembly and the autonomous lawn mower is less than a preset distance, the control module controls the autonomous lawn mower to execute a preset obstacle-avoidance measure.

Preferably, the ultrasonic sensor assembly includes at least two ultrasonic sensors, including a first ultrasonic sensor and a second ultrasonic sensor, the first ultrasonic sensor receives and transmits ultrasound in a first transceiver region, the second ultrasonic sensor receives and transmits ultrasound in a second transceiver region, and the first ultrasonic sensor and the second ultrasonic sensor are arranged on the housing and directed toward one another such that the first transceiver region and the second transceiver region overlap partially to form three detection regions, wherein the portion where the first transceiver region and the second transceiver region overlap each other is a third detection region, the portion of the first transceiver region that doesn't overlap with the second transceiver region is a first detection region, the portion of the second transceiver region that doesn't overlap with the first transceiver region is a second detection region.

Preferably, the first ultrasonic sensor has a first axis, the second ultrasonic sensor has a second axis, and the angle between the first axis and the second axis ranges from 60° to 110°.

Preferably, the angle between the first axis and the second axis ranges from 70° to 90°.

Preferably, the first ultrasonic sensor has a first axis, the second ultrasonic sensor has a second axis, the housing has a housing axis, and the angle between the first axis and the housing axis ranges from 10° to 80°, the angle between the second axis and the housing axis ranges from 10° to 80°.

Preferably, the angle between the first axis and the housing axis ranges from 25° to 55°, the angle between the second axis and the housing axis ranges from 25° to 55°.

Preferably, the ultrasonic sensor assembly includes at least two ultrasonic sensors, including a first ultrasonic sensor and a second ultrasonic sensor, the first ultrasonic sensor receives and transmits ultrasound in a first transceiver region, the second ultrasonic sensor receives and transmits ultrasound in a second transceiver region, and the first ultrasonic sensor and the second ultrasonic sensor are arranged on the housing in parallel to each other in a width direction of the autonomous lawn mower, so that the first transceiver region and the second transceiver region overlap partially to form three detection regions, where an overlapping part of the first transceiver region and the second transceiver region is a third detection region, a part except the overlapping part of the first transceiver region is a first detection region, and a part except the overlapping part of the second transceiver region is a second detection region.

Preferably, the third detection region at least covers both a part of a first distance-measurement blind area in the first transceiver region and a part of a second distance-measurement blind area in the second transceiver region.

Preferably, the control module controls the first ultrasonic sensor and the second ultrasonic sensor to transmit ultrasound alternately in time.

Preferably, the control module controls the first ultrasonic sensor to transmit ultrasound in a first period of time, the first ultrasonic sensor and the second ultrasonic sensor receive echoes from the obstacle in the first period of time, the control module controls the second ultrasonic sensor to transmit ultrasound in a second period of time following the first period of time, and the first ultrasonic sensor and the second ultrasonic sensor receive echoes from the obstacle in the second period of time.

Preferably, the control module determines a location of the obstacle according to a combination of ultrasound transmitted by the first ultrasonic sensor and the second ultrasonic sensor in the ultrasonic sensor assembly and echoes received from the obstacle by the first ultrasonic sensor and the second ultrasonic sensor.

Preferably, when only the first ultrasonic sensor in the ultrasonic sensor assembly transmits ultrasound and only the first ultrasonic sensor receives an echo from the obstacle, the control module determines that the obstacle is located in the first detection region; when only the second ultrasonic sensor in the ultrasonic sensor assembly transmits ultrasound and only the second ultrasonic sensor receives an echo from the obstacle, the control module determines that the obstacle is located in the second detection region; when the first ultrasonic sensor in the ultrasonic sensor assembly transmits ultrasound and the first ultrasonic sensor and the second ultrasonic sensor receive echoes from the obstacle, the control module determines that the obstacle is located in the third detection region; when the second ultrasonic sensor in the ultrasonic sensor assembly transmits ultrasound and the first ultrasonic sensor and the second ultrasonic sensor receive echoes from the obstacle, the control module determines that the obstacle is located in the third detection region; when the first ultrasonic sensor in the ultrasonic sensor assembly transmits ultrasound and the second ultrasonic sensor receives an echo from the obstacle, the control module determines that the obstacle is located in the third detection region; and when the second ultrasonic sensor in the ultrasonic sensor assembly transmits ultrasound and the first ultrasonic sensor receives an echo from the obstacle, the control module determines that the obstacle is located in the third detection region.

Preferably, the control module calculates the distance between the obstacle and the autonomous lawn mower according to a time difference between the time when the ultrasonic sensor assembly transmits ultrasound and the time when the ultrasonic sensor assembly receives an echo from the obstacle.

Preferably, when the distance between the obstacle and the autonomous lawn mower is greater than 200 centimeters, the control module does not analyze a received ultrasonic echo.

Preferably, when the distance between the obstacle and the autonomous lawn mower is greater than 90 centimeters, the control module does not analyze a received ultrasonic echo.

Preferably, when the distance between the obstacle and the autonomous lawn mower is greater than 60 centimeters, the control module does not analyze a received ultrasonic echo.

Preferably, the first ultrasonic sensor has a first axis, the second ultrasonic sensor has a second axis, and the first axis and the second axis are coplanar in a vertical direction.

Preferably, the ultrasonic sensor assembly includes at least two ultrasonic sensors, including a first ultrasonic sensor and a second ultrasonic sensor, the first ultrasonic sensor receives and transmits ultrasound in a first transceiver region, the second ultrasonic sensor receives and transmits ultrasound in a second transceiver region, and the first ultrasonic sensor and the second ultrasonic sensor are arranged adjacently on the housing in parallel to each other in a width direction of the autonomous lawn mower, so that the first transceiver region and the second transceiver region do not overlap.

Preferably, the ultrasonic sensor assembly includes a third ultrasonic sensor and a fourth ultrasonic sensor that are arranged on the housing, the third ultrasonic sensor receives ultrasound in a third reception region, the fourth ultrasonic sensor receives ultrasound in a fourth reception region, the third ultrasonic sensor is located on another side, not adjacent to the second ultrasonic sensor, of the first ultrasonic sensor, the third ultrasonic sensor and the first ultrasonic sensor are arranged on the housing at an angle from each other, so that the first transceiver region and the third reception region overlap partially, the fourth ultrasonic sensor is located on another side, not adjacent to the first ultrasonic sensor, of the second ultrasonic sensor, the fourth ultrasonic sensor and the second ultrasonic sensor are arranged on the housing at an angle from each other, so that the second transceiver region and the fourth reception region overlap partially, the four ultrasonic sensors form four detection regions, where an overlapping part of the first transceiver region and the third transceiver region is a third detection region, a part except the overlapping part of the first transceiver region is a first detection region, an overlapping part of the second transceiver region and the fourth transceiver region is a fourth detection region, and a part except the overlapping part of the second transceiver region is a second detection region.

Preferably, the third detection region at least covers a part of a first distance-measurement blind area in the first transceiver region, and the fourth detection region at least covers a part of a second distance-measurement blind area in the second transceiver region.

Preferably, the control module controls the first ultrasonic sensor and the second ultrasonic sensor to transmit ultrasound alternately in time.

Preferably, the control module controls the first ultrasonic sensor to transmit ultrasound in a first period of time, the first ultrasonic sensor and the third ultrasonic sensor receive ultrasound in the first period of time, the control module controls the second ultrasonic sensor to transmit ultrasound in a second period of time following the first period of time, and the second ultrasonic sensor and the fourth ultrasonic sensor receive ultrasound in the second period of time.

Preferably, the control module controls the first ultrasonic sensor and the second ultrasonic sensor to transmit ultrasound simultaneously.

Preferably, the control module controls the first ultrasonic sensor and the second ultrasonic sensor to transmit ultrasound in a first period of time, and the first ultrasonic sensor, the second ultrasonic sensor, the third ultrasonic sensor, and the fourth ultrasonic sensor receive ultrasound in the first period of time.

Preferably, the control module determines a location of the obstacle according to a combination of ultrasound transmitted and received by the first ultrasonic sensor, the second ultrasonic sensor, the third ultrasonic sensor, and the fourth ultrasonic sensor in the ultrasonic sensor assembly.

Preferably, when only the first ultrasonic sensor in the ultrasonic sensor assembly transmits ultrasound and only the first ultrasonic sensor receives ultrasound, the control module determines that the obstacle is located in the first detection region; when only the second ultrasonic sensor in the ultrasonic sensor assembly transmits ultrasound and only the second ultrasonic sensor receives ultrasound, the control module determines that the obstacle is located in the second detection region; when the first ultrasonic sensor in the ultrasonic sensor assembly transmits ultrasound and the first ultrasonic sensor and the third ultrasonic sensor receive ultrasound, the control module determines that the obstacle is located in the third detection region; and when the second ultrasonic sensor in the ultrasonic sensor assembly transmits ultrasound and the second ultrasonic sensor and the fourth ultrasonic sensor receive ultrasound, the control module determines that the obstacle is located in the fourth detection region.

Preferably, the third ultrasonic sensor has a third axis, the first ultrasonic sensor has a first axis, and a range of an angle between the third axis and the first axis is 10° to 80°.

Preferably, the angle between the third axis and the first axis ranges from 25° to 55°.

Preferably, the fourth ultrasonic sensor has a fourth axis, the second ultrasonic sensor has a second axis, and the angle between the fourth axis and the second axis ranges from 10° to 80°.

Preferably, the angle between the fourth axis and the second axis ranges from 25° to 55°.

Preferably, the first ultrasonic sensor has a first axis, the second ultrasonic sensor has a second axis, the third ultrasonic sensor has a third axis, the fourth ultrasonic sensor has a fourth axis, and the first axis, the second axis, the third axis, and the fourth axis are coplanar in a vertical direction.

Preferably, the ultrasonic sensor assembly includes at least two ultrasonic sensors, including a first ultrasonic sensor and a second ultrasonic sensor, the first ultrasonic sensor receives and transmits ultrasound in a first transceiver region, the second ultrasonic sensor receives ultrasound in a second reception region, and the first ultrasonic sensor and the second ultrasonic sensor are arranged on the housing at an angle from each other, so that the first transceiver region and the second reception region overlap partially, an overlapping part of the first transceiver region and the second reception region is a third detection region, and a part except the overlapping part of the first transceiver region is a first detection region.

Preferably, the third detection region at least covers a part of a first distance-measurement blind area in the first transceiver region.

Preferably, a range of an angle between the first ultrasonic sensor and the second ultrasonic sensor is 10° to 80°.

Preferably, a range of an angle between the first ultrasonic sensor and the second ultrasonic sensor is 25° to 55°.

Preferably, when there are three or more coordinating ultrasonic sensors, a plurality of ultrasonic sensors transmitting ultrasound whose sound wave transmission ranges overlap uses a mode of transmitting ultrasound successively, and when one of ultrasonic sensors transmitting ultrasound whose sound wave transmission ranges overlap transmits ultrasound, the remaining ultrasonic sensors receive ultrasound.

Preferably, when there are three or more coordinating ultrasonic sensors, a plurality of ultrasonic sensors transmitting ultrasound whose sound wave transmission ranges do not overlap uses a mode of transmitting ultrasound simultaneously, and when one of ultrasonic sensors transmitting ultrasound whose sound wave transmission ranges overlap and the ultrasonic sensors transmitting ultrasound whose sound wave transmission ranges do not overlap transmit ultrasound simultaneously, the remaining ultrasonic sensors receive ultrasound.

Preferably, when there are three or more coordinating ultrasonic sensors, a plurality of ultrasonic sensors transmitting ultrasound whose sound wave transmission ranges do not overlap uses a mode of transmitting ultrasound successively, when one of ultrasonic sensors transmitting ultrasound whose sound wave transmission ranges overlap transmits ultrasound, the remaining ultrasonic sensors receive ultrasound, and when the ultrasonic sensors transmitting ultrasound whose sound wave transmission ranges do not overlap transmits ultrasound, the remaining ultrasonic sensors receive ultrasound.

Preferably, the first ultrasonic sensor is disposed at a position at a distance D from a front end of the autonomous lawn mower.

Preferably, the distance D is located at a front half of the autonomous lawn mower in a length direction.

Preferably, an ultrasonic beam pattern for recognizing an obstacle in a forward movement direction of the autonomous lawn mower is noncircular, a tangent plane is formed by an axis perpendicular to the ultrasonic beam pattern to obtain a waveform surface, the waveform surface has a major axis direction and a minor axis direction, the major axis direction is mounted to be basically parallel to a bottom surface of the autonomous lawn mower, and the minor axis direction is mounted to be basically perpendicular to the bottom surface of the autonomous lawn mower.

Preferably, the waveform surface is elliptical.

Preferably, an ultrasonic beam pattern of the first ultrasonic sensor is noncircular, and a tangent plane is formed by an axis perpendicular to the first ultrasonic sensor to obtain the noncircular waveform surface.

Preferably, an ultrasonic beam pattern of the first ultrasonic sensor is circular, a beam adjuster configured to adjust a shape of an ultrasonic beam pattern of ultrasound transmitted by the first ultrasonic sensor is disposed at an ultrasonic transmission end of the first ultrasonic sensor, the ultrasonic beam pattern obtained after the adjustment by the beam adjuster is noncircular, and a tangent plane is formed by an axis perpendicular to the ultrasonic beam pattern to obtain the noncircular waveform surface.

Preferably, the ultrasonic sensor assembly includes an ultrasonic sensor configured to transmit and receive ultrasound, a PCB board, and a protection case for fixing the PCB board and the ultrasonic sensor, the ultrasonic sensor has an outward sound-producing surface, the protection case has an end surface, and the sound-producing surface is level with the end surface or is concave relative to the end surface to be disposed in the protection case.

Preferably, the autonomous lawn mower has a reflected wave threshold, and a value of the intensity of an echo from an obstacle recognized by the autonomous lawn mower is greater than the reflected wave threshold.

Preferably, the ultrasonic sensor assembly includes a fifth ultrasonic sensor, an output end of the fifth ultrasonic sensor is connected to an input end of the control module, the fifth ultrasonic sensor is configured to detect in real time whether a slope exists in the forward movement direction of the autonomous lawn mower, and the control module is configured to control, according to information about the slope detected by the fifth ultrasonic sensor, whether the autonomous lawn mower ascends the slope.

Preferably, the fifth ultrasonic sensor is mounted and disposed on the housing at an angle relative to a bottom surface of the housing, and an axis of the fifth ultrasonic sensor is perpendicular to the slope.

Preferably, the preset distance is in a positive relationship with at least one of a movement speed of the autonomous lawn mower, an acceleration of the autonomous lawn mower, mass of the autonomous lawn mower, an arrangement position of an axis of the moving module, and mass distribution of the autonomous lawn mower.

Preferably, the preset distance is less than or equal to 25 centimeters.

Preferably, the preset distance is less than or equal to 15 centimeters.

Preferably, the preset distance is less than or equal to 10 centimeters.

Preferably, the preset distance is less than or equal to 40% of a length of the housing.

Preferably, the preset distance is less than or equal to 24% of a length of the housing.

Preferably, the preset distance is less than or equal to 15% of a length of the housing.

Preferably, the preset distance is less than or equal to 60% of a width of the housing.

Preferably, the preset distance is less than or equal to 35% of a width of the housing.

Preferably, the preset distance is less than or equal to 25% of a width of the housing.

Preferably, ranges of mounting heights of the first ultrasonic sensor and/or the second ultrasonic sensor relative to the ground are 19 centimeters to 20 centimeters.

Preferably, when a height of grass to be cut by the autonomous lawn mower is H2, a relational expression between a mounting height H1 of the ultrasonic sensor assembly and H2 is $H1=H2+L*\sin(\phi\pm\sigma)$, where L is a distance between an axial center of the ultrasonic sensor and a determination section, $\phi$ is a half of a field-of-view angle determined by sensor performance, and $\sigma$ is an offset angle of a central line of the ultrasonic sensor relative to a bottom surface of the housing.

Preferably, the first ultrasonic sensor has a sound beam axis, and the sound beam axis is arranged horizontally.

Preferably, the first transceiver region has a first border line near a front end of the housing, the housing has a neighboring wall adjacent to the first transceiver region, and an upper surface of the neighboring wall is lower than the first border line.

Preferably, the first ultrasonic sensor has a first axis, the neighboring wall has a tangent, there is an angle $\theta$ between the tangent and the first axis, and the angle $\theta$ is greater than or equal to $\phi\pm\sigma$, where $\phi$ is a half of a field-of-view angle determined by sensor performance, and $\sigma$ is an offset angle of a central line of the ultrasonic sensor relative to a bottom surface of the housing.

Preferably, the preset obstacle-avoidance measure is that the control module controls the autonomous lawn mower to stop moving, reverse, steer, move and steer or reverse and steer, and the distance between the autonomous lawn mower and the obstacle is greater than 0.

Preferably, the housing is provided with a vertical axis, the housing has a region E closest to the housing, a region H farthest from the housing, and a turning region located between the region E and the region H in front of the autonomous lawn mower in the forward movement direction, the turning region includes a region F and a region G located on two sides of the third vertical axis with the third vertical axis as a dividing line, and a detection range of the ultrasonic sensor assembly at least covers the region E, the region F, and the region G.

Preferably, a damaging collision occurs between the autonomous lawn mower and the obstacle when the autonomous lawn mower moves forward or turns in the region E.

Preferably, no damaging collision occurs between the autonomous lawn mower and the obstacle the autonomous lawn mower turns right in the region F.

Preferably, no damaging collision occurs between the autonomous lawn mower and the obstacle when the autonomous lawn mower turns left in the region G.

Preferably, no damaging collision occurs between the autonomous lawn mower and the obstacle when the autonomous lawn mower moves forward or turns in the region H.

Preferably, when an obstacle is detected in the region E, the control module controls the autonomous lawn mower to execute an obstacle-avoidance measure of reversing.

Preferably, when obstacles are detected in both the region F and the region G, the control module controls the autonomous lawn mower to execute an obstacle-avoidance measure of reversing.

Preferably, when an obstacle is detected in only the region F, the control module controls the autonomous lawn mower to execute an obstacle-avoidance measure of turning right or reversing.

Preferably, when an obstacle is detected in only the region G, the control module controls the autonomous lawn mower to execute an obstacle-avoidance measure of turning left or reversing.

Preferably, when an obstacle is detected in the region H, the control module controls the autonomous lawn mower to execute an obstacle-avoidance measure of moving forward or reversing or turning.

Preferably, when an obstacle is detected in none of the region E, the region F, and the region G, the control module controls the autonomous lawn mower to execute an obstacle-avoidance measure of moving forward or reversing or turning.

Preferably, the autonomous lawn mower further includes a crosstalk prevention structure, configured to prevent ultrasound sent by one of the first ultrasonic sensor and the second ultrasonic sensor from being received directly by the other one of the two without being reflected by the obstacle.

Preferably, the crosstalk prevention structure is disposed between the first ultrasonic sensor and the second ultrasonic sensor.

Preferably, the crosstalk prevention structure includes a stop wall disposed at an angle from an axis of an ultrasonic sensor.

Preferably, the crosstalk prevention structure extends toward a front side of the housing without coming into contact with an axis of an ultrasonic sensor.

Preferably, the crosstalk prevention structure extends toward a front side of the housing without exceeding an intersection of projections of an axis of the first ultrasonic sensor and an axis of the second ultrasonic sensor.

Preferably, the crosstalk prevention structure is located on a front side of a connecting line between a sound wave transmission point of the first ultrasonic sensor and a sound wave transmission point of the second ultrasonic sensor and extends toward a front side of the housing.

Preferably, the stop wall includes a first stop wall and a second stop wall, the first stop wall has a top end, the second stop wall has an upper connecting end, and the upper connecting end is lower than the top end in a vertical direction.

Preferably, the second stop wall extends toward a front side of the housing from the upper connecting end, and has a gradually decreasing height in a vertical direction.

Preferably, the crosstalk prevention structure further includes a mounting hole corresponding to a sound-producing surface of an ultrasonic sensor, a top surface, and a front end surface basically vertically connected to the top surface, the mounting hole has a hole center, and the second stop wall has a lower connecting end that is far away from the first stop wall and is lower than the upper connecting end in a vertical direction and a connecting surface that connects the upper connecting end and the lower connecting end.

Preferably, a distance L between the hole center and the front end surface is greater than 5 mm.

Preferably, a distance L2 between the upper connecting end and a front end surface is less than 10 mm.

Preferably, a distance L1 between the lower connecting end and a front end surface is less than 20 mm.

Preferably, a distance Δ between the upper connecting end and the hole center in a vertical direction is less than 16 mm.

Preferably, a range of an angle τ between the connecting surface and the top surface is 35° to 55°.

Preferably, the stop wall is disposed slanted relative to the top surface, and an angle μ between the stop wall and the top surface is not equal to 900.

Preferably, the control module includes an amplification circuit module, an analog-to-digital conversion module, a filter module, a data cache module, a microcontroller, a data processing module, a main controller, and a pulse circuit module, the microcontroller conveys an instruction to the pulse circuit module, the pulse circuit module conveys, to the ultrasonic sensor, an instruction for sending ultrasound, the ultrasonic sensor receives the instruction and sends ultrasound, the ultrasonic sensor receives an echo from an obstacle, the amplification circuit module performs amplification processing on the echo, the analog-to-digital conversion module performs analog-to-digital conversion processing on the echo, the filtering module performs filter processing, data obtained after processing enters the data cache module, the sensor microcontroller transfers the data in the data cache module to the data processing module for data analysis, and an analysis result is then fed back to the main controller for execution.

To achieve the foregoing objective, the technical solution of the present invention is:

A self-moving device includes:

a housing;

a moving module, disposed below the housing, and configured to drive the housing to move;

a drive module, configured to drive the moving module to move; and a control module, configured to control the self-moving device, where an ultrasonic sensor assembly configured to recognize an obstacle in a forward movement direction of the self-moving device is disposed on the housing, the ultrasonic sensor assembly includes at least two ultrasonic sensors, including a first ultrasonic sensor and a second ultrasonic sensor, the first ultrasonic sensor receives and transmits ultrasound in a first transceiver region, the second ultrasonic sensor receives and transmits ultrasound in a second transceiver region, the first ultrasonic sensor and the second ultrasonic sensor are arranged on the housing and directed toward one another such that the first transceiver region and the second transceiver region overlap partially to form three detection regions, wherein the portion where the first transceiver region and the second transceiver region overlap each other is a third detection region, the portion of the first transceiver region that doesn't overlap with the second transceiver region is a first detection region, the portion of the second transceiver region that doesn't overlap with the first transceiver region is a second detection region, and the control module controls the moving module to move along a preset path to keep a distance between the housing and the obstacle greater than zero.

To achieve the foregoing objective, the technical solution of the present invention is:

A self-moving device includes:

a housing;

a moving module, disposed below the housing, and configured to drive the housing to move;

a drive module, configured to drive the moving module to move; and a control module, configured to control the self-moving device, where an ultrasonic sensor assembly configured to recognize an obstacle in a forward movement direction of the self-moving device is disposed on the housing, the ultrasonic sensor assembly includes at least two ultrasonic sensors, including a first ultrasonic sensor and a second ultrasonic sensor, the first ultrasonic sensor receives and transmits ultrasound in a first transceiver region, the second ultrasonic sensor receives and transmits ultrasound in a second transceiver region, the first ultrasonic sensor and the second ultrasonic sensor are arranged on the housing and directed toward one another such that the first transceiver region and the second transceiver region overlap partially to form three detection regions, wherein the portion where the first transceiver region and the second transceiver region overlap each other is a third detection region, the portion of the first transceiver region that doesn't overlap with the second transceiver region is a first detection region, the portion of the second transceiver region that doesn't overlap with the first transceiver region is a second detection region, and the control module controls the moving module to move along a path in a direction different from a current forward movement direction.

To achieve the foregoing objective, the technical solution of the present invention is:

A self-moving device includes:

a housing;

a moving module, disposed below the housing, and configured to drive the housing to move;

a drive module, configured to drive the moving module to move; and a control module, configured to control the self-moving device, where an ultrasonic sensor assembly configured to recognize an obstacle in a forward movement direction of the self-moving device is disposed on the housing, the ultrasonic sensor assembly includes at least two ultrasonic sensors, including a first ultrasonic sensor and a second ultrasonic sensor, the first ultrasonic sensor receives and transmits ultrasound in a first transceiver region, the second ultrasonic sensor receives and transmits ultrasound in a second transceiver region, the first ultrasonic sensor and the second ultrasonic sensor are arranged on the housing and directed toward one another such that the first transceiver region and the second transceiver region overlap partially to form three detection regions, wherein the portion where the first transceiver region and the second transceiver region overlap each other is a third detection region, the portion of the first transceiver region that doesn't overlap with the second transceiver region is a first detection region, the portion of the second transceiver region that doesn't overlap with the first transceiver region is a second detection region, and the control module controls the moving module to move in a direction away from the obstacle.

To achieve the foregoing objective, the technical solution of the present invention is:

A self-moving device includes:

a housing;

a moving module, disposed below the housing, and configured to drive the housing to move;

a drive module, configured to drive the moving module to move; and a control module, configured to control the self-moving device, where an ultrasonic sensor assembly configured to recognize an obstacle in a forward movement direction of the self-moving device is disposed on the housing, the ultrasonic sensor assembly includes at least two ultrasonic sensors, including a first ultrasonic sensor and a second ultrasonic sensor, the first ultrasonic sensor receives and transmits ultrasound in a first transceiver region, the second ultrasonic sensor receives and transmits ultrasound in a second transceiver region, the first ultrasonic sensor and the second ultrasonic sensor are arranged on the housing and directed toward one another such that the first transceiver region and the second transceiver region overlap partially to form three detection regions, wherein the portion where the first transceiver region and the second transceiver region overlap each other is a third detection region, the portion of the first transceiver region that doesn't overlap with the second transceiver region is a first detection region, the portion of the second transceiver region that doesn't overlap with the first transceiver region is a second detection region, the control module recognizes that a distance between an obstacle on one side in a forward movement direction of the housing and the housing is less than a preset distance, and the control module controls the moving module to move along the other side of the forward movement direction.

To achieve the objective of detecting an obstacle at a short distance of the present invention, the technical solution of the present invention is:

A self-moving device includes:

a housing;

a moving module, disposed below the housing, and configured to drive the housing to move;

a drive module, configured to drive the moving module to move; and a control module, configured to control the self-moving device, where an ultrasonic sensor assembly configured to recognize an obstacle in a forward movement direction of the self-moving device is disposed on the housing, the ultrasonic sensor assembly includes at least two ultrasonic sensors, including a first ultrasonic sensor and a second ultrasonic sensor, the first ultrasonic sensor and the second ultrasonic sensor have an overlapping detection region, the overlapping detection region covers a part of a distance-measurement blind area of one ultrasonic sensor that transmits ultrasound, and a part of the distance-measurement blind area is located in a transceiver region of the other one of the ultrasonic sensors that receives ultrasound.

Preferably, the first ultrasonic sensor receives and transmits ultrasound in a first transceiver region, the second ultrasonic sensor receives and transmits ultrasound in a second transceiver region, the first ultrasonic sensor and the second ultrasonic sensor are arranged on the housing and directed toward one another such that the first transceiver region and the second transceiver region overlap partially to form three detection regions, wherein the portion where the first transceiver region and the second transceiver region overlap each other is a third detection region, the portion of the first transceiver region that doesn't overlap with the second transceiver region is a first detection region, the portion of the second transceiver region that doesn't overlap with the first transceiver region is a second detection region.

Preferably, the first ultrasonic sensor has a first axis, the second ultrasonic sensor has a second axis, and a range of an angle between the first axis and the second axis is 60° to 110°.

Preferably, the angle between the first axis and the second axis ranges from 70° to 90°.

Preferably, the first ultrasonic sensor has a first axis, the second ultrasonic sensor has a second axis, the housing has a housing axis, and the angles between the first axis and/or the second axis and the housing axis range from 10° to 80°.

Preferably, the angles between the first axis and/or the second axis and the housing axis range from 25° to 55°.

Preferably, the first ultrasonic sensor receives and transmits ultrasound in a first transceiver region, the second ultrasonic sensor receives and transmits ultrasound in a second transceiver region, and the first ultrasonic sensor and the second ultrasonic sensor are arranged on the housing in parallel to each other in a width direction of the self-moving device, so that the first transceiver region and the second transceiver region overlap partially to form three detection regions, where an overlapping part of the first transceiver region and the second transceiver region is a third detection region, a part except the overlapping part of the first transceiver region is a first detection region, and a part except the overlapping part of the second transceiver region is a second detection region.

Preferably, the third detection region at least covers both a part of a first distance-measurement blind area in the first transceiver region and a part of a second distance-measurement blind area in the second transceiver region.

Preferably, the control module controls the first ultrasonic sensor and the second ultrasonic sensor to transmit ultrasound alternately in time.

Preferably, the control module controls the first ultrasonic sensor to transmit ultrasound in a first period of time, the first ultrasonic sensor and the second ultrasonic sensor receive echoes from the obstacle in the first period of time, the control module controls the second ultrasonic sensor to transmit ultrasound in a second period of time following the first period of time, and the first ultrasonic sensor and the second ultrasonic sensor receive echoes from the obstacle in the second period of time.

Preferably, the control module determines a location of the obstacle according to a combination of ultrasound transmitted by the first ultrasonic sensor and the second ultrasonic sensor in the ultrasonic sensor assembly and echoes received from the obstacle by the first ultrasonic sensor and the second ultrasonic sensor.

Preferably, when only the first ultrasonic sensor in the ultrasonic sensor assembly transmits ultrasound and only the first ultrasonic sensor receives an echo from the obstacle, the control module determines that the obstacle is located in the first detection region; when only the second ultrasonic sensor in the ultrasonic sensor assembly transmits ultrasound and only the second ultrasonic sensor receives an echo from the obstacle, the control module determines that the obstacle is located in the second detection region; when the first ultrasonic sensor in the ultrasonic sensor assembly transmits ultrasound and the first ultrasonic sensor and the second ultrasonic sensor receive echoes from the obstacle, the control module determines that the obstacle is located in the third detection region; when the second ultrasonic sensor in the ultrasonic sensor assembly transmits ultrasound and the first ultrasonic sensor and the second ultrasonic sensor receive echoes from the obstacle, the control module determines that the obstacle is located in the third detection region; when the first ultrasonic sensor in the ultrasonic sensor assembly transmits ultrasound and the second ultrasonic sensor receives an echo from the obstacle, the control module determines that the obstacle is located in the third detection region; and when the second ultrasonic sensor in the ultrasonic sensor assembly transmits ultrasound and the first ultrasonic sensor receives an echo from the obstacle, the control module determines that the obstacle is located in the third detection region.

Preferably, the control module calculates the distance between the obstacle and the self-moving device according to a time difference between the time when the ultrasonic sensor assembly transmits ultrasound and the time when the ultrasonic sensor assembly receives an echo from the obstacle.

Preferably, the first ultrasonic sensor has a first axis, the second ultrasonic sensor has a second axis, and the first axis and the second axis are coplanar in a vertical direction.

Preferably, the first ultrasonic sensor receives and transmits ultrasound in a first transceiver region, the second ultrasonic sensor receives ultrasound in a second reception region, and the first ultrasonic sensor and the second ultrasonic sensor are arranged on the housing at an angle from each other, so that the first transceiver region and the second reception region overlap partially, an overlapping part of the first transceiver region and the second reception region is a third detection region, a part except the overlapping part of the first transceiver region is a first detection region, and the third detection region at least covers a part of a first distance-measurement blind area in the first transceiver region.

Preferably, a range of an angle between the first ultrasonic sensor and the second ultrasonic sensor is 10° to 80°.

Preferably, a range of an angle between the first ultrasonic sensor and the second ultrasonic sensor is 25° to 55°.

Preferably, when there are three or more coordinating ultrasonic sensors, a plurality of ultrasonic sensors transmitting ultrasound whose sound wave transmission ranges overlap uses a mode of transmitting ultrasound successively, and when one of ultrasonic sensors transmitting ultrasound whose sound wave transmission ranges overlap transmits ultrasound, the remaining ultrasonic sensors receive ultrasound.

Preferably, when there are three or more coordinating ultrasonic sensors, a plurality of ultrasonic sensors transmitting ultrasound whose sound wave transmission ranges do not overlap uses a mode of transmitting ultrasound simultaneously, and when one of ultrasonic sensors transmitting ultrasound whose sound wave transmission ranges overlap and the ultrasonic sensors transmitting ultrasound whose sound wave transmission ranges do not overlap transmit ultrasound simultaneously, the remaining ultrasonic sensors receive ultrasound.

Preferably, when there are three or more coordinating ultrasonic sensors, a plurality of ultrasonic sensors transmitting ultrasound whose sound wave transmission ranges do not overlap uses a mode of transmitting ultrasound successively, when one of ultrasonic sensors transmitting ultrasound whose sound wave transmission ranges overlap transmits ultrasound, the remaining ultrasonic sensors receive ultrasound, and when the ultrasonic sensors transmitting ultrasound whose sound wave transmission ranges do not overlap transmits ultrasound, the remaining ultrasonic sensors receive ultrasound.

Preferably, the first ultrasonic sensor is disposed at a position at a distance D from a front end of the self-moving device.

Preferably, the distance D is located at a front half of the self-moving device in a length direction.

Preferably, an ultrasonic beam pattern for recognizing an obstacle in a forward movement direction of the self-moving device is noncircular, a tangent plane is formed by an axis perpendicular to the ultrasonic beam pattern to obtain a waveform surface, the waveform surface has a major axis direction and a minor axis direction, the major axis direction is mounted to be basically parallel to a bottom surface of the self-moving device, and the minor axis direction is mounted to be basically perpendicular to the bottom surface of the self-moving device.

Preferably, the waveform surface is elliptical.

Preferably, an ultrasonic beam pattern of the first ultrasonic sensor is noncircular, and a tangent plane is formed by an axis perpendicular to the first ultrasonic sensor to obtain the noncircular waveform surface.

Preferably, an ultrasonic beam pattern of the first ultrasonic sensor is circular, a beam adjuster configured to adjust a shape of an ultrasonic beam pattern of ultrasound transmitted by the first ultrasonic sensor is disposed at an ultrasound transmission end of the first ultrasonic sensor, the ultrasonic beam pattern obtained after the adjustment by the beam adjuster is noncircular, and a tangent plane is formed by an axis perpendicular to the ultrasonic beam pattern to obtain the noncircular waveform surface.

Preferably, the ultrasonic sensor assembly includes an ultrasonic sensor configured to transmit and receive ultrasound, a PCB board, and a protection case for fixing the PCB board and the ultrasonic sensor, the ultrasonic sensor has an outward sound-producing surface, the protection case has an end surface, and the sound-producing surface is level with the end surface or is concave relative to the end surface to be disposed in the protection case.

Preferably, the self-moving device has a reflected wave threshold, and the self-moving device recognizes that a value of the intensity of the echo from the obstacle is greater than the reflected wave threshold.

Preferably, when the distance between the obstacle detected by the ultrasonic sensor assembly and the self-moving device is less than the preset distance, the control module controls the self-moving device to execute a preset obstacle-avoidance measure.

Preferably, the preset distance is less than or equal to 25 centimeters.

Preferably, the preset distance is less than or equal to 15 centimeters.

Preferably, the preset distance is less than or equal to 10 centimeters.

Preferably, the preset distance is less than or equal to 40% of a length of the housing.

Preferably, the preset distance is less than or equal to 24% of a length of the housing.

Preferably, the preset distance is less than or equal to 15% of a length of the housing.

Preferably, the preset distance is less than or equal to 60% of a width of the housing.

Preferably, the preset distance is less than or equal to 35% of a width of the housing.

Preferably, the preset distance is less than or equal to 25% of a width of the housing.

Preferably, ranges of mounting heights of the first ultrasonic sensor and/or the second ultrasonic sensor relative to the ground are 19 centimeters to 20 centimeters.

Preferably, when a height of grass to be cut by the autonomous lawn mower is H2, a relational expression between a mounting height H1 of the ultrasonic sensor assembly and H2 is H1=H2+L*sin(φ±σ) where L is a distance between an axial center of the ultrasonic sensor and a determination section, φ is a half of a field-of-view angle determined by sensor performance, and σ is an offset angle of a central line of the ultrasonic sensor relative to a bottom surface of the housing.

Preferably, the first ultrasonic sensor has a sound beam axis, and the sound beam axis is arranged horizontally.

Preferably, the first transceiver region has a first border line near a front end of the housing, the housing has a neighboring wall adjacent to the first transceiver region, and an upper surface of the neighboring wall is lower than the first border line.

Preferably, the first ultrasonic sensor has a first axis, the neighboring wall has a tangent, there is an angle θ between the tangent and the first axis, and the angle θ is greater than or equal to φ±σ, where φ is a half of a field-of-view angle determined by sensor performance, and σ is an offset angle of a central line of the ultrasonic sensor relative to a bottom surface of the housing.

Preferably, the autonomous lawn mower further includes a crosstalk prevention structure, configured to prevent ultrasound sent by one of the first ultrasonic sensor and the second ultrasonic sensor from being received directly by the other one of the two without being reflected by the obstacle.

Preferably, the crosstalk prevention structure is disposed between the first ultrasonic sensor and the second ultrasonic sensor.

Preferably, the crosstalk prevention structure includes a stop wall disposed at an angle from an axis of an ultrasonic sensor.

Preferably, the crosstalk prevention structure extends toward a front side of the housing without coming into contact with an axis of an ultrasonic sensor.

Preferably, the crosstalk prevention structure extends toward a front side of the housing without exceeding an intersection of projections of an axis of the first ultrasonic sensor and an axis of the second ultrasonic sensor.

Preferably, the crosstalk prevention structure is located on a front side of a connecting line between a sound wave transmission point of the first ultrasonic sensor and a sound wave transmission point of the second ultrasonic sensor and extends toward a front side of the housing.

Preferably, the stop wall includes a first stop wall and a second stop wall, the first stop wall has a top end, the second stop wall has an upper connecting end, and the upper connecting end is lower than the top end in a vertical direction.

Preferably, the second stop wall extends toward a front side of the housing from the upper connecting end, and has a gradually decreasing height in a vertical direction.

Preferably, the crosstalk prevention structure further includes a mounting hole corresponding to a sound-producing surface of an ultrasonic sensor, a top surface, and a front end surface basically vertically connected to the top surface, the mounting hole has a hole center, and the second stop wall has a lower connecting end that is far away from the first stop wall and is lower than the upper connecting end in a vertical direction and a connecting surface that connects the upper connecting end and the lower connecting end.

Preferably, a distance L between the hole center and the front end surface is greater than 5 mm.

Preferably, a distance L2 between the upper connecting end and a front end surface is less than 10 mm.

Preferably, a distance L1 between the lower connecting end and a front end surface is less than 20 mm.

Preferably, a distance Δ between the upper connecting end and the hole center in a vertical direction is less than 16 mm.

Preferably, a range of an angle τ between the connecting surface and the top surface is 35° and 55°.

Preferably, the stop wall is disposed slanted relative to the top surface, and an angle μ between the stop wall and the top surface is not equal to 90°.

Preferably, the control module includes an amplification circuit module, an analog-to-digital conversion module, a filter module, a data cache module, a microcontroller, a data processing module, a main controller, and a pulse circuit module, the microcontroller conveys an instruction to the pulse circuit module, the pulse circuit module conveys, to the ultrasonic sensor, an instruction for sending ultrasound, the ultrasonic sensor receives the instruction and sends ultrasound, the ultrasonic sensor receives an echo from an obstacle, the amplification circuit module performs amplification processing on the echo, the analog-to-digital conversion module performs analog-to-digital conversion processing on the echo, the filtering module performs filter processing, data obtained after processing enters the data cache module, the sensor microcontroller transfers the data in the data cache module to the data processing module for data analysis, and an analysis result is then fed back to the main controller for execution.

To achieve the objective of detecting an obstacle at a short distance of the present invention, the technical solution of the present invention is:

A self-moving device includes:

a housing;

a moving module, disposed below the housing, and configured to drive the housing to move;

a drive module, configured to drive the moving module to move; and a control module, configured to control the self-moving device, where an ultrasonic sensor assembly configured to recognize an obstacle in a forward movement direction of the self-moving device is disposed on the housing, the ultrasonic sensor assembly includes at least two ultrasonic sensors, including a first ultrasonic sensor and a second ultrasonic sensor, the first ultrasonic sensor receives and transmits ultrasound in a first transceiver region, the second ultrasonic sensor receives and transmits ultrasound in a second transceiver region, the first transceiver region and the second transceiver region overlap partially to form an overlapping detection region, and the overlapping detection region at least covers both a part of a first distance-measurement blind area in the first transceiver region and a part of a second distance-measurement blind area in the second transceiver region.

Preferably, the first ultrasonic sensor and the second ultrasonic sensor are arranged on the housing at an angle from each other, so that the first transceiver region and the second transceiver region overlap partially to form three detection regions, where an overlapping part of the first transceiver region and the second transceiver region is a third detection region, a part except the overlapping part of the first transceiver region is a first detection region, and a part except the overlapping part of the second transceiver region is a second detection region.

Preferably, the first ultrasonic sensor has a first axis, the second ultrasonic sensor has a second axis, and a range of an angle between the first axis and the second axis is 60° to 110°.

Preferably, the angle between the first axis and the second axis ranges from 70° to 90°.

Preferably, the first ultrasonic sensor has a first axis, the second ultrasonic sensor has a second axis, the housing has a housing axis, and angles between the first axis and/or the second axis and the housing axis range from 10° to 80°.

Preferably, the angles between the first axis and/or the second axis and the housing axis range from 25° to 55°.

Preferably, the first ultrasonic sensor receives and transmits ultrasound in a first transceiver region, the second ultrasonic sensor receives and transmits ultrasound in a second transceiver region, and the first ultrasonic sensor and the second ultrasonic sensor are arranged on the housing in parallel to each other in a width direction of the self-moving device, so that the first transceiver region and the second transceiver region overlap partially to form three detection regions, where an overlapping part of the first transceiver region and the second transceiver region is a third detection region, a part except the overlapping part of the first transceiver region is a first detection region, and a part except the overlapping part of the second transceiver region is a second detection region.

Preferably, the third detection region at least covers both a part of a first distance-measurement blind area in the first transceiver region and a part of a second distance-measurement blind area in the second transceiver region.

Preferably, the control module controls the first ultrasonic sensor and the second ultrasonic sensor to transmit ultrasound alternately in time.

Preferably, the control module controls the first ultrasonic sensor to transmit ultrasound in a first period of time, the first ultrasonic sensor and the second ultrasonic sensor receive echoes from the obstacle in the first period of time, the control module controls the second ultrasonic sensor to transmit ultrasound in a second period of time following the first period of time, and the first ultrasonic sensor and the second ultrasonic sensor receive echoes from the obstacle in the second period of time.

Preferably, the control module determines a location of the obstacle according to a combination of ultrasound transmitted by the first ultrasonic sensor and the second ultrasonic sensor in the ultrasonic sensor assembly and echoes received from the obstacle by the first ultrasonic sensor and the second ultrasonic sensor.

Preferably, when only the first ultrasonic sensor in the ultrasonic sensor assembly transmits ultrasound and only the first ultrasonic sensor receives an echo from the obstacle, the control module determines that the obstacle is located in the first detection region; when only the second ultrasonic sensor in the ultrasonic sensor assembly transmits ultrasound and only the second ultrasonic sensor receives an echo from the obstacle, the control module determines that the obstacle is located in the second detection region; when the first ultrasonic sensor in the ultrasonic sensor assembly transmits ultrasound and the first ultrasonic sensor and the second ultrasonic sensor receive echoes from the obstacle, the control module determines that the obstacle is located in the third detection region; when the second ultrasonic sensor in the ultrasonic sensor assembly transmits ultrasound and the first ultrasonic sensor and the second ultrasonic sensor receive echoes from the obstacle, the control module determines that the obstacle is located in the third detection region; when the first ultrasonic sensor in the ultrasonic sensor assembly transmits ultrasound and the second ultrasonic sensor receives an echo from the obstacle, the control module determines that the obstacle is located in the third detection region; and when the second ultrasonic sensor in the ultrasonic sensor assembly transmits ultrasound and the first ultrasonic sensor receives an echo from the obstacle, the control module determines that the obstacle is located in the third detection region.

Preferably, the control module calculates the distance between the obstacle and the self-moving device according to a time difference between the time when the ultrasonic sensor assembly transmits ultrasound and the time when the ultrasonic sensor assembly receives an echo from the obstacle.

Preferably, the first ultrasonic sensor has a first axis, the second ultrasonic sensor has a second axis, and the first axis and the second axis are coplanar in a vertical direction.

Preferably, the first ultrasonic sensor receives and transmits ultrasound in a first transceiver region, the second ultrasonic sensor receives ultrasound in a second reception region, and the first ultrasonic sensor and the second ultrasonic sensor are arranged on the housing at an angle from each other, so that the first transceiver region and the second reception region overlap partially, an overlapping part of the first transceiver region and the second reception region is a third detection region, a part except the overlapping part of the first transceiver region is a first detection region, and the third detection region at least covers a part of a first distance-measurement blind area in the first transceiver region.

Preferably, a range of an angle between the first ultrasonic sensor and the second ultrasonic sensor is 10° to 80°.

Preferably, a range of an angle between the first ultrasonic sensor and the second ultrasonic sensor is 25° to 55°.

Preferably, when there are three or more coordinating ultrasonic sensors, a plurality of ultrasonic sensors transmitting ultrasound whose sound wave transmission ranges overlap uses a mode of transmitting ultrasound successively, and when one of ultrasonic sensors transmitting ultrasound whose sound wave transmission ranges overlap transmits ultrasound, the remaining ultrasonic sensors receive ultrasound.

Preferably, when there are three or more coordinating ultrasonic sensors, a plurality of ultrasonic sensors transmitting ultrasound whose sound wave transmission ranges do not overlap uses a mode of transmitting ultrasound simultaneously, and when one of ultrasonic sensors transmitting ultrasound whose sound wave transmission ranges overlap and the ultrasonic sensors transmitting ultrasound whose sound wave transmission ranges do not overlap transmit ultrasound simultaneously, the remaining ultrasonic sensors receive ultrasound.

Preferably, when there are three or more coordinating ultrasonic sensors, a plurality of ultrasonic sensors transmitting ultrasound whose sound wave transmission ranges do not overlap uses a mode of transmitting ultrasound successively, when one of ultrasonic sensors transmitting ultrasound whose sound wave transmission ranges overlap transmits ultrasound, the remaining ultrasonic sensors receive ultrasound, and when the ultrasonic sensors transmitting ultrasound whose sound wave transmission ranges do not overlap transmits ultrasound, the remaining ultrasonic sensors receive ultrasound.

Preferably, the first ultrasonic sensor is disposed at a position at a distance D from a front end of the self-moving device.

Preferably, the distance D is located at a front half of the self-moving device in a length direction.

Preferably, an ultrasonic beam pattern for recognizing an obstacle in a forward movement direction of the self-moving device is noncircular, a tangent plane is formed by an axis perpendicular to the ultrasonic beam pattern to obtain a waveform surface, the waveform surface has a major axis direction and a minor axis direction, the major axis direction is mounted to be basically parallel to a bottom surface of the self-moving device, and the minor axis direction is mounted to be basically perpendicular to the bottom surface of the self-moving device.

Preferably, the waveform surface is elliptical.

Preferably, an ultrasonic beam pattern of the first ultrasonic sensor is noncircular, and a tangent plane is formed by an axis perpendicular to the first ultrasonic sensor to obtain the noncircular waveform surface.

Preferably, an ultrasonic beam pattern of the first ultrasonic sensor is circular, a beam adjuster configured to adjust a shape of an ultrasonic beam pattern of ultrasound transmitted by the first ultrasonic sensor is disposed at an ultrasound transmission end of the first ultrasonic sensor, the ultrasonic beam pattern obtained after the adjustment by the beam adjuster is noncircular, and a tangent plane is formed by an axis perpendicular to the ultrasonic beam pattern to obtain the noncircular waveform surface.

Preferably, the ultrasonic sensor assembly includes an ultrasonic sensor configured to transmit and receive ultrasound, a PCB board, and a protection case for fixing the PCB board and the ultrasonic sensor, the ultrasonic sensor has an outward sound-producing surface, the protection case has an end surface, and the sound-producing surface is level with the end surface or is concave relative to the end surface to be disposed in the protection case.

Preferably, the self-moving device has a reflected wave threshold, and the self-moving device recognizes that a value of the intensity of the echo from the obstacle is greater than the reflected wave threshold.

Preferably, when the distance between the obstacle detected by the ultrasonic sensor assembly and the self-moving device is less than the preset distance, the control module controls the self-moving device to execute a preset obstacle-avoidance measure.

Preferably, the preset distance is less than or equal to 25 centimeters.

Preferably, the preset distance is less than or equal to 15 centimeters.

Preferably, the preset distance is less than or equal to 10 centimeters.

Preferably, the preset distance is less than or equal to 40% of a length of the housing.

Preferably, the preset distance is less than or equal to 24% of a length of the housing.

Preferably, the preset distance is less than or equal to 15% of a length of the housing.

Preferably, the preset distance is less than or equal to 60% of a width of the housing.

Preferably, the preset distance is less than or equal to 35% of a width of the housing.

Preferably, the preset distance is less than or equal to 25% of a width of the housing.

Preferably, ranges of mounting heights of the first ultrasonic sensor and/or the second ultrasonic sensor relative to the ground are 19 centimeters to 20 centimeters.

Preferably, when a height of grass to be cut by an autonomous lawn mower is H2, a relational expression between a mounting height H1 of the ultrasonic sensor assembly and H2 is $H1=H2+L*\sin(\phi\pm\sigma)$, where L is a distance between an axial center of the ultrasonic sensor and a determination section, $\phi$ is a half of a field-of-view angle determined by sensor performance, and $\sigma$ is an offset angle of a central line of the ultrasonic sensor relative to a bottom surface of the housing.

Preferably, the first ultrasonic sensor has a sound beam axis, and the sound beam axis is arranged horizontally.

Preferably, the first transceiver region has a first border line near a front end of the housing, the housing has a neighboring wall adjacent to the first transceiver region, and an upper surface of the neighboring wall is lower than the first border line.

Preferably, the first ultrasonic sensor has a first axis, the neighboring wall has a tangent, there is an angle $\theta$ between the tangent and the first axis, and the angle $\theta$ is greater than or equal to $\phi\pm\sigma$, where $\phi$ is a half of a field-of-view angle determined by sensor performance, and $\sigma$ is an offset angle of a central line of the ultrasonic sensor relative to a bottom surface of the housing.

Preferably, the autonomous lawn mower further includes a crosstalk prevention structure, configured to prevent ultrasound sent by one of the first ultrasonic sensor and the second ultrasonic sensor from being received directly by the other one of the two without being reflected by the obstacle.

Preferably, the crosstalk prevention structure is disposed between the first ultrasonic sensor and the second ultrasonic sensor.

Preferably, the crosstalk prevention structure includes a stop wall disposed at an angle from an axis of an ultrasonic sensor.

Preferably, the crosstalk prevention structure extends toward a front side of the housing without coming into contact with an axis of an ultrasonic sensor.

Preferably, the crosstalk prevention structure extends toward a front side of the housing without exceeding an intersection of projections of an axis of the first ultrasonic sensor and an axis of the second ultrasonic sensor.

Preferably, the crosstalk prevention structure is located on a front side of a connecting line between a sound wave transmission point of the first ultrasonic sensor and a sound wave transmission point of the second ultrasonic sensor and extends toward a front side of the housing.

Preferably, the stop wall includes a first stop wall and a second stop wall, the first stop wall has a top end, the second stop wall has an upper connecting end, and the upper connecting end is lower than the top end in a vertical direction.

Preferably, the second stop wall extends toward a front side of the housing from the upper connecting end, and has a gradually decreasing height in a vertical direction.

Preferably, the crosstalk prevention structure further includes a mounting hole corresponding to a sound-producing surface of an ultrasonic sensor, a top surface, and a front end surface basically vertically connected to the top surface, the mounting hole has a hole center, and the second stop wall has a lower connecting end that is far away from the first stop wall and is lower than the upper connecting end in a vertical direction and a connecting surface that connects the upper connecting end and the lower connecting end.

Preferably, a distance L between the hole center and the front end surface is greater than 5 mm.

Preferably, a distance L2 between the upper connecting end and a front end surface is less than 10 mm.

Preferably, a distance L1 between the lower connecting end and a front end surface is less than 20 mm.

Preferably, a distance Δ between the upper connecting end and the hole center in a vertical direction is less than 16 mm.

Preferably, a range of an angle τ between the connecting surface and the top surface is 35° and 55°.

Preferably, the stop wall is disposed slanted relative to the top surface, and an angle μ between the stop wall and the top surface is not equal to 90°.

Preferably, the control module includes an amplification circuit module, an analog-to-digital conversion module, a filter module, a data cache module, a microcontroller, a data processing module, a main controller, and a pulse circuit module, the microcontroller conveys an instruction to the pulse circuit module, the pulse circuit module conveys, to the ultrasonic sensor, an instruction for sending ultrasound, the ultrasonic sensor receives the instruction and sends ultrasound, the ultrasonic sensor receives an echo from an obstacle, the amplification circuit module performs amplification processing on the echo, the analog-to-digital conversion module performs analog-to-digital conversion processing on the echo, the filtering module performs filter processing, data obtained after processing enters the data cache module, the sensor microcontroller transfers the data in the data cache module to the data processing module for data analysis, and an analysis result is then fed back to the main controller for execution.

To achieve the objective of ascending a slope of the present invention, the technical solution of the present invention is:

A self-moving device includes:

a housing;

a moving module, disposed below the housing, and configured to drive the housing to move;

a drive module, configured to drive the moving module to move; and a control module, configured to control the self-moving device, where an ultrasonic sensor assembly configured to recognize an obstacle in a forward movement direction of the self-moving device is disposed on the housing, the ultrasonic sensor assembly includes at least two ultrasonic sensors, including a first ultrasonic sensor and a second ultrasonic sensor, the first ultrasonic sensor and the second ultrasonic sensor have an overlapping detection region, the overlapping detection region covers a part of a distance-measurement blind area of one ultrasonic sensor that transmits ultrasound, a part of the distance-measurement blind area is located in a transceiver region of the other one of the ultrasonic sensors that receives ultrasound, and when the distance between the obstacle detected by the ultrasonic sensor assembly and the self-moving device is less than the preset distance and the intensity of the echo received from the obstacle is greater than the reflected wave threshold, the control module controls the self-moving device to execute a preset obstacle-avoidance measure.

Preferably, the first ultrasonic sensor receives and transmits ultrasound in a first transceiver region, the second ultrasonic sensor receives and transmits ultrasound in a second transceiver region, and the first ultrasonic sensor and the second ultrasonic sensor are arranged on the housing and directed toward one another such that the first transceiver region and the second transceiver region overlap partially to form three detection regions, wherein the portion where the first transceiver region and the second transceiver region overlap each other is a third detection region, the portion of the first transceiver region that doesn't overlap with the second transceiver region is a first detection region, the portion of the second transceiver region that doesn't overlap with the first transceiver region is a second detection region.

Preferably, the first ultrasonic sensor has a first axis, the second ultrasonic sensor has a second axis, and a range of an angle between the first axis and the second axis is 60° to 110°.

Preferably, the angle between the first axis and the second axis ranges from 70° to 90°.

Preferably, the first ultrasonic sensor has a first axis, the second ultrasonic sensor has a second axis, the housing has a housing axis, and the angles between the first axis and/or the second axis and the housing axis range from 10° to 80°.

Preferably, the angles between the first axis and/or the second axis and the housing axis range from 25° to 55°.

Preferably, the first ultrasonic sensor receives and transmits ultrasound in a first transceiver region, the second ultrasonic sensor receives and transmits ultrasound in a second transceiver region, and the first ultrasonic sensor and the second ultrasonic sensor are arranged on the housing in parallel to each other in a width direction of the self-moving device, so that the first transceiver region and the second transceiver region overlap partially to form three detection regions, where an overlapping part of the first transceiver region and the second transceiver region is a third detection region, a part except the overlapping part of the first transceiver region is a first detection region, and a part except the overlapping part of the second transceiver region is a second detection region.

Preferably, the third detection region at least covers both a part of a first distance-measurement blind area in the first transceiver region and a part of a second distance-measurement blind area in the second transceiver region.

Preferably, the control module controls the first ultrasonic sensor and the second ultrasonic sensor to transmit ultrasound alternately in time.

Preferably, the control module controls the first ultrasonic sensor to transmit ultrasound in a first period of time, the first ultrasonic sensor and the second ultrasonic sensor receive echoes from the obstacle in the first period of time, the control module controls the second ultrasonic sensor to transmit ultrasound in a second period of time following the first period of time, and the first ultrasonic sensor and the second ultrasonic sensor receive echoes from the obstacle in the second period of time.

Preferably, the control module calculates the distance between the obstacle and the self-moving device according to a time difference between the time when the ultrasonic sensor assembly transmits ultrasound and the time when the ultrasonic sensor assembly receives an echo from the obstacle.

Preferably, the first ultrasonic sensor has a first axis, the second ultrasonic sensor has a second axis, and the first axis and the second axis are coplanar in a vertical direction.

Preferably, the first ultrasonic sensor receives and transmits ultrasound in a first transceiver region, the second ultrasonic sensor receives ultrasound in a second reception region, and the first ultrasonic sensor and the second ultrasonic sensor are arranged on the housing at an angle from each other, so that the first transceiver region and the second reception region overlap partially, an overlapping part of the first transceiver region and the second reception region is a third detection region, a part except the overlapping part of the first transceiver region is a first detection region, and the third detection region at least covers a part of a first distance-measurement blind area in the first transceiver region.

Preferably, a range of an angle between the first ultrasonic sensor and the second ultrasonic sensor is 10° to 80°.

Preferably, a range of an angle between the first ultrasonic sensor and the second ultrasonic sensor is 25° to 55°.

Preferably, when there are three or more coordinating ultrasonic sensors, a plurality of ultrasonic sensors transmitting ultrasound whose sound wave transmission ranges overlap uses a mode of transmitting ultrasound successively, and when one of ultrasonic sensors transmitting ultrasound whose sound wave transmission ranges overlap transmits ultrasound, the remaining ultrasonic sensors receive ultrasound.

Preferably, when there are three or more coordinating ultrasonic sensors, a plurality of ultrasonic sensors transmitting ultrasound whose sound wave transmission ranges do not overlap uses a mode of transmitting ultrasound simultaneously, and when one of ultrasonic sensors transmitting ultrasound whose sound wave transmission ranges overlap and the ultrasonic sensors transmitting ultrasound whose sound wave transmission ranges do not overlap transmit ultrasound simultaneously, the remaining ultrasonic sensors receive ultrasound.

Preferably, when there are three or more coordinating ultrasonic sensors, a plurality of ultrasonic sensors transmitting ultrasound whose sound wave transmission ranges do not overlap uses a mode of transmitting ultrasound successively, when one of ultrasonic sensors transmitting ultrasound whose sound wave transmission ranges overlap transmits ultrasound, the remaining ultrasonic sensors receive ultrasound, and when the ultrasonic sensors transmitting ultrasound whose sound wave transmission ranges do not overlap transmits ultrasound, the remaining ultrasonic sensors receive ultrasound.

Preferably, the first ultrasonic sensor is disposed at a position at a distance D from a front end of the self-moving device.

Preferably, the distance D is located at a front half of the self-moving device in a length direction.

Preferably, an ultrasonic beam pattern for recognizing an obstacle in a forward movement direction of the self-moving device is noncircular, a tangent plane is formed by an axis perpendicular to the ultrasonic beam pattern to obtain a waveform surface, the waveform surface has a major axis direction and a minor axis direction, the major axis direction is mounted to be basically parallel to a bottom surface of the self-moving device, and the minor axis direction is mounted to be basically perpendicular to the bottom surface of the self-moving device.

Preferably, the waveform surface is elliptical.

Preferably, an ultrasonic beam pattern of the first ultrasonic sensor is noncircular, and a tangent plane is formed by an axis perpendicular to the first ultrasonic sensor to obtain the noncircular waveform surface.

Preferably, an ultrasonic beam pattern of the first ultrasonic sensor is circular, a beam adjuster configured to adjust a shape of an ultrasonic beam pattern of ultrasound transmitted by the first ultrasonic sensor is disposed at an ultrasound transmission end of the first ultrasonic sensor, the ultrasonic beam pattern obtained after the adjustment by the beam adjuster is noncircular, and a tangent plane is formed by an axis perpendicular to the ultrasonic beam pattern to obtain the noncircular waveform surface.

Preferably, the ultrasonic sensor assembly includes an ultrasonic sensor configured to transmit and receive ultrasound, a PCB board, and a protection case for fixing the PCB board and the ultrasonic sensor, the ultrasonic sensor has an outward sound-producing surface, the protection case has an end surface, and the sound-producing surface is level with the end surface or is concave relative to the end surface to be disposed in the protection case.

Preferably, the preset distance is less than or equal to 25 centimeters.

Preferably, the preset distance is less than or equal to 15 centimeters.

Preferably, the preset distance is less than or equal to 10 centimeters.

Preferably, the preset distance is less than or equal to 40% of a length of the housing.

Preferably, the preset distance is less than or equal to 24% of a length of the housing.

Preferably, the preset distance is less than or equal to 15% of a length of the housing.

Preferably, the preset distance is less than or equal to 60% of a width of the housing.

Preferably, the preset distance is less than or equal to 35% of a width of the housing.

Preferably, the preset distance is less than or equal to 25% of a width of the housing.

Preferably, ranges of mounting heights of the first ultrasonic sensor and/or the second ultrasonic sensor relative to the ground are 19 centimeters to 20 centimeters.

Preferably, when a height of grass to be cut by an autonomous lawn mower is H2, a relational expression between a mounting height H1 of the ultrasonic sensor assembly and H2 is $H1=H2+L*\sin(\phi \pm \sigma)$, where L is a distance between an axial center of the ultrasonic sensor and a determination section, $\phi$ is a half of a field-of-view angle determined by sensor performance, and $\sigma$ is an offset angle of a central line of the ultrasonic sensor relative to a bottom surface of the housing.

Preferably, the first ultrasonic sensor has a sound beam axis, and the sound beam axis is arranged horizontally.

Preferably, the first transceiver region has a first border line near a front end of the housing, the housing has a neighboring wall adjacent to the first transceiver region, and an upper surface of the neighboring wall is lower than the first border line.

Preferably, the first ultrasonic sensor has a first axis, the neighboring wall has a tangent, there is an angle $\theta$ between the tangent and the first axis, and the angle $\theta$ is greater than or equal to $\phi \pm \sigma$, where $\phi$ is a half of a field-of-view angle determined by sensor performance, and $\sigma$ is an offset angle of a central line of the ultrasonic sensor relative to a bottom surface of the housing.

Preferably, the autonomous lawn mower further includes a crosstalk prevention structure, configured to prevent ultrasound sent by one of the first ultrasonic sensor and the second ultrasonic sensor from being received directly by the other one of the two without being reflected by the obstacle.

Preferably, the crosstalk prevention structure is disposed between the first ultrasonic sensor and the second ultrasonic sensor.

Preferably, the crosstalk prevention structure includes a stop wall disposed at an angle from an axis of an ultrasonic sensor.

Preferably, the crosstalk prevention structure extends toward a front side of the housing without coming into contact with an axis of an ultrasonic sensor.

Preferably, the crosstalk prevention structure extends toward a front side of the housing without exceeding an intersection of projections of an axis of the first ultrasonic sensor and an axis of the second ultrasonic sensor.

Preferably, the crosstalk prevention structure is located on a front side of a connecting line between a sound wave transmission point of the first ultrasonic sensor and a sound wave transmission point of the second ultrasonic sensor and extends toward a front side of the housing.

Preferably, the stop wall includes a first stop wall and a second stop wall, the first stop wall has a top end, the second stop wall has an upper connecting end, and the upper connecting end is lower than the top end in a vertical direction.

Preferably, the second stop wall extends toward a front side of the housing from the upper connecting end, and has a gradually decreasing height in a vertical direction.

Preferably, the crosstalk prevention structure further includes a mounting hole corresponding to a sound-producing surface of an ultrasonic sensor, a top surface, and a front end surface basically vertically connected to the top surface, the mounting hole has a hole center, and the second stop wall has a lower connecting end that is far away from the first stop wall and is lower than the upper connecting end in a vertical direction and a connecting surface that connects the upper connecting end and the lower connecting end.

Preferably, a distance L between the hole center and the front end surface is greater than 5 mm.

Preferably, a distance L2 between the upper connecting end and a front end surface is less than 10 mm.

Preferably, a distance L1 between the lower connecting end and a front end surface is less than 20 mm.

Preferably, a distance Δ between the upper connecting end and the hole center in a vertical direction is less than 16 mm.

Preferably, a range of an angle τ between the connecting surface and the top surface is 35° and 55°.

Preferably, the stop wall is disposed slanted relative to the top surface, and an angle μ between the stop wall and the top surface is not equal to 90°.

Preferably, the control module includes an amplification circuit module, an analog-to-digital conversion module, a filter module, a data cache module, a microcontroller, a data processing module, a main controller, and a pulse circuit module, the microcontroller conveys an instruction to the pulse circuit module, the pulse circuit module conveys, to the ultrasonic sensor, an instruction for sending ultrasound, the ultrasonic sensor receives the instruction and sends ultrasound, the ultrasonic sensor receives an echo from an obstacle, the amplification circuit module performs amplification processing on the echo, the analog-to-digital conversion module performs analog-to-digital conversion processing on the echo, the filtering module performs filter processing, data obtained after processing enters the data cache module, the sensor microcontroller transfers the data in the data cache module to the data processing module for data analysis, and an analysis result is then fed back to the main controller for execution.

To achieve the objective of preventing crosstalk of the present invention, the technical solution of the present invention is:

A self-moving device includes:
  a housing;
  a moving module, disposed below the housing, and configured to drive the housing to move;
  a drive module, configured to drive the moving module to move; and
  a control module, configured to control the self-moving device, where
  an ultrasonic sensor assembly configured to recognize an obstacle in a forward movement direction of the self-moving device is disposed on the housing, the ultrasonic sensor assembly includes at least two ultrasonic sensors, including a first ultrasonic sensor and a second ultrasonic sensor, the first ultrasonic sensor receives and transmits ultrasound in a first transceiver region, the second ultrasonic sensor receives and transmits ultrasound in a second transceiver region, the first ultrasonic sensor and the second ultrasonic sensor are arranged on the housing at an angle from each other, and the self-moving device further includes a crosstalk prevention structure, configured to prevent ultrasound sent by one of the first ultrasonic sensor and the second ultrasonic sensor from being received directly by the other one of the two without being reflected by the obstacle.

Preferably, the crosstalk prevention structure is disposed between the first ultrasonic sensor and the second ultrasonic sensor.

Preferably, the crosstalk prevention structure includes a stop wall disposed at an angle from an axis of an ultrasonic sensor.

Preferably, the crosstalk prevention structure extends toward a front side of the housing without coming into contact with an axis of an ultrasonic sensor.

Preferably, the crosstalk prevention structure extends toward a front side of the housing without exceeding an intersection of projections of an axis of the first ultrasonic sensor and an axis of the second ultrasonic sensor.

Preferably, the crosstalk prevention structure is located on a front side of a connecting line between a sound wave transmission point of the first ultrasonic sensor and a sound wave transmission point of the second ultrasonic sensor and extends toward a front side of the housing.

Preferably, the stop wall includes a first stop wall and a second stop wall, the first stop wall has a top end, the second stop wall has an upper connecting end, and the upper connecting end is lower than the top end in a vertical direction.

Preferably, the second stop wall extends toward a front side of the housing from the upper connecting end, and has a gradually decreasing height in a vertical direction.

Preferably, the crosstalk prevention structure further includes a mounting hole corresponding to a sound-producing surface of an ultrasonic sensor, a top surface, and a front end surface basically vertically connected to the top surface, the mounting hole has a hole center, and the second stop wall has a lower connecting end that is far away from the first stop wall and is lower than the upper connecting end in a vertical direction and a connecting surface that connects the upper connecting end and the lower connecting end.

Preferably, a distance L between the hole center and the front end surface is greater than 5 mm.

Preferably, a distance L2 between the upper connecting end and a front end surface is less than 10 mm.

Preferably, a distance L1 between the lower connecting end and a front end surface is less than 20 mm.

Preferably, a distance Δ between the upper connecting end and the hole center in a vertical direction is less than 16 mm.

Preferably, a range of an angle τ between the connecting surface and the top surface is 35° to 55°.

Preferably, the stop wall is disposed slanted relative to the top surface, and an angle μ between the stop wall and the top surface is not equal to 90°.

To achieve the objective of obstacle recognition of the present invention, the technical solution of the present invention is:

A method for recognizing an obstacle by a self-moving device is provided, a self-moving device including an ultrasonic sensor, where the method for recognizing an obstacle by a self-moving device includes the following steps:
  S11: starting data collection;

S12: sending, by the ultrasonic sensor, ultrasound, and receiving an echo from an obstacle;

S13: performing analysis according to the echo from the obstacle to obtain a distance from the obstacle and intensity of the echo; and S14: comparing the distance from the obstacle with a preset distance and comparing the intensity of the echo with a reflected wave threshold to determine a condition of the obstacle.

Preferably, when the self-moving device includes a first ultrasonic sensor and a second ultrasonic sensor and the first ultrasonic sensor and the second ultrasonic sensor transmit ultrasound alternately, the method for recognizing an obstacle by a self-moving device includes the following steps:

S111: starting data collection;

S112: sending, by one of the first ultrasonic sensor and the second ultrasonic sensor, ultrasound within a period of time ti, and receiving, by the first ultrasonic sensor and the second ultrasonic sensor, echoes from the obstacle within the period of time ti, to obtain an $i^{th}$ group of echoes from the obstacle;

S113: transmitting, by the other one of the first ultrasonic sensor and the second ultrasonic sensor, ultrasound within a period of time t(i+1) following the period of time ti, and receiving, by the first ultrasonic sensor and the second ultrasonic sensor, echoes from the obstacle within the period of time t(i+1), to obtain an $(i+1)^{th}$ group of echoes from the obstacle;

S114: analyzing the $(i+1)^{th}$ group of echoes from the obstacle and the $i^{th}$ group of echoes from the obstacle to obtain the distance from the obstacle and the intensity of the echo; and S115: comparing the distance from the obstacle with the preset distance and comparing the intensity of the echo with the reflected wave threshold to determine the condition of the obstacle.

Preferably, a method for comparing the distance from the obstacle with the preset distance and comparing the intensity of the echo with the reflected wave threshold to determine the condition of the obstacle in the foregoing steps S14 and S115 is: when a value of the distance obtained through analysis is greater than the specified threshold, determining that there is no obstacle.

Preferably, a method for comparing the distance from the obstacle with the preset distance and comparing the intensity of the echo with the reflected wave threshold to determine the condition of the obstacle in the foregoing steps S14 and S115 is: when a value of the distance obtained through analysis is less than the specified threshold and a value of the intensity of the echo obtained through analysis is less than the reflected wave threshold, determining that there is no obstacle.

Preferably, a method for comparing the distance from the obstacle with the preset distance and comparing the intensity of the echo with the reflected wave threshold to determine the condition of the obstacle in the foregoing steps S14 and S115 is: when a value of the distance obtained through analysis is less than the specified threshold but a value of the intensity of the echo obtained through analysis is greater than the reflected wave threshold, determining that there is an obstacle.

Preferably, in the foregoing steps S13 and S114, the processing of the echoes from the obstacle includes:

adjusting an amplification factor for an ultrasonic echo analog signal;

performing analog-to-digital conversion on the signal obtained after the amplification factor is adjusted; and performing digital filtering on the signal obtained after analog-to-digital conversion.

Compared with the prior art, the present embodiments uses an ultrasonic sensor and sets a preset distance for an autonomous lawn mower to implement non-contact obstacle avoidance of the autonomous lawn mower and sets an ultrasonic sensor assembly to avoid impact of a distance-measurement blind area on the autonomous lawn mower in different working conditions, thereby improving the reachability of the autonomous lawn mower. In addition, a stop wall is disposed. In this way, when the first ultrasonic sensor and the second ultrasonic sensor intersect at an angle, the stop wall can prevent ultrasound transmitted by the first ultrasonic sensor from being reflected by an obstacle and directly received by the second ultrasonic sensor, thereby ensuring the accuracy of recognizing an obstacle at a short distance. In addition, by using a flexible internal structure of a crosstalk prevention structure, a field-of-view transmission range of ultrasound can also be constrained when the ultrasound is just sent, so as to further prevent the ultrasound from directly contacting a housing to generate an ultrasonic echo, thereby ensuring the accuracy of detecting an obstacle.

BRIEF DESCRIPTION OF THE DRAWINGS

The present invention is further described below with reference to the accompanying drawings and implementations.

FIG. 43 is a schematic diagram of comparison between a distance between an obstacle and an ultrasonic sensor of an autonomous lawn mower of the present invention and a distance between an obstacle and an ultrasonic sensor of an autonomous lawn mower that has the same structure but has not resolved a blind area problem in the prior art.

FIG. 53 is a schematic structural diagram of field-of-view crosstalk of an autonomous lawn mower provided with a crosstalk prevention structure according to the present invention and an autonomous lawn mower that has the same structure but is not provided with a crosstalk prevention structure in the prior art.

Figure 1:
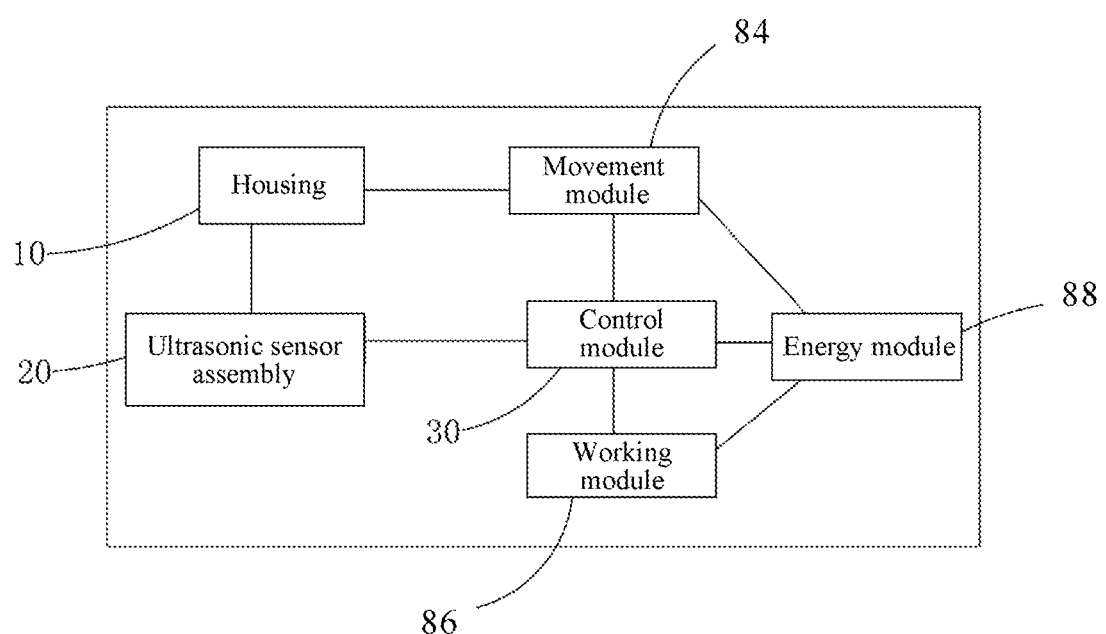
FIG. 1 is a schematic modular diagram of an autonomous lawn mower according to the present invention.

Where:
1, 100, 200, 300, and 400 Autonomous lawn mower 10 Housing 84 Moving module
86 Working module 88 Energy module 20 Ultrasonic sensor assembly
21, 41, 61, 81 First ultrasonic sensor 23, 43, 63, 83 Second ultrasonic sensor 30 Control module
A First transceiver region B Second transceiver region C Third transceiver region
D Fourth transceiver region 11 First detection region 12 Second detection region
13 Third detection region 14 Fourth detection region 15 Fifth detection region
16 Sixth detection region 17 Seventh detection region 18 Eighth detection region
31a, 31b Drive circuit 33a, 33b Transformer 35a, 35b ADC
37a, 37b Data processing unit 25, 45, 65, 85 Third ultrasonic sensor 27, 47, 67 Fourth ultrasonic sensor
92 Fifth ultrasonic sensor 211, 411, 611 First axis 231, 431, 631 Second axis
210 Housing axis 651 Third axis 671 Fourth axis
80, 89 Crosstalk prevention structure 801 Stop wall 90 Beam adjuster
91 Neighboring wall 97 Border line 98 Field of view
99 Obstacle 201 Ultrasonic sensor 2011 Sound-producing surface
202 PCB board 203 Transformer 204 Capacitor
205 Protection case 2051 End surface 802 Mounting hole
803 Top surface 804 Parallel surface 805 Upper connecting end
806 lower connecting end 807 Hole center 808 Front end surface
809 Connecting surface 8011 First stop wall 8012 Second stop wall
71 First position 72 Second position 73 Third position
891 First side 892 Second side 96 Connecting circuit
21a First ultrasonic reception processing circuit 23a Second ultrasonic reception processing circuit 893 First crosstalk prevention surface
894 Second crosstalk prevention surface 87 Receiving apparatus 510 Forward movement arrow
705 Sensor microcontroller 708 Pulse circuit module 701 Amplification circuit module
702 Analog-to-digital conversion module 703 Filter module 704 Data cache module
706 Data processing module 707 Main controller 709 Reflected wave threshold

DETAILED DESCRIPTION

The present embodiments discloses an autonomous lawn mower that can implement non-contact obstacle avoidance. Autonomous lawn mowers in different embodiments all use an ultrasonic sensor to recognize an obstacle. In addition, ultrasonic sensors are arranged to form an overlapping detection region to improve the reachability of the autonomous lawn mower, so that short-distance non-contact obstacle avoidance can be implemented.

It should be noted before the embodiments of the present invention are described in detail that in the description of the present invention, the relational terms such as left, right, up, down, front, rear, first, and second are used only to differentiate an entity or action from another entity or action, and do not require or imply any actual relationship or sequence between these entities or actions. The terms "include", "comprise", or any variation thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device.

In the description of the present embodiments, the term "front" represents a direction in which ultrasound sent by an ultrasonic sensor is propagated, the term "front" is defined to be a forward movement direction of a machine, the term "rear" represents a direction opposite to "front", the term "left" represents a left side in the forward movement direction, the term "right" represents a right side opposite to "left" in the forward movement direction, the term "up" represents a direction away from a working surface of the machine during working, and the term "down" represents a direction that is opposite to "up" and is near the working surface of the machine.

For the disclosure of the present embodiments, the term "transceiver region" is a region in which an ultrasonic sensor that integrates transmission and reception sends ultrasound and can receive an ultrasonic echo from an obstacle. The term "ultrasonic sensor that integrates transmission and reception" is that the ultrasonic sensor can both send ultrasound and receive an echo from an obstacle. The term "transmission region" is a region in which ultrasound sent by an ultrasonic sensor can be propagated. The term "reception region" is a region in which an ultrasonic sensor can receive an echo from an obstacle. The term "field of view" is a range in which the ultrasonic sensor sends ultrasound and can receive an ultrasonic echo from an obstacle. For an ultrasonic sensor that is only responsible for receiving an echo from an obstacle. The term "field-of-view" is a region in which a reception sensor can receive an echo from an obstacle if the reception sensor can transmit a signal. The term "sound wave transmission range" is a region in which ultrasound sent by an ultrasonic sensor can be propagated. The term "beam pattern" is a sectional shape of a field of view formed by ultrasound after an ultrasonic sensor sends ultrasound. The term "sound-producing surface" is a surface from which an ultrasonic sensor transmits ultrasound. The term "overlapping detection region" is a position where beams sent by two ultrasonic sensors can intersect. The term "determination section" is a section chosen on a field of view, where the sectional shape is a beam pattern. The "sound beam axis" is a direction in which a beam has the strongest radiation.

To make the objectives, technical solutions, and advantages of the present embodiments more comprehensible, the present embodiments is further described in detail below with reference to the accompanying drawings and the embodiments. It should be understood that the described specific embodiments are only used to explain the present embodiments rather than to limit the present embodiments.

As shown in FIG. 1, FIG. 1 is a schematic modular diagram of a non-contact obstacle-avoiding self-moving device 1 according to the present embodiments. An autonomous lawn mower includes a housing 10, an ultrasonic sensor assembly 20 located on the housing 10, a moving module 84 located at the bottom of the housing 10, a working module 86 configured to carry out work, a control module 30 configured to control the autonomous lawn mower to automatically work and move, and an energy module 88 providing energy to the autonomous lawn mower. A specific physical form of the control module 30 is a control circuit board arranged with one or more processors, a memory, other related components, and corresponding peripheral circuits. The control module 30 has an embedded control program to execute a predetermined instruction to control the autonomous lawn mower to automatically move and carry out work in a working area. The self-moving device of the present embodiments may be an autonomous lawn mower or a smart robot cleaner. Therefore, the description of the elements in FIG. 1 is also applicable to the description about the autonomous lawn mower or the self-propelled device in the following embodiments of the present embodiments.

The ultrasonic sensor assembly 20 in the non-contact obstacle-avoiding self-moving device 1 of the present embodiments includes at least one ultrasonic sensor. The ultrasonic sensor assembly 20 is located at a front end of the housing 10, and is configured to detect whether an obstacle exists in a forward movement direction of the self-moving device 1 and a distance between the obstacle and the self-moving device 1. The ultrasonic sensor assembly 20 includes at least one ultrasonic sensor that integrates transmission and reception, or includes at least one ultrasonic transmission sensor and one ultrasonic reception sensor having an intersecting field of view with the ultrasonic transmission sensor.

The ultrasonic sensor assembly 20 may include plurality of groups of ultrasonic transducers having separate transmission and reception functions. At least one of the ultrasonic transducers having separate transmission and reception functions sends ultrasound, and the rest receive echoes from an obstacle.

Figure 51:
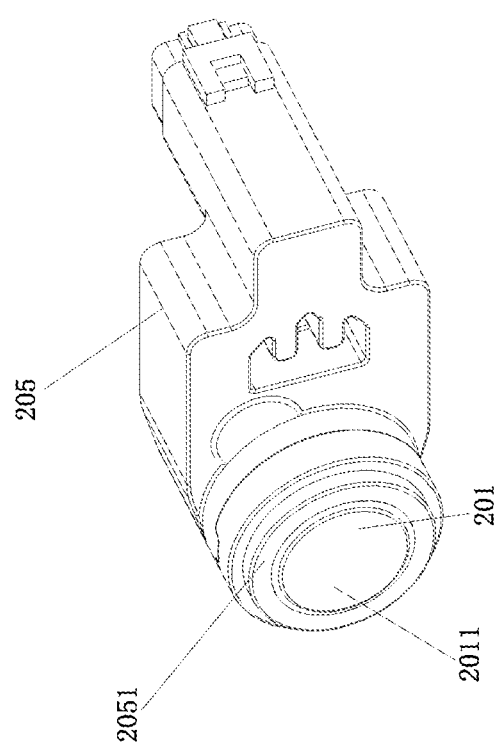
FIG. 51 is a structural diagram of an ultrasonic sensor of an autonomous lawn mower according to the present invention.
Figure 52:
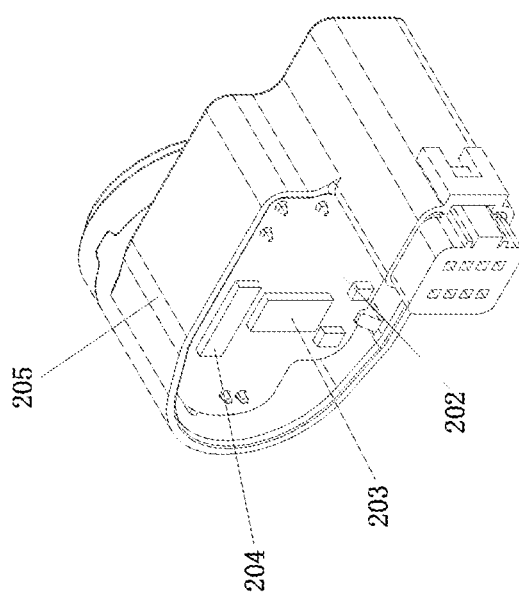
FIG. 52 is a structural diagram of an ultrasonic sensor of an autonomous lawn mower from another angle according to the present invention.
Figure 54:
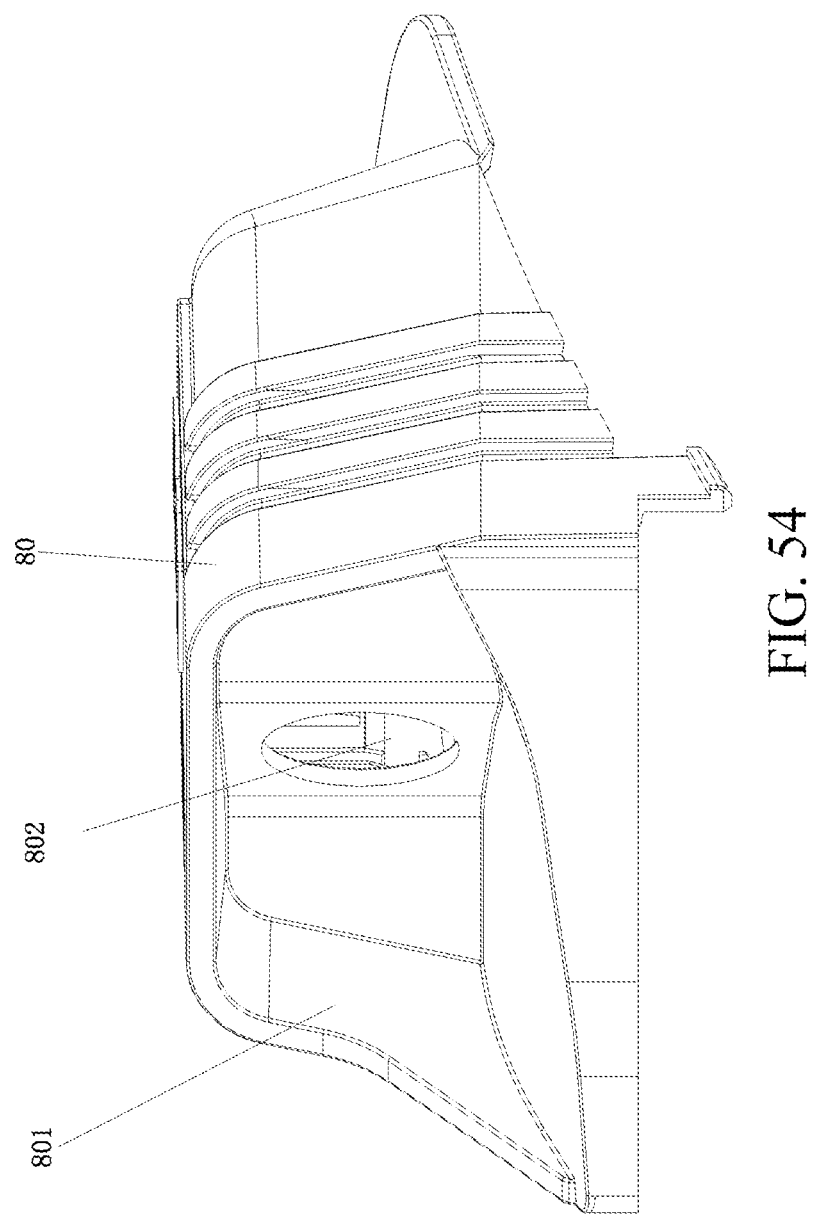
FIG. 54 is a schematic three-dimensional diagram of a crosstalk prevention structure of an autonomous lawn mower according to the present invention.
Figure 55:
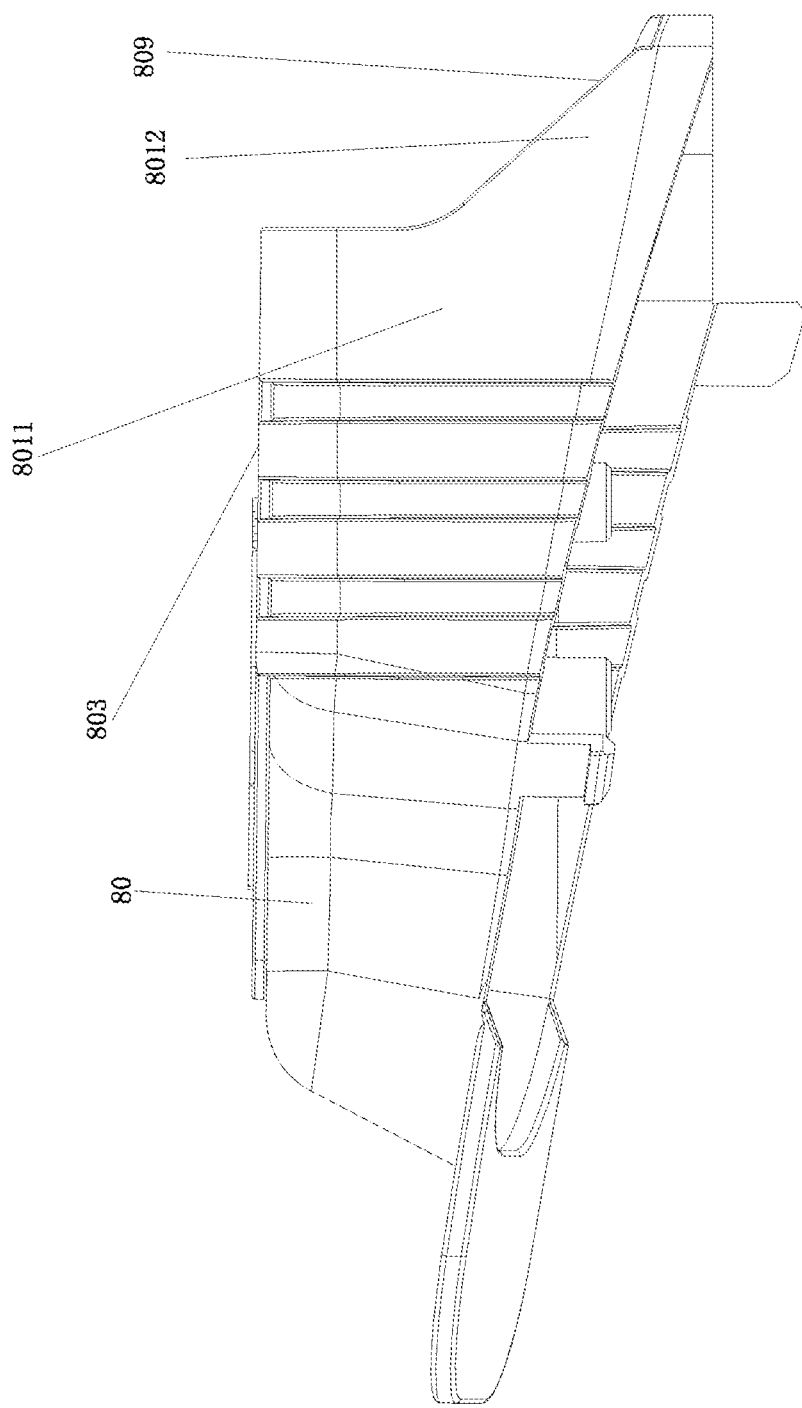
FIG. 55 is a schematic side view of the crosstalk prevention structure in FIG. 54.
Figure 56:
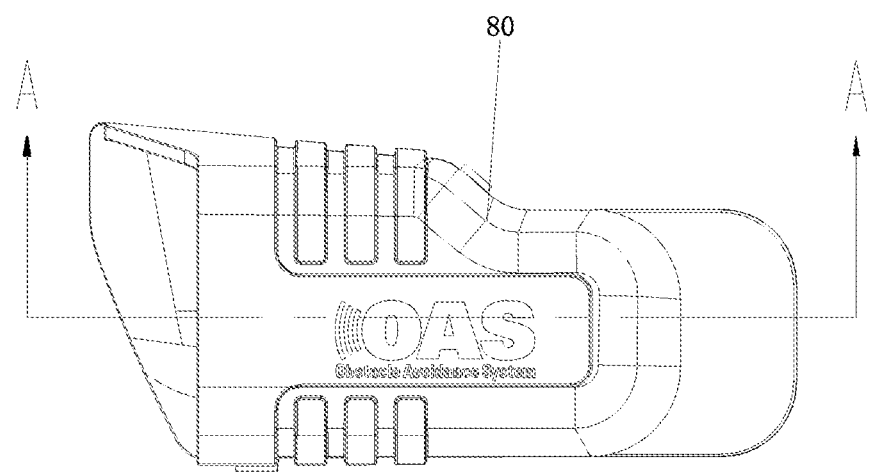
FIG. 56 is a schematic top view of the crosstalk prevention structure in FIG. 54.

As shown in FIG. 51 and FIG. 52, the ultrasonic sensor assembly 20 in the non-contact obstacle-avoiding self-moving device 1 of the present embodiments includes an ultrasonic sensor 201, a PCB board 202, a capacitor 204 mounted on the PCB board, and a protection case 205 for positioning the PCB board 202 and the ultrasonic sensor 201. The ultrasonic sensor 201 has an outward sound-producing surface 2011. The protection case 205 has an end surface 2051. The sound-producing surface 2011 is level with the end surface 2051 or is concave relative to the end surface 2051 to be disposed in the protection case 205. As shown in FIG. 52, in other embodiments of the present embodiments, when the ultrasonic sensor needs a high voltage to send ultrasound, a transformer 203 is further disposed on the PCB board.

In the description of the present embodiments, an axis of an ultrasonic sensor is an axis passing through the sound-producing surface 2011. An angle between two ultrasonic sensors of the autonomous lawn mower is an angle between axes of the two ultrasonic sensors. When two ultrasonic sensors are in parallel, it means that axes of the two ultrasonic sensors are in parallel. An axis of the housing 10 is an axis of the housing 10 in a longitudinal direction. An angle between an ultrasonic sensor and a housing axis is an angle between an axis of the ultrasonic sensor and the housing axis. When an ultrasonic sensor and the housing axis are in parallel, it means that an axis of the ultrasonic sensor and the housing axis are in parallel. In the description of the present embodiments, a distance between an ultrasonic sensor and an obstacle is a distance between an axial center of the sound-producing surface 2011 and the obstacle. A distance between the housing 10 and an obstacle is a distance between a foremost end of the housing and the obstacle. A distance between the autonomous lawn mower and an obstacle is a distance between the foremost end of the housing and the obstacle.

In the description of the present embodiments, a width range of a body is a width of the housing 10 and a width of the moving module 84. An effective detection range of the ultrasonic sensor assembly 20 at least covers the width range of the body. The ultrasonic sensor assembly 20 has the foregoing effective detection range, so that the ultrasonic sensor assembly 20 can detect an obstacle right in front during movement of the autonomous lawn mower, so as to prevent the autonomous lawn mower from colliding with the obstacle during movement.

The non-contact obstacle-avoiding autonomous lawn mower disclosed in the present embodiments uses an ultrasonic sensor to recognize an obstacle. The ultrasonic sensor transmits ultrasound. The ultrasound hits an obstacle in front and reflection takes place. The ultrasonic sensor receives a reflected ultrasonic echo. The autonomous lawn mower determines a distance between the ultrasonic sensor and the obstacle by using a time difference between the time when the ultrasound is transmitted and the time when an echo from the obstacle is received. The control module 30 is then used to set a preset distance to restrict the movement of the autonomous lawn mower. When the distance between the ultrasonic sensor and the obstacle is less than the preset distance, the control module 30 of the autonomous lawn mower determines that there is in front an obstacle that needs to be avoided, and the control module 30 controls the autonomous lawn mower to execute an obstacle-avoidance measure, thereby eventually implementing non-contact obstacle avoidance.

The present embodiments has a plurality of embodiments regarding the arrangement of the ultrasonic sensor assembly 20, so as to form a plurality of embodiments of non-contact obstacle-avoiding autonomous lawn mowers. The non-contact obstacle-avoiding autonomous lawn mowers in different embodiments are described below in detail.

First Embodiment

Figure 2:
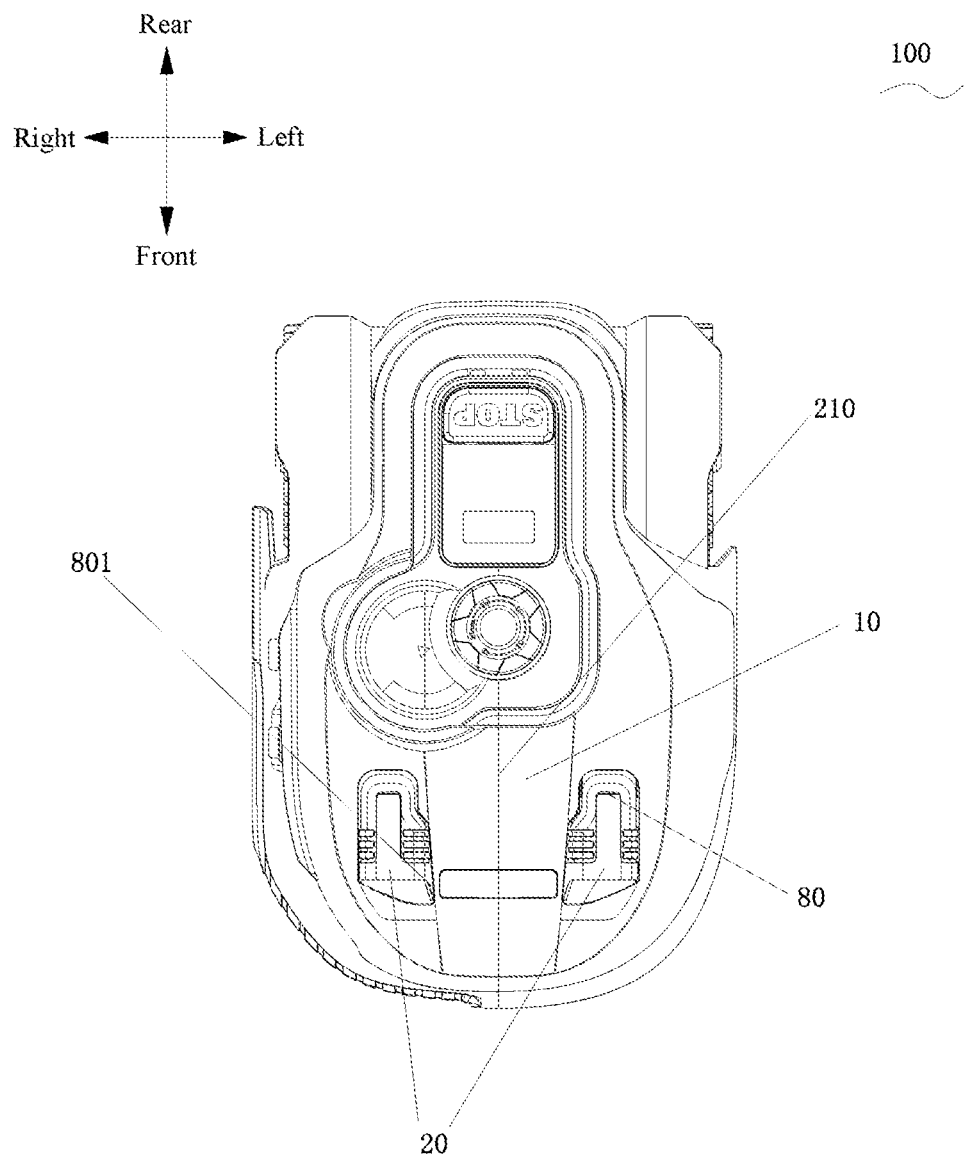
FIG. 2 is a schematic top view of an autonomous lawn mower 100 according to a first embodiment of the present invention.

As shown in FIG. 2, FIG. 2 is a schematic top view of an autonomous lawn mower 100 according to the first embodiment of the present invention. A length direction of the autonomous lawn mower 100 is a longitudinal direction. A forward movement arrow 510 represents a forward movement direction of the autonomous lawn mower.

Figure 3:
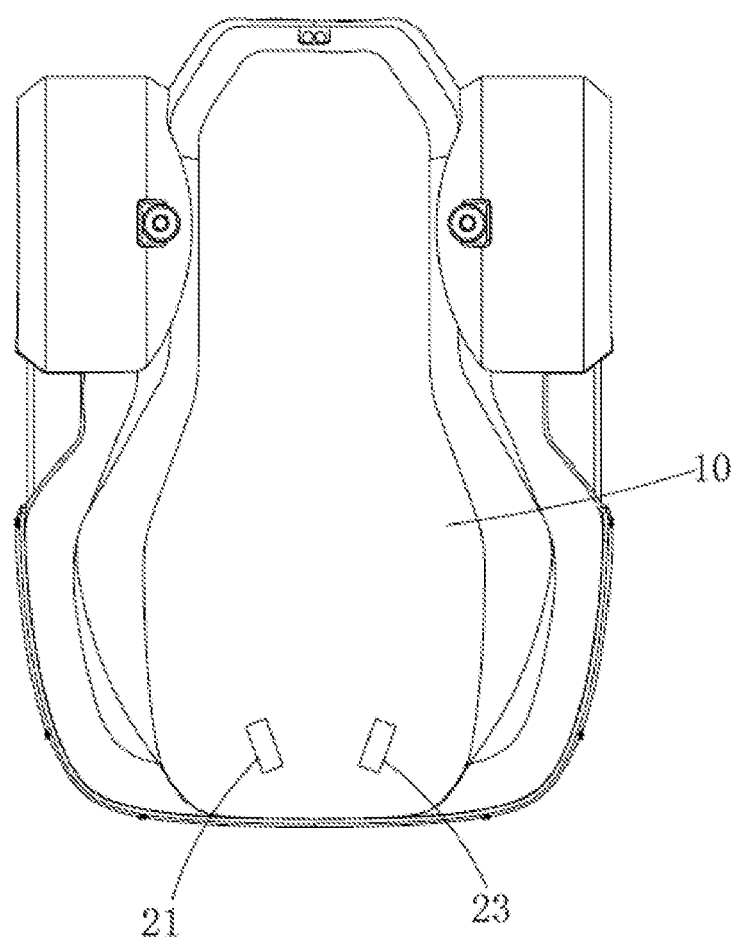
FIG. 3 is a schematic diagram of a first arrangement manner of an ultrasonic sensor assembly of the autonomous lawn mower 100 according to the first embodiment of the present invention.
Figure 4:
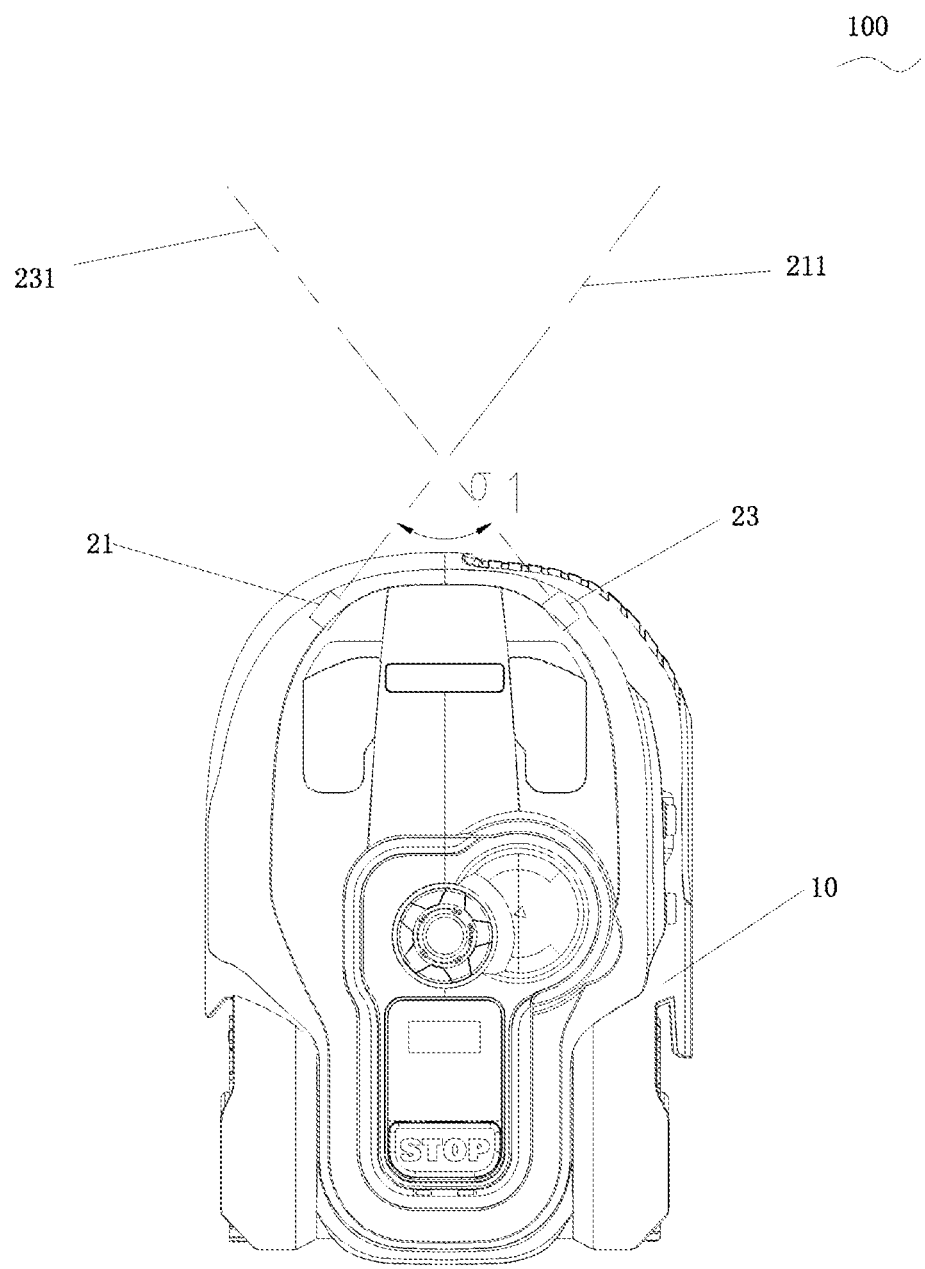
FIG. 4 is a schematic diagram of an angle relationship between axes of ultrasonic sensors assembly in the ultrasonic sensor assembly of the autonomous lawn mower 100 according to the first embodiment of the present invention.

As shown in FIG. 3 and FIG. 4, in the autonomous lawn mower 100 in the first embodiment, an ultrasonic sensor assembly 20 includes a first ultrasonic sensor 21 and a second ultrasonic sensor 23. The first ultrasonic sensor 21 and the second ultrasonic sensor 23 are disposed at an angle from each other. The first ultrasonic sensor 21 has a first axis 211, the second ultrasonic sensor 23 has a second axis 231, and the autonomous lawn mower 100 has a housing axis 210 extending longitudinally. The first axis 211 and the second axis 231 intersect at an angle. As seen from the top, the first axis 211 and the second axis 231 intersect in front of a housing 10. A projection intersection of the intersection may be located at any position right in front of the housing 10. A range of an angle σ1 between the first ultrasonic sensor 21 and the second ultrasonic sensor 23 is 60° to 110°. In a preferred embodiment of the autonomous lawn mower 100 in the first embodiment, the angle σ1 of intersection between the first ultrasonic sensor 21 and the second ultrasonic sensor 23 ranges from 70° to 90°. The angle of intersection between the first ultrasonic sensor 21 and the second ultrasonic sensor 23 in the range of 70° to 90° ensures that while an overlapping detection region is obtained, the overlapping detection region can further be closer to the front of the autonomous lawn mower 100. In addition, ultrasound transmitted by one of the ultrasonic sensors is prevented from being directly received by the other one of the ultrasonic sensors without being reflected by an obstacle, thereby reducing signal crosstalk between the first ultrasonic sensor 21 and the second ultrasonic sensor 23 and improving the accuracy of recognizing an obstacle. The foregoing angle between the first ultrasonic sensor 21 and the second ultrasonic sensor 23 is an angle between the first axis 211 and the second axis 231. The angle between the first axis 211 and the second axis 231 becomes increasingly small in the forward movement direction of the autonomous lawn mower.

Figure 5:
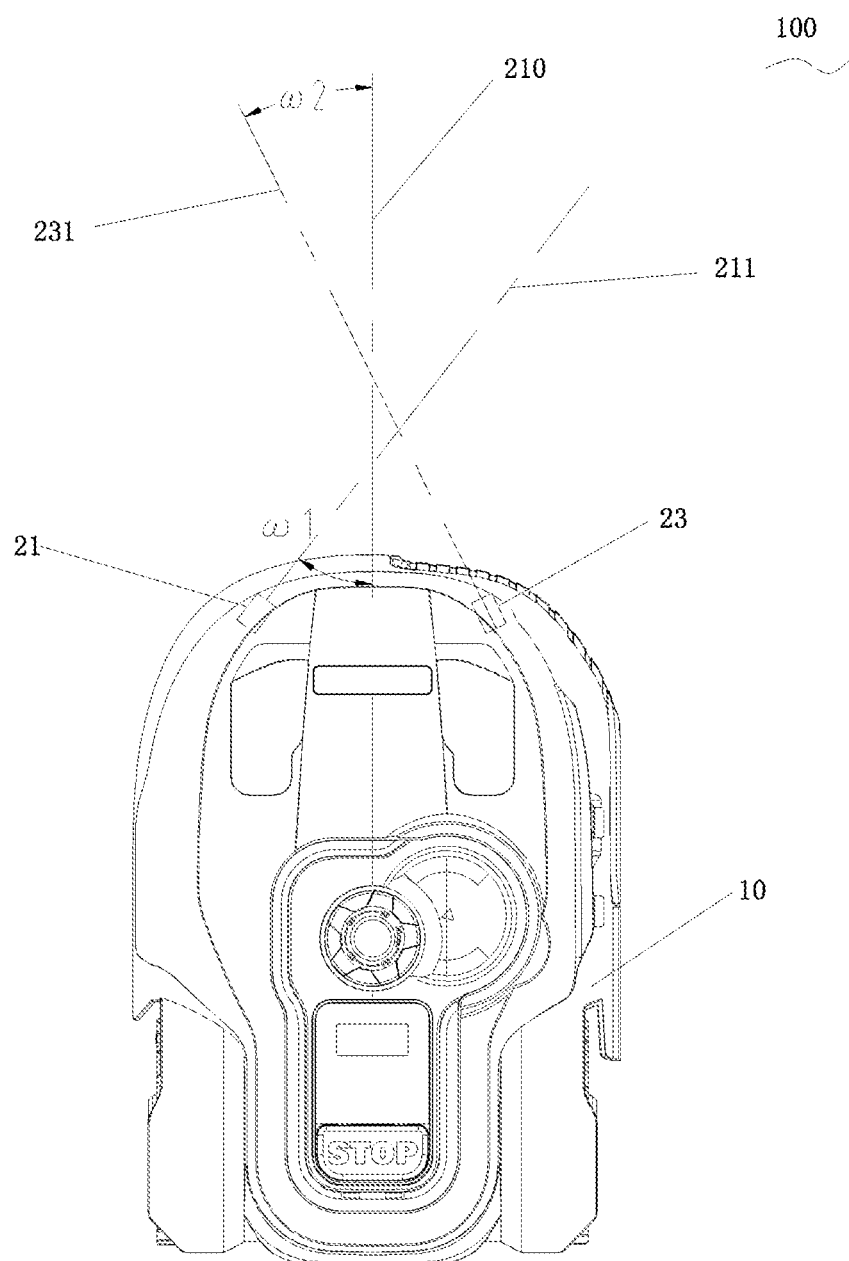
FIG. 5 is a schematic diagram of an angle relationship between axes of ultrasonic sensors assembly in the ultrasonic sensor assembly and a housing of the autonomous lawn mower 100 according to the first embodiment of the present invention.

As shown in FIG. 5, relative to the housing axis 210, a range of an angle ω1 between the first axis 211 and the housing axis 210 is 10° to 80°. In a preferred embodiment of the autonomous lawn mower 100 in the first embodiment, the angle ω1 between the first axis 211 and the housing axis 210 ranges from 25° to 55°. The angle ω2 between the second axis 231 and the housing axis 210 ranges from 10° to 80°. In a preferred embodiment of the autonomous lawn mower 100 in the first embodiment, the angle ω2 between the second axis 231 and the housing axis 210 ranges from 25° to 55°. Within the range of the angle, while it is ensured that an overlapping detection region is obtained, the overlapping detection region can further be closer to the front of the autonomous lawn mower 100. In addition, ultrasound transmitted by one of the ultrasonic sensors is prevented from being directly received by the other one of the ultrasonic sensors without being reflected by an obstacle, thereby reducing signal crosstalk between the first ultrasonic sensor 21 and the second ultrasonic sensor 23 and improving the accuracy of recognizing an obstacle.

As shown in FIG. 3 and FIG. 4, in the autonomous lawn mower 100 according to the first embodiment of the present invention, the first ultrasonic sensor 21 and the second ultrasonic sensor 23 are both ultrasonic sensors that integrate transmission and reception. That is, an ultrasonic sensor can have both functions of sending ultrasound and receiving an echo from an obstacle. In other embodiments, the first ultrasonic sensor 21 and the second ultrasonic sensor 23 may alternatively be a combination of two independent ultrasonic sensors. One of the two ultrasonic sensors performs the function of sending ultrasound, and the other one of the two ultrasonic sensors performs the function of receiving ultrasound. In other embodiments, the first ultrasonic sensor 21 and the second ultrasonic sensor 23 may alternatively be a combination of a plurality of independent ultrasonic sensors. That is, the first ultrasonic sensor 21 is ultrasonic sensors having separate transmission and reception functions. At least one of the plurality of independent ultrasonic sensors sends ultrasound, and the rest of the plurality of independent ultrasonic sensors receive echoes from an obstacle.

Figure 6:
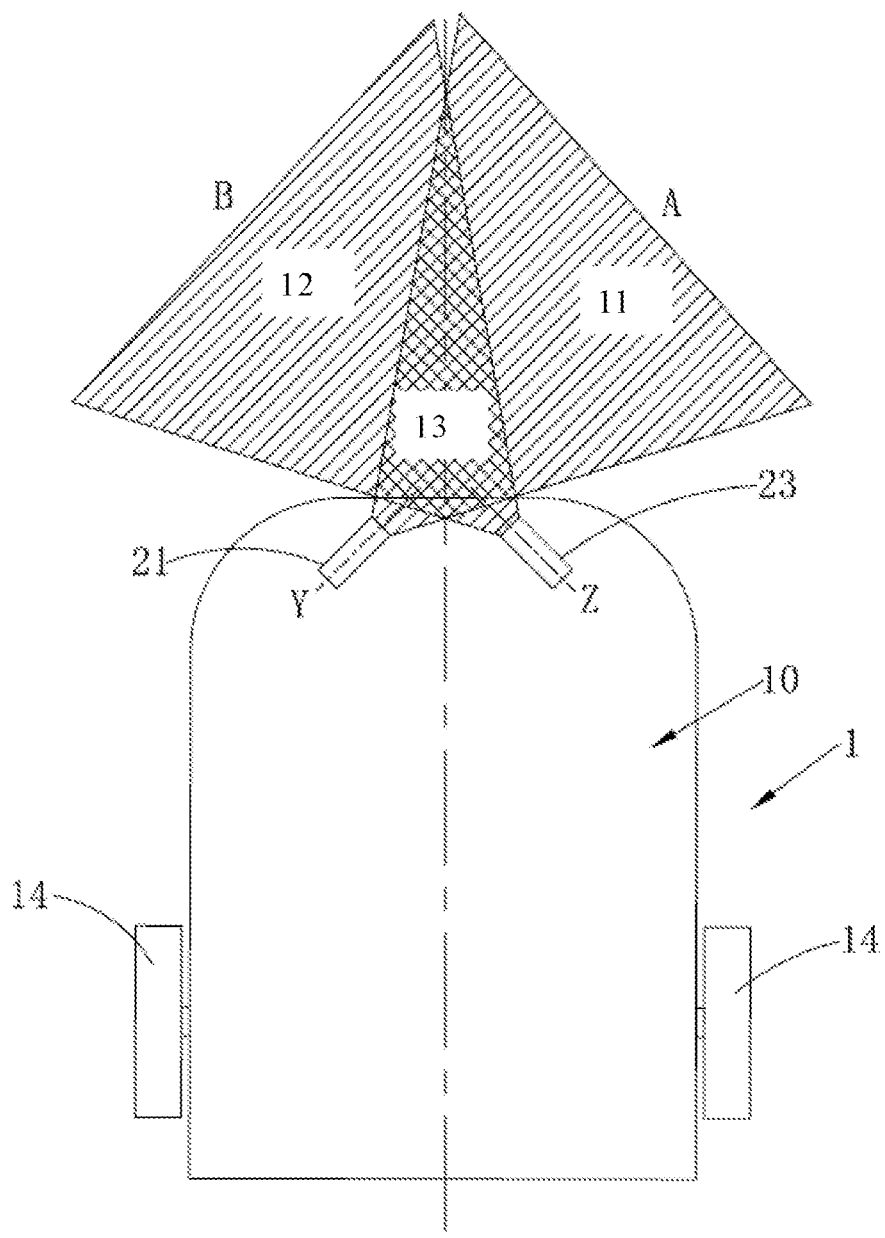
FIG. 6 is a schematic diagram of a detection range of a first arrangement manner when the ultrasonic sensor assembly of the autonomous lawn mower 100 uses a triangular beam pattern according to the first embodiment of the present invention.
Figure 8:
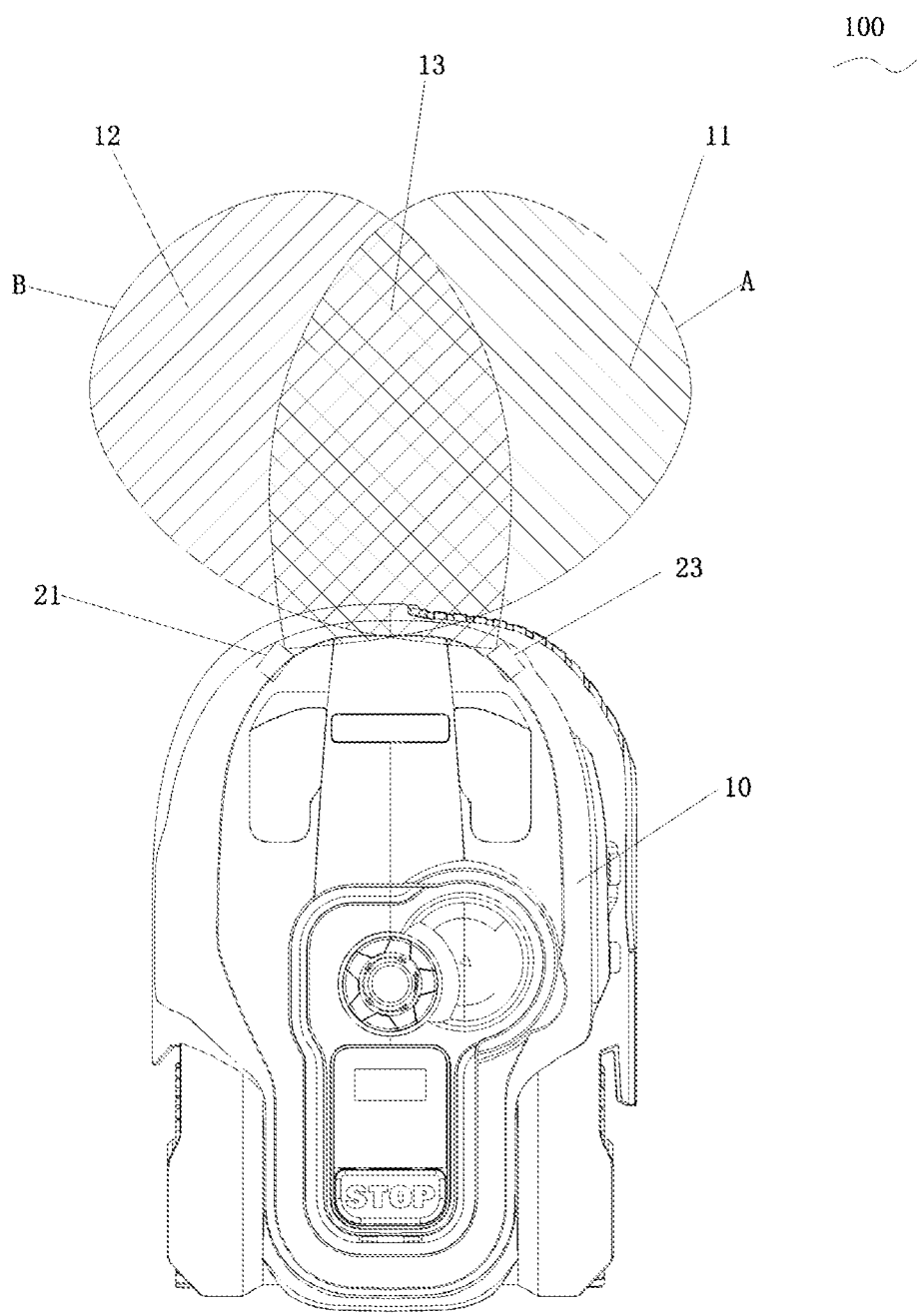
FIG. 8 is a schematic diagram of a detection range of a first arrangement manner when the ultrasonic sensor assembly of the autonomous lawn mower 100 uses an elliptical beam pattern according to the first embodiment of the present invention.

As shown in FIG. 6 and FIG. 8, FIG. 6 and FIG. 8 are schematic diagrams of a detection range when the ultrasonic sensor assembly of the autonomous lawn mower 100 according to the first embodiment of the present invention is in a first arrangement manner. A difference between the two figures is that beam patterns are different. A beam pattern of the ultrasonic sensor assembly shown in FIG. 6 is a triangle or an approximate triangle, and a beam pattern of the ultrasonic sensor assembly in FIG. 8 is an ellipse or an approximate ellipse. In an embodiment of the first arrangement manner, the first ultrasonic sensor 21 and the second ultrasonic sensor 23 have consistent hardware parameters. The first ultrasonic sensor 21 has a first transceiver region A. The second ultrasonic sensor 23 has a second transceiver region B. The first transceiver region A and the second transceiver region B form an overlapping detection region right in front of the autonomous lawn mower 100. The first ultrasonic sensor 21 and the second ultrasonic sensor 23 in the overlapping detection region may both receive an ultrasonic echo. That is, in the overlapping detection region, if the first ultrasonic sensor 21 sends ultrasound, both the first ultrasonic sensor 21 and the second ultrasonic sensor 23 can receive an ultrasonic echo; and if the second ultrasonic sensor 23 sends ultrasound, both the first ultrasonic sensor 21 and the second ultrasonic sensor 23 can receive an ultrasonic echo.

As shown in FIG. 6 and FIG. 8, in an embodiment of the first arrangement manner of the autonomous lawn mower 100 according to the first embodiment of the present invention, the first ultrasonic sensor 21 and the second ultrasonic sensor 23 are disposed at a front end of the housing 10 at an angle from each other, so that the first transceiver region A of the first ultrasonic sensor 21 and the second transceiver region B of the second ultrasonic sensor 23 overlap partially. A non-overlapping part of the first transceiver region A is a first detection region 11 of the sensor component 20, and a non-overlapping part of the second transceiver region B is a second detection region 12 of the sensor component 20. An overlapping part of the first transceiver region A and the second transceiver region B is a third detection region 13 of the sensor component 20.

Figure 7:
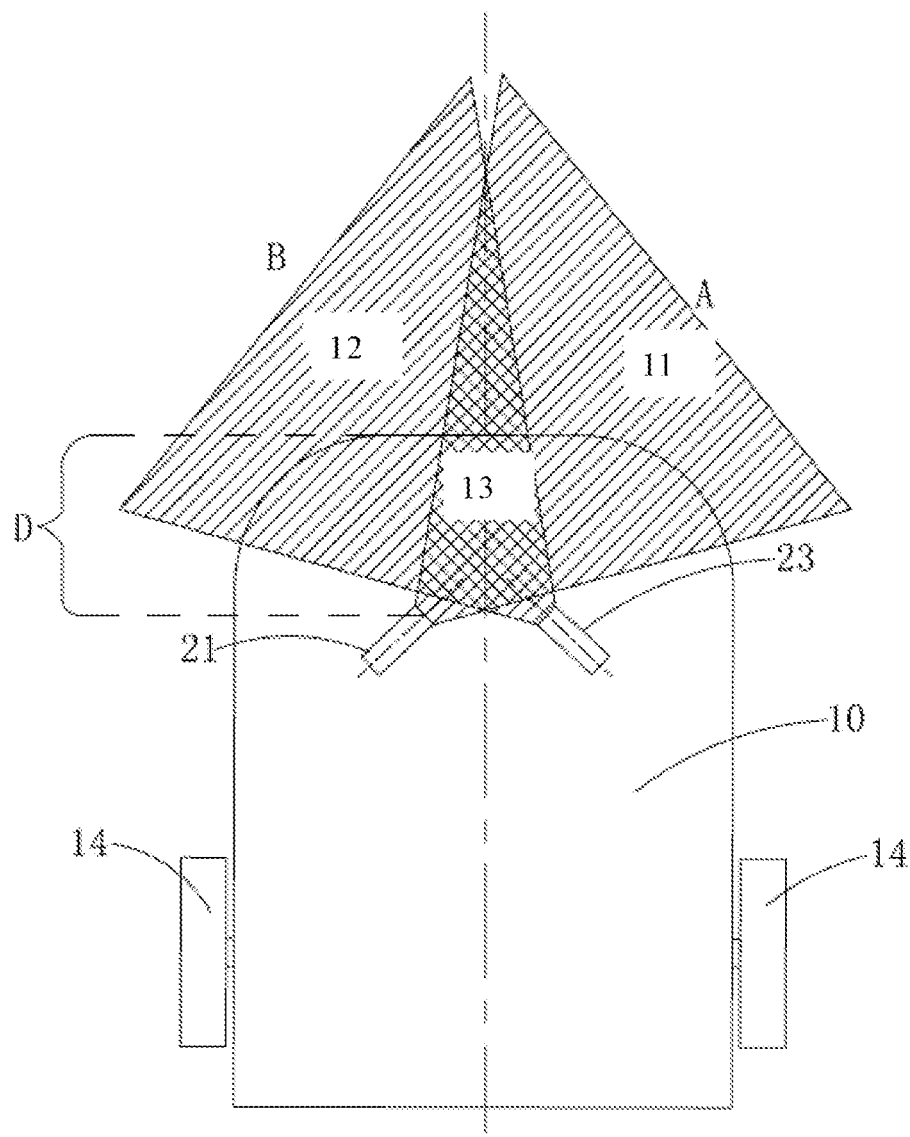
FIG. 7 is a schematic diagram of a detection range of a second arrangement manner when the ultrasonic sensor assembly of the autonomous lawn mower 100 uses a triangular beam pattern according to the first embodiment of the present invention.
Figure 9:
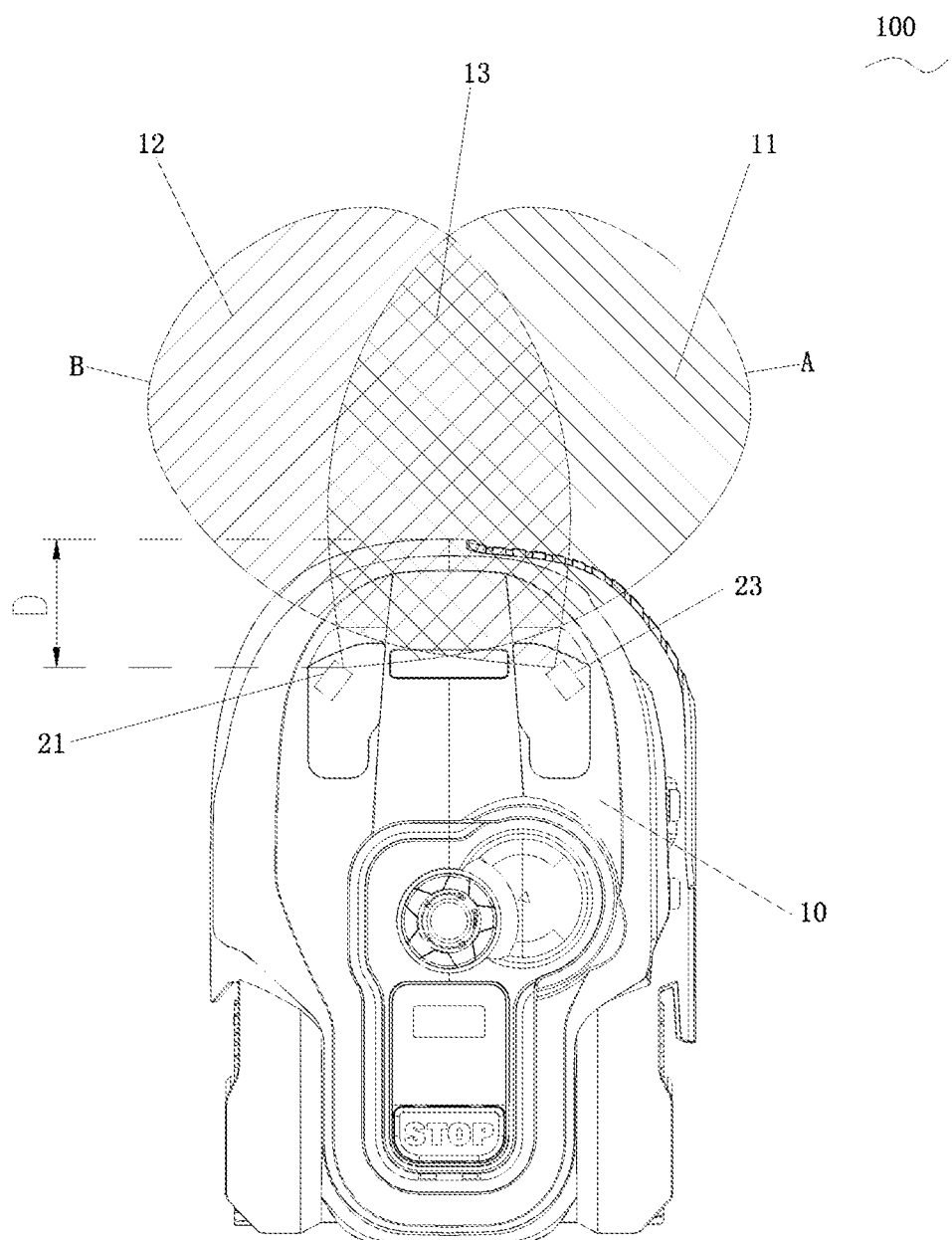
FIG. 9 is a schematic diagram of a detection range of a second arrangement manner when the ultrasonic sensor assembly of the autonomous lawn mower 100 uses an elliptical beam pattern according to the first embodiment of the present invention.

As shown in FIG. 7 and FIG. 9, FIG. 7 and FIG. 9 are schematic diagrams of a detection range when the ultrasonic sensor assembly of the autonomous lawn mower 100 according to the first embodiment of the present invention is in a second arrangement manner. A difference between the second arrangement manner and the first arrangement manner of the ultrasonic sensor assembly lies in that the ultrasonic sensor assembly 20 is mounted at a position at a distance D from a front end of the housing. The specific description is that in an embodiment of the second arrangement manner, the ultrasonic sensor assembly 20 includes a first ultrasonic sensor 21 and a second ultrasonic sensor 23. The first ultrasonic sensor 21 and the second ultrasonic sensor 23 are disposed at an angle from each other at a front end of the housing 10 and at a position at a distance D from the front end of the housing. The first ultrasonic sensor 21 has a first transceiver region A. The second ultrasonic sensor 23 has a second transceiver region B. The first transceiver region A of the first ultrasonic sensor 21 and the second transceiver region B of the second ultrasonic sensor 23 still overlap partially and still form three detection regions of the ultrasonic sensor assembly 20. In the overlapping detection region, both the first ultrasonic sensor 21 and the second ultrasonic sensor 23 can receive an ultrasonic echo. That is, if the first ultrasonic sensor 21 sends ultrasound, both the first ultrasonic sensor 21 and the second ultrasonic sensor 23 can receive an ultrasonic echo, and if the second ultrasonic sensor 23 sends ultrasound, both the first ultrasonic sensor 21 and the second ultrasonic sensor 23 can receive an ultrasonic echo. A non-overlapping part of the first transceiver region A is a first detection region 11 of the sensor component 20, a non-overlapping part of the second transceiver region B is a second detection region 12 of the sensor component 20, and an overlapping part of the first transceiver region A and the second transceiver region B is a third detection region 13 of the sensor component 20.

As shown in FIG. 7 and FIG. 9, in the second arrangement manner of the autonomous lawn mower 100 according to the first embodiment of the present invention, the first ultrasonic sensor 21 and the second ultrasonic sensor 23 theoretically may be disposed at any position in a length direction of the housing 10. If the first ultrasonic sensor 21 and the second ultrasonic sensor 23 are disposed at positions closer to a rear end of the housing 10, to protect transmission of ultrasound and reception of an echo from an obstacle by an ultrasonic sensor from being affected, the shape of the housing may be improved or the ultrasonic sensor may be disposed higher. In a preferred embodiment of the present invention, the factors of transmission and reception of ultrasound and a small occupying space are all considered, the first ultrasonic sensor 21 and the second ultrasonic sensor 23 are disposed at a front half of the housing 10 in a length direction, and the distance D is less than or equal to a half of a length of the housing 10. In this way, it may be more convenient to improve the structure of the front end of the housing to adapt to a range of a field of view, thereby preventing ultrasound from being blocked.

In a preferred solution of the autonomous lawn mower 100 according to the first embodiment of the present invention, a control module 30 controls the first ultrasonic sensor 21 and the second ultrasonic sensor 23 to transmit ultrasound alternately in time, the control module 30 controls the first ultrasonic sensor 21 to transmit ultrasound in a first period of time, the first ultrasonic sensor 21 and the second ultrasonic sensor 23 receive echoes from an obstacle in the first period of time, the control module 30 controls the second ultrasonic sensor 23 to transmit ultrasound in a second period of time following the first period of time, and the first ultrasonic sensor 21 and the second ultrasonic sensor 23 receive echoes from the obstacle in the second period of time.

In a preferred solution of the autonomous lawn mower 100 according to the first embodiment of the present invention, the control module 30 determines a location of the obstacle according to a combination of ultrasound transmitted by the first ultrasonic sensor 21 and the second ultrasonic sensor 23 in the ultrasonic sensor assembly 20 and echoes received from the obstacle by the first ultrasonic sensor 21 and the second ultrasonic sensor 23. The specific description is that when only the first ultrasonic sensor 21 in the ultrasonic sensor assembly 20 transmits ultrasound and only the first ultrasonic sensor 21 receives an echo from the obstacle, the control module 30 determines that the obstacle is located in the first detection region. When only the second ultrasonic sensor 23 in the ultrasonic sensor assembly 20 transmits ultrasound and only the second ultrasonic sensor 23 receives an echo from the obstacle, the control module 30 determines that the obstacle is located in the second detection region. When the first ultrasonic sensor 21 in the ultrasonic sensor assembly 20 transmits ultrasound, the first ultrasonic sensor 21 and the second ultrasonic sensor 23 receive echoes from the obstacle, and the control module 30 determines that the obstacle is located in the third detection region. When the second ultrasonic sensor 23 in the ultrasonic sensor assembly 20 transmits ultrasound, the first ultrasonic sensor 21 and the second ultrasonic sensor 23 receive echoes from the obstacle, and the control module 30 determines that the obstacle is located in the third detection region. When the first ultrasonic sensor 21 in the ultrasonic sensor assembly 20 transmits ultrasound, the second ultrasonic sensor 23 receives an echo from the obstacle, and the control module 30 determines that the obstacle is located in the third detection region. When the second ultrasonic sensor 23 in the ultrasonic sensor assembly 20 transmits ultrasound, the first ultrasonic sensor 21 receives an echo from the obstacle, and the control module 30 determines that the obstacle is located in the third detection region.

In a preferred solution of the autonomous lawn mower 100 according to the first embodiment of the present invention, the control module 30 calculates the distance between the obstacle and the autonomous lawn mower according to a time difference between the time when the ultrasonic sensor assembly 20 transmits ultrasound and the time when the ultrasonic sensor assembly 20 receives an echo from the obstacle.

In a preferred solution of the autonomous lawn mower 100 according to the first embodiment of the present invention, the first ultrasonic sensor 21 has a first axis, the second ultrasonic sensor 23 has a second axis, and the first axis and the second axis are coplanar in a vertical direction. In this way, the autonomous lawn mower may obtain an overlapping detection region having a largest area, and because same ultrasonic sensors are selected, coplanar axes may facilitate the arrangement of an ultrasonic sensor structure and the design of a mounting structure of the housing 10.

In a preferred embodiment of the autonomous lawn mower 100 according to the first embodiment of the present invention, to ensure that the autonomous lawn mower 100 in the first embodiment can recognize an obstacle in a forward movement direction, an effective detection range of the ultrasonic sensor assembly 20 needs to cover a region right in front of the body of the autonomous lawn mower 100. In a preferred embodiment of the autonomous lawn mower 100 according to the first embodiment of the present invention, the effective detection range of the ultrasonic sensor assembly 20 is a sum of the first detection region, the second detection region, and the third detection region. Specifically, a transverse direction of the autonomous lawn mower 100 is a width direction, and an effective detection width of the ultrasonic sensor assembly 20 covers a width range of the body.

In another preferred embodiment of the autonomous lawn mower 100 according to the first embodiment of the present invention, the used ultrasonic sensor assembly 20 includes more than two ultrasonic sensors. That is, the ultrasonic sensor assembly 20 may include three or more ultrasonic sensors. When there are more than two ultrasonic sensors, there are different requirements for sending of ultrasound by ultrasonic sensors in different arrangements. Theoretically, when more than two ultrasonic sensors have overlapping detection regions with other sensors, the more than two ultrasonic sensors and the other ultrasonic sensors having overlapping detection regions need to send ultrasound successively and alternately in time. When more than two ultrasonic sensors do not have overlapping detection regions with other ultrasonic sensors, it may be selected that the more than two ultrasonic sensors and the other ultrasonic sensors send ultrasound simultaneously, or it may be selected that the more than two ultrasonic sensors and the other ultrasonic sensors send ultrasound successively and alternately in time. Arrangements of more than two ultrasonic sensors and sending of ultrasound are described below with reference to specific accompanying drawings and embodiments.

Figure 10:
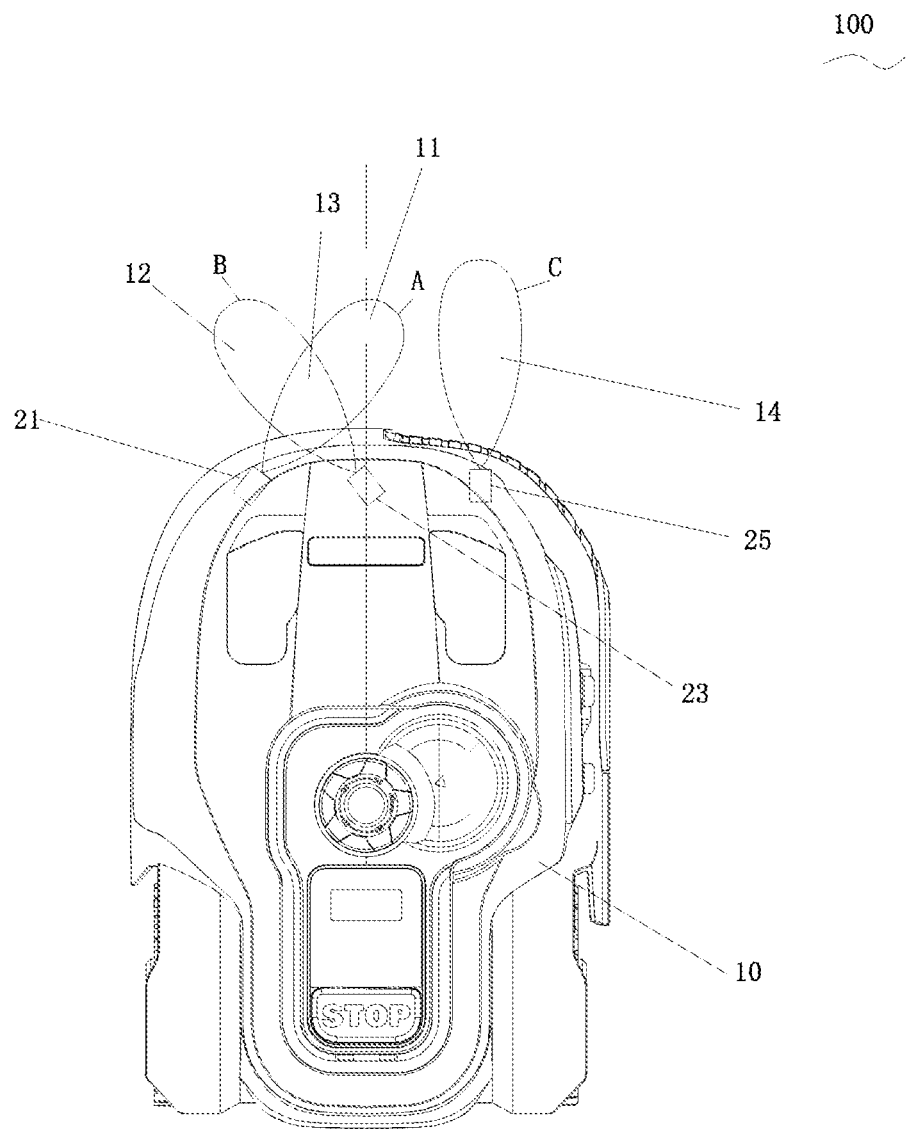
FIG. 10 is a schematic arrangement diagram when the ultrasonic sensor assembly of the autonomous lawn mower 100 includes three ultrasonic sensors according to the first embodiment of the present invention.

As shown in FIG. 10, FIG. 10 shows an embodiment in which the autonomous lawn mower 100 according to the first embodiment of the present invention includes three ultrasonic sensors. The specific description is that the ultrasonic sensor assembly 20 includes a first ultrasonic sensor 21, a second ultrasonic sensor 23, and a third ultrasonic sensor 25. The first ultrasonic sensor 21 and the second ultrasonic sensor 23 are still arranged intersecting at an angle, and form a field-of-view overlapping detection region right in front of the housing 10, and the third ultrasonic sensor 25 is parallel to the housing axis. For example, in the first arrangement manner, the third ultrasonic sensor 25 forms a field-of-view overlapping detection region right in front of the housing 10 with neither of the first ultrasonic sensor 21 and the second ultrasonic sensor 23. The third ultrasonic sensor 25 has a fourth detection region. Based on that the third ultrasonic sensor 25 forms a field-of-view overlapping detection region right in front of the housing 10 with neither of the first ultrasonic sensor 21 and the second ultrasonic sensor 23, it may be selected that the third ultrasonic sensor 25 and the first ultrasonic sensor 21 or the second ultrasonic sensor 23 send ultrasound simultaneously, or it may be selected that the third ultrasonic sensor 25 and the first ultrasonic sensor 21 or the second ultrasonic sensor 23 send ultrasound successively and alternately in time.

As shown in FIG. 10, when the third ultrasonic sensor 25 and the first ultrasonic sensor 21 or the second ultrasonic sensor 23 send ultrasound simultaneously, the control module 30 controls the first ultrasonic sensor 21 and the third ultrasonic sensor 25 to transmit ultrasound in a first period of time, and the first ultrasonic sensor 21, the second ultrasonic sensor 23, and the third ultrasonic sensor 25 receive echoes from an obstacle in the first period of time. The control module 30 controls the third ultrasonic sensor 25 and the second ultrasonic sensor 23 to transmit ultrasound in a second period of time following the first period of time, and the first ultrasonic sensor 21, the second ultrasonic sensor 23, and the third ultrasonic sensor 25 receive echoes from an obstacle in the second period of time.

As shown in FIG. 10, when the third ultrasonic sensor 25 and the first ultrasonic sensor 21 or the second ultrasonic sensor 23 send ultrasound successively, the control module 30 controls the first ultrasonic sensor 21 to transmit ultrasound in a first period of time. The first ultrasonic sensor 21, the second ultrasonic sensor 23, and the third ultrasonic sensor 25 receive echoes from the obstacle in the first period of time. The control module 30 controls the second ultrasonic sensor 23 to transmit ultrasound in a second period of time following the first period of time, and the first ultrasonic sensor 21, the second ultrasonic sensor 23, and the third ultrasonic sensor 25 receive echoes from the obstacle in the second period of time. The control module 30 controls the third ultrasonic sensor 25 to transmit ultrasound in a third period of time following the second period of time, and the first ultrasonic sensor 21, the second ultrasonic sensor 23, and the third ultrasonic sensor 25 receive echoes from an obstacle in the third period of time.

As shown in FIG. 10, in an embodiment in which the autonomous lawn mower 100 according to the first embodiment of the present invention includes three ultrasonic sensors, the first ultrasonic sensor 21 and the second ultrasonic sensor 23 are disposed at an angle from each other at a front end of the housing 10, so that the first transceiver region A of the first ultrasonic sensor 21 and the second transceiver region B of the second ultrasonic sensor 23 overlap partially. A third transceiver region C of the third ultrasonic sensor 25 does not overlap with the first transceiver region A of the first ultrasonic sensor 21 and the second transceiver region B of the second ultrasonic sensor 23. A non-overlapping part of the first transceiver region A is a first detection region 11 of the sensor component 20, a non-overlapping part of the second transceiver region B is a second detection region 12 of the sensor component 20, and an overlapping part of the first transceiver region A and the second transceiver region B is a third detection region 13 of the sensor component 20. The third transceiver region C is a fourth detection region 14.

As shown in FIG. 10, the control module 30 can still determine a location of the obstacle according to a combination of ultrasound transmitted by the first ultrasonic sensor 21, the second ultrasonic sensor 23, and the third ultrasonic sensor 25 in the ultrasonic sensor assembly 20 and echoes received from an obstacle by the first ultrasonic sensor 21, the second ultrasonic sensor 23, and the third ultrasonic sensor 25. The specific description is that when only the first ultrasonic sensor 21 in the ultrasonic sensor assembly 20 transmits ultrasound and only the first ultrasonic sensor 21 receives an echo from the obstacle, the control module 30 determines that the obstacle is located in the first detection region 11. When only the second ultrasonic sensor 23 in the ultrasonic sensor assembly 20 transmits ultrasound and only the second ultrasonic sensor 23 receives an echo from the obstacle, the control module 30 determines that the obstacle is located in the second detection region 12. When the first ultrasonic sensor 21 in the ultrasonic sensor assembly 20 transmits ultrasound and the first ultrasonic sensor 21 and the second ultrasonic sensor 23 receive echoes from the obstacle, the control module 30 determines that the obstacle is located in the third detection region 13. When the second ultrasonic sensor 23 in the ultrasonic sensor assembly 20 transmits ultrasound and the first ultrasonic sensor 21 and the second ultrasonic sensor 23 receive echoes from the obstacle, the control module 30 determines that the obstacle is located in the third detection region 13. When the first ultrasonic sensor 21 in the ultrasonic sensor assembly 20 transmits ultrasound and the second ultrasonic sensor 23 receives an echo from the obstacle, the control module 30 determines that the obstacle is located in the third detection region 13. When the second ultrasonic sensor 23 in the ultrasonic sensor assembly 20 transmits ultrasound and the first ultrasonic sensor 21 receives an echo from the obstacle, the control module 30 determines that the obstacle is located in the third detection region 13. When the third ultrasonic sensor 25 in the ultrasonic sensor assembly 20 transmits ultrasound and only the third ultrasonic sensor 25 receives an echo from the obstacle, the control module 30 determines that the obstacle is located in the fourth detection region 14.

Figure 11:
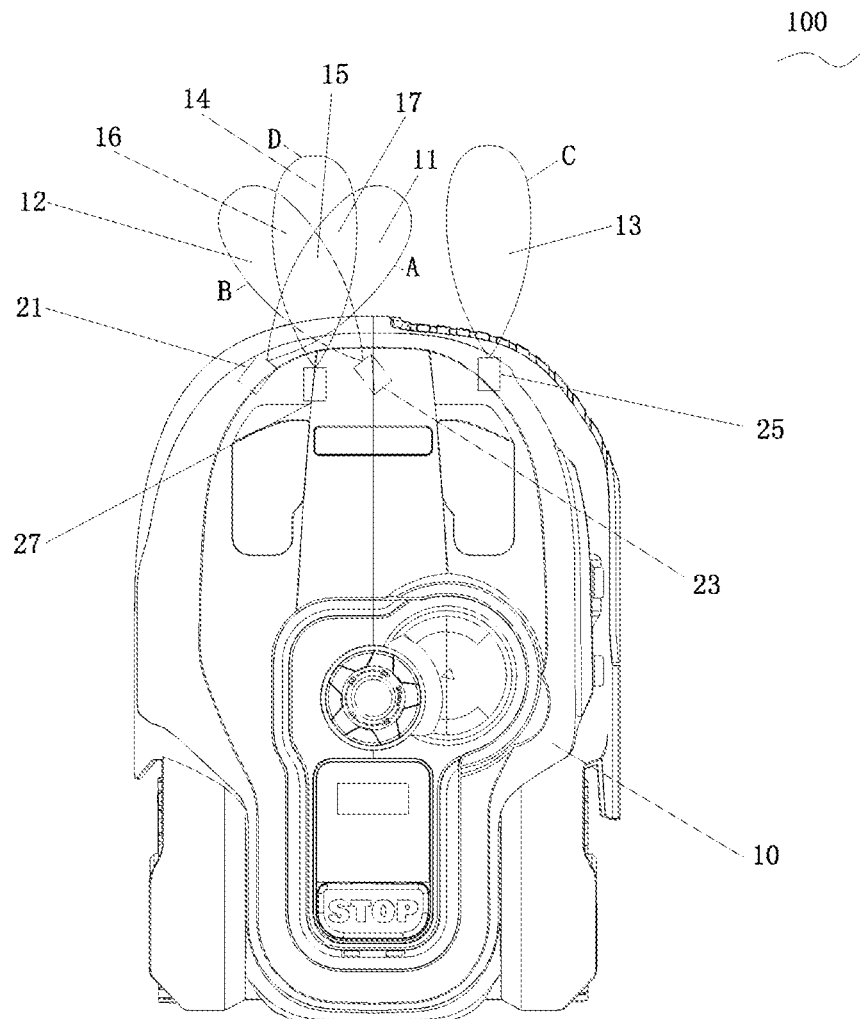
FIG. 11 is a schematic arrangement diagram when the ultrasonic sensor assembly of the autonomous lawn mower 100 includes four ultrasonic sensors according to the first embodiment of the present invention.

As shown in FIG. 11, FIG. 11 is an embodiment in which the ultrasonic sensor assembly 20 includes four ultrasonic sensors, the ultrasonic sensor assembly 20 includes a first ultrasonic sensor 21, a second ultrasonic sensor 23, a third ultrasonic sensor 25, and a fourth ultrasonic sensor 27. The first ultrasonic sensor 21 has a first transceiver region A, and the second ultrasonic sensor 23 has a second transceiver region B. The first ultrasonic sensor 21 and the second ultrasonic sensor 23 are arranged at an angle from each other and form a field-of-view overlapping detection region, that is, the third detection region, right in front of the housing 10. The third ultrasonic sensor 25 has a third transceiver region C, and the fourth ultrasonic sensor 27 has a fourth transceiver region D. The third ultrasonic sensor 25 forms an overlapping detection region right in front of the housing 10 with neither of the first ultrasonic sensor 21 and the second ultrasonic sensor 23. The fourth ultrasonic sensor 27 forms an overlapping detection region right in front of the housing 10 with either the first ultrasonic sensor 21 or the second ultrasonic sensor 23. The fourth ultrasonic sensor 27 has an intersection with the first ultrasonic sensor 21 and the second ultrasonic sensor 23 and therefore forms a new overlapping detection region. As shown in FIG. 11, the third ultrasonic sensor 25 and the fourth ultrasonic sensor 27 are parallel to each other. The third ultrasonic sensor 25 and the fourth ultrasonic sensor 27 are both parallel to an axis of the housing, and the fourth ultrasonic sensor 27 is located between the first ultrasonic sensor 21 and the second ultrasonic sensor 23. In other embodiments, provided that the fourth ultrasonic sensor 27 forms an overlapping detection region with the first ultrasonic sensor 21 and the second ultrasonic sensor 23 and the third ultrasonic sensor 25 forms an overlapping detection region with none of the other sensors, a manner of arranging axes of the sensors is not limited.

Still as shown in FIG. 11, based on that the third ultrasonic sensor 25 forms an overlapping detection region right in front of the housing 10 with neither of the first ultrasonic sensor 21 and the second ultrasonic sensor 23, it may be selected that the third ultrasonic sensor 25, the first ultrasonic sensor 21, and the second ultrasonic sensor 23 send ultrasound simultaneously, or it may be selected that the third ultrasonic sensor 25, the first ultrasonic sensor 21, and the second ultrasonic sensor 23 send ultrasound successively and alternately in time. Based on that the fourth ultrasonic sensor 27 forms an overlapping detection region right in front of the housing 10 with either of the first ultrasonic sensor 21 and the second ultrasonic sensor 23, the fourth ultrasonic sensor 27, the first ultrasonic sensor 21, and the second ultrasonic sensor 23 need to send ultrasound successively and alternately in time, so as to avoid that a plurality of ultrasonic sensors sends ultrasound to the obstacle together to cause crosstalk to recognition.

As shown in FIG. 11, when the third ultrasonic sensor 25 and the first ultrasonic sensor 21 or the second ultrasonic sensor 23 or the fourth ultrasonic sensor 27 send ultrasound simultaneously, the control module 30 controls the first ultrasonic sensor 21 and the third ultrasonic sensor 25 to transmit ultrasound in a first period of time, and the first ultrasonic sensor 21, the second ultrasonic sensor 23, the third ultrasonic sensor 25, and the fourth ultrasonic sensor 27 receive echoes from an obstacle in the first period of time. The control module 30 controls the third ultrasonic sensor 25 and the second ultrasonic sensor 23 to transmit ultrasound in a second period of time following the first period of time, and the first ultrasonic sensor 21, the second ultrasonic sensor 23, the third ultrasonic sensor 25, and the fourth ultrasonic sensor 27 receive echoes from the obstacle in the second period of time. The control module 30 controls the third ultrasonic sensor 25 and the fourth ultrasonic sensor 27 to transmit ultrasound in a third period of time following the second period of time, and the first ultrasonic sensor 21, the second ultrasonic sensor 23, the third ultrasonic sensor 25, and the fourth ultrasonic sensor 27 receive echoes from an obstacle in the third period of time.

As shown in FIG. 11, when the third ultrasonic sensor 25 and the first ultrasonic sensor 21 or the second ultrasonic sensor 23 send ultrasound successively, the control module 30 controls the first ultrasonic sensor 21 to transmit ultrasound in a first period of time, and the first ultrasonic sensor 21, the second ultrasonic sensor 23, the third ultrasonic sensor 25, and the fourth ultrasonic sensor 27 receive echoes from the obstacle in the first period of time. The control module 30 controls the second ultrasonic sensor 23 to transmit ultrasound in a second period of time following the first period of time, and the first ultrasonic sensor 21, the second ultrasonic sensor 23, the third ultrasonic sensor 25, and the fourth ultrasonic sensor 27 receive echoes from the obstacle in the second period of time. The control module 30 controls the third ultrasonic sensor 25 to transmit ultrasound in a third period of time following the second period of time, and the first ultrasonic sensor 21, the second ultrasonic sensor 23, the third ultrasonic sensor 25, and the fourth ultrasonic sensor 27 receive echoes from an obstacle in the third period of time. The control module 30 controls the fourth ultrasonic sensor 27 to transmit ultrasound in a fourth period of time following the third period of time, and the first ultrasonic sensor 21, the second ultrasonic sensor 23, the third ultrasonic sensor 25, and the fourth ultrasonic sensor 27 receive echoes from an obstacle in the fourth period of time.

As shown in FIG. 11, in an embodiment in which the autonomous lawn mower 100 according to the first embodiment of the present invention includes four ultrasonic sensors, a non-overlapping part of the first transceiver region A is a first detection region 11 of the sensor component 20, a non-overlapping part of the second transceiver region B is a second detection region 12 of the sensor component 20, and a third transceiver region C is a fourth detection region 13. A non-overlapping part of the fourth transceiver region D is a fourth detection region 14 of the sensor component 20. An overlapping part of the first transceiver region A, the second transceiver region B, and the fourth transceiver region D is a fifth detection region 15 of the sensor component 20. A remaining part that is in an overlapping part of the first transceiver region A and the fourth transceiver region D and does not overlap with the second transceiver region B is a seventh detection region 17, and a remaining part that is in an overlapping part of the second transceiver region B and the fourth transceiver region D and does not overlap with the first transceiver region A is a sixth detection region 16.

As shown in FIG. 11, the control module 30 can still determine a location of the obstacle according to a combination of ultrasound transmitted by the first ultrasonic sensor 21, the second ultrasonic sensor 23, the third ultrasonic sensor 25, and the fourth ultrasonic sensor 27 in the ultrasonic sensor assembly 20 and echoes received from an obstacle by the first ultrasonic sensor 21, the second ultrasonic sensor 23, the third ultrasonic sensor 25, and the fourth ultrasonic sensor 27. The specific description is that when only the first ultrasonic sensor 21 in the ultrasonic sensor assembly 20 transmits ultrasound and only the first ultrasonic sensor 21 receives an echo from the obstacle, the control module 30 determines that the obstacle is located in the first detection region 11. When only the second ultrasonic sensor 23 in the ultrasonic sensor assembly 20 transmits ultrasound and only the second ultrasonic sensor 23 receives an echo from the obstacle, the control module 30 determines that the obstacle is located in the second detection region 12. When only the third ultrasonic sensor 25 in the ultrasonic sensor assembly 20 transmits ultrasound and only the third ultrasonic sensor 25 receives an echo from the obstacle, the control module 30 determines that the obstacle is located in the third detection region 13. When only the fourth ultrasonic sensor 27 in the ultrasonic sensor assembly 20 transmits ultrasound and only the fourth ultrasonic sensor 27 receives an echo from the obstacle, the control module 30 determines that the obstacle is located in the fourth detection region 14. When the first ultrasonic sensor 21 or the second ultrasonic sensor 23 or the fourth ultrasonic sensor 27 in the ultrasonic sensor assembly 20 transmits ultrasound, the first ultrasonic sensor 21, the second ultrasonic sensor 23, and the fourth ultrasonic sensor 27 all receive echoes from the obstacle, the control module 30 determines that the obstacle is located in the fifth detection region 15. When the first ultrasonic sensor 21 in the ultrasonic sensor assembly 20 transmits ultrasound and both the second ultrasonic sensor 23 and the fourth ultrasonic sensor 27 receive echoes from the obstacle, the control module 30 determines that the obstacle is located in the fifth detection region 15. When the second ultrasonic sensor 23 in the ultrasonic sensor assembly 20 transmits ultrasound and both the first ultrasonic sensor 21 and the fourth ultrasonic sensor 27 receive echoes from the obstacle, the control module 30 determines that the obstacle is located in the fifth detection region 15. When the fourth ultrasonic sensor 27 in the ultrasonic sensor assembly 20 transmits ultrasound and both the first ultrasonic sensor 21 and the second ultrasonic sensor 23 receive echoes from the obstacle, the control module 30 determines that the obstacle is located in the fifth detection region 15. When the second ultrasonic sensor 23 in the ultrasonic sensor assembly 20 or the fourth ultrasonic sensor 27 transmits ultrasound and both the second ultrasonic sensor 23 and the fourth ultrasonic sensor 27 receive echoes from the obstacle, the control module 30 determines that the obstacle is located in the sixth detection region 16. When the second ultrasonic sensor 23 in the ultrasonic sensor assembly 20 transmits ultrasound and the fourth ultrasonic sensor 27 receives an echo from the obstacle, the control module 30 determines that the obstacle is located in the sixth detection region 16. When the fourth ultrasonic sensor 27 in the ultrasonic sensor assembly 20 transmits ultrasound and the second ultrasonic sensor 23 receives an echo from the obstacle, the control module 30 determines that the obstacle is located in the sixth detection region 16. When the first ultrasonic sensor 21 or the fourth ultrasonic sensor 27 in the ultrasonic sensor assembly 20 transmits ultrasound and both the first ultrasonic sensor 21 and the fourth ultrasonic sensor 27 receive echoes from the obstacle, the control module 30 determines that the obstacle is located in the seventh detection region 17. When the first ultrasonic sensor 21 in the ultrasonic sensor assembly 20 transmits ultrasound and the fourth ultrasonic sensor 27 receives an echo from the obstacle, the control module 30 determines that the obstacle is located in the seventh detection region 17. When the fourth ultrasonic sensor 27 in the ultrasonic sensor assembly 20 transmits ultrasound and the first ultrasonic sensor 21 receives an echo from the obstacle, the control module 30 determines that the obstacle is located in the seventh detection region 17.

The autonomous lawn mower 100 according to the first embodiment of the present invention detects an obstacle by using an ultrasonic sensor, and the autonomous lawn mower 100 has a preset distance. When a distance between the autonomous lawn mower 100 and an obstacle is less than or equal to the preset distance, the autonomous lawn mower performs obstacle avoidance instead of continuing to move toward the obstacle and non-contact obstacle avoidance of the autonomous lawn mower is implemented. By using different values of the preset distance, when the distance is relatively small, non-contact obstacle avoidance at a relatively short distance can be implemented. When the distance is relatively large, non-contact obstacle avoidance at a relatively long distance as compared with a short distance can be implemented. In addition, the ultrasonic sensors are arranged intersecting at an angle, so that the position and direction of an obstacle can be obtained, thereby improving the accuracy of positioning an obstacle and helping the autonomous lawn mower 100 to adapt to different working conditions. In addition, after the direction is known, it is convenient for the autonomous lawn mower 100 to execute a corresponding obstacle-avoidance measure. For example, if an obstacle is on the right side, the autonomous lawn mower 100 turns left when a left turning condition is met.

The control module 30 determines a location of an obstacle according to different conditions of ultrasound received by the ultrasonic sensor assembly 20, so as to control the forward movement direction of the autonomous lawn mower to avoid the obstacle correspondingly, thereby improving the efficiency of obstacle avoidance. Specifically, for example, for the autonomous lawn mower 100 according to the first embodiment of the present invention, when an obstacle appears in the third detection region, the control module 30 controls the autonomous lawn mower to reverse, or stop, or steer to the left, or steer to the right, or reverse to the left, or reverse to the right. When an obstacle appears in the first detection region, the control module 30 controls the autonomous lawn mower to reverse, or stop, or steer to the left, or reverse to the left. When an obstacle appears in the second detection region, the control module 30 controls the autonomous lawn mower to reverse, or stop, or steer to the right, or reverse to the right. Specific obstacle-avoidance measures are properly selected by the control module 30 according to a distance between an obstacle and the autonomous lawn mower 100.

Second Embodiment

Figure 12:
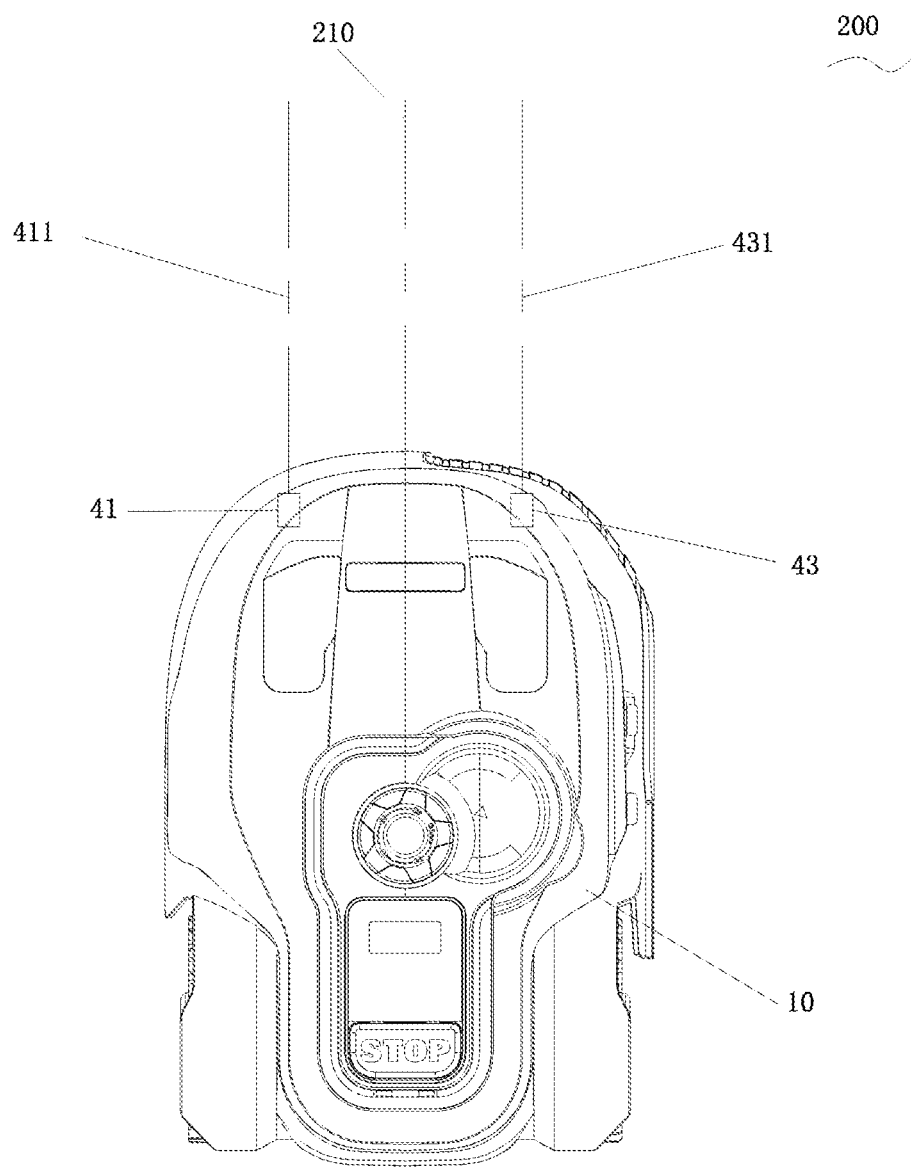
FIG. 12 is a schematic diagram of an axis relationship in an ultrasonic sensor assembly of an autonomous lawn mower 200 according to a second embodiment of the present invention.
Figure 13:
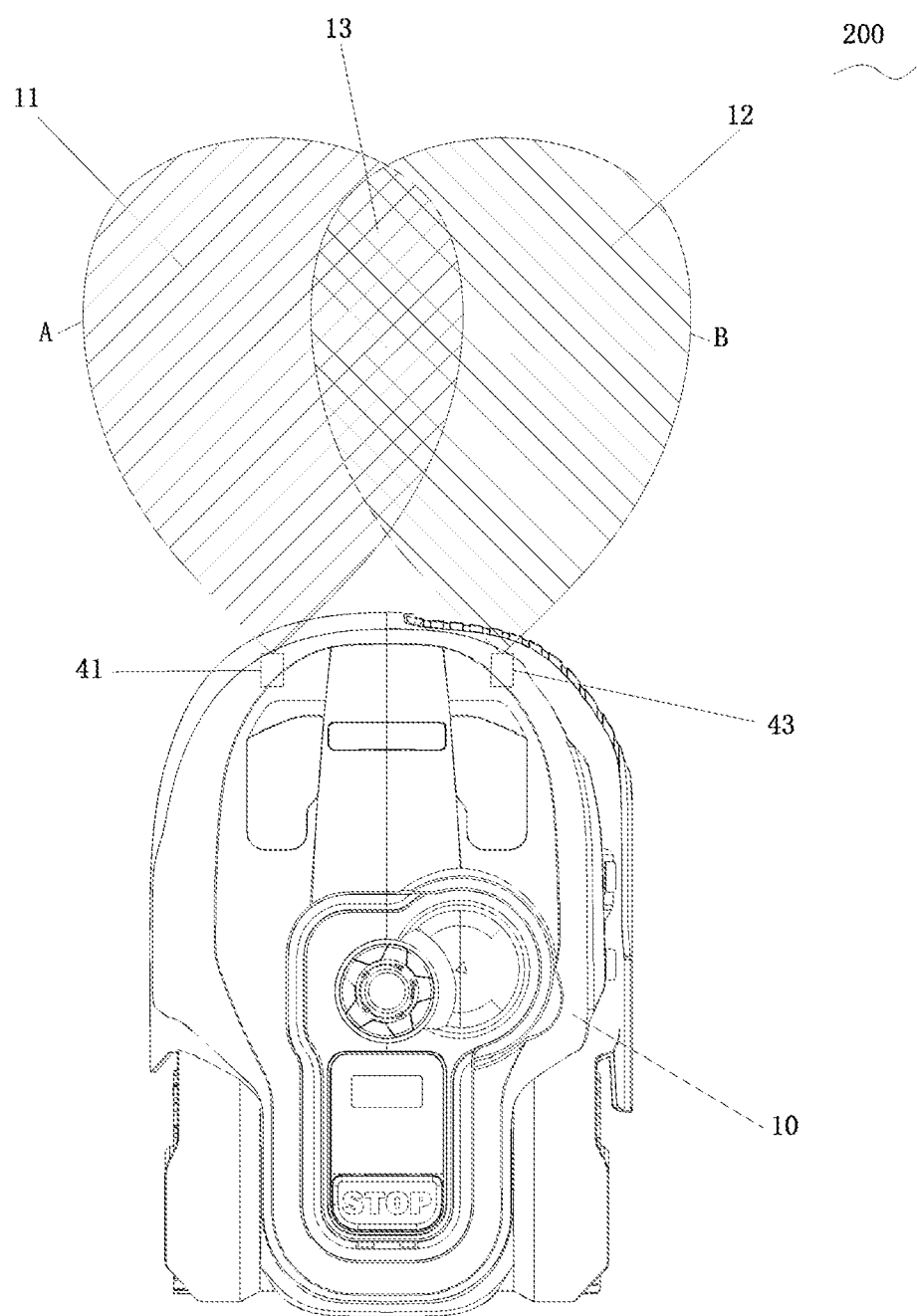
FIG. 13 is a schematic diagram of a detection range of a first arrangement manner of the ultrasonic sensor assembly of the autonomous lawn mower 200 according to the second embodiment of the present invention.

As shown in FIG. 12 and FIG. 13, FIG. 12 is a schematic top view of an autonomous lawn mower 200 according to the second embodiment of the present invention. FIG. 13 is a schematic diagram of an arrangement and a detection range of an ultrasonic sensor assembly of the autonomous lawn mower 200 in the second embodiment of the present invention. In the autonomous lawn mower 200 in the second embodiment, an ultrasonic sensor assembly 20 includes a first ultrasonic sensor 41 and a second ultrasonic sensor 43. The first ultrasonic sensor 41 and the second ultrasonic sensor 43 are disposed in parallel to each other and an ultrasonic sending direction faces the right front of a housing 10.

As shown in FIG. 12, in a preferred embodiment of the autonomous lawn mower 200 in the second embodiment of the present invention, the first ultrasonic sensor 41 has a first axis 411, the second ultrasonic sensor 43 has a second axis 431, and the housing 10 has a housing axis 210. The first axis 411 and the second axis 431 are parallel to each other, and the first axis 411, the second axis 431, and the housing axis 210 are all parallel to each other. In other embodiments, it only needs to be ensured that the first axis 411 and the second axis 431 are parallel to each other, and whether the first axis 411 and the second axis 431 are parallel to the housing axis 210 is not limited.

Still as shown in FIG. 13, the first ultrasonic sensor 41 and the second ultrasonic sensor 43 have consistent hardware parameters. The first ultrasonic sensor 41 has a first transceiver region A. The second ultrasonic sensor 43 has a second transceiver region B. The first transceiver region A and the second transceiver region B form an overlapping detection region right in front of the autonomous lawn mower 1. In the overlapping detection region, both the first ultrasonic sensor 41 and the second ultrasonic sensor 43 can receive ultrasonic echoes. That is, if the first ultrasonic sensor 41 sends ultrasound, both the first ultrasonic sensor 41 and the second ultrasonic sensor 43 can receive ultrasonic echoes. If the second ultrasonic sensor 43 sends ultrasound, both the first ultrasonic sensor 41 and the second ultrasonic sensor 43 can receive ultrasonic echoes.

Still as shown in FIG. 13, in an embodiment of the first arrangement manner of the autonomous lawn mower 200 in the second embodiment of the present invention, as discussed above, the first ultrasonic sensor 41 and the second ultrasonic sensor 43 are disposed at a front end of the housing 10 in parallel in a transverse direction, so that the first transceiver region A of the first ultrasonic sensor 41 and the second transceiver region B of the second ultrasonic sensor 43 overlap partially. A non-overlapping part of the first transceiver region A is a first detection region 11 of the sensor component 20, a non-overlapping part of the second transceiver region B is a second detection region 12 of the sensor component 20, and an overlapping part of the first transceiver region A and the second transceiver region B is a third detection region 13 of the sensor component 20.

Figure 14:
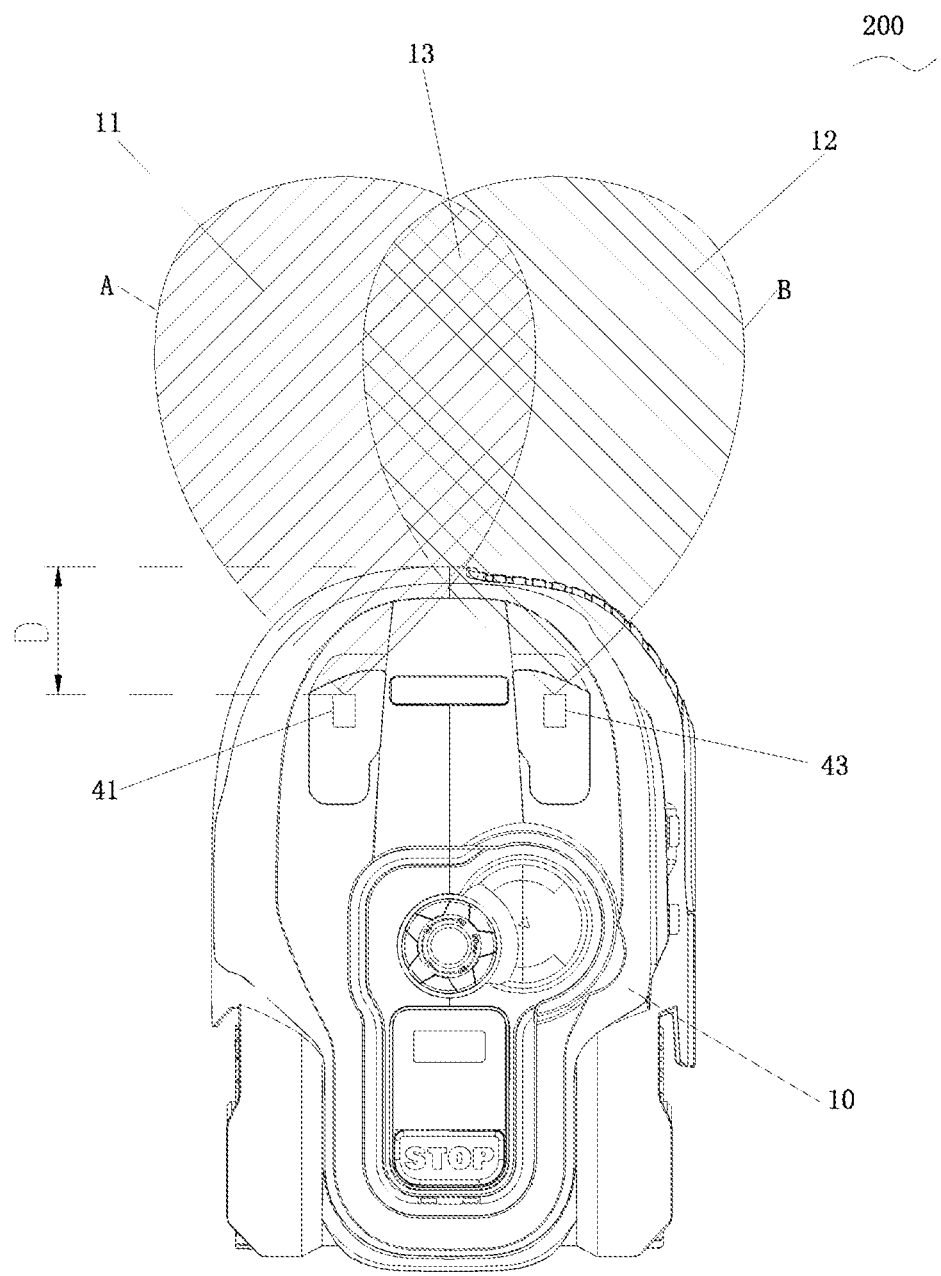
FIG. 14 is a schematic diagram of a detection range of a second arrangement manner of the ultrasonic sensor assembly of the autonomous lawn mower 200 according to the second embodiment of the present invention.

As shown in FIG. 14, FIG. 14 is a schematic diagram of a detection range of the second arrangement manner of the ultrasonic sensor assembly of the autonomous lawn mower 200 according to the second embodiment of the present invention 20. A difference between the second arrangement manner and the first arrangement manner of the ultrasonic sensor assembly 20 lies in that the ultrasonic sensor assembly 20 is mounted at a position at a distance D from a front end of the housing. The specific description is that the ultrasonic sensor assembly 20 includes a first ultrasonic sensor 41 and a second ultrasonic sensor 43. The first ultrasonic sensor 41 and the second ultrasonic sensor 43 have consistent hardware parameters. The first ultrasonic sensor 41 has a first transceiver region A. The second ultrasonic sensor 43 has a second transceiver region B. The first transceiver region A and the second transceiver region B form an overlapping detection region right in front of the autonomous lawn mower 1. In the overlapping detection region, both the first ultrasonic sensor 41 and the second ultrasonic sensor 43 can receive ultrasonic echoes. That is, if the first ultrasonic sensor 41 sends ultrasound, both the first ultrasonic sensor 41 and the second ultrasonic sensor 43 can receive ultrasonic echoes. If the second ultrasonic sensor 43 sends ultrasound, both the first ultrasonic sensor 41 and the second ultrasonic sensor 43 can receive ultrasonic echoes.

Still as shown in FIG. 14, in an embodiment of the second arrangement manner of the autonomous lawn mower 200 in the second embodiment of the present invention, the first ultrasonic sensor 41 and the second ultrasonic sensor 43 are disposed at a front end of the housing 10 in parallel in a transverse direction, so that the first transceiver region A of the first ultrasonic sensor 41 and the second transceiver region B of the second ultrasonic sensor 43 overlap partially. A non-overlapping part of the first transceiver region A is a first detection region 11 of the sensor component 20, a non-overlapping part of the second transceiver region B is a second detection region 12 of the sensor component 20, and an overlapping part of the first transceiver region A and the second transceiver region B is a third detection region 13 of the sensor component 20.

As shown in FIG. 14, in the second arrangement manner of the autonomous lawn mower 200 in the second embodiment of the present invention, the first ultrasonic sensor 41 and the second ultrasonic sensor 43 theoretically may be disposed at any position in a length direction of the housing 10. If the first ultrasonic sensor 41 and the second ultrasonic sensor 43 are disposed on the housing 10 at a position closer to a rear end, to protect sending of ultrasound and reception of an echo from an obstacle by the ultrasonic sensors from being affected, the shape of the housing may be improved or the ultrasonic sensor may be disposed higher. In a preferred embodiment of the present invention, the factors of transmission and reception of ultrasound and a small occupying space are all considered. The first ultrasonic sensor 41 and the second ultrasonic sensor 43 are disposed at a front half of the housing 10 in a length direction. A distance D is less than or equal to a half of a length of the housing 10. In this way, it may be more convenient to improve the structure of the front end of the housing to adapt to a range of a field of view, thereby preventing ultrasound from being blocked.

In a preferred embodiment of the autonomous lawn mower 200 in the second embodiment of the present invention, a control module 30 controls the first ultrasonic sensor 41 and the second ultrasonic sensor 43 to transmit ultrasound alternately in time. The control module 30 controls the first ultrasonic sensor 41 to transmit ultrasound in a first period of time, and the first ultrasonic sensor 41 and the second ultrasonic sensor 43 receive echoes from the obstacle in the first period of time. The control module 30 controls the second ultrasonic sensor 43 to transmit ultrasound in a second period of time following the first period of time, and the first ultrasonic sensor 41 and the second ultrasonic sensor 43 receive echoes from the obstacle in the second period of time.

In a preferred embodiment of the autonomous lawn mower 200 in the second embodiment of the present invention, the control module 30 determines a location of the obstacle according to a combination of ultrasound transmitted by the first ultrasonic sensor 41 and the second ultrasonic sensor 43 in the ultrasonic sensor assembly 20 and echoes received from an obstacle by the first ultrasonic sensor 41 and the second ultrasonic sensor 43. When only the first ultrasonic sensor 41 in the ultrasonic sensor assembly 20 transmits ultrasound and only the first ultrasonic sensor 41 receives an echo from the obstacle, the control module 30 determines that the obstacle is located in the first detection region 11. When only the second ultrasonic sensor 43 in the ultrasonic sensor assembly 20 transmits ultrasound and only the second ultrasonic sensor 43 receives an echo from the obstacle, the control module 30 determines that the obstacle is located in the second detection region 12. When the first ultrasonic sensor 41 in the ultrasonic sensor assembly 20 transmits ultrasound, the first ultrasonic sensor 41 and the second ultrasonic sensor 43 receive echoes from the obstacle, and the control module 30 determines that the obstacle is located in the third detection region 13. When the second ultrasonic sensor 43 in the ultrasonic sensor assembly 20 transmits ultrasound and the first ultrasonic sensor 41 and the second ultrasonic sensor 43 receive echoes from the obstacle, the control module 30 determines that the obstacle is located in the third detection region 13. When the first ultrasonic sensor 41 in the ultrasonic sensor assembly 20 transmits ultrasound and the second ultrasonic sensor 43 receives an echo from the obstacle, the control module 30 determines that the obstacle is located in the third detection region 13. When the second ultrasonic sensor 43 in the ultrasonic sensor assembly 20 transmits ultrasound and the first ultrasonic sensor 41 receives an echo from the obstacle, the control module 30 determines that the obstacle is located in the third detection region 13.

In a preferred embodiment of the autonomous lawn mower 200 in the second embodiment of the present invention, the control module 30 calculates the distance between the obstacle and the autonomous lawn mower according to a time difference between the time when the ultrasonic sensor assembly 20 transmits ultrasound and the time when the ultrasonic sensor assembly 20 receives an echo from the obstacle.

In a preferred embodiment of the autonomous lawn mower 200 in the second embodiment of the present invention, the first axis 411 and the second axis 431 are coplanar in a vertical direction. In this way, the autonomous lawn mower may obtain an overlapping detection region having a largest area, and because same ultrasonic sensors are selected, coplanar axes may facilitate the arrangement of an ultrasonic sensor structure and the design of a mounting structure of the housing 10.

In a preferred embodiment of the autonomous lawn mower 200 in the second embodiment of the present invention, to ensure that the autonomous lawn mower 200 in the second embodiment can recognize an obstacle in a forward movement direction, the effective detection range of the ultrasonic sensor assembly 20 covers a region right in front of the body of the autonomous lawn mower 200. In the autonomous lawn mower 200 in the second embodiment of the present invention, the effective detection range of the ultrasonic sensor assembly 20 is a sum of the first detection region, the second detection region, and the third detection region.

In another preferred embodiment of the autonomous lawn mower 200 in the second embodiment of the present invention, when the used ultrasonic sensor assembly 20 includes more than two ultrasonic sensors, that is, to obtain an overlapping detection region having a larger area in front of the autonomous lawn mower 200 and position information of an obstacle, the ultrasonic sensor assembly 20 may include three or more ultrasonic sensors. When there are more than two ultrasonic sensors, there are different requirements for transmission of ultrasound by ultrasonic sensors in different arrangements. When an overlapping detection region of a plurality of ultrasonic sensors has a larger area, a detection range for an obstacle is wider, and obtained position information of an obstacle is more accurate. In this way, through coordination of a plurality of ultrasonic sensors, the accuracy of detecting an obstacle right in front of the autonomous lawn mower 200 can be increased.

Figure 15:
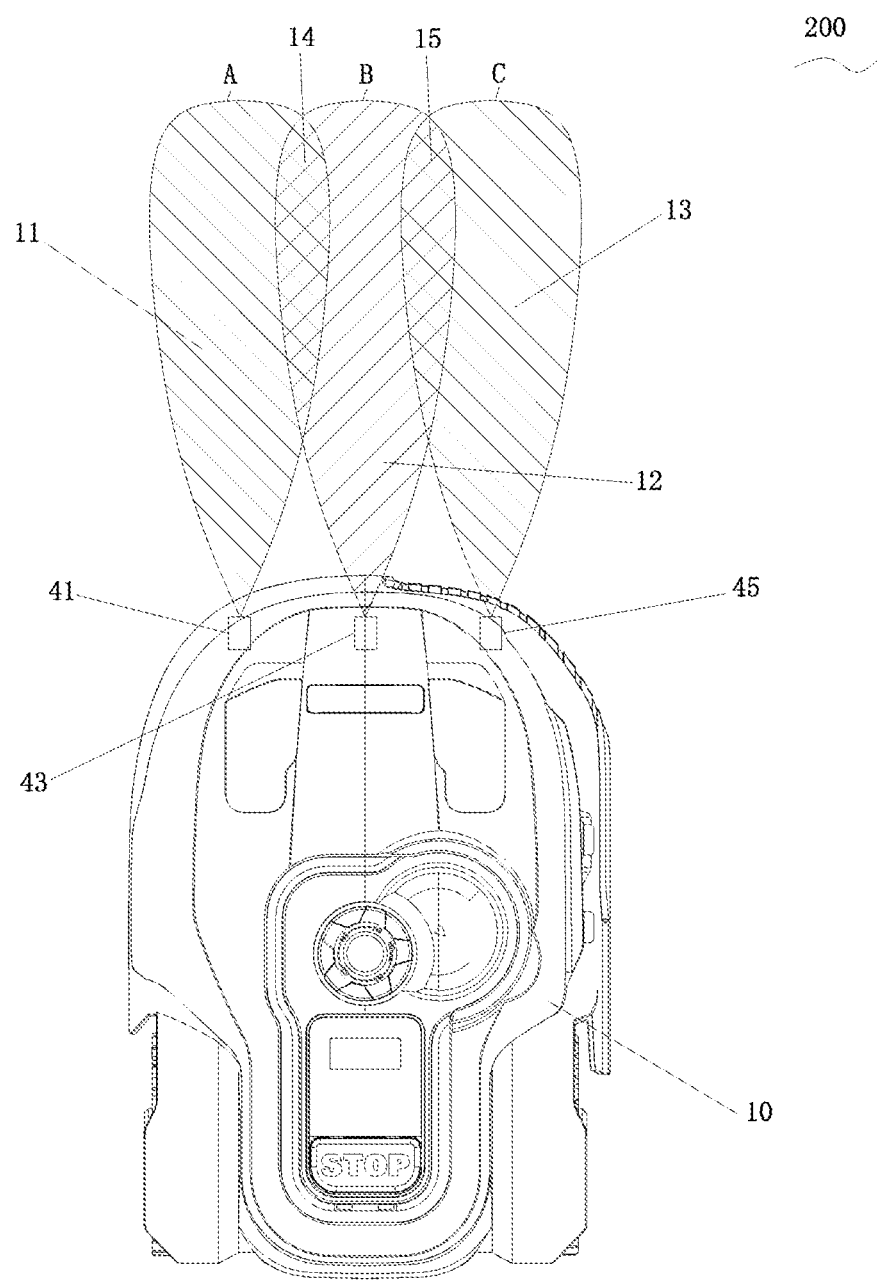
FIG. 15 is a schematic arrangement diagram when the ultrasonic sensor assembly of the autonomous lawn mower 200 includes three ultrasonic sensors according to the second embodiment of the present invention.

As shown in FIG. 15, FIG. 15 shows an embodiment in which the autonomous lawn mower 200 in the second embodiment of the present invention includes three ultrasonic sensors. Axes of the three ultrasonic sensors are parallel to each other. The specific description is that the ultrasonic sensor assembly 20 includes a first ultrasonic sensor 41, a second ultrasonic sensor 43, and a third ultrasonic sensor 45. The first ultrasonic sensor 41 has a first transceiver region A. The second ultrasonic sensor 43 has a second transceiver region B. The third ultrasonic sensor 45 has a third transceiver region C. The three ultrasonic sensors are all parallel to each other. The first ultrasonic sensor 41 and the second ultrasonic sensor 43 form a field-of-view overlapping detection region right in front of the housing 10, the third ultrasonic sensor 45 and the second ultrasonic sensor 43 form a field-of-view overlapping detection region right in front of the housing 10, but the third ultrasonic sensor 45 and the first ultrasonic sensor 41 do not form a field-of-view overlapping detection region right in front of the housing 10. Based on that the third ultrasonic sensor 45 and the second ultrasonic sensor 43 form a field-of-view overlapping detection region right in front of the housing 10 and the third ultrasonic sensor 45 and the first ultrasonic sensor 41 do not form a field-of-view overlapping detection region right in front of the housing 10, the third ultrasonic sensor 45 and the first ultrasonic sensor 41 may send ultrasound simultaneously, or the third ultrasonic sensor 45 and the first ultrasonic sensor 41 may send ultrasound successively, and the third ultrasonic sensor 45 and the second ultrasonic sensor 43 need to send ultrasound successively.

As shown in FIG. 15, when the third ultrasonic sensor 45 and the first ultrasonic sensor 41 send ultrasound simultaneously, the control module 30 controls the first ultrasonic sensor 41 and the third ultrasonic sensor 45 to transmit ultrasound in a first period of time, and the first ultrasonic sensor 41, the second ultrasonic sensor 43, and the third ultrasonic sensor 45 receive echoes from the obstacle in the first period of time. The control module 30 controls the second ultrasonic sensor 43 to transmit ultrasound in a second period of time following the first period of time, and the first ultrasonic sensor 41, the second ultrasonic sensor 43, and the third ultrasonic sensor 45 receive echoes from the obstacle in the second period of time.

As shown in FIG. 15, when the third ultrasonic sensor 45, the first ultrasonic sensor 41, and the second ultrasonic sensor 43 send ultrasound successively, the control module 30 controls the first ultrasonic sensor 41 to transmit ultrasound in a first period of time, the first ultrasonic sensor 41, the second ultrasonic sensor 43, and the third ultrasonic sensor 45 receive echoes from the obstacle in the first period of time. The control module 30 controls the second ultrasonic sensor 43 to transmit ultrasound in a second period of time following the first period of time, and the first ultrasonic sensor 41, the second ultrasonic sensor 43, and the third ultrasonic sensor 45 receive echoes from the obstacle in the second period of time. The control module 30 controls the third ultrasonic sensor 45 to transmit ultrasound in a third period of time following the second period of time, and the first ultrasonic sensor 41, the second ultrasonic sensor 43, and the third ultrasonic sensor 45 receive echoes from an obstacle in the third period of time.

As shown in FIG. 15, a non-overlapping part of the first transceiver region A is a first detection region 11 of the sensor component 20, a non-overlapping part of the second transceiver region B is a second detection region 12 of the sensor component 20, a non-overlapping part of the third transceiver region C is a third detection region 13 of the sensor component 20, an overlapping part of the first transceiver region A and the second transceiver region B is a fourth detection region 14 of the sensor component 20, and an overlapping part of the second transceiver region B and the third transceiver region C is a fifth detection region 15 of the sensor component 20.

As shown in FIG. 15, the control module 30 can still determine a location of the obstacle according to a combination of ultrasound transmitted by the first ultrasonic sensor 41, the second ultrasonic sensor 43, and the third ultrasonic sensor 45 in the ultrasonic sensor assembly 20 and echoes received from an obstacle by the first ultrasonic sensor 41, the second ultrasonic sensor 43, and the third ultrasonic sensor 45. For a specific determination manner, an obstacle in transceiver regions of the first ultrasonic sensor 41 and the second ultrasonic sensor 43 may be determined in the foregoing determination manner. Because an overlapping manner of the third ultrasonic sensor 45 and the second ultrasonic sensor 43 is similar to that of the first ultrasonic sensor 41 and the second ultrasonic sensor 43, the manner of determining the position of an obstacle is the same as that of the first ultrasonic sensor 41 and the second ultrasonic sensor 43. Details are not described herein again.

Figure 16:
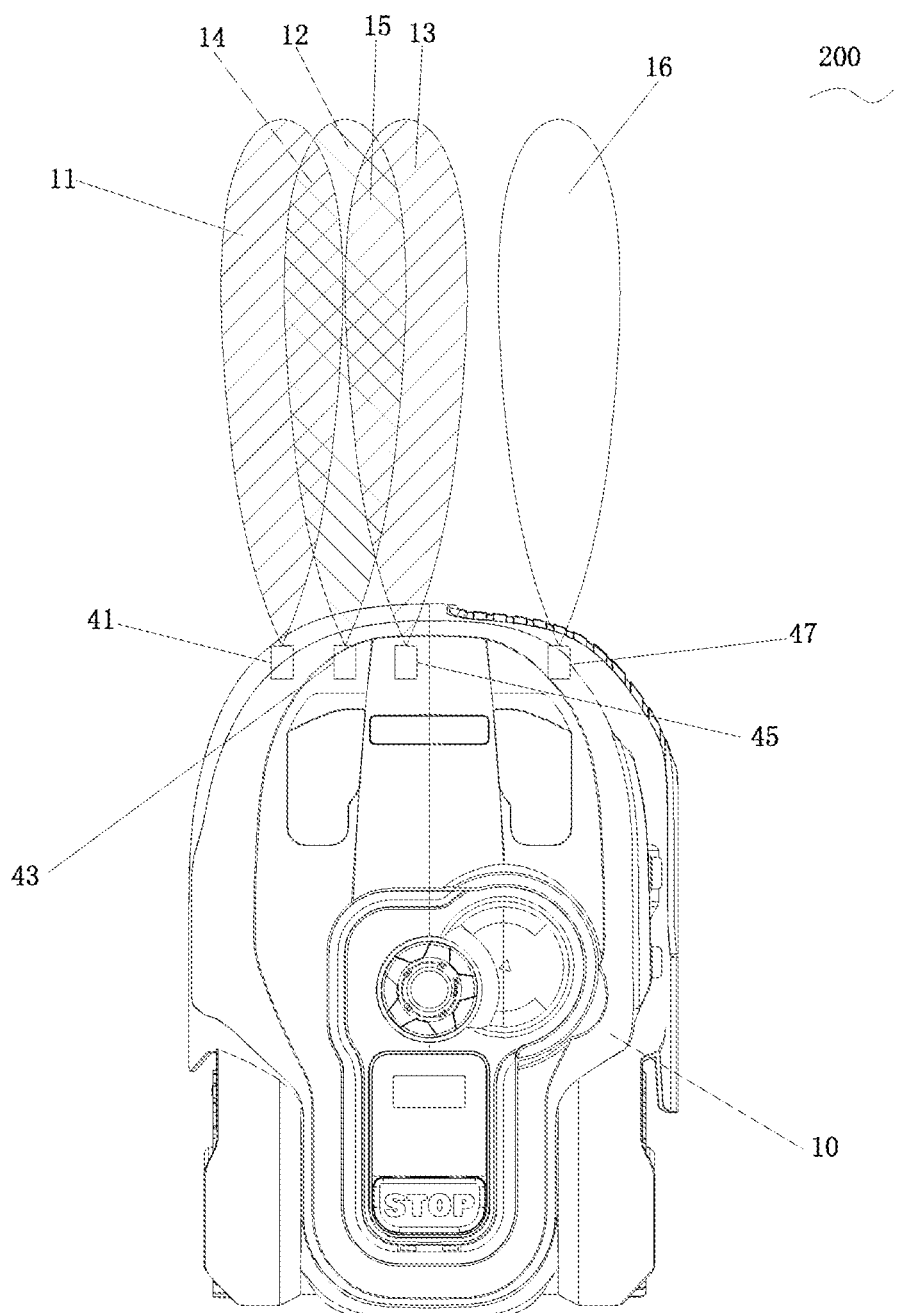
FIG. 16 is a schematic arrangement diagram when the ultrasonic sensor assembly of the autonomous lawn mower 200 includes four ultrasonic sensors according to the second embodiment of the present invention.

As shown in FIG. 16, FIG. 16 is an embodiment in which the autonomous lawn mower 200 in the second embodiment of the present invention includes four ultrasonic sensors. Axes of the four ultrasonic sensors are parallel to each other. The specific description is that the ultrasonic sensor assembly 20 includes a first ultrasonic sensor 41, a second ultrasonic sensor 43, a third ultrasonic sensor 45, and a fourth ultrasonic sensor 47. The four ultrasonic sensors are all parallel to each other. The first ultrasonic sensor 41 and the second ultrasonic sensor 43 form a field-of-view overlapping detection region right in front of the housing 10, and the third ultrasonic sensor 45 and the second ultrasonic sensor 43 form a field-of-view overlapping detection region right in front of the housing 10, but the third ultrasonic sensor 45 and the first ultrasonic sensor 41 do not form a field-of-view overlapping detection region right in front of the housing 10.

The fourth ultrasonic sensor 47 forms a field-of-view overlapping detection region right in front of the housing 10 with none of the first ultrasonic sensor 41, the second ultrasonic sensor 43, and the third ultrasonic sensor 45. Based on that the third ultrasonic sensor 45 forms a field-of-view overlapping detection region right in front of the housing 10 with the second ultrasonic sensor 43 but does not form a field-of-view overlapping detection region right in front of the housing 10 with the first ultrasonic sensor 41, the third ultrasonic sensor 45 and the first ultrasonic sensor 41 may send ultrasound simultaneously, or the third ultrasonic sensor 45 and the first ultrasonic sensor 41 may send ultrasound successively, and the third ultrasonic sensor 45 and the second ultrasonic sensor 43 send ultrasound successively. Based on that the fourth ultrasonic sensor 47 forms a field-of-view overlapping detection region right in front of the housing 10 with none of the first ultrasonic sensor 41, the second ultrasonic sensor 43, and the third ultrasonic sensor 45, it may be selected that the fourth ultrasonic sensor 47, the first ultrasonic sensor 41, the second ultrasonic sensor 43, and the third ultrasonic sensor 45 send ultrasound simultaneously, or it may be selected that the fourth ultrasonic sensor 47, the first ultrasonic sensor 41, the second ultrasonic sensor 43, and the third ultrasonic sensor 45 send ultrasound successively and alternately in time.

As shown in FIG. 16, when the fourth ultrasonic sensor 47 and the first ultrasonic sensor 41 or the second ultrasonic sensor 43 or the third ultrasonic sensor 45 send ultrasound simultaneously, the control module 30 controls the first ultrasonic sensor 41 and the fourth ultrasonic sensor 47 to transmit ultrasound in a first period of time, and the first ultrasonic sensor 41, the second ultrasonic sensor 43, the third ultrasonic sensor 45, and the fourth ultrasonic sensor 47 receive echoes from the obstacle in the first period of time. The control module 30 controls the fourth ultrasonic sensor 47 and the second ultrasonic sensor 43 to transmit ultrasound in a second period of time following the first period of time, and the first ultrasonic sensor 41, the second ultrasonic sensor 43, the third ultrasonic sensor 45, and the fourth ultrasonic sensor 47 receive echoes from the obstacle in the second period of time. The control module 30 controls the fourth ultrasonic sensor 47 and the third ultrasonic sensor 45 to transmit ultrasound in a third period of time following the second period of time, and the first ultrasonic sensor 41, the second ultrasonic sensor 43, the third ultrasonic sensor 45, and the fourth ultrasonic sensor 47 receive echoes from an obstacle in the third period of time.

As shown in FIG. 16, when the fourth ultrasonic sensor 47 and the first ultrasonic sensor 41, the second ultrasonic sensor 43, and the third ultrasonic sensor 45 send ultrasound successively, the control module 30 controls the first ultrasonic sensor 41 to transmit ultrasound in a first period of time, and the first ultrasonic sensor 41, the second ultrasonic sensor 43, the third ultrasonic sensor 45, and the fourth ultrasonic sensor 47 receive echoes from the obstacle in the first period of time. The control module 30 controls the second ultrasonic sensor 43 to transmit ultrasound in a second period of time following the first period of time, and the first ultrasonic sensor 41, the second ultrasonic sensor 43, the third ultrasonic sensor 45, and the fourth ultrasonic sensor 47 receive echoes from the obstacle in the second period of time. The control module 30 controls the third ultrasonic sensor 45 to transmit ultrasound in a third period of time following the second period of time, and the first ultrasonic sensor 41, the second ultrasonic sensor 43, the third ultrasonic sensor 45, and the fourth ultrasonic sensor 47 receive echoes from an obstacle in the third period of time. The control module 30 controls the fourth ultrasonic sensor 47 to transmit ultrasound in a fourth period of time following the third period of time, and the first ultrasonic sensor 41, the second ultrasonic sensor 43, the third ultrasonic sensor 45, and the fourth ultrasonic sensor 47 receive echoes from an obstacle in the fourth period of time. Certainly, because the third ultrasonic sensor 45 and the first ultrasonic sensor 41 do not have an overlapping detection region, the third ultrasonic sensor 45 and the first ultrasonic sensor 41 may send signals simultaneously, or the third ultrasonic sensor 45 and the first ultrasonic sensor 41 may send signals successively. Therefore, there may further be more signal sending combinations. Details are no longer described herein.

As shown in FIG. 16, the control module 30 can still determine a location of the obstacle according to a combination of ultrasound transmitted by the first ultrasonic sensor 41, the second ultrasonic sensor 43, the third ultrasonic sensor 45, and the fourth ultrasonic sensor 47 in the ultrasonic sensor assembly 20 and echoes received from an obstacle by the first ultrasonic sensor 41, the second ultrasonic sensor 43, the third ultrasonic sensor 45, and the fourth ultrasonic sensor 47. For a specific determination manner, an obstacle in transceiver regions of the first ultrasonic sensor 41 and the second ultrasonic sensor 43 may be determined in the foregoing determination manner. An obstacle in transceiver regions of the second ultrasonic sensor 43 and the third ultrasonic sensor 45 may be determined by using a method same as that of the first ultrasonic sensor 41 and the second ultrasonic sensor 43. When the fourth ultrasonic sensor 27 transmits ultrasound and only the fourth ultrasonic sensor 27 receives an echo from the obstacle, the control module determines that the obstacle is located in a detection region of the fourth ultrasonic sensor 27.

The autonomous lawn mower 200 in the second embodiment of the present invention detects an obstacle by using an ultrasonic sensor, and the autonomous lawn mower 200 has a preset distance. When a distance between the autonomous lawn mower 200 and an obstacle is less than or equal to the preset distance, the autonomous lawn mower performs obstacle avoidance instead of continuing to move toward the obstacle and non-contact obstacle avoidance of the autonomous lawn mower is implemented. By using different values of the preset distance, when the distance is relatively small, non-contact obstacle avoidance at a relatively short distance can be implemented. When the distance is relatively large, non-contact obstacle avoidance at a relatively long distance as compared with a short distance can be implemented. In addition, the ultrasonic sensors are disposed in parallel and an overlapping detection region is formed, so that the position of an obstacle can be obtained, thereby improving the accuracy of positioning an obstacle, and helping the autonomous lawn mower 200 to adapt to different working conditions. In addition, after the direction is known, it is convenient for the autonomous lawn mower 200 to execute a corresponding obstacle-avoidance measure. For example, if an obstacle is on the right side, the autonomous lawn mower 200 turns left when a left turning condition is met.

Third Embodiment

Figure 17:
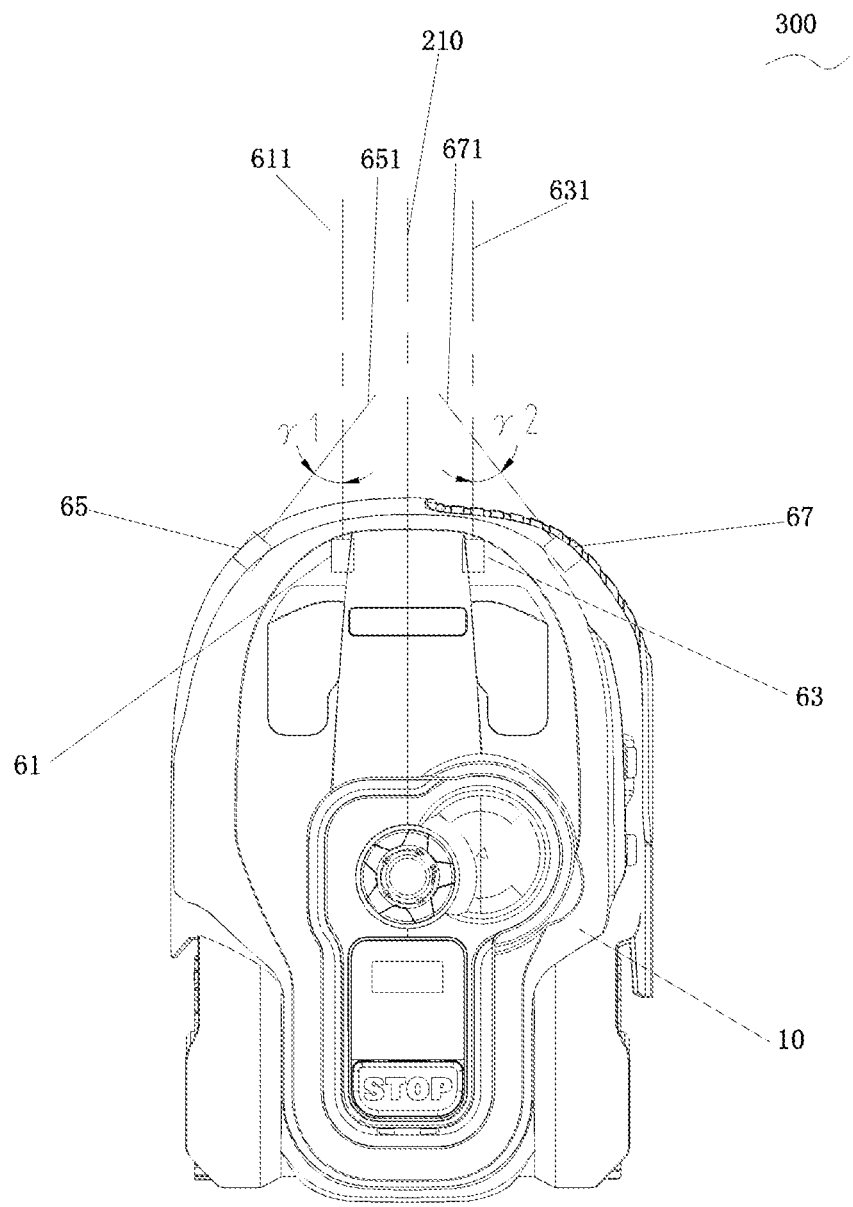
FIG. 17 is a schematic diagram of an axis relationship in an ultrasonic sensor assembly of an autonomous lawn mower 300 according to a third embodiment of the present invention.
Figure 18:
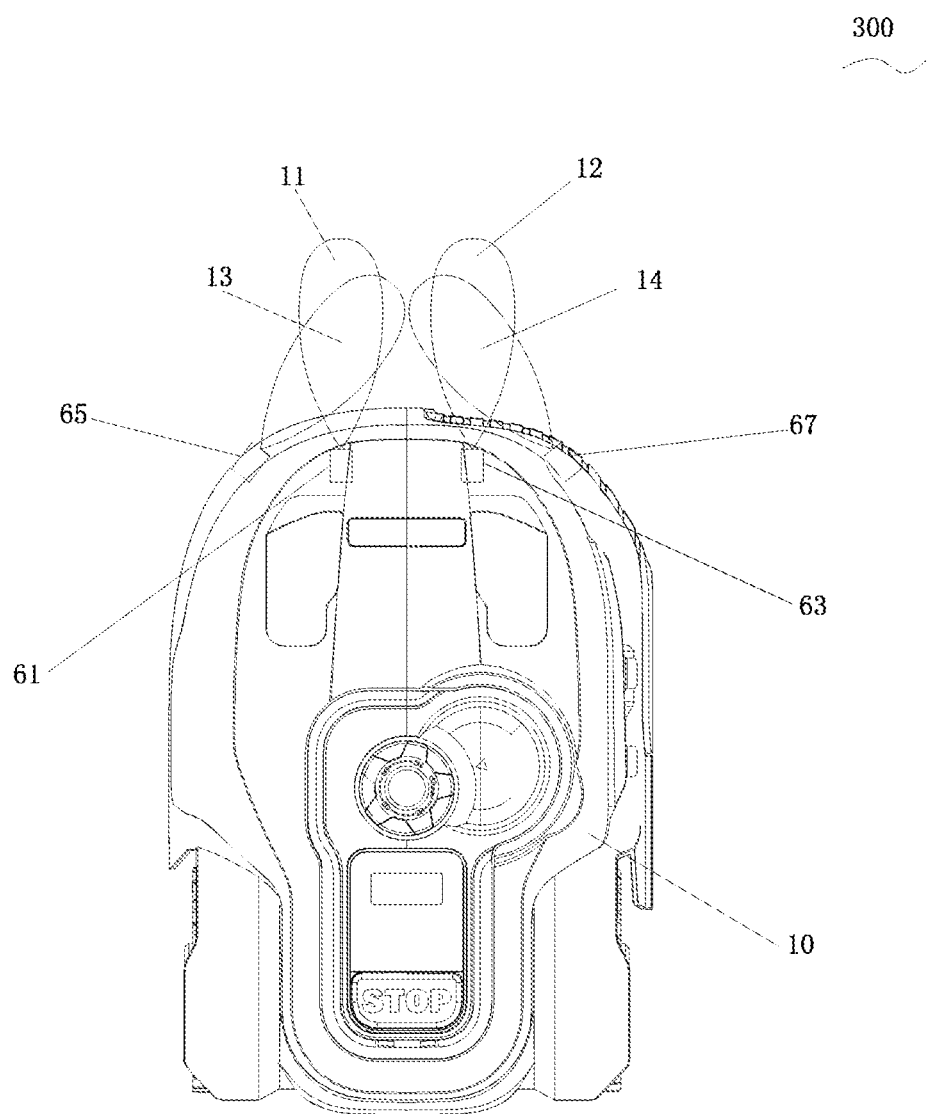
FIG. 18 is a schematic diagram of a detection range of a first arrangement manner of the ultrasonic sensor assembly of the autonomous lawn mower 300 according to the third embodiment of the present invention.

As shown in FIG. 17 and FIG. 18, FIG. 17 is a schematic top view of an autonomous lawn mower 300 according to the third embodiment of the present invention. FIG. 18 is a schematic diagram of an arrangement and a detection range of an ultrasonic sensor assembly of the autonomous lawn mower 300 in the third embodiment in FIG. 17. In the autonomous lawn mower 300 in the third embodiment, an ultrasonic sensor assembly 20 includes a first ultrasonic sensor 61 and a second ultrasonic sensor 63. The first ultrasonic sensor 61 receives and transmits ultrasound in a first transceiver region, and the second ultrasonic sensor 63 receives and transmits ultrasound in a second transceiver region. The first ultrasonic sensor 61 and the second ultrasonic sensor 63 are parallel to each other in a width direction of the autonomous lawn mower and are adjacently arranged on a housing 10, so that the first transceiver region and the second transceiver region do not overlap. This embodiment uses the first ultrasonic sensor 61 and the second ultrasonic sensor 63 to detect an obstacle, and uses restriction with a preset distance to implement non-contact obstacle avoidance.

As shown in FIG. 17 and FIG. 18, in a preferred embodiment of the autonomous lawn mower 300 in the third embodiment of the present invention, the ultrasonic sensor assembly 20 further includes a third ultrasonic sensor 65 and a fourth ultrasonic sensor 67. The third ultrasonic sensor 65 receives and transmits ultrasound in a third transceiver region. The fourth ultrasonic sensor 67 receives and transmits ultrasound in a fourth transceiver region. The third ultrasonic sensor 65 is located on another side, not adjacent to the second ultrasonic sensor 63, of the first ultrasonic sensor 61. The third ultrasonic sensor 65 and the first ultrasonic sensor 61 are arranged on the housing 10 at an angle from each other, so that the first transceiver region and the third reception region overlap partially. The fourth ultrasonic sensor 67 is located on another side, not adjacent to the first ultrasonic sensor 61, of the second ultrasonic sensor 63. The fourth ultrasonic sensor 67 and the second ultrasonic sensor 63 are arranged on the housing 10 at an angle from each other, so that the second transceiver region and the fourth reception region overlap partially, and the four ultrasonic sensors form four detection regions. An overlapping part of the first transceiver region and the third transceiver region is a third detection region 13, a part except the overlapping part of the first transceiver region is a first detection region 11, an overlapping part of the second transceiver region and the fourth transceiver region is a fourth detection region 14, and a part except the overlapping part of the second transceiver region is a second detection region 12.

As shown in FIG. 18, in the overlapping third detection region 13, both the first ultrasonic sensor 61 and the third ultrasonic sensor 65 can receive an ultrasonic echo. That is, if the first ultrasonic sensor 61 sends ultrasound, both the first ultrasonic sensor 61 and the third ultrasonic sensor 65 can receive an ultrasonic echo. If the third ultrasonic sensor 65 sends ultrasound, both the first ultrasonic sensor 61 and the third ultrasonic sensor 65 can receive an ultrasonic echo. Similarly, in the overlapping fourth detection region 14, both the second ultrasonic sensor 63 and the fourth ultrasonic sensor 67 can receive an ultrasonic echo. That is, if the second ultrasonic sensor 63 sends ultrasound, both the second ultrasonic sensor 63 and the fourth ultrasonic sensor 67 can receive an ultrasonic echo. If the fourth ultrasonic sensor 67 sends ultrasound, both the second ultrasonic sensor 63 and the fourth ultrasonic sensor 67 can receive an ultrasonic echo.

In other embodiments, the first ultrasonic sensor 61 and the second ultrasonic sensor 63 may be respectively disposed on two sides, the third ultrasonic sensor 65 and the fourth ultrasonic sensor 67 are disposed between the first ultrasonic sensor 61 and the second ultrasonic sensor 63, axes of the first ultrasonic sensor 61 and the third ultrasonic sensor 65 intersect at an angle, and the second ultrasonic sensor 63 and the fourth ultrasonic sensor 67 intersect at an angle. A layout manner may use different combinations according to requirements.

Figure 19:
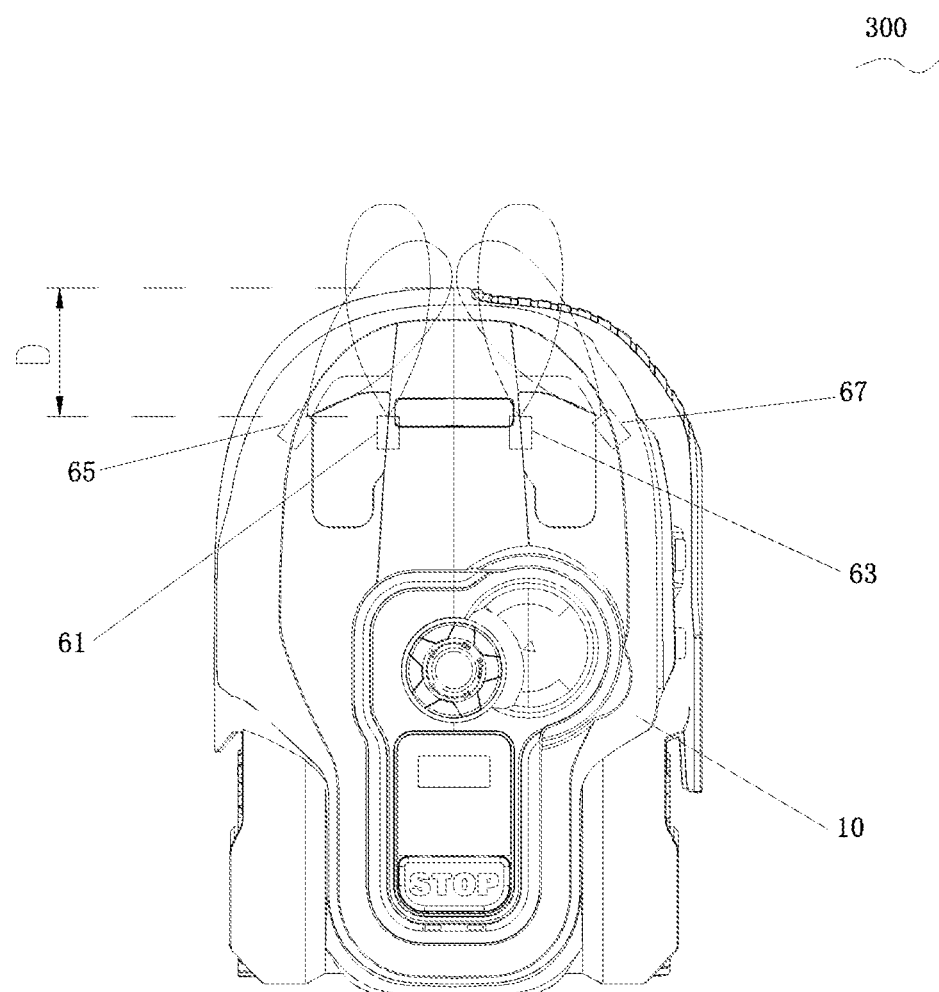
FIG. 19 is a schematic diagram of a detection range of a second arrangement manner of the ultrasonic sensor assembly of the autonomous lawn mower 300 according to the third embodiment of the present invention.

As shown in FIG. 19, FIG. 19 is a schematic diagram of a detection range in the second arrangement manner of the ultrasonic sensor assembly of the autonomous lawn mower 300 according to the third embodiment of the present invention. A difference between the second arrangement manner and the first arrangement manner of the ultrasonic sensor assembly lies in that the ultrasonic sensor assembly 20 is mounted at a position at a distance D from a front end of the housing. The specific description is that in an embodiment of the second arrangement manner, and the ultrasonic sensor assembly 20 includes a first ultrasonic sensor 61, a second ultrasonic sensor 63, a third ultrasonic sensor 65, and a fourth ultrasonic sensor 67. The first ultrasonic sensor 61 receives and transmits ultrasound in a first transceiver region, and the second ultrasonic sensor 63 receives and transmits ultrasound in a second transceiver region. The third ultrasonic sensor 65 receives and transmits ultrasound in a third transceiver region. The fourth ultrasonic sensor 67 receives and transmits ultrasound in a fourth transceiver region. The first ultrasonic sensor 61 and the second ultrasonic sensor 63 are arranged adjacently on the housing in parallel to each other in a width direction of the autonomous lawn mower 10, so that the first transceiver region and the second transceiver region do not overlap. The third ultrasonic sensor 65 is located on another side, not adjacent to the second ultrasonic sensor 63, of the first ultrasonic sensor 61, and the third ultrasonic sensor 65 and the first ultrasonic sensor 61 are arranged on the housing 10 at an angle from each other, so that the first transceiver region and the third reception region overlap partially. The fourth ultrasonic sensor 67 is located on another side, not adjacent to the first ultrasonic sensor 61, of the second ultrasonic sensor 63, and the fourth ultrasonic sensor 67 and the second ultrasonic sensor 63 are arranged on the housing 10 at an angle from each other, so that the second transceiver region and the fourth reception region overlap partially. The four ultrasonic sensors form four detection regions, and the four detection regions use an arrangement manner the same as the first arrangement manner. The reference numerals of these regions are the same as those in FIG. 17.

As shown in FIG. 18, in the second arrangement manner of the autonomous lawn mower 300 according to the third embodiment of the present invention, the first ultrasonic sensor 61, the second ultrasonic sensor 63, the third ultrasonic sensor 65, and the fourth ultrasonic sensor 67 theoretically may be disposed at any position in a length direction of the housing 10. If the first ultrasonic sensor 61, the second ultrasonic sensor 63, the third ultrasonic sensor 65, and the fourth ultrasonic sensor 67 are disposed on the housing 10 at a position closer to a rear end, to protect sending of ultrasound and reception of an echo from an obstacle of the ultrasonic sensors from being affected, the shape of the housing may be improved or the ultrasonic sensor may be disposed higher. In a preferred embodiment of the present invention, the factors of transmission and reception of ultrasound and a small occupying space are all considered. The first ultrasonic sensor 61, the second ultrasonic sensor 63, the third ultrasonic sensor 65, and the fourth ultrasonic sensor 67 are disposed at a front half of the housing 10 in a length direction. A distance D is less than or equal to a half of a length of the housing 10. In this way, it may be more convenient to improve the structure of the front end of the housing to adapt to a range of a field of view, thereby preventing ultrasound from being blocked.

As shown in FIG. 17, the autonomous lawn mower 300 in the third embodiment has a housing axis 210 in a longitudinal direction. An axis of the third ultrasonic sensor 65 and an axis of the fourth ultrasonic sensor 67 are respectively at an angle from the housing axis. The axes of the first ultrasonic sensor 61 and the second ultrasonic sensor 63 are parallel to each other. Sound wave transmission ends of the third ultrasonic sensor 65 and the fourth ultrasonic sensor 67 are offset toward the housing axis, so that the first ultrasonic sensor 61 and the third ultrasonic sensor 65 are disposed at an angle from each other, and the second ultrasonic sensor 63 and the fourth ultrasonic sensor 67 are disposed at an angle from each other. A range of an angle γ1 between the first ultrasonic sensor 61 and the third ultrasonic sensor 65 is 10° to 80°. In a preferred embodiment of the autonomous lawn mower 100 in the first embodiment, the angle 71 of intersection between the first ultrasonic sensor 61 and the third ultrasonic sensor 65 ranges from 25° to 55°. The angle of intersection between the first ultrasonic sensor 61 and the third ultrasonic sensor 65 in the range of 25° to 55° ensures that while an overlapping detection region is obtained, the overlapping detection region can further be closer to the front of the autonomous lawn mower 300. A range of an angle γ2 between the second ultrasonic sensor 63 and the fourth ultrasonic sensor 67 is 10° to 80°. In a preferred embodiment of the autonomous lawn mower 300 in the first embodiment, the angle γ2 of intersection between the second ultrasonic sensor 63 and the fourth ultrasonic sensor 67 ranges from 25° to 55°. The angle of intersection between the second ultrasonic sensor 63 and the fourth ultrasonic sensor 67 in the range of 25° to 55° ensures that while an overlapping detection region is obtained, the overlapping detection region can further be closer to the front of the autonomous lawn mower 300.

In a preferred embodiment of the autonomous lawn mower 300 according to the third embodiment of the present invention, because transceiver regions of the first ultrasonic sensor 61 and the second ultrasonic sensor 63 do not overlap, the first ultrasonic sensor 61 and the second ultrasonic sensor 63 may send signals alternately or may send signals simultaneously. When a control module 30 controls the first ultrasonic sensor 61 and the second ultrasonic sensor 63 to transmit ultrasound alternately in time, the control module 30 controls the first ultrasonic sensor 61 to transmit ultrasound in the first period of time, the first ultrasonic sensor 61, the second ultrasonic sensor 63, the third ultrasonic sensor 65, and the fourth ultrasonic sensor 67 receive echoes from the obstacle in the first period of time. The control module 30 controls the second ultrasonic sensor 63 to transmit ultrasound in a second period of time following the first period of time, and the first ultrasonic sensor 61, the second ultrasonic sensor 63, the third ultrasonic sensor 65, and the fourth ultrasonic sensor 67 receive echoes from the obstacle in the second period of time. When the control module 30 controls the first ultrasonic sensor 61 and the second ultrasonic sensor 63 to transmit ultrasound simultaneously in time, the control module 30 controls the first ultrasonic sensor 61 and the second ultrasonic sensor 63 to transmit ultrasound in the first period of time. The first ultrasonic sensor 61, the second ultrasonic sensor 63, the third ultrasonic sensor 65, and the fourth ultrasonic sensor 67 receive echoes from the obstacle in the first period of time.

In a preferred embodiment of the autonomous lawn mower 300 according to the third embodiment of the present invention, the control module 30 determines a location of the obstacle according to a combination of ultrasound transmitted by the first ultrasonic sensor 61 and the second ultrasonic sensor 63 in the ultrasonic sensor assembly 20 and an echo received from the obstacle by the first ultrasonic sensor 61, the second ultrasonic sensor 63, the third ultrasonic sensor 65, and the fourth ultrasonic sensor 67. When only the first ultrasonic sensor 61 in the ultrasonic sensor assembly 20 transmits ultrasound and only the first ultrasonic sensor 61 receives an echo from the obstacle, the control module 30 determines that the obstacle is located in the first detection region. When only the second ultrasonic sensor 63 in the ultrasonic sensor assembly 20 transmits ultrasound and only the second ultrasonic sensor 63 receives an echo from the obstacle, the control module 30 determines that the obstacle is located in the second detection region. When the first ultrasonic sensor 61 in the ultrasonic sensor assembly 20 transmits ultrasound and the first ultrasonic sensor 61 and the third ultrasonic sensor 65 receive echoes from the obstacle, the control module 30 determines that the obstacle is located in the third detection region. When the second ultrasonic sensor 63 in the ultrasonic sensor assembly 20 transmits ultrasound and the second ultrasonic sensor 63 and the fourth ultrasonic sensor 67 receive echoes from the obstacle, the control module 30 determines that the obstacle is located in the fourth detection region.

In a preferred embodiment of the autonomous lawn mower 300 according to the third embodiment of the present invention, the control module 30 calculates the distance between the obstacle and the autonomous lawn mower according to a time difference between the time when the ultrasonic sensor assembly 20 transmits ultrasound and the time when the ultrasonic sensor assembly 20 receives an echo from the obstacle.

As shown in FIG. 17, in a preferred embodiment of the autonomous lawn mower 300 according to the third embodiment of the present invention, the first ultrasonic sensor 61 has a first axis 611, the second ultrasonic sensor 63 has a second axis 631, the third ultrasonic sensor 65 has a third axis 651, the fourth ultrasonic sensor 67 has a fourth axis 671, and the first axis 611, the second axis 631, the third axis 651, and the fourth axis 671 are coplanar in a vertical direction. In this way, the autonomous lawn mower may obtain an overlapping detection region having a largest area, and because same ultrasonic sensors are selected, coplanar axes may facilitate the arrangement of an ultrasonic sensor structure and the design of a mounting structure of the housing 10.

Figure 20:
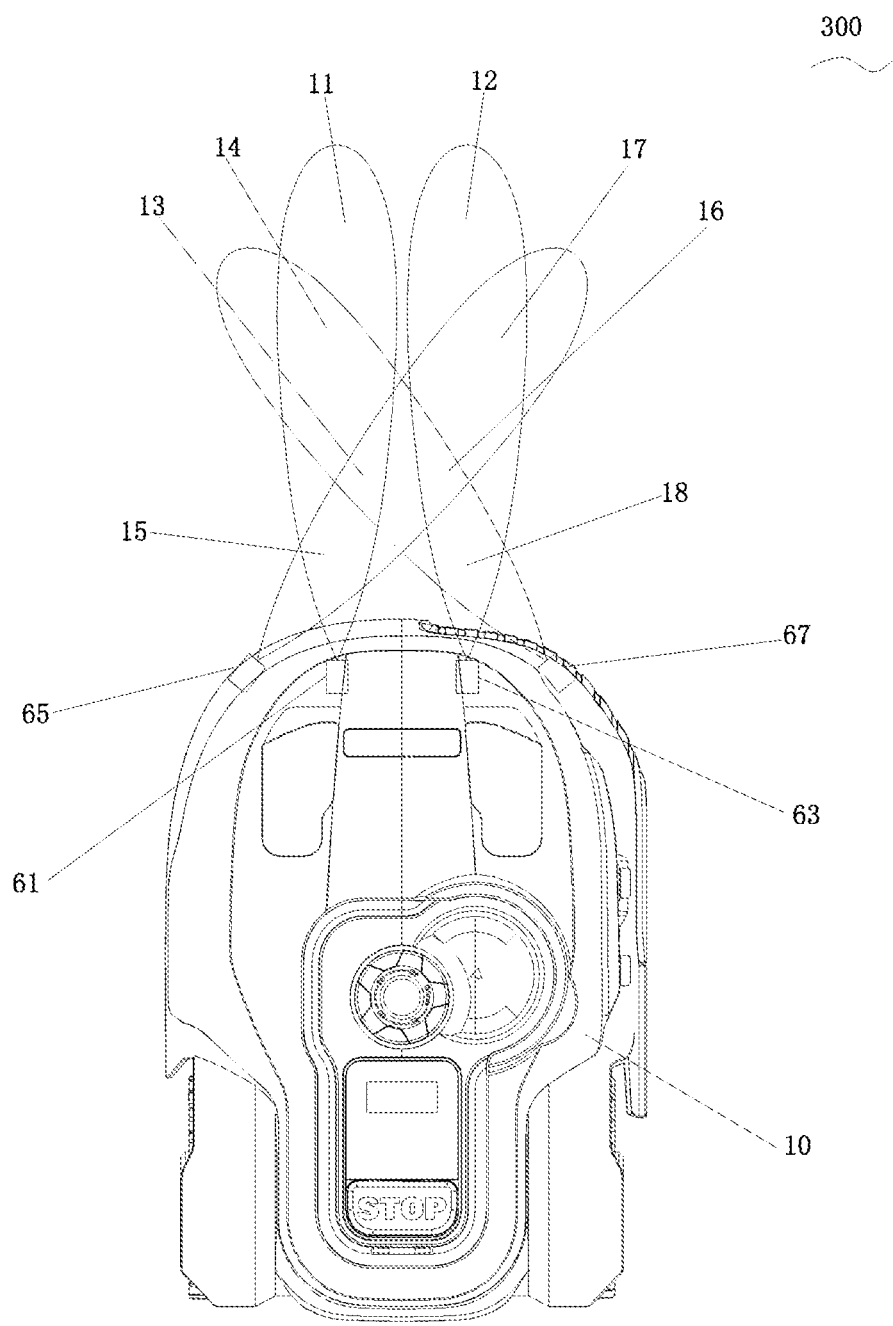
FIG. 20 is a schematic diagram of another detection range of the ultrasonic sensor assembly of the autonomous lawn mower 300 according to the third embodiment of the present invention.

As shown in FIG. 20, FIG. 20 is a schematic diagram of a detection range of another embodiment of the ultrasonic sensor assembly of the autonomous lawn mower 300 according to the third embodiment of the present invention. In this embodiment, transceiver regions of the third ultrasonic sensor 65 and the fourth ultrasonic sensor 67 are relatively wide. That is, the transceiver region of the third ultrasonic sensor 65 overlaps the transceiver regions of both the first ultrasonic sensor 61 and the second ultrasonic sensor 63, and the transceiver region of the fourth ultrasonic sensor 67 overlaps the transceiver regions of both the first ultrasonic sensor 61 and the second ultrasonic sensor 63. The first ultrasonic sensor 61 receives and transmits ultrasound in a first transceiver region, and the second ultrasonic sensor 63 receives and transmits ultrasound in a second transceiver region. The third ultrasonic sensor 65 receives and transmits ultrasound in a third transceiver region. The fourth ultrasonic sensor 67 receives and transmits ultrasound in a fourth transceiver region. A non-overlapping part of the first transceiver region is a first detection region 11 of the sensor component 20. A non-overlapping part of the second transceiver region is a second detection region 12 of the sensor component 20. An overlapping part of the first transceiver region, the third transceiver region, and the fourth transceiver region is a third detection region 13 of the sensor component 20. A part of the first transceiver region that overlaps the fourth transceiver region but does not overlap the third detection region is a fourth detection region 14 of the sensor component 20. A part of the first transceiver region that overlaps the third transceiver region but does not overlap the fourth detection region is a fifth detection region 15 of the sensor component 20. An overlapping part of the second transceiver region, the third transceiver region, and the fourth transceiver region is a sixth detection region 16 of the sensor component 20. A part of the second transceiver region that overlaps the third transceiver region but does not overlap the sixth detection region is a seventh detection region 17 of the sensor component 20. A part of the second transceiver region that overlaps the fourth transceiver region but does not overlap the sixth detection region is an eighth detection region 18 of the sensor component 20.

As shown in FIG. 20, the control module 30 determines a location of the obstacle according to a combination of ultrasound transmitted by the first ultrasonic sensor 61 and the second ultrasonic sensor 63 in the ultrasonic sensor assembly 20 and echoes received from the obstacle by the first ultrasonic sensor 61, the second ultrasonic sensor 63, the third ultrasonic sensor 65, and the fourth ultrasonic sensor 67. When only the first ultrasonic sensor 61 in the ultrasonic sensor assembly 20 transmits ultrasound and only the first ultrasonic sensor 61 receives an echo from the obstacle, the control module 30 determines that the obstacle is located in the first detection region 11. When only the second ultrasonic sensor 63 in the ultrasonic sensor assembly 20 transmits ultrasound and only the second ultrasonic sensor 63 receives an echo from the obstacle, the control module 30 determines that the obstacle is located in the second detection region 12. When the first ultrasonic sensor 21 in the ultrasonic sensor assembly 20 transmits ultrasound and the first ultrasonic sensor 61, the third ultrasonic sensor 65, and the fourth ultrasonic sensor 67 all receive echoes from an obstacle, the control module 30 determines that the obstacle is located in the third detection region 13. When the first ultrasonic sensor 21 in the ultrasonic sensor assembly 20 transmits ultrasound and only the first ultrasonic sensor 61 and the fourth ultrasonic sensor 67 receive echoes from an obstacle, the control module 30 determines that the obstacle is located in the fourth detection region 14. When the first ultrasonic sensor 21 in the ultrasonic sensor assembly 20 transmits ultrasound and only the first ultrasonic sensor 61 and the third ultrasonic sensor 65 receive echoes from an obstacle, the control module 30 determines that the obstacle is located in the fifth detection region 15. When the second ultrasonic sensor 63 in the ultrasonic sensor assembly 20 transmits ultrasound and the second ultrasonic sensor 63, the third ultrasonic sensor 65, and the fourth ultrasonic sensor 67 all receive echoes from the obstacle, the control module 30 determines that the obstacle is located in the sixth detection region 16. When the second ultrasonic sensor 63 in the ultrasonic sensor assembly 20 transmits ultrasound and only the second ultrasonic sensor 63 and the fourth ultrasonic sensor 67 receive echoes from an obstacle, the control module 30 determines that the obstacle is located in the eighth detection region 18. When the second ultrasonic sensor 63 in the ultrasonic sensor assembly 20 transmits ultrasound and only the second ultrasonic sensor 63 and the third ultrasonic sensor 65 receive echoes from the obstacle, the control module 30 determines that the obstacle is located in the seventh detection region 17. In a preferred embodiment of the manner of the autonomous lawn mower 300 according to the third embodiment of the present invention, the control module 30 calculates the distance between the obstacle and the autonomous lawn mower according to a time difference between the time when the ultrasonic sensor assembly 20 transmits ultrasound and the time when the ultrasonic sensor assembly 20 receives an echo from the obstacle.

The autonomous lawn mower 300 according to the third embodiment of the present invention detects an obstacle by using an ultrasonic sensor, and the autonomous lawn mower 300 has a preset distance. When a distance between the autonomous lawn mower 300 and an obstacle is less than or equal to the preset distance, the autonomous lawn mower performs obstacle avoidance instead of continuing to move toward the obstacle and non-contact obstacle avoidance of the autonomous lawn mower is implemented. By using different values of the preset distance, when the distance is relatively small, non-contact obstacle avoidance at a relatively short distance can be implemented. When the distance is relatively large, non-contact obstacle avoidance at a relatively long distance as compared with a short distance can be implemented. In addition, the ultrasonic sensors are arranged intersecting at an angle, so that the position of an obstacle can be obtained, thereby improving the accuracy of positioning an obstacle and helping the autonomous lawn mower 300 to adapt to different working conditions. In addition, after the direction is known, it is convenient for the autonomous lawn mower 300 to execute a corresponding obstacle-avoidance measure. For example, if an obstacle is on the right side, the autonomous lawn mower 30 turns left when a left turning condition is met.

Fourth Embodiment

Figure 21:
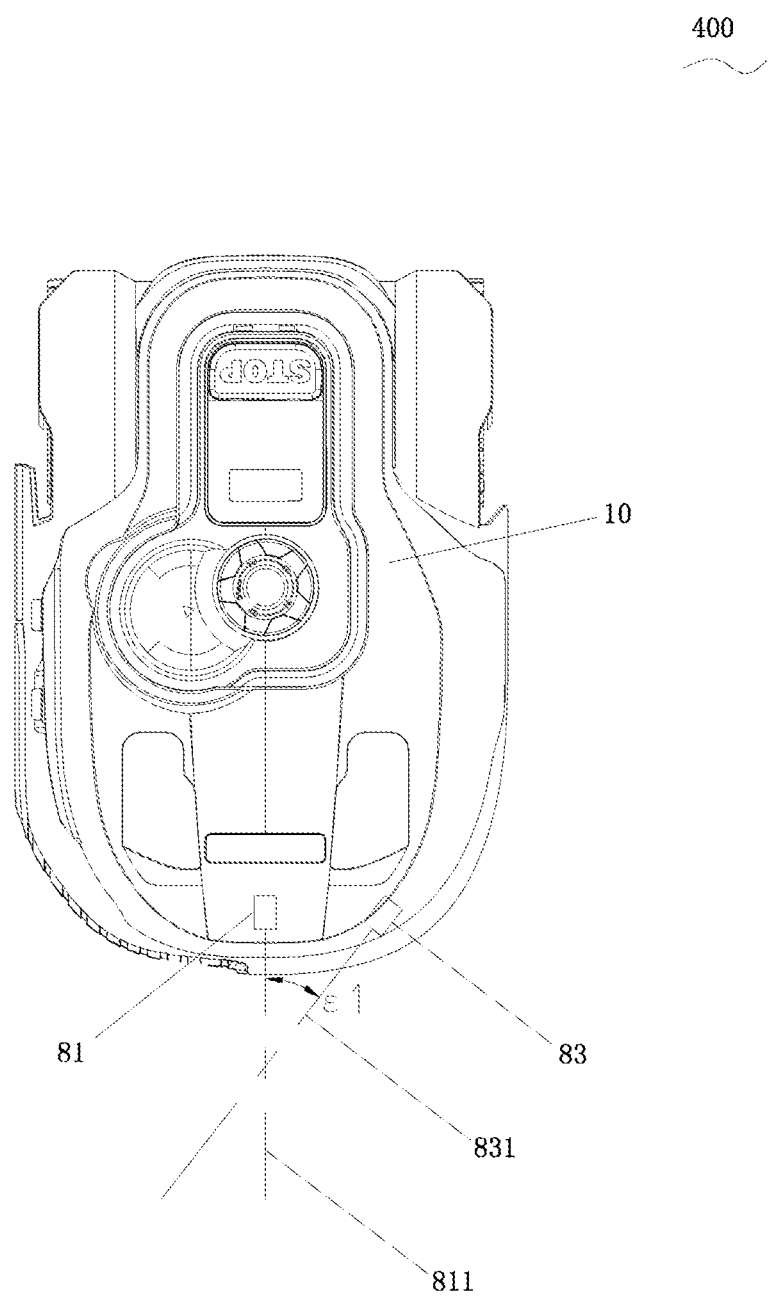
FIG. 21 is a schematic diagram of an axis relationship when an ultrasonic sensor assembly of an autonomous lawn mower 400 includes two ultrasonic sensors according to a fourth embodiment of the present invention.

As shown in FIG. 21, FIG. 21 is a schematic diagram of an arrangement and an axis relationship of ultrasonic sensors an autonomous lawn mower 400 according to the fourth embodiment of the present invention includes two ultrasonic sensors. An ultrasonic sensor assembly 20 includes two ultrasonic sensors including a first ultrasonic sensor 81 and a second ultrasonic sensor 83. The first ultrasonic sensor 81 receives and transmits ultrasound in a first transceiver region, the second ultrasonic sensor 83 receives ultrasound in the second reception region, and the first ultrasonic sensor and the second ultrasonic sensor are arranged on a housing 10 at an angle from each other, so that the first transceiver region and the second reception region overlap partially, an overlapping part of the first transceiver region and the second reception region is a third detection region, and a part except the overlapping part of the first transceiver region is a first detection region.

As shown in FIG. 21, the first ultrasonic sensor 81 has a first axis 811, and the second ultrasonic sensor 83 has a second axis 831. A range of an angle ε1 between the first axis 811 and the second axis 831 is 10° to 80°. In a preferred solution of this embodiment of the present invention, the angle ε between the first axis 811 and the second axis 831 ranges from 25° to 55°. The second ultrasonic sensor 93 is disposed to be separately responsible for receiving an echo from an obstacle, so that an ultrasonic echo can still be received accurately in a blind area range of the first ultrasonic sensor 91, thereby implementing detection of an obstacle at a short distance, and further implementing short-distance non-contact obstacle avoidance. In other embodiments, the first ultrasonic sensor 81 may be only responsible for sending ultrasound in the first reception region, and the second ultrasonic sensor 83 is responsible for receiving ultrasound in the second reception region. This structure can still detect an obstacle. As the overlapping region between the first ultrasonic sensor 81 and the second ultrasonic sensor 83 has different positions, obstacles at different distances can be detected. The autonomous lawn mower 400 has a preset distance. When a distance between the autonomous lawn mower 100 and an obstacle is less than or equal to the preset distance, the autonomous lawn mower performs obstacle avoidance instead of continuing to move toward the obstacle and non-contact obstacle avoidance of the autonomous lawn mower is implemented. By using different values of the preset distance, when the distance is relatively small, non-contact obstacle avoidance at a relatively short distance can be implemented, and when the distance is relatively large, non-contact obstacle avoidance at a relatively long distance as compared with a short distance can be implemented.

Figure 22:
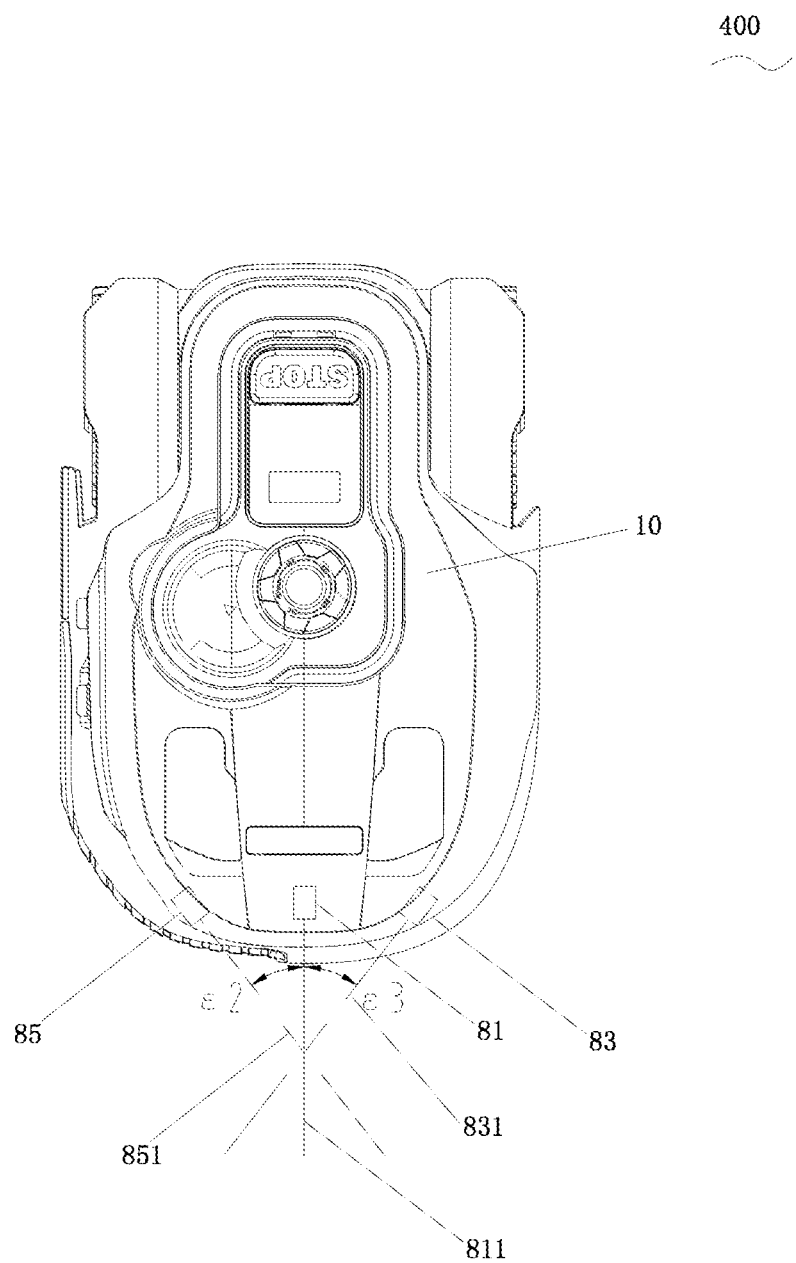
FIG. 22 is a schematic diagram of an axis relationship when the ultrasonic sensor assembly of the autonomous lawn mower 400 includes three ultrasonic sensors according to the fourth embodiment of the present invention.

As shown in FIG. 22, FIG. 22 is a schematic diagram of a detection range of a first arrangement manner when the ultrasonic sensor assembly of the autonomous lawn mower 400 in the fourth embodiment of the present invention includes three ultrasonic sensors. The ultrasonic sensor assembly 20 includes a first ultrasonic sensor 81, a second ultrasonic sensor 83, and a third ultrasonic sensor 85. The first ultrasonic sensor 81 represents an ultrasonic sensor that can have both functions of sending ultrasound and receiving an echo from an obstacle. The second ultrasonic sensor 83 and the third ultrasonic sensor 85 are reception sensors and do not send ultrasound. The second ultrasonic sensor 83 and the third ultrasonic sensor 85 are respectively located on two sides of the first ultrasonic sensor 81 and are respectively disposed at an angle of intersection from the first ultrasonic sensor 81. The angle of intersection only needs to enable an overlapping detection region to be a short-distance detection region as close as possible to a front end of the machine. This manner may detect an obstacle at a short distance, and can know a direction of the obstacle. In another implementation of this embodiment, the first ultrasonic sensor 81 can only send ultrasound, that is, the first ultrasonic sensor 81 is a single ultrasonic transmission sensor. The second ultrasonic sensor 83 and the third ultrasonic sensor 85 are still reception sensors. The second ultrasonic sensor 83 and the third ultrasonic sensor 85 may form overlapping detection regions with the first ultrasonic sensor 81 at different positions, so as to increase the range of recognizing the obstacle.

As shown in FIG. 22, the first ultrasonic sensor 81 has a first axis 811, the second ultrasonic sensor 83 has a second axis 831, and the third ultrasonic sensor 85 has a third axis 851. The second axis 831 and the third axis 851 respectively intersect the first axis 811. In the embodiment in FIG. 22 of the present invention, an angle of intersection between the second axis 831 and the first axis 811 is the same as an angle of intersection between the third axis 851 and the first axis 811. In other embodiments, the angle of intersection between the second axis 831 and the first axis 811 may not be the same as the angle of intersection between the third axis 851 and the first axis 811. A range of an angle ε3 between the first axis 811 and the second axis 831 is 10° to 80°. In a preferred solution of this embodiment of the present invention, the angle ε3 between the first axis 811 and the second axis 831 ranges from 25° to 55°. The angle ε2 between the first axis 811 and the third axis 851 ranges from 10° to 80°. In a preferred solution of this embodiment of the present invention, the angle ε2 between the first axis 811 and the third axis 851 ranges from 25° to 55°. The second ultrasonic sensor 93 is disposed to be separately responsible for receiving an echo from the obstacle, so that an ultrasonic echo can still be received accurately in a blind area range of the first ultrasonic sensor 91, thereby implementing detection of an obstacle at a short distance, and further implementing short-distance non-contact obstacle avoidance.

In a preferred embodiment of the autonomous lawn mower 400 in the fourth embodiment of the present invention, the first axis 811, the second axis 831, and the third axis 851 are coplanar in a vertical direction. In this way, the autonomous lawn mower 400 may obtain an overlapping detection region having a largest area, and because same ultrasonic sensors are selected, coplanar axes may facilitate the arrangement of an ultrasonic sensor structure and the design of a mounting structure of the housing 10.

Figure 23:
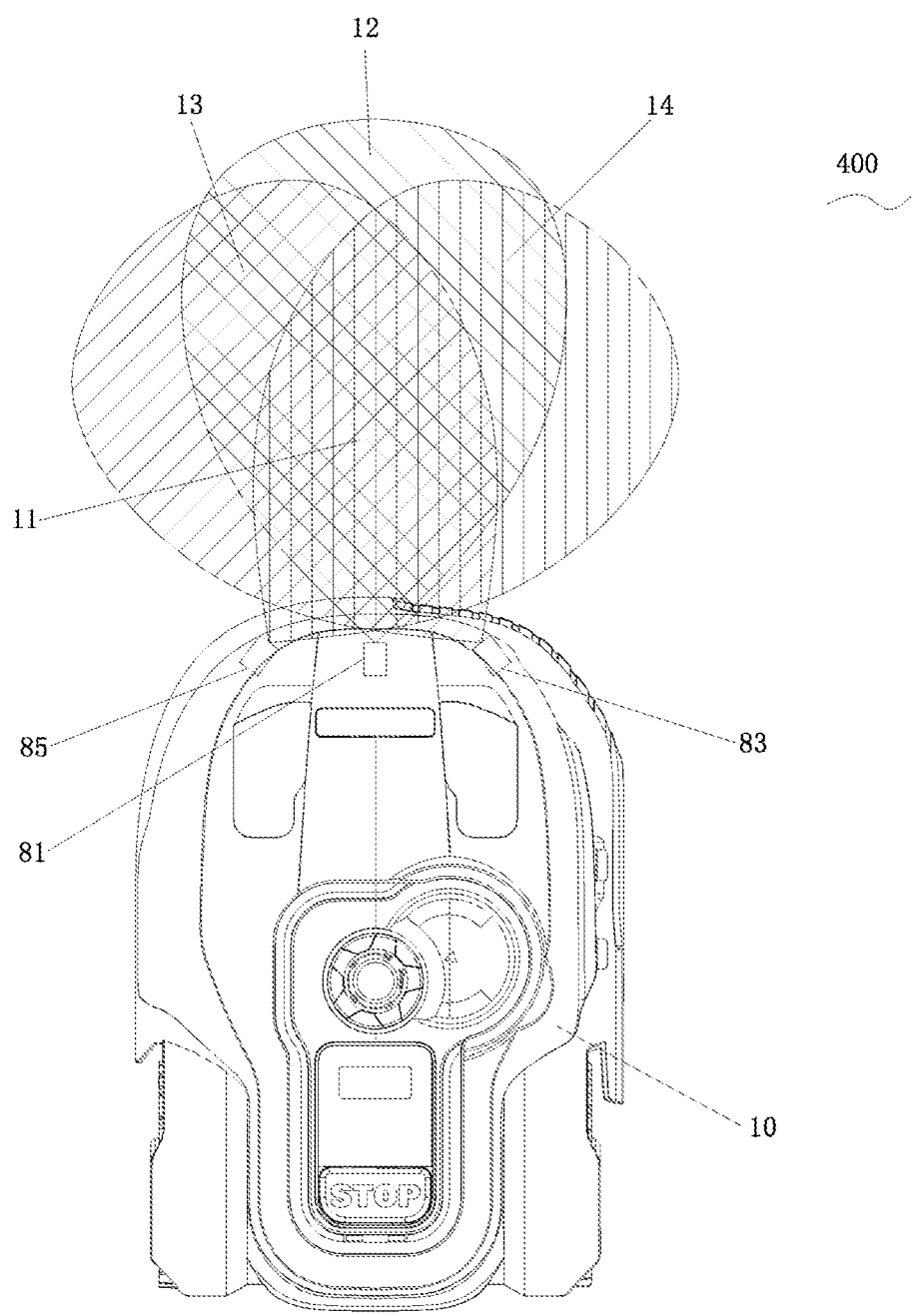
FIG. 23 is a schematic diagram of a detection range of a first arrangement manner of the ultrasonic sensor assembly of the autonomous lawn mower 400 according to the fourth embodiment of the present invention in FIG. 22.

As shown in FIG. 23, FIG. 23 is a schematic diagram of a detection range of the first arrangement manner of the ultrasonic sensor assembly of the autonomous lawn mower 400 in the fourth embodiment of the present invention. In an embodiment of the first arrangement manner, the first ultrasonic sensor 81 has a first transceiver region. The second ultrasonic sensor 83 has a second reception region. The third ultrasonic sensor 85 has a third reception region. The first transceiver region, the second reception region, and the third reception region form an overlapping detection region right in front of the autonomous lawn mower 400. In the overlapping detection region, the first ultrasonic sensor 81, the second ultrasonic sensor 83, and the third ultrasonic sensor 85 can all receive an ultrasonic echo. That is, if the first ultrasonic sensor 81 sends ultrasound, the first ultrasonic sensor 81, the second ultrasonic sensor 83, and the third ultrasonic sensor 85 can all receive an ultrasonic echo.

Still as shown in FIG. 23, a non-overlapping part of the first transceiver region is a first detection region 11 of the sensor component 20. An overlapping part of the first transceiver region, the second reception region, and the third reception region is a second detection region 12 of the sensor component 20. A part except the second detection region of the overlapping part of the first transceiver region and the second reception region is a fourth detection region 14 of the sensor component 20. A part except the second detection region of the overlapping part of the first transceiver region and the third reception region is a third detection region 13 of the sensor component 20.

Figure 24:
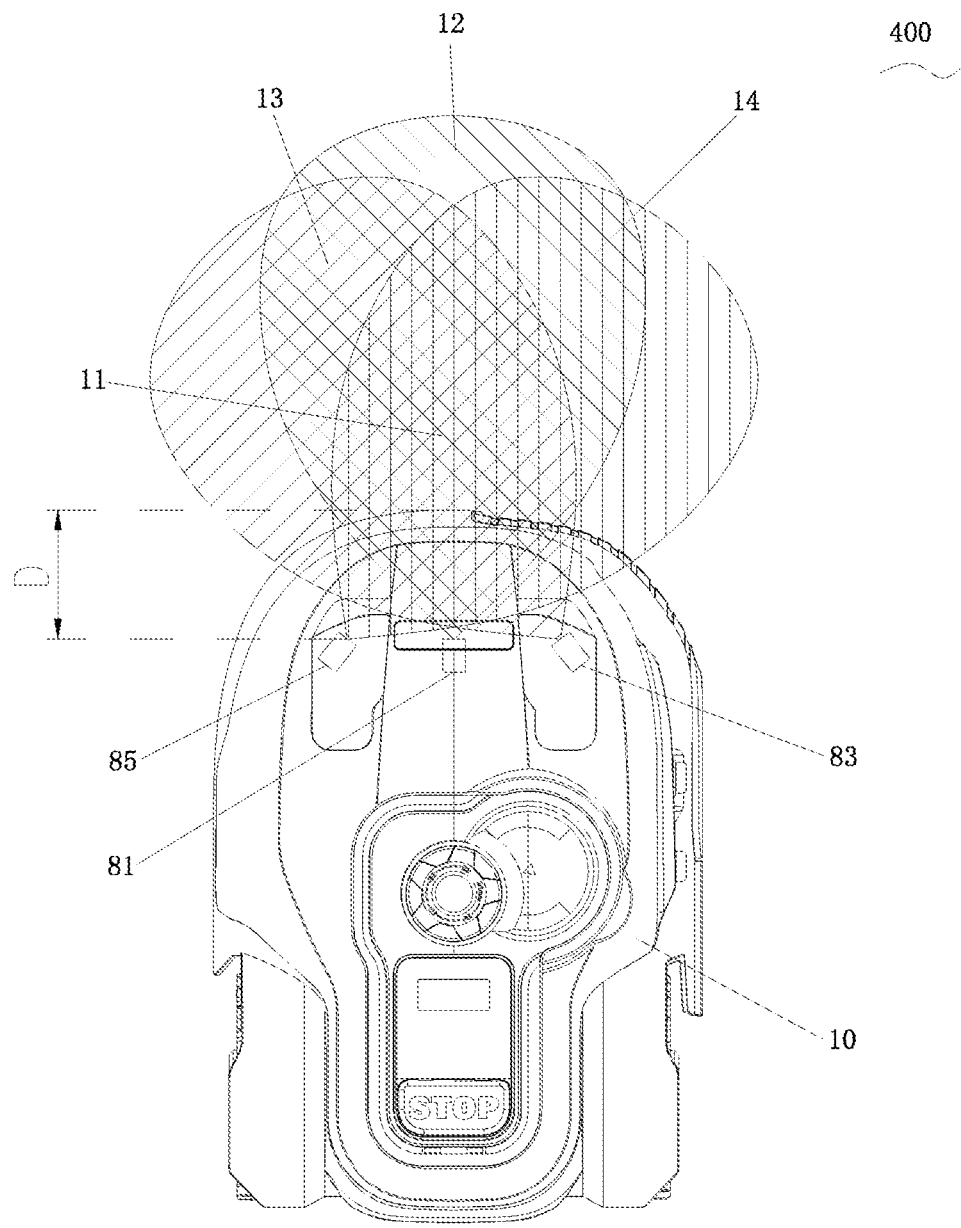
FIG. 24 is a schematic diagram of a detection range of a second arrangement manner of the ultrasonic sensor assembly of the autonomous lawn mower 400 according to the fourth embodiment of the present invention in FIG. 22.

As shown in FIG. 24, FIG. 24 is a schematic diagram of a detection range of a second arrangement manner when the ultrasonic sensor assembly of the autonomous lawn mower 400 in the fourth embodiment of the present invention includes three ultrasonic sensors. A difference between the second arrangement manner and the first arrangement manner of the ultrasonic sensor assembly lies in that the ultrasonic sensor assembly 20 is mounted at a position at a distance D from a front end of the housing. The specific description is that in an embodiment of the second arrangement manner, the ultrasonic sensor assembly 20 includes a first ultrasonic sensor 81, a second ultrasonic sensor 83, and a third ultrasonic sensor 85. The second ultrasonic sensor 83 and the third ultrasonic sensor 85 are respectively located on two sides of the first ultrasonic sensor 81 and are respectively disposed at an angle the first ultrasonic sensor 81. The angle of intersection only needs to enable an overlapping detection region to be a short-distance detection region as close as possible to a front end of the machine. This manner may detect an obstacle at a short distance, and can know a direction of the obstacle.

As shown in FIG. 24, in an embodiment of the second arrangement manner, the first ultrasonic sensor 81 has a first transceiver region. The second ultrasonic sensor 83 has a second reception region. The third ultrasonic sensor 85 has a third reception region. The first transceiver region, the second reception region, and the third reception region form an overlapping detection region right in front of the autonomous lawn mower 400. In the overlapping detection region, the first ultrasonic sensor 81, the second ultrasonic sensor 83, and the third ultrasonic sensor 85 can all receive an ultrasonic echo. That is, if the first ultrasonic sensor 81 sends ultrasound, the first ultrasonic sensor 81, the second ultrasonic sensor 83, and the third ultrasonic sensor 85 can all receive an ultrasonic echo. A non-overlapping part of the first transceiver region is a first detection region 11 of the sensor component 20. An overlapping part of the first transceiver region, the second reception region, and the third reception region is a second detection region 12 of the sensor component 20. A part except the second detection region of the overlapping part of the first transceiver region and the second reception region is a fourth detection region 14 of the sensor component 20. A part except the second detection region of the overlapping part of the first transceiver region and the third reception region is a third detection region 13 of the sensor component 20.

As shown in FIG. 24, in a second arrangement manner of the autonomous lawn mower 400 in the fourth embodiment of the present invention, the first ultrasonic sensor 81, the second ultrasonic sensor 83, and the third ultrasonic sensor 85 theoretically may be disposed at any position in a length direction of the housing 10. If the first ultrasonic sensor 81, the second ultrasonic sensor 83, and the third ultrasonic sensor 85 are disposed on the housing 10 at a position closer to a rear end, to protect sending of ultrasound and reception of an echo from an obstacle of the ultrasonic sensors from being affected, the shape of the housing may be improved or the ultrasonic sensor may be disposed higher. In a preferred embodiment of the present invention, the factors of transmission and reception of ultrasound and a small occupying space are all considered. The first ultrasonic sensor 81, the second ultrasonic sensor 83, and the third ultrasonic sensor 85 are disposed at a front half of the housing 10 in a length direction. A distance D is less than or equal to a half of a length of the housing 10. In this way, it may be more convenient to improve the structure of the front end of the housing to adapt to a range of a field of view, thereby preventing ultrasound from being blocked.

In a preferred embodiment of the autonomous lawn mower 400 in the fourth embodiment of the present invention, a control module 30 determines a location of the obstacle according to a combination of ultrasound transmitted by the first ultrasonic sensor 81 in the ultrasonic sensor assembly 20 and echoes received from an obstacle by the first ultrasonic sensor 81, the second ultrasonic sensor 83, and the third ultrasonic sensor 85. When only the first ultrasonic sensor 81 in the ultrasonic sensor assembly 20 transmits ultrasound and only the first ultrasonic sensor 81 receives an echo from the obstacle, the control module 30 determines that the obstacle is located in the first detection region 11. When the first ultrasonic sensor 81 in the ultrasonic sensor assembly 20 transmits ultrasound and the first ultrasonic sensor 81, the second ultrasonic sensor 83, and the third ultrasonic sensor 85 all receive echoes from the obstacle, the control module 30 determines that the obstacle is located in the second detection region 12. When the first ultrasonic sensor 81 in the ultrasonic sensor assembly 20 transmits ultrasound and only the first ultrasonic sensor 81 and the second ultrasonic sensor 83 receive echoes from the obstacle, the control module 30 determines that the obstacle is located in the third detection region 13. When the first ultrasonic sensor 81 in the ultrasonic sensor assembly 20 transmits ultrasound and only the first ultrasonic sensor 81 and the third ultrasonic sensor 85 receive echoes from the obstacle, the control module 30 determines that the obstacle is located in the fourth detection region 14.

In a preferred embodiment of the autonomous lawn mower 400 in the fourth embodiment of the present invention, the control module 30 calculates the distance between the obstacle and the autonomous lawn mower according to a time difference between the time when the ultrasonic sensor assembly 20 transmits ultrasound and the time when the ultrasonic sensor assembly 20 receives an echo from the obstacle.

The embodiments of the autonomous lawn mower in the foregoing four embodiments of the present invention are also applicable to other self-moving devices such as a smart robot cleaner. The description about the embodiments of the smart robot cleaner or more self-moving devices is not repeated here. Solutions in embodiments of other self-moving devices are the same as the autonomous lawn mowers 100, 200, 300, and 400 in the foregoing four embodiments.

Figure 25:
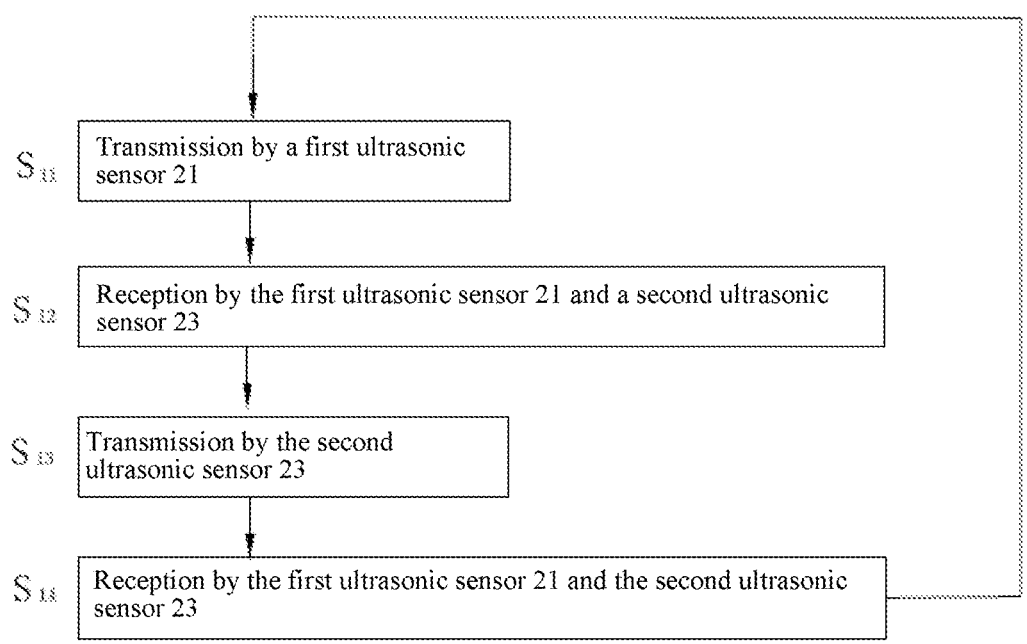
FIG. 25 is a flowchart of a control module 30 controlling transmission and reception of an ultrasonic sensor assembly.

FIG. 25 is a flowchart of the control module 30 controlling transmission and reception of the ultrasonic sensor assembly 20. For the ultrasonic sensor assembly 20 applicable to all the embodiments of the present invention, an ultrasonic sensor in the autonomous lawn mower 100 in the first embodiment is used as an example for description below. The control module 30 controls the first ultrasonic sensor 21 and the second ultrasonic sensor 23 to transmit ultrasound on a time axis at an interval. Specific steps are sequentially as follows:

Step S11: The first ultrasonic sensor 21 sends ultrasound at a first moment.

Step S12: The first ultrasonic sensor 21 and the second ultrasonic sensor 23 receive the ultrasound.

Step S13: The second ultrasonic sensor 23 sends ultrasound at a second moment.

Step S14: The first ultrasonic sensor 21 and the second ultrasonic sensor 23 receive the ultrasound.

The control module 30 controls the ultrasonic sensor assembly 20 to detect an obstacle cyclically according to the steps in FIG. 25. If an obstacle exists in an effective detection range, transmitted ultrasound is reflected by the obstacle to form an echo. The ultrasonic sensor assembly 20 receives the echo. The control module 30 analyzes information about the echo to determine a location and a distance of the obstacle. If no obstacle exists in the effective detection range, the ultrasonic sensor assembly in step S12 and step S14 receives no ultrasonic echo, and further makes an analysis to determine that an obstacle does not exist in a forward movement direction of the autonomous lawn mower 100. A time difference T between the time when the first ultrasonic sensor 21 transmits ultrasound and the time when the second ultrasonic sensor 23 transmits ultrasound is referred to as an effective reception period. A specific time of the effective reception period T varies according to the intensity of a drive signal generated by a drive circuit and hardware parameters of the ultrasonic sensors. The step of transmitting ultrasound alternately is also applicable to the foregoing autonomous lawn mowers 200 and 300 in the present invention.

Figure 26:
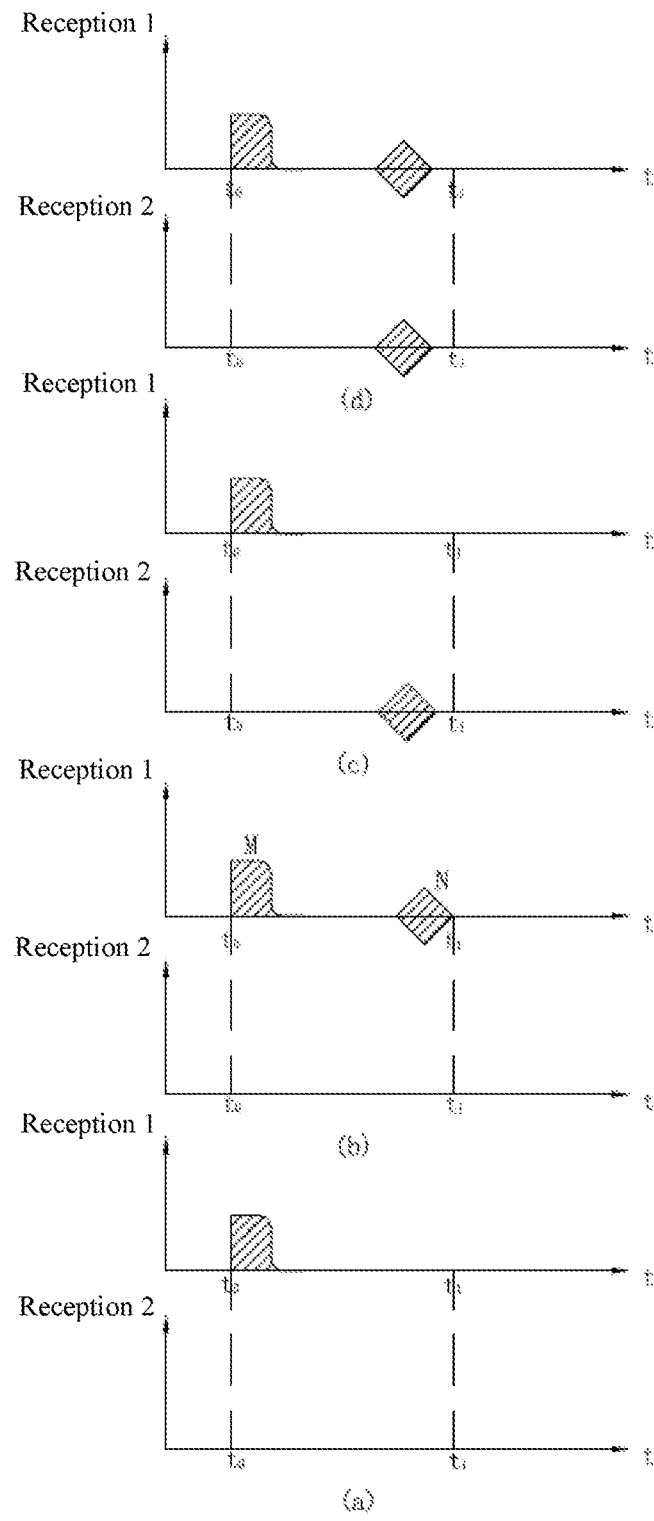
FIG. 26 is a schematic diagram of signal reception of the ultrasonic sensor assembly that corresponds to different obstacles in an effective detection range of the autonomous lawn mower 100 according to the first embodiment of the present invention.

FIG. 26 is a schematic diagram of signal reception of an ultrasonic sensor assembly corresponding to different obstacles in an effective detection range of the autonomous lawn mower. FIG. 26 uses an ultrasonic sensor in the autonomous lawn mower 100 in the first embodiment as an example for description. The schematic diagram of waveforms is only used to represent a schematic of waveforms received by the ultrasonic sensor assembly when obstacles are at different locations and does not represent a waveform of a received signal of an actual sensor component. In this embodiment, an example in which the first ultrasonic sensor 21 transmits ultrasound is used to describe schematic diagrams of signals received by the first ultrasonic sensor 21 and the second ultrasonic sensor 23 when obstacles appear at different locations. In the waveform of the received signal in FIG. 17, a waveform M having an approximate rectangular shape represents self-excited oscillation after an ultrasonic sensor transmits ultrasound, a waveform N having an approximate rhombic shape represents reflected ultrasound received by the ultrasonic sensor. In this embodiment, the first ultrasonic sensor 21 transmits ultrasound. Therefore, a schematic diagram of a received signal of the first ultrasonic sensor 21 always has a waveform a having an approximate rectangular shape. The case of the transmitted and received signals is also applicable to the foregoing autonomous lawn mowers 200 and 300 in the present invention.

As shown in FIG. 26(a), the first ultrasonic sensor 21 transmits ultrasound at a moment t0. In a period of time from t0 to t1, neither of the first ultrasonic sensor 21 and the second ultrasonic sensor 23 receives reflected ultrasound. The control module 30 determines that an obstacle does not exist in the effective detection range of the autonomous lawn mower 100. The period of time from t0 to t1 is the foregoing effective reception period T.

As shown in FIG. 26(b), the first ultrasonic sensor 21 transmits ultrasound at a moment t0. In a period of time from t0 to t1, the first ultrasonic sensor 21 receives a transmitted wave but the second ultrasonic sensor 23 does not receive reflected ultrasound. The control module 30 determines that an obstacle exists in the first detection region of the autonomous lawn mower 100.

As shown in FIG. 26(c), the first ultrasonic sensor 21 transmits ultrasound at a moment t0. In a period of time from t0 to t1, the first ultrasonic sensor 21 does not receive a transmitted wave but the second ultrasonic sensor 23 receives reflected ultrasound. The control module 30 determines that an obstacle exists in the second detection region of the autonomous lawn mower 100.

As shown in FIG. 26(d), the first ultrasonic sensor 21 transmits ultrasound at a moment t0. In a period of time from t0 to t1, neither of the first ultrasonic sensor 21 and the second ultrasonic sensor 23 receives reflected ultrasound. The control module 30 determines that an obstacle exists in the third detection region of the autonomous lawn mower 100.

Figure 27:
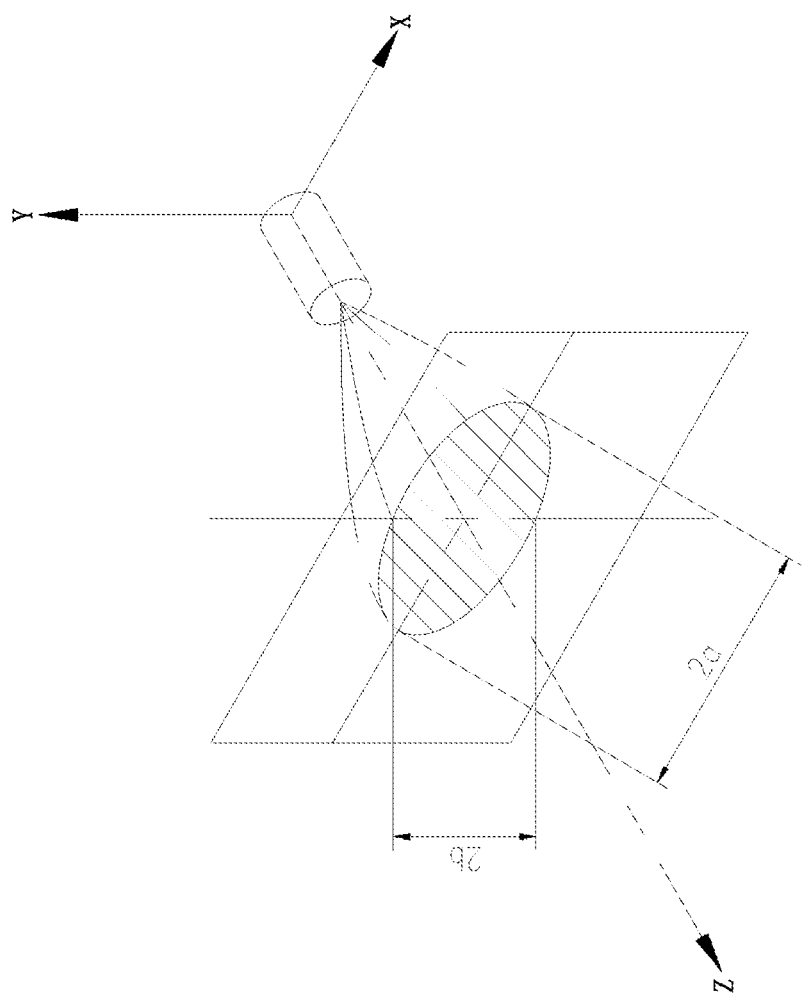
FIG. 27 is a schematic diagram of an elliptical beam of an ultrasonic sensor according to the present invention.
Figure 28:
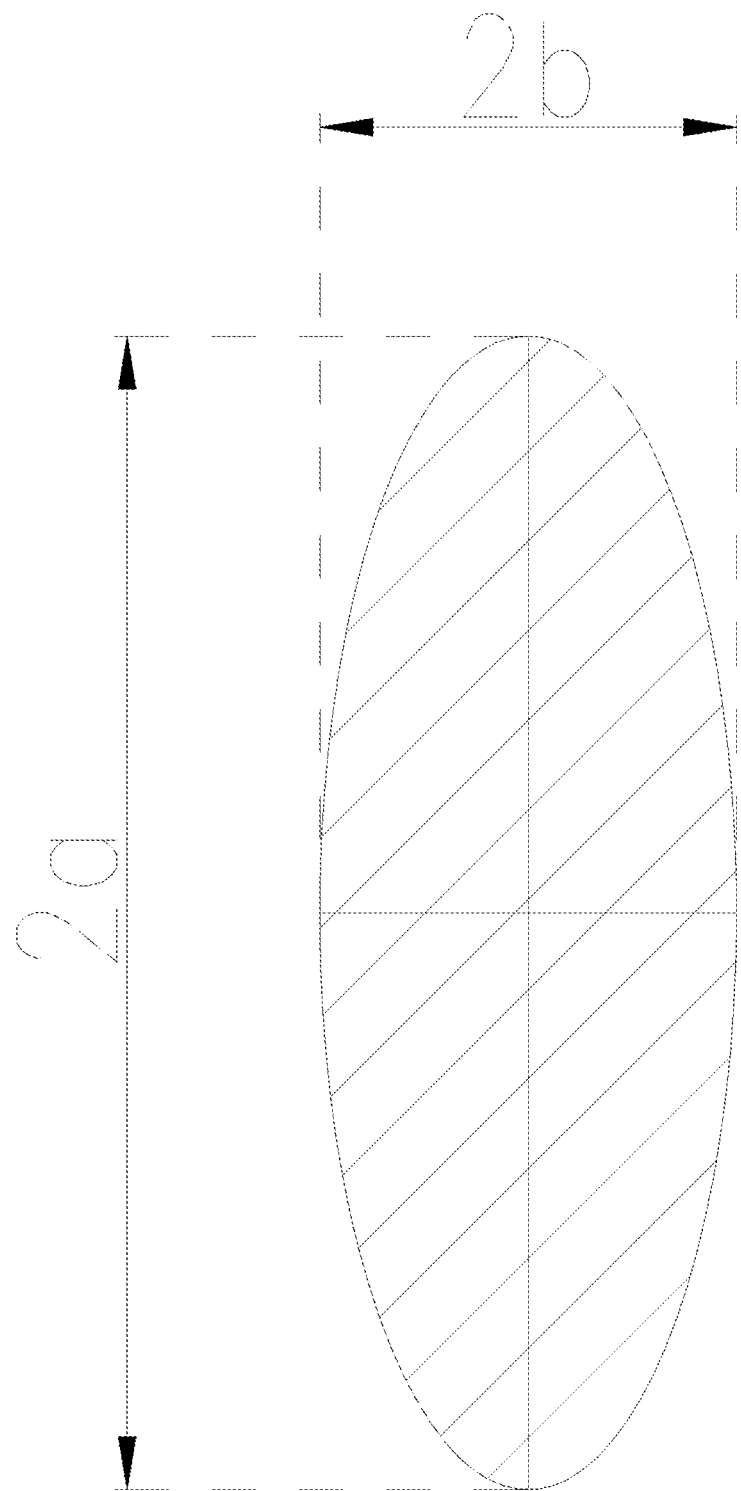
FIG. 28 is a sectional view of the elliptical beam in FIG. 27.

As shown in FIG. 27 and FIG. 28, in the autonomous lawn mower in a preferred embodiment of the present invention, a related ultrasonic sensor sends ultrasound to form an ultrasonic field of view for detecting an obstacle. Because in a height direction, the autonomous lawn mower only needs to detect an obstacle in a particular range of height in a forward movement direction of the autonomous lawn mower, but needs to detect an obstacle in a width range of the autonomous lawn mower right in front of the autonomous lawn mower. Therefore, to obtain a wider range for detecting an obstacle, the present embodiment preferably uses a noncircular field of view, for example, an elliptical field of view. A tangent plane is formed by an axis perpendicular to the field of view. A waveform surface is approximately elliptical and has a major axis direction 2a and a minor axis direction 2b. The housing 10 has a bottom surface, the major axis direction is mounted to be basically parallel to a bottom surface of the housing 10, and the minor axis direction is mounted to be basically perpendicular to the bottom surface of the housing 10. The "basically" here has two meanings. The first meaning is that the major axis direction is completely parallel to a bottom surface of the housing 10 and the minor axis direction is completely perpendicular to the bottom surface of the housing 10. The second meaning is that the major axis direction is approximately parallel (but is not absolutely parallel) to the bottom surface of the housing 10 and the minor axis direction is approximately perpendicular (but is not absolutely perpendicular) to the bottom surface of the housing 10. For example, by using such a definition, the ultrasonic sensors may be flexibly mounted and arranged, so that the ultrasonic field of view meets that the major axis is greater than the minor axis, that is, a width field-of-view value is greater than a height field-of-view value, and it can be ensured that a relatively large amount of ultrasound from an obstacle is detected in a width direction of the housing, thereby ensuring the accuracy of detecting an obstacle right in front of the housing. When ultrasonic beam pattern is elliptical, the waveform surface is elliptical. The description about the ultrasonic beam pattern in this embodiment is also applicable to the autonomous lawn mowers 100, 200, 300, and 400 in the foregoing four embodiments of the present invention.

Figure 29:
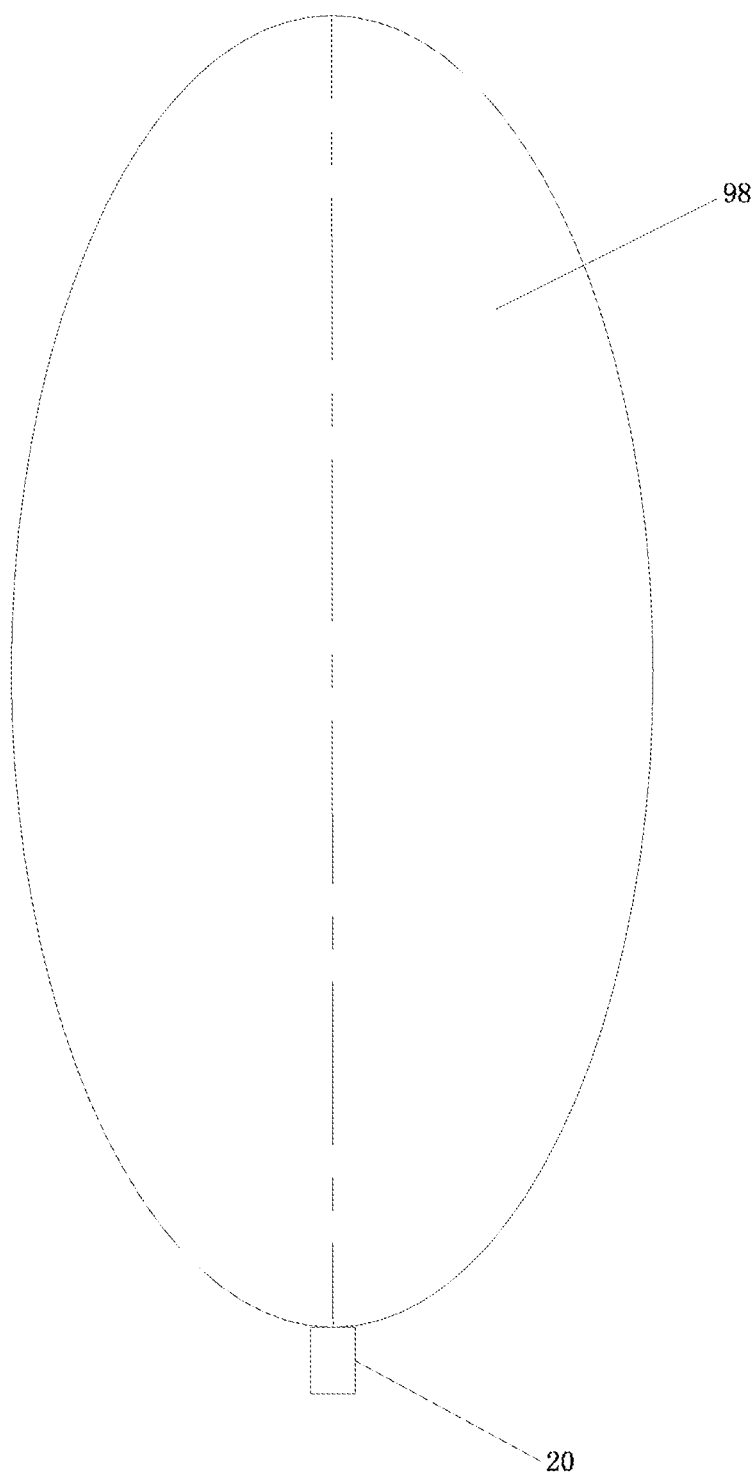
FIG. 29 is a schematic diagram when an ultrasonic beam pattern of an ultrasonic sensor is noncircular.

As shown in FIG. 29, in the ultrasonic sensor assembly 20 in a preferred embodiment of the present invention, to obtain a noncircular ultrasonic beam pattern, it may be directly selected that an ultrasonic beam pattern of an ultrasonic sensor is noncircular. The field of view 98 is noncircular, and a tangent plane is formed by an axis perpendicular to the ultrasonic sensor to obtain the waveform surface. The description about an ultrasonic beam pattern of an ultrasonic sensor in this embodiment is also applicable to the autonomous lawn mowers 100, 200, 300, and 400 in the foregoing four embodiments of the present invention.

Figure 30:
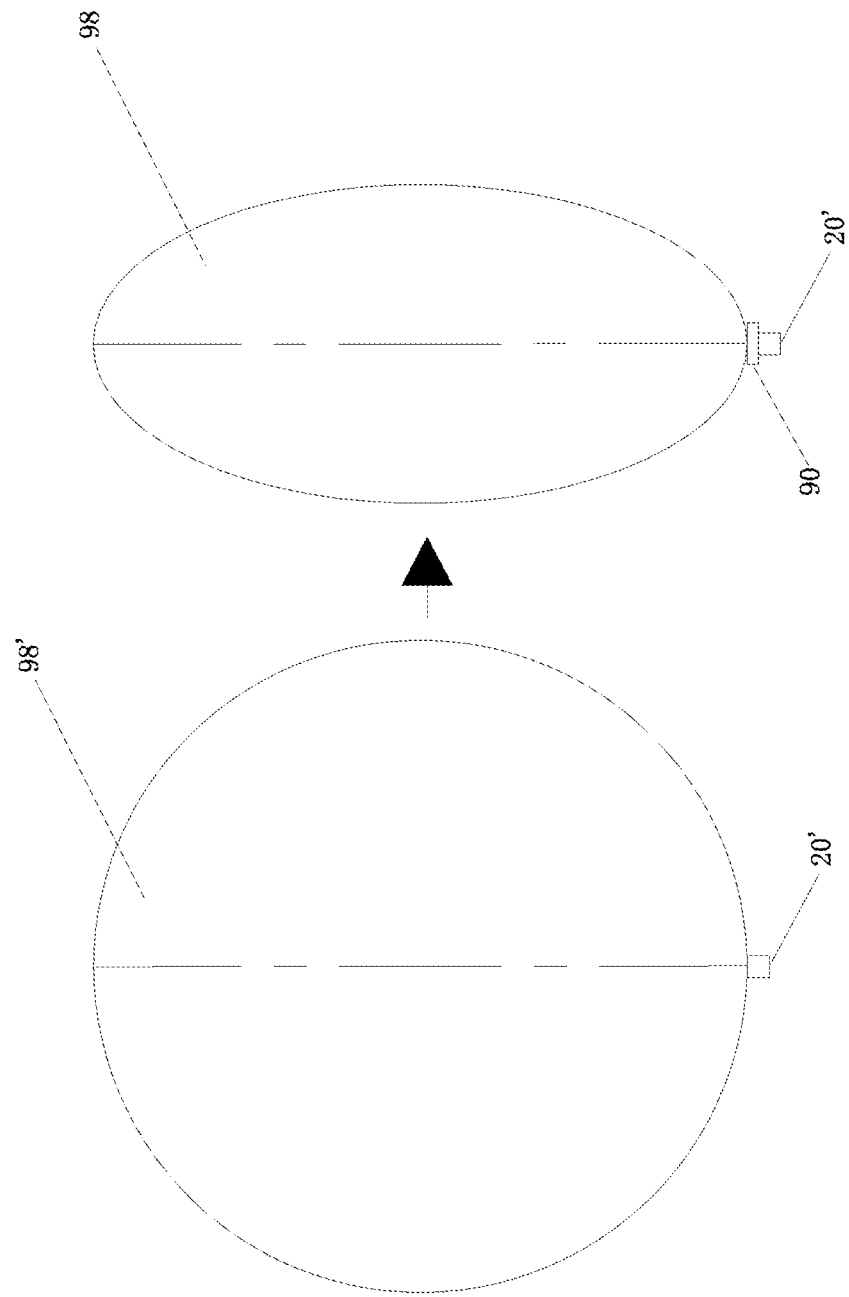
FIG. 30 is a schematic diagram when a beam pattern of an ultrasonic sensor is circular and the beam is adjusted to be elliptical after a beam adjuster 90 is disposed.

As shown in FIG. 30, in the ultrasonic sensor assembly 20 in a preferred embodiment of the present invention, to obtain a noncircular ultrasonic beam pattern, it may be selected that an ultrasonic beam pattern of an ultrasonic sensor 20' is circular, and a field of view 98' is noncircular. A beam adjuster 90 configured to adjust a shape of an ultrasonic beam pattern of ultrasound transmitted by the ultrasonic sensor may be disposed at an ultrasound transmission end of the ultrasonic sensor. An ultrasonic beam pattern obtained after adjustment by the beam adjuster 90 is noncircular. The field of view 98 of the ultrasonic sensor assembly 20 is noncircular. A tangent plane is formed by an axis perpendicular to the ultrasonic beam pattern to obtain the waveform surface. The description about an ultrasonic beam pattern of an ultrasonic sensor in this embodiment and the arrangement of the beam adjuster 90 are also applicable to the autonomous lawn mowers 100, 200, 300, and 400 in the foregoing four embodiments of the present invention.

In the ultrasonic sensor assembly 20 in a preferred embodiment of the present invention, a sound wave guide tube may be disposed on an ultrasonic sensor, and to obtain an overlapping detection region having a larger area, the sound wave guide tube may be used to expand a sound wave transmission range.

In the autonomous lawn mower in a preferred embodiment of the present invention, when a distance between the obstacle and the autonomous lawn mower is less than the preset distance, the control module 30 controls the autonomous lawn mower to execute a preset obstacle-avoidance measure. The preset distance is in a positive relationship with at least one of a movement speed, an acceleration, and inertia of the autonomous lawn mower. The inertia is related to mass of the autonomous lawn mower and is related to an arrangement position of an axis of a moving module, that is, related to mass distribution of the autonomous lawn mower. Different positions of the axis of the moving module affect mass distribution of the autonomous lawn mower and further affect the inertia. The preset distance is less than or equal to 25 centimeters. When the autonomous lawn mower of the present invention needs to implement short-distance non-contact obstacle avoidance, the preset distance is less than or equal to 15 centimeters. When a slope or a narrow channel exists in a working environment of the autonomous lawn mower of the present embodiment, the preset distance is less than or equal to 10 centimeters. A length size of the autonomous lawn mower in the present embodiment is used as a reference value, and the preset distance is less than or equal to 40% of a length of the housing. When the autonomous lawn mower of the present embodiment needs to implement short-distance non-contact obstacle avoidance, the preset distance is less than or equal to 24% of a length of the housing. When a slope or a narrow channel exists in the working environment of the autonomous lawn mower of the present embodiment, the preset distance is less than or equal to 15% of a length of the housing. The width size of the autonomous lawn mower in the present embodiment is used as a reference value. The preset distance is less than or equal to 60% of a width of the housing. When the autonomous lawn mower of the present embodiment needs to implement short-distance non-contact obstacle avoidance, the preset distance is less than or equal to 35% of a width of the housing. When a slope or a narrow channel exists in the working environment of the autonomous lawn mower of the present embodiment, the preset distance is less than or equal to 25% of a width of the housing. For example, the setting of the foregoing preset distance is associated with the length and width of the housing. When the autonomous lawn mower selects different obstacle-avoidance logics, the implementation of non-contact obstacle avoidance is related to the preset distance and is also related to the length and width of the housing. The foregoing description about the preset distance is also applicable to the autonomous lawn mowers 100, 200, 300, and 400 in the foregoing four embodiments of the present invention.

In the autonomous lawn mower in a preferred embodiment of the present invention, after an ultrasonic sensor sends a signal, all obstacles in front in a transmission range of ultrasound return echoes, and many ultrasonic echoes are received by the ultrasonic sensor. However, some obstacles that are relatively far away do not affect the autonomous lawn mower. The autonomous lawn mower mainly needs to recognize an obstacle that is relatively close, and an objective of non-contact obstacle avoidance is then achieved. Therefore, to avoid unnecessary data analysis, the control module 30 only needs to analyze ultrasonic echoes received in a limited analysis range. The limited analysis range is related to the length of the housing 10. The limited analysis range is optimally less than or equal to 200 centimeters. The range is 200 centimeters in front of the housing 10 from a foremost end of the housing 10. In a preferred embodiment of the present invention, the limited analysis range is optimally less than or equal to 90 centimeters. The range is 90 centimeters in front of the housing 10 from the foremost end of the housing 10. The foregoing description about the limited analysis range is also applicable to the autonomous lawn mowers 100, 200, 300, and 400 in the foregoing four embodiments of the present invention.

In the autonomous lawn mower in a preferred embodiment of the present invention, the autonomous lawn mower needs to detect an obstacle in a forward movement direction of the autonomous lawn mower, and only an obstacle in a particular range of height is detected, and an obstacle beyond the range of height may not be detected. For example, an obstacle whose height exceeds the height of the autonomous lawn mower 1 by 5 cm may not be detected. Because an obstacle to be detected needs to meet a range of height requirement, a precondition for determining whether an obstacle is to be detected is that the obstacle is in a range of a field of view of an ultrasonic sensor, so that an ultrasonic field of view sent by the ultrasonic sensor can detect an obstacle to generate an ultrasonic echo. Different mounting heights and pitch angles of the ultrasonic sensor determine different directions of field of views.

Figure 31:
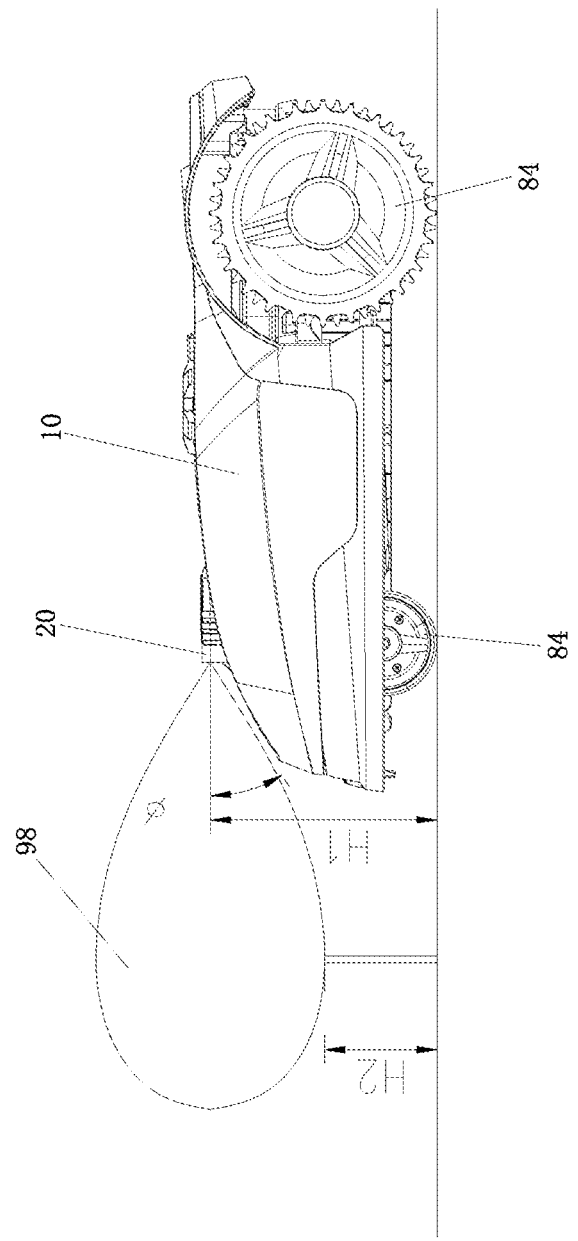
FIG. 31 is a schematic diagram that an ultrasonic sensor in an autonomous lawn mower of the present invention is not offset.
Figure 32:
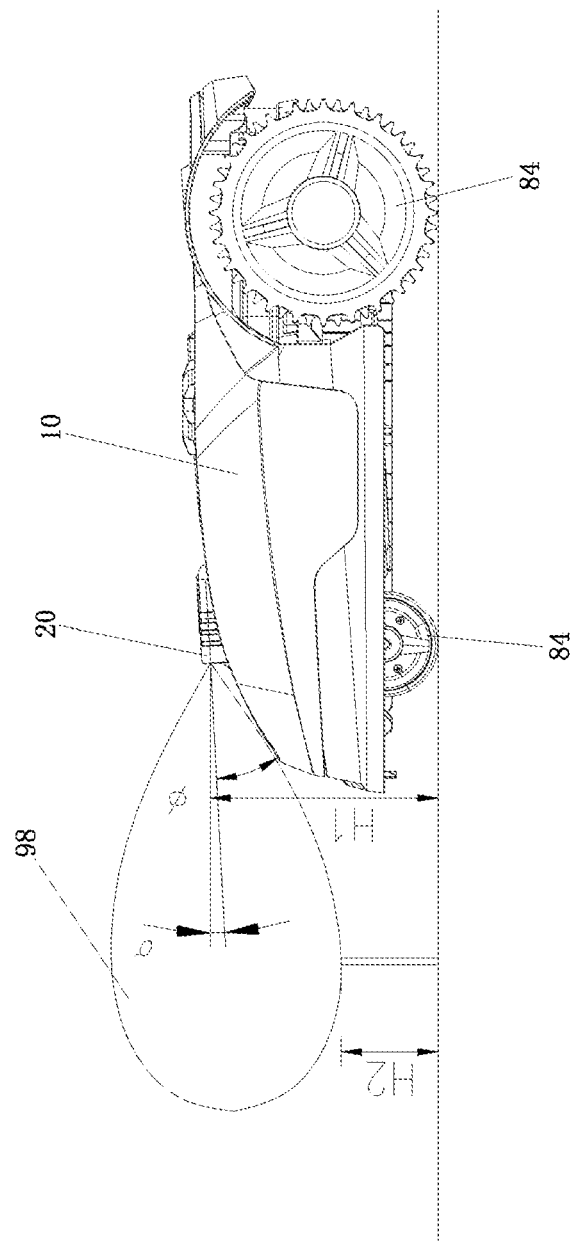
FIG. 32 is a schematic diagram that an ultrasonic sensor in an autonomous lawn mower of the present invention is offset downward by an angle 3.
Figure 33:
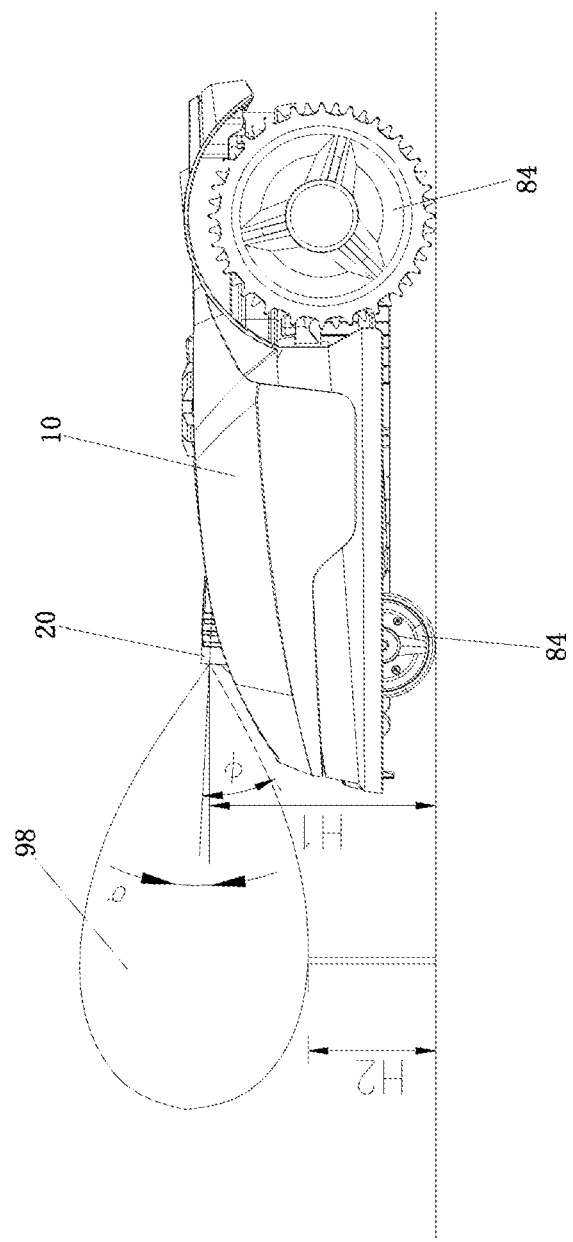
FIG. 33 is a schematic diagram that an ultrasonic sensor in an autonomous lawn mower of the present invention is offset upward by an angle 3.

In the autonomous lawn mower in a preferred embodiment of the present invention, as shown in FIG. 31 to FIG. 33, a mounting height of an ultrasonic sensor is H1, and a height limit value of an obstacle to be recognized is H2 (for the autonomous lawn mower, H2 is generally set to be a height of grass to be cut). That is, an object whose height is greater than H2 is recognized as an obstacle, and an object whose height is less than H2 is not considered as an obstacle. A relationship between the mounting height H1 of the ultrasonic sensor and the height H2 of grass to be cut is H$1$=H$2$+L*sin($\phi \pm \sigma$), where L is a distance between an axial center of the ultrasonic sensor and a determination section, $\phi$ is a half of a field-of-view angle determined by sensor performance, and $\sigma$ is an offset angle of a central line of the ultrasonic sensor relative to a bottom surface of the housing. If the ultrasonic sensor slants upward, $\sigma$ is negative, and if the ultrasonic sensor slants downward, $\sigma$ is positive. Based on the mounting height H1, the field of view 98 of the ultrasonic sensor can cover a range greater than H2, an object whose height is greater than H2 can be recognized, and an obstacle can be recognized. The setting of the height H1 of the ultrasonic sensor in this embodiment is also applicable to the autonomous lawn mowers 100, 200, 300, and 400 in the foregoing four embodiments of the present invention.

In the autonomous lawn mower in a preferred embodiment of the present invention, the autonomous lawn mower has an approximately determined range of grass cutting height of grass that needs to be cut. Therefore, an object whose height is greater than that of grass to be cut is recognized as an obstacle. In addition, to complete that grass with determined height can be cut, a field of view of an ultrasonic sensor is needed, and grass that needs to be cut is not recognized as an obstacle. Because values of $\phi$ and $\sigma$ are determined by the performance of the ultrasonic sensor, after a determination section is chosen, the distance L may also be determined. Therefore, only a height H2 of grass that needs to be cut needs to be determined, and the mounting height H1 of the ultrasonic sensor can be obtained through conversion by using a formula H$1$=H$2$+L*sin($\phi \pm \sigma$). Because the grass cutting heights H2 of different lawns may have different values, after an initial grass cutting height H2 is set, internal software may further be used to control the value of H2 to change flexibly. For example, the intensity of a detection signal near an axis of a sensor in a field of view of the sensor is greater than that of a detection signal in an outer side field of view far away from the axis of the sensor, the height H2 may be changed by selecting the intensity of a recognition signal, so as to implement micro adjustment of different grass cutting heights. The setting of the height H1 of the ultrasonic sensor in this embodiment is also applicable to the autonomous lawn mowers 100, 200, 300, and 400 in the foregoing four embodiments of the present invention.

In the autonomous lawn mower in a preferred embodiment of the present invention, because grass on a lawn has varying heights, the grass cutting height H2 is selected only to cut most of the grass. Some tall grass whose height is greater than the grass cutting height H2 still needs to be cut. However, because a value of a height of some tall grass is greater than the value of H2, the tall grass is recognized as an obstacle to perform obstacle-avoidance processing, and as a result, tall grass may fail to be cut. Therefore, a reflected wave threshold is preset in the autonomous lawn mower in the present embodiment. For tall grass that enters a field of view of an ultrasonic sensor, a top end of the grass enters the field of view of the ultrasonic sensor, and the top end of the grass produces a relatively weak echo signal. The reflected wave threshold may be set, so that an ultrasonic echo that is less than the reflected wave threshold is considered as an ultrasonic echo generated by tall grass. The autonomous lawn mower continues to move forward to cut the tall grass. An echo signal that is greater than the reflected wave threshold is considered as an echo signal generated by an obstacle, and the autonomous lawn mower needs to execute an obstacle-avoidance measure. During actual application, there may sometimes be a relatively small difference of intensity between an echo signal generated by tall grass and an echo signal generated by an obstacle. In this case, the reflected wave threshold is set to be relatively high. In addition, to avoid a collision with an obstacle, an echo signal of some tall grass is still greater than the reflected wave threshold, and in this case, the tall grass may be considered as an obstacle and fail to be cut. For this case, a circuit improvement may be made, and amplification factor adjustment is set. By using the amplification factor adjustment, a signal difference between an echo from tall grass and an echo from an obstacle is expanded, and an appropriate reflected wave threshold is then set, so that tall grass and an obstacle can be clearly distinguished. The foregoing reflected wave threshold in the present embodiment may be a reflected signal intensity value. The related description about the setting of a reflected wave threshold of an ultrasonic sensor in this embodiment is also applicable to the autonomous lawn mowers 100, 200, 300, and 400 in the foregoing four embodiments of the present invention.

Figure 34:
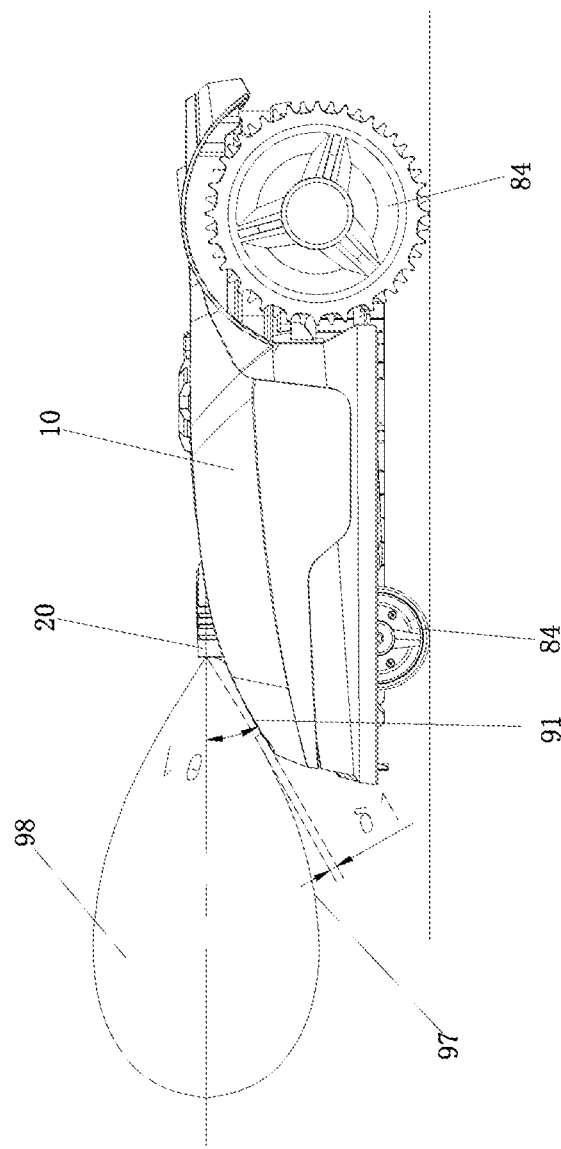
FIG. 34 is a schematic diagram when a wall, near a field of view of an ultrasonic sensor, on a housing has an inclined surface in an autonomous lawn mower of the present invention.
Figure 35:
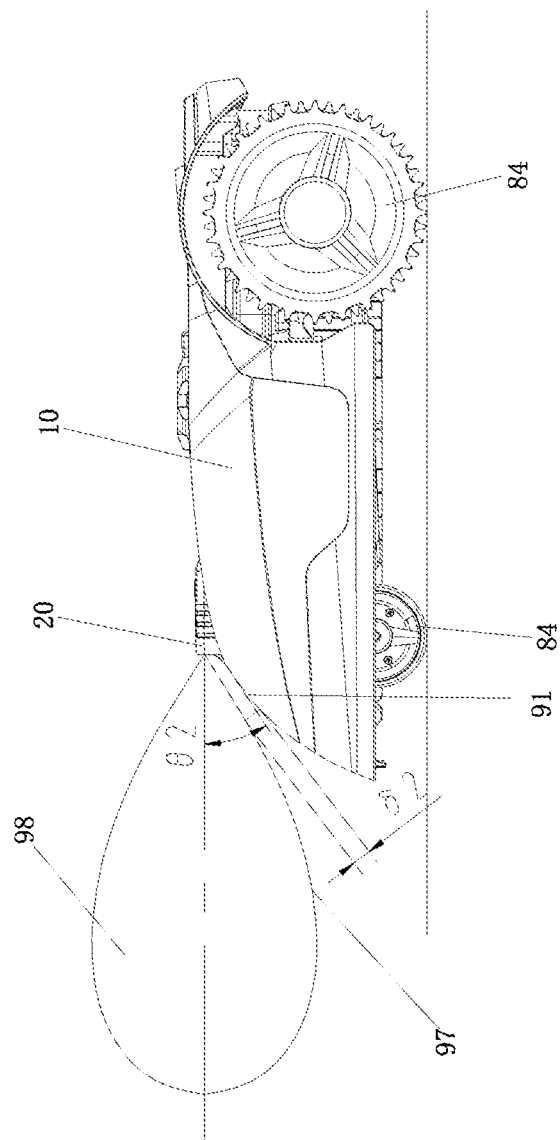
FIG. 35 is a schematic diagram when a wall, near a field of view of an ultrasonic sensor, on a housing has an arc-shaped surface in an autonomous lawn mower of the present invention.

As shown in FIG. 34 and FIG. 35, in the autonomous lawn mower in a preferred embodiment of the present invention, to further improve the accuracy of recognizing an obstacle by an ultrasonic sensor, an upper surface (the upper surface is a surface adjacent to the field of view) of a neighboring wall 91, near the field of view of the ultrasonic sensor, on the housing 10 needs to be lower than an outermost side (a virtual side of the field of view) of the field of view of the ultrasonic sensor in a vertical direction. In this way, the housing 10 can be prevented from blocking transmission of ultrasound. Therefore, in one aspect, the housing 10 is prevented from reflecting ultrasound to prevent a reflected ultrasonic echo from affecting ultrasound transmitted by a sensor, and in another aspect, the housing 10 is prevented from blocking ultrasound, because the accuracy of recognizing an obstacle is adversely affected when there is a relatively small amount of ultrasound for recognizing an obstacle. In addition, it can be ensured that a sound beam axis is horizontal. A sensor has a sound beam axis. In a preferred implementation, the sound beam axis needs to be in a horizontal state. When the neighboring wall 91 is lower than the outermost side of the field of view of the ultrasonic sensor in a vertical direction, it is ensured that the structure of the housing does not block the field of view, and further the position of the sound beam axis is not changed, thereby ensuring that the sound beam axis is in a horizontal state. The shape of the upper surface of the neighboring wall 91 near the field of view of the ultrasonic sensor is not limited. A field of view of an ultrasonic sensor has a border line 97 near the housing 10. The upper surface of the neighboring wall 91 at a position, adjacent to the border line 97, on the housing 10 is lower than the border line 97. A smallest distance δ1 between the border line 97 and the upper surface of the neighboring wall 91 is greater than 0. The related description about the neighboring wall 91 of the housing 10 in this embodiment is also applicable to the autonomous lawn mowers 100, 200, 300, and 400 in the foregoing four embodiments of the present invention.

As shown in FIG. 34, the upper surface of the neighboring wall 91 may be an arc-shaped surface, or may alternatively be an inclined surface, or may alternatively be another irregular surface. In the autonomous lawn mower in a preferred embodiment of the present invention, the neighboring wall 91 is an inclined surface. The inclined surface is lower than the border line 97. A relationship between the neighboring wall 91 and the border line 97 may be achieved by designing the housing 10. For example, a groove is opened on the housing along a field of view of an ultrasonic sensor, so that ultrasound is transmitted without being blocked. The relationship between the neighboring wall 91 and the border line 97 may alternatively be achieved by adjusting a mounting position and a pitch angle of the ultrasonic sensor relative to a front end of the autonomous lawn mower. The mounting position of the ultrasonic sensor here includes a mounting position of the ultrasonic sensor in a longitudinal direction of the housing 10, also includes a mounting height of the ultrasonic sensor, and also includes whether the ultrasonic sensor is embedded in the housing 10 or mounted outside the housing 10. Although the adjustment of the position and pitch angle of the ultrasonic sensor affects the detection field of view of the ultrasonic sensor, another auxiliary structure can still be used to adjust a sound wave transmission direction of the ultrasonic sensor. The ultrasonic sensor has an axis. An inclination angle of the inclined surface relative to the axis is θ1. A requirement of the inclination angle θ1 is θ1≥φ±σ (if the ultrasonic sensor is mounted horizontally, σ=0, if the ultrasonic sensor slants upward, σ is negative, or if the ultrasonic sensor slants downward, σ is positive). The angle is defined to ensure that the ultrasound transmitted by the ultrasonic sensor does not hit the housing 10 to generate an ultrasonic echo. In this embodiment, an inclined surface is used already, and therefore the tangent plane and the inclined surface are one surface.

As shown in FIG. 35, in the autonomous lawn mower in a preferred embodiment of the present invention, the neighboring wall 91 has an arc-shaped surface, the neighboring wall 91 is lower than the border line 97, and a relationship between the arc-shaped surface and the outermost side of the border line 97 may be achieved by designing a curvature of an arc-shaped surface on the housing 10. The relationship between the inclined surface and the outermost side of the border line 97 may alternatively be achieved by adjusting a mounting position and a pitch angle of the ultrasonic sensor relative to the front end of the autonomous lawn mower. The ultrasonic sensor has an axis, the arc-shaped surface has a tangent, an inclination angle of the tangent relative to the axis is θ2, and a requirement of the inclination angle θ2 is θ2≥φ±σ (if the ultrasonic sensor is mounted horizontally, σ=0, if the ultrasonic sensor slants upward, σ is negative, or if the ultrasonic sensor slants downward, σ is positive). The angle is defined to ensure that the ultrasound transmitted by the ultrasonic sensor does not hit the housing 10 to generate an ultrasonic echo. The conclusion is shown by the formula θ≥φ±σ in FIG. 34 and FIG. 35 (if the ultrasonic sensor is mounted horizontally, σ=0, if the ultrasonic sensor slants upward, σ is negative, or if the ultrasonic sensor slants downward, σ is positive).

In the autonomous lawn mower in another preferred embodiment of the present invention, the neighboring wall 91 may have, in addition to an inclined surface or an arc-shaped surface, an irregular shape such as a wavy shape and a stepped shape. The description about the foregoing angle relationship between the tangent of the neighboring wall 91 and the ultrasonic sensor in the present embodiment is also applicable to the autonomous lawn mowers 100, 200, 300, and 400 in the foregoing four embodiments of the present invention.

Figure 36:
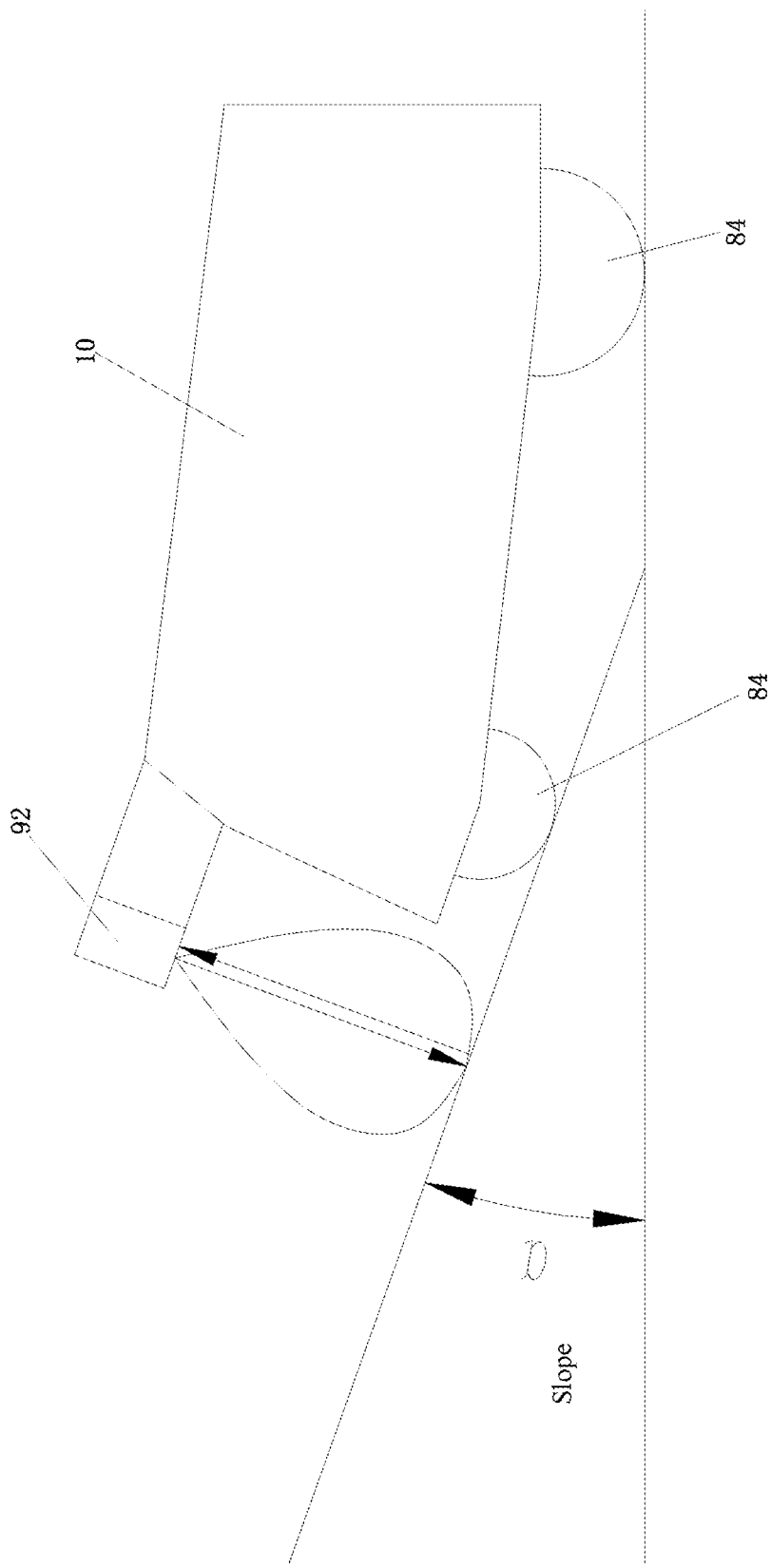
FIG. 36 is a schematic diagram of a fifth ultrasonic sensor for recognizing a slope disposed in an autonomous lawn mower of the present invention.

As shown in FIG. 36, in the autonomous lawn mower in a preferred embodiment of the present invention, the autonomous lawn mower may further include a fifth ultrasonic sensor 92. An output end of the fifth ultrasonic sensor 92 is connected to an input end of the control module 30. The fifth ultrasonic sensor 92 is configured to detect in real time whether a slope exists in the forward movement direction of the autonomous lawn mower. The control module 30 is configured to control, according to information about a slope detected by the fifth ultrasonic sensor 92, whether the autonomous lawn mower ascends the slope. The fifth ultrasonic sensor 92 is mounted and disposed on the housing 10 at an angle relative to the bottom surface of the housing 10. When the autonomous lawn mower cuts grass on flat ground, the fifth ultrasonic sensor 92 recognizes no obstacle. When there is a slope in front of the autonomous lawn mower, the fifth ultrasonic sensor 92 receives an ultrasonic echo reflected by the slope and recognizes that the obstacle is a slope. A mounting angle of the axis of the fifth ultrasonic sensor 92 relative to the bottom surface of the housing 10 is mainly determined by an inclination angle of a slope in a working area. During initial setting of the machine, approximate parameters of the inclination angle of the slope may be entered in the autonomous lawn mower according to a working environment. The setting and the description of the fifth ultrasonic sensor 92 in this embodiment is also applicable to the autonomous lawn mowers 100, 200, 300, and 400 in the foregoing four embodiments of the present invention. During actual application, when the housing has a relatively high height, a distance between a slope and an axial center of an ultrasonic sensor is greater than a blind area range. Therefore, the fifth ultrasonic sensor 92 may be mounted at a front end of the housing. When the housing has a relatively low height, a distance between a slope and an axial center of an ultrasonic sensor may further be located in a blind area range. To avoid a blind area of the fifth ultrasonic sensor 92, the fifth ultrasonic sensor 92 may be disposed to be higher than the housing.

For the autonomous lawn mower of the present embodiment, when the autonomous lawn mower arrives at a preset distance from an obstacle, to avoid a collision with the obstacle, the autonomous lawn mower does not continue to move forward toward the obstacle to execute a preset obstacle-avoidance measure. The preset obstacle-avoidance measure is that the control module controls the autonomous lawn mower to stop moving, reverse, steer, move and steer or reverse and steer. The distance between the autonomous lawn mower and the obstacle is greater than 0.

In the autonomous lawn mower in a preferred embodiment of the present invention, it only needs to be ensured that the autonomous lawn mower 100 can stop or reverse rapidly. The preset distance may be infinitely small and may approximate 0 centimeters, but is not equal to 0. For example, when a braking effect of the autonomous lawn mower 10 is desirable enough, instant braking or reversing can be implemented, so as to achieve an effect that the autonomous lawn mower 10 keeps getting closer but does not collide with an obstacle. However, to optimize the movement of the autonomous lawn mower and improve grass cutting efficiency, the lawn mower is usually expected to execute a preset movement logic to continue working rather than to stop.

Figure 48:
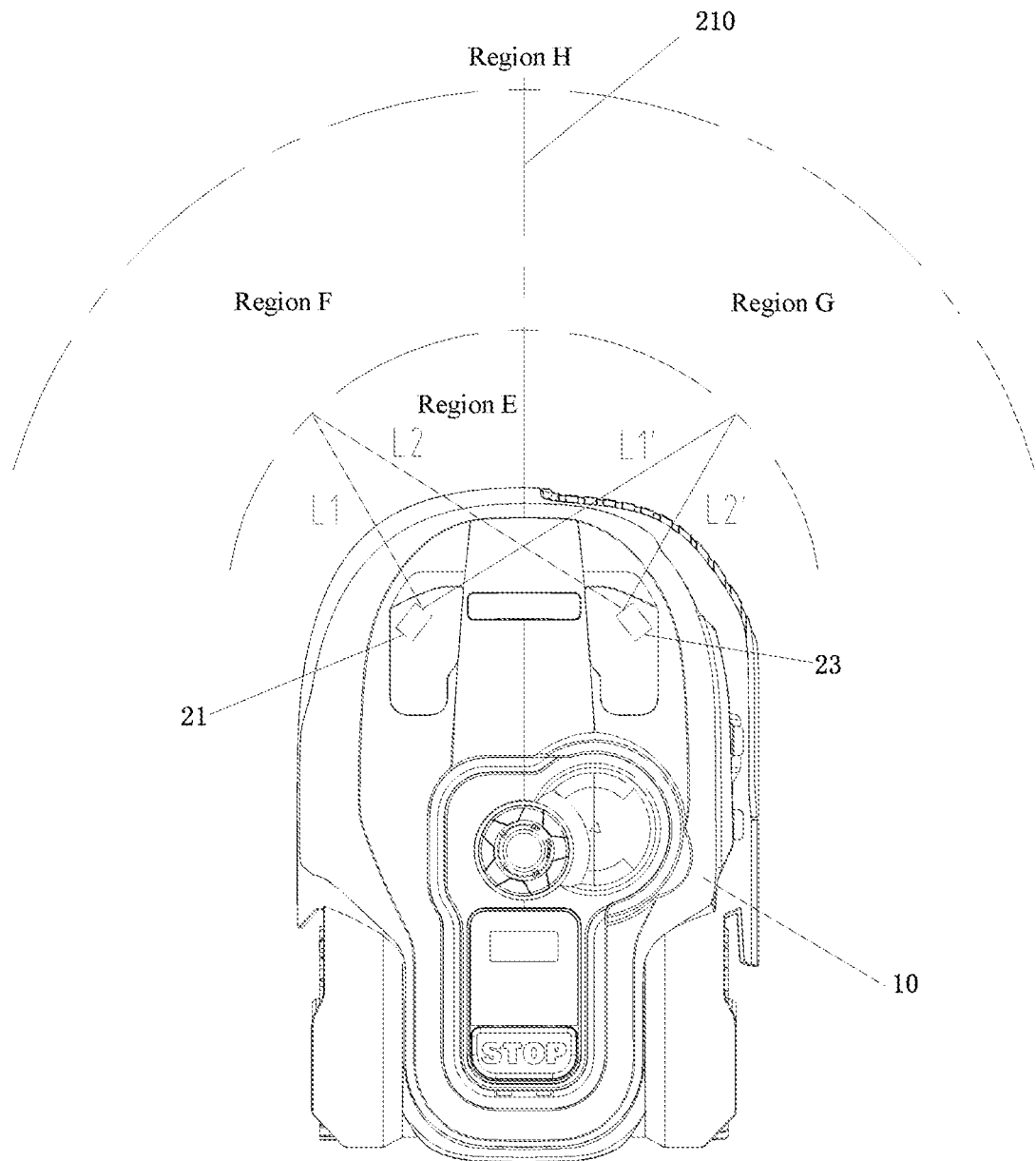
FIG. 48 is a schematic diagram of region-based obstacle avoidance of an autonomous lawn mower according to the present invention.
Figure 49:
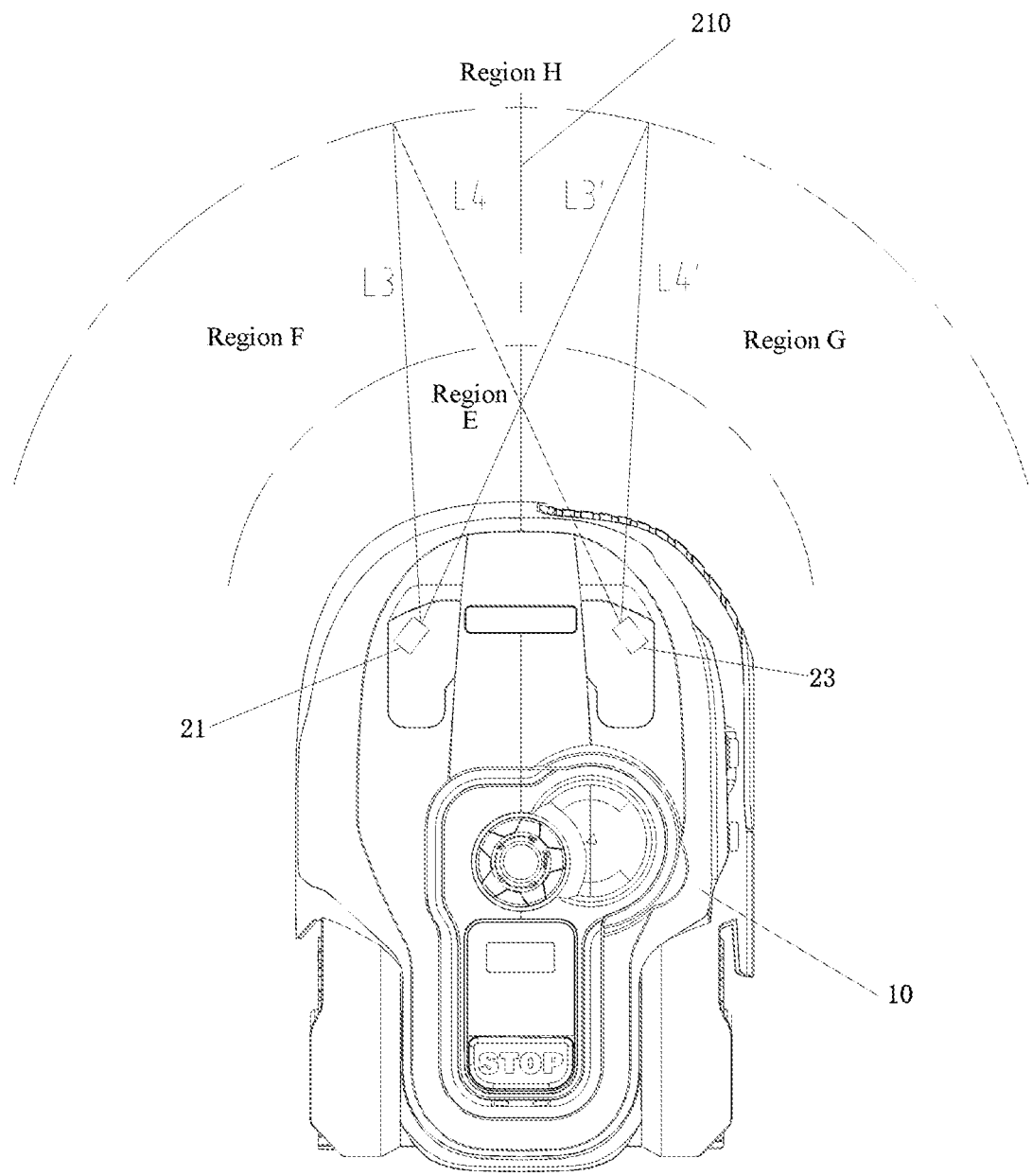
FIG. 49 is a schematic diagram of region-based obstacle avoidance of an autonomous lawn mower according to the present invention.

As shown in FIG. 48 and FIG. 49, in the autonomous lawn mower in a preferred embodiment of the present invention, the autonomous lawn mower may select an obstacle-avoidance logic according to three virtual detection regions formed by the control module, and may further perform virtual region-based obstacle avoidance by using a preset distance L. As shown in FIG. 48 and FIG. 49, FIG. 48 and FIG. 49 are schematic diagrams of region-based obstacle avoidance of the autonomous lawn mower. The housing 10 has a housing axis 210 extending in a longitudinal direction. The control module 30 provides a virtual region E closest to the housing in front of the housing 10, a region F and a region G that are located in front of the region E, and a region H that is located in front of the region F and the region G. The region F and the region G are divided by an axis as a dividing line and are respectively located on two sides of the housing axis 210. A detection range of the ultrasonic sensor assembly 20 at least covers the region E, the region F, and the region G. A damaging collision occurs between the autonomous lawn mower and the obstacle when the autonomous lawn mower moves forward or turns in the region E. No damaging collision occurs between the autonomous lawn mower and the obstacle the autonomous lawn mower turns right in the region F. No damaging collision occurs between the autonomous lawn mower and the obstacle when the autonomous lawn mower turns left in the region G. No damaging collision occurs between the autonomous lawn mower and the obstacle when the autonomous lawn mower moves forward or turns in the region H. When an obstacle is detected in the region E, the control module controls the autonomous lawn mower to execute an obstacle-avoidance measure of reversing. When obstacles are detected in both the region F and the region G, the control module controls the autonomous lawn mower to execute an obstacle-avoidance measure of reversing. When an obstacle is detected in only the region F, the control module controls the autonomous lawn mower to execute an obstacle-avoidance measure of turning right or reversing. When an obstacle is detected in only the region G, the control module controls the autonomous lawn mower to execute an obstacle-avoidance measure of turning left or reversing. When an obstacle is detected in the region H, the control module controls the autonomous lawn mower to execute an obstacle-avoidance measure of moving forward or reversing or turning. When an obstacle is detected in none of the region E, the region F, and the region G, the control module controls the autonomous lawn mower to execute an obstacle-avoidance measure of moving forward or reversing or turning.

As shown in FIG. 48, a region that is in the region F and the region G and is located near the housing axis 210 is an obstacle-avoiding margin region. The autonomous lawn mower sometimes cannot turn left or right in the region. Therefore, an obstacle-avoidance measure of reversing may be directly used in the region. An area of the margin region is mainly related to a speed of the autonomous lawn mower and a width of the machine. The control module 30 may calculate, according to a distance from an obstacle, the speed of the autonomous lawn mower, structural parameters of a body, and a turning radius and by using an algorithm, which obstacle-avoidance logic can be used to avoid a collision with the obstacle. The division of the region E may be virtually set according to a preset distance. The division may be set in a software manner. As a movement speed of the autonomous lawn mower varies, the range of the virtual region E changes. In this way, short-distance non-contact obstacle avoidance can be implemented to the greatest extent, thereby improving the reachability of the autonomous lawn mower. A requirement of setting the region E is that in the range of the region E, the autonomous lawn mower can only adopt an obstacle-avoidance measure of reversing. During software control, because size information (for example, a length, a width, and a chamfer curvature of a side surface at a front end) of the machine and performance parameters (for example, a braking capability, and a signal transfer speed) of the machine are all set in the machine, the machine automatically determines the range of the region E by combining the preset distance and the current movement speed.

As shown in FIG. 48, the autonomous lawn mower 100 in the first embodiment is used as an example. In the range of the region E, a sum of L and L2 is a constant value, a sum of L1' and L2' is a constant value, L1 is a distance from an axial center of a first ultrasonic sensor to an obstacle, and L2 is a distance from an axial center of a second ultrasonic sensor to the obstacle. As shown in FIG. 49, similarly, in the range of the region F and the region G, a sum of L3 and L4 is a constant value, a sum of L3' and L4' is a constant value, L3 is a distance from an axial center of a first ultrasonic sensor to an obstacle, and L4 is a distance from an axial center of a second ultrasonic sensor to the obstacle. The description of obstacle avoidance in the embodiment in FIG. 48 and FIG. 49 of the present invention is also applicable to the autonomous lawn mowers 100, 200, 300, and 400 in the foregoing four embodiments of the present invention.

Figure 50:
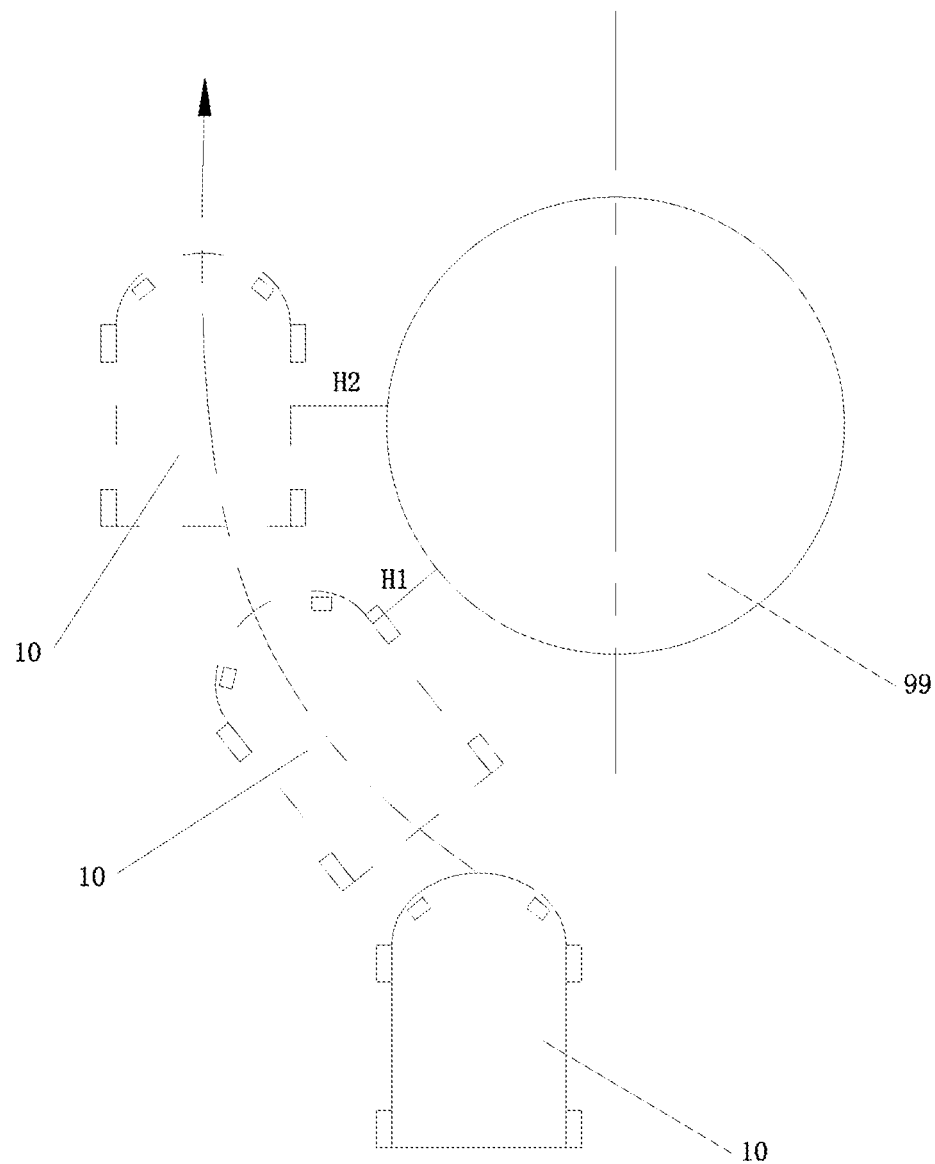
FIG. 50 is a diagram of a trajectory along which an autonomous lawn mower avoids an obstacle according to the present invention.

As shown in FIG. 50, FIG. 50 is a logic diagram of obstacle avoidance performed by the autonomous lawn mower according to the present embodiment. The autonomous lawn mower of the present embodiment is kept at a particular distance from an obstacle 99 during obstacle avoidance, and both distances H1 and H2 are greater than 0. The autonomous lawn mower of the present embodiment can implement non-contact obstacle avoidance. The circle in FIG. 50 represents an assumed obstacle 99.

Figure 42:
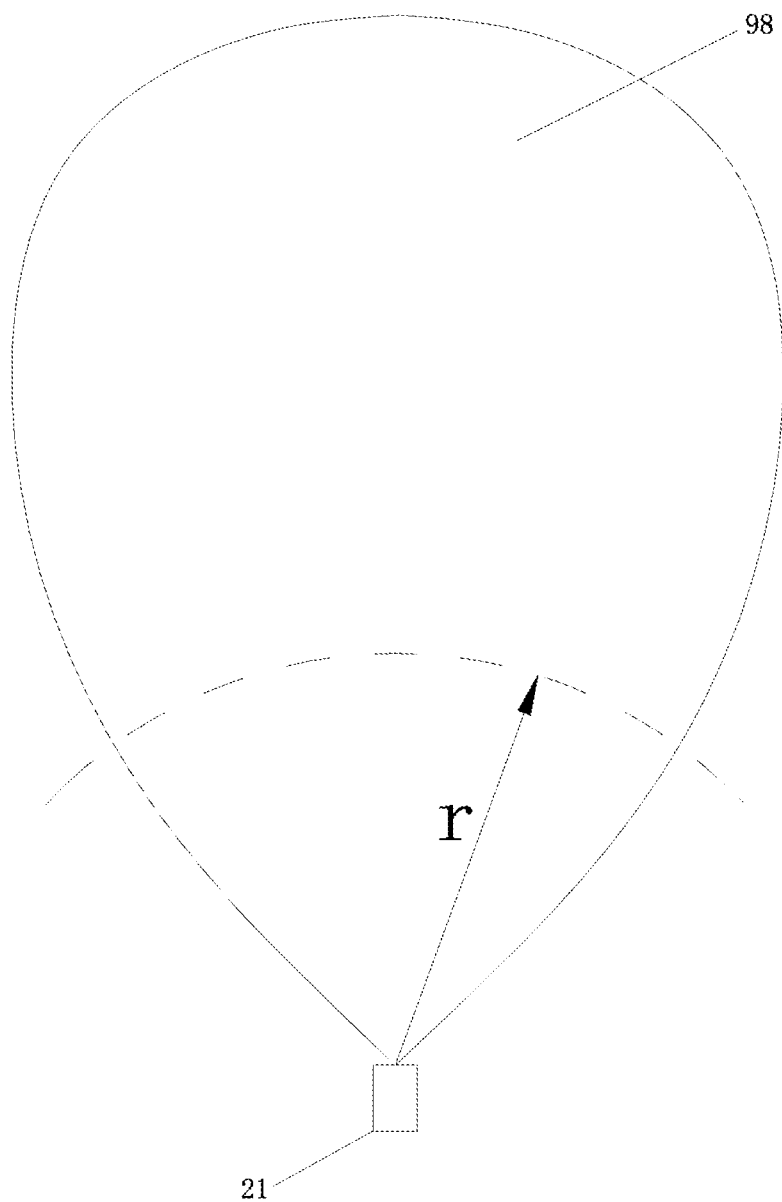
FIG. 42 is a schematic diagram of a blind area of an ultrasonic sensor of an autonomous lawn mower of the present invention.

Embodiment of resolving a problem of short-distance non-contact obstacle avoidance As shown in FIG. 42, a common ultrasonic sensor 21 that integrates transmission and reception needs to transmit ultrasound and receive an echo from an obstacle, and therefore there is a blind area problem. A forming principle of a blind area is as follows: One high voltage pulse is used to transmit ultrasound. After the pulse ends, an ultrasonic sensor has an aftershock that lasts a relatively long time. In a period of time of the aftershock, a reflected wave signal of a sound wave cannot be distinguished from a transmitted wave signal, and as a result a distance-measurement blind area of the ultrasonic sensor is formed. A distance-measurement blind area varies correspondingly as a time length of the aftershock varies. A blind area radius of the distance-measurement blind area of the ultrasonic sensor is usually greater than 30 centimeters. Therefore, as shown in FIG. 43, FIG. 43(a) shows a preset distance S1 of an ultrasonic sensor that has a blind area, and FIG. 43(b) shows a preset distance S2 of the ultrasonic sensor for which a part of the blind area is resolved, where S2 (S1. If the blind area problem is completely resolved, S2 is smaller.

Therefore, if the blind area problem is not resolved, a self-moving device that uses an ultrasonic sensor as a non-contact obstacle-avoidance means cannot determine an obstacle whose distance from the ultrasonic sensor is less than 30 centimeters. Therefore, to avoid a collision with an obstacle, a distance for the self-moving device to adopt a responsive action needs to be greater than the blind area radius, that is, the preset distance (a distance at which obstacle avoidance needs to be performed) needs to be greater than the blind area radius. In this case, the reachability of the body of the self-moving device is affected. Regarding the blind area problem, in the prior art, a hardware improvement may be made to reduce or eliminate blind areas, or a software algorithm may be used to reduce or eliminate blind areas. However, the applications of both the hardware improvement and the software algorithm require additional structural arrangements or algorithm processing. The self-moving device in this embodiment of the present invention can reduce or eliminate blind areas without making a hardware improvement or adding a software algorithm. This embodiment of resolving a problem of short-distance non-contact obstacle avoidance is described below with reference to specific embodiments.

Fifth Embodiment

A self-moving device in the fifth embodiment of the present invention has a structure and control that are the same as those of the autonomous lawn mower 100 in the first embodiment. Details are not described herein again, and the drawings are not provided repeatedly. The drawings of the autonomous lawn mower 100 in the first embodiment are directly used for description.

As shown in FIG. 6 and FIG. 8, a difference between the self-moving device in the fifth embodiment of the present invention and the autonomous lawn mower 100 in the first embodiment lies in that in a first arrangement manner (the first arrangement manner is the same as the first arrangement manner of the autonomous lawn mower 100 in the first embodiment) of the self-moving device in the fifth embodiment, the third detection region at least simultaneously covers a part of the distance-measurement blind area of the first ultrasonic sensor 21 and a part of the distance-measurement blind area of the second ultrasonic sensor 23.

As shown in FIG. 7 and FIG. 9, a difference between the self-moving device in the fifth embodiment of the present invention and the autonomous lawn mower 100 in the first embodiment lies in that in a second arrangement manner (the second arrangement manner is the same as the second arrangement manner of the autonomous lawn mower 100 in the first embodiment) of the self-moving device in the fifth embodiment, the position of the ultrasonic sensor assembly 20 is moved backward relative to the front end of the housing 10. For an ultrasonic sensor having a blind area, a part or the whole of the blind area of the ultrasonic sensor falls on the housing 10. Therefore, the third detection region does not need to cover the whole of distance-measurement blind area of the first ultrasonic sensor 21 and the distance-measurement blind area of the second ultrasonic sensor 23.

In an embodiment of the second arrangement manner of the self-moving device in the fifth embodiment, the third detection region only needs to simultaneously cover blind areas (the blind area of the first ultrasonic sensor and the blind area of the second ultrasonic sensor) located at the front end of the housing 10. Therefore, a specific value of the angle between the first ultrasonic sensor 21 and the second ultrasonic sensor 23 only needs to enable the third detection region to simultaneously cover the blind areas located at the front end of the housing 10.

As shown in FIG. 3 and FIG. 4, in the self-moving device in the fifth embodiment of the present invention, a range of the angle σ1 between the first ultrasonic sensor 21 and the second ultrasonic sensor 23 is 60° to 110°. In a preferred embodiment of the self-moving device in the fifth embodiment, the range of the angle σ1 of intersection between the first ultrasonic sensor 21 and the second ultrasonic sensor 23 is 70° to 90°. The angle of intersection between the first ultrasonic sensor 21 and the second ultrasonic sensor 23 in the value range of 70° to 90° can ensure that the overlapping detection region covers blind areas, and ultrasound transmitted by one of the ultrasonic sensors can further be prevented from being directly received by the other one of the ultrasonic sensors without being reflected by an obstacle, thereby reducing signal crosstalk between the first ultrasonic sensor 21 and the second ultrasonic sensor 23 and improving the accuracy of recognizing an obstacle. The foregoing angle between the first ultrasonic sensor 21 and the second ultrasonic sensor 23 is an angle between the first axis 211 and the second axis 231.

As shown in FIG. 5, in the self-moving device in the fifth embodiment of the present invention, relative to a housing axis 210, a range of the angle ω1 between the first axis 211 and the housing axis 210 is 10° to 80°, and a range of the angle ω2 between the second axis 231 and the housing axis 210 is 25° to 55°. Within the range of the angle, it can be ensured that the overlapping detection region covers blind areas, and ultrasound transmitted by one of the ultrasonic sensors can further be prevented from being directly received by the other one of the ultrasonic sensors without being reflected by an obstacle, thereby reducing signal crosstalk between the first ultrasonic sensor 21 and the second ultrasonic sensor 23 and improving the accuracy of recognizing an obstacle.

In the self-moving device in the fifth embodiment of the present invention, a specific value of the angle between the first ultrasonic sensor 21 and the second ultrasonic sensor 23 varies according to different intervals between the first ultrasonic sensor 21 and the second ultrasonic sensor 23 and different hardware parameters such as beam divergence angles of ultrasonic sensors. During actual application, the first ultrasonic sensor 21 and the second ultrasonic sensor 23 only need to be arranged to form an overlapping third detection region, and the third detection region only needs to at least simultaneously cover a part of the distance-measurement blind area of the first ultrasonic sensor 21 and a part of the distance-measurement blind area of the second ultrasonic sensor 23.

In the self-moving device in the fifth embodiment of the present invention, more than one ultrasonic sensor may receive an ultrasonic echo from an obstacle in the overlapping detection region. For example, the first ultrasonic sensor 21 sends ultrasound. When an obstacle exists in the overlapping detection region and the obstacle is located in a blind area range of the first ultrasonic sensor 21, because the blind area of the first ultrasonic sensor 21 still actually exists, the first ultrasonic sensor 21 cannot distinguish an ultrasonic echo from the obstacle from an aftershock generated after the first ultrasonic sensor 21 sends ultrasound. However, the second ultrasonic sensor 23 in the overlapping detection region can also receive an ultrasonic echo. In addition, for the second ultrasonic sensor 23, the position of the obstacle is not in the blind area range of the second ultrasonic sensor 23, or even if the position of the obstacle is in the blind area range of the second ultrasonic sensor 23, the second ultrasonic sensor 23 does not send ultrasound and is only responsible for receiving an echo from the obstacle at this time. Therefore, the second ultrasonic sensor 23 can determine an ultrasonic echo from the obstacle without being affected by crosstalk. Based on this principle, the first ultrasonic sensor 21 and the second ultrasonic sensor 23 are arranged intersecting each other at an angle, so that the distance-measurement blind area of the self-moving device can be shrunk or even eliminated, and the reachability of the self-moving device is improved. The improvement of the reachability of the self-moving device helps the self-moving device to adapt to different working conditions. Because test blind areas of the ultrasonic sensors are shrunk or eliminated, the preset distance may be set to be smaller, and an obstacle can be detected at a short distance while non-contact obstacle avoidance is implemented. For the self-moving device, a short distance may enable a lawn mower to cut more grass, thereby improving the working efficiency.

In the self-moving device in the fifth embodiment of the present invention, by only using a design in which two ultrasonic sensors intersect each other, a blind area problem can be resolved, the reachability can be improved, a direction of an obstacle can be obtained, and problems in different working conditions (for example, a slope, a narrow channel, a side wall) can further be resolved. The different working conditions are described as follows. The self-moving device in the fifth embodiment of the present invention uses a small number of parts, has a convenient arrangement of parts, resolves many problems, and reduces use costs.

In other implementations of the self-moving device in the fifth embodiment of the present invention, by referring to the autonomous lawn mower 100 in the first embodiment, three or more ultrasonic sensors may be disposed similarly, and areas of overlapping regions are sequentially increased to ensure comprehensiveness of coverage for blind areas. An arrangement manner of the three or more ultrasonic sensors, definition of signal transmission and reception, and position determining of an obstacle are the same as those of the autonomous lawn mower 100 in the first embodiment.

Sixth Embodiment

A self-moving device in the sixth embodiment of the present invention has a structure and control that are the same as those of the autonomous lawn mower 200 in the second embodiment. Details are not described herein again, and the drawings are not provided repeatedly. The drawings of the autonomous lawn mower 200 in the second embodiment are directly used for description.

As shown in FIG. 13, a difference between the self-moving device in the sixth embodiment of the present invention and the autonomous lawn mower 200 in the second embodiment lies in that in a first arrangement manner (the first arrangement manner is the same as the first arrangement manner of the autonomous lawn mower 200 in the second embodiment) of the self-moving device in the sixth embodiment, the third detection region at least simultaneously covers a part of the distance-measurement blind area of the first ultrasonic sensor 41 and a part of the distance-measurement blind area of the second ultrasonic sensor 43.

As shown in FIG. 14, a difference between the self-moving device in the sixth embodiment of the present invention and the autonomous lawn mower 200 in the second embodiment lies in that in a second arrangement manner (the second arrangement manner is the same as the second arrangement manner of the autonomous lawn mower 200 in the second embodiment) of the self-moving device in the sixth embodiment, the position of the ultrasonic sensor assembly 20 is moved backward relative to the front end of the housing 10. For an ultrasonic sensor having a blind area, a part or the whole of the blind area of the ultrasonic sensor falls on the housing 10. Therefore, the third detection region does not need to cover the whole of the distance-measurement blind area of the first ultrasonic sensor 41 and the whole of the distance-measurement blind area of the second ultrasonic sensor 43. In an embodiment of the second arrangement manner of the self-moving device in the sixth embodiment, the third detection region only needs to simultaneously cover blind areas (the blind area of the first ultrasonic sensor and the blind area of the second ultrasonic sensor) located at the front end of the housing 10.

In the self-moving device in the sixth embodiment of the present invention, more than one ultrasonic sensor may receive an ultrasonic echo from an obstacle in the overlapping detection region. For example, the first ultrasonic sensor 41 sends ultrasound. When an obstacle exists in the overlapping detection region and the obstacle is located in a blind area range of the first ultrasonic sensor 41, because the blind area of the first ultrasonic sensor 41 still actually exists, the first ultrasonic sensor 41 cannot distinguish an ultrasonic echo from the obstacle from an aftershock generated after the first ultrasonic sensor 41 sends ultrasound. However, the second ultrasonic sensor 43 in the overlapping detection region can also receive an ultrasonic echo. In addition, for the second ultrasonic sensor 43, the position of the obstacle is not in the blind area range of the second ultrasonic sensor 43, or even if the position of the obstacle is in the blind area range of the second ultrasonic sensor 43, the second ultrasonic sensor 43 does not send ultrasound and is only responsible for receiving an echo from the obstacle at this time. Therefore, the second ultrasonic sensor 43 can determine an ultrasonic echo from the obstacle without being affected by crosstalk. Based on this principle, the first ultrasonic sensor 41 and the second ultrasonic sensor 43 are arranged intersecting each other at an angle, so that the distance-measurement blind area of the self-moving device can be shrunk or even eliminated, and the reachability of the self-moving device is improved. The improvement of the reachability of the self-moving device helps the self-moving device to adapt to different working conditions. Because test blind areas of the ultrasonic sensors are shrunk or eliminated, the preset distance may be set to be smaller, and an obstacle can be detected at a short distance while non-contact obstacle avoidance is implemented. For the self-moving device, a short distance may enable a lawn mower to cut more grass, thereby improving the working efficiency.

In the self-moving device in the sixth embodiment of the present invention, only two ultrasonic sensors are disposed in parallel to enable detection regions of the ultrasonic sensors to overlap, so that a reachability problem can be resolved, a problem of obtaining a direction of an obstacle can be resolved, and a problem of different working conditions (for example, a slope) can further be resolved. The self-moving device in the sixth embodiment of the present invention uses a small number of parts, has a convenient arrangement of parts, resolves many problems, and reduces use costs.

In another implementation of the self-moving device in the sixth embodiment of the present invention, referring to the autonomous lawn mower 200 in the second embodiment, three or more ultrasonic sensors may be disposed similarly, and areas of overlapping regions are sequentially increased to ensure comprehensiveness of coverage for blind areas. An arrangement manner of the three or more ultrasonic sensors, definition of and signal transmission and reception, and position determining of an obstacle are the same as those of the autonomous lawn mower 200 in the second embodiment.

Seventh Embodiment

A self-moving device in the seventh embodiment of the present invention has a structure and control that are the same as those of the autonomous lawn mower 300 in the third embodiment. Details are not described herein again, and the drawings are not provided repeatedly. The drawings of the autonomous lawn mower 300 in the third embodiment are directly used for description.

As shown in FIG. 18, a difference between the self-moving device in the seventh embodiment of the present invention and the autonomous lawn mower 300 in the third embodiment lies in that in a first arrangement manner (the first arrangement manner is the same as the first arrangement manner of the autonomous lawn mower 300 in the third embodiment) of the self-moving device in the seventh embodiment, an overlapping region formed by the third ultrasonic sensor 65 and the first ultrasonic sensor 61 intersecting each other covers the distance-measurement blind area of the first ultrasonic sensor 61, and an overlapping region formed by the second ultrasonic sensor 63 and the fourth ultrasonic sensor 67 intersecting each other covers the distance-measurement blind area of the second ultrasonic sensor 63. In this embodiment, in the blind area range of the first ultrasonic sensor 61, the third ultrasonic sensor 65 can accurately receive an ultrasonic echo from an obstacle, and in the blind area range of the second ultrasonic sensor 63, the fourth ultrasonic sensor 67 can accurately receive an ultrasonic echo from an obstacle, so that a blind area can be shrunk or eliminated.

As shown in FIG. 19, a difference between the self-moving device in the seventh embodiment of the present invention and the autonomous lawn mower 300 in the third embodiment lies in that in a second arrangement manner (the second arrangement manner is the same as the first arrangement manner of the autonomous lawn mower 300 in the third embodiment) of the self-moving device in the seventh embodiment, the position of the ultrasonic sensor assembly 20 is moved backward relative to the front end of the housing 10. For an ultrasonic sensor having a blind area, a part or the whole of the blind area of the ultrasonic sensor falls on the housing 10. Therefore, the third detection region and the fourth detection region do not need to cover both the distance-measurement blind area of the first ultrasonic sensor 61 and the distance-measurement blind area of the second ultrasonic sensor 63. In an embodiment of the second arrangement manner of the autonomous lawn mower 300 in the seventh embodiment, the third detection region and the fourth detection region only need to respectively cover blind areas (the blind area of the first ultrasonic sensor and the blind area of the second ultrasonic sensor) located at the front end of the housing 10.

As shown in FIG. 18 and FIG. 19, during actual application, the arrangement of the third ultrasonic sensor 65 and the fourth ultrasonic sensor 67 only needs to achieve that an overlapping third detection region and an overlapping fourth detection region can be formed, the third detection region can at least cover a part of the distance-measurement blind area of the first ultrasonic sensor 61, and the fourth detection region can at least cover a part of the distance-measurement blind area of the second ultrasonic sensor 63.

In an embodiment of the first arrangement manner of the self-moving device in the seventh embodiment of the present invention, more than one ultrasonic sensor may receive an ultrasonic echo from an obstacle in the overlapping detection region. For example, the first ultrasonic sensor 61 sends ultrasound. When an obstacle exists in the overlapping detection region and the obstacle is located in a blind area range of the first ultrasonic sensor 61, because the blind area of the first ultrasonic sensor 61 still actually exists, the first ultrasonic sensor 61 cannot distinguish an ultrasonic echo from the obstacle from an aftershock generated after the first ultrasonic sensor 61 sends ultrasound. However, the third ultrasonic sensor 65 in the overlapping detection region can also receive an ultrasonic echo. In addition, the third ultrasonic sensor 65 does not send ultrasound and is only responsible for receiving an echo from the obstacle. Therefore, the third ultrasonic sensor 65 can determine an ultrasonic echo from the obstacle without being affected by crosstalk. Based on this principle, the first ultrasonic sensor 61 and the third ultrasonic sensor 65 are arranged intersecting each other at an angle. The second ultrasonic sensor 63 and the fourth ultrasonic sensor 67 are arranged intersecting each other at an angle, so that the distance-measurement blind area of the self-moving device in the seventh embodiment can be shrunk or even eliminated, and the reachability of the self-moving device is improved. The improvement of the reachability of the self-moving device helps the self-moving device in the seventh embodiment to adapt to different working conditions. Because test blind areas of the ultrasonic sensors are shrunk or eliminated, the preset distance may be set to be smaller, and an obstacle can be detected at a short distance while non-contact obstacle avoidance is implemented. For a lawn mower, a short distance may enable the lawn mower to cut more grass, thereby improving the working efficiency. An overlapping region formed by the first ultrasonic sensor 61 and the third ultrasonic sensor 65 intersecting each other covers the distance-measurement blind area of the first ultrasonic sensor 61, and an overlapping region formed by the second ultrasonic sensor 63 and the fourth ultrasonic sensor 67 intersecting each other covers the distance-measurement blind area of the second ultrasonic sensor 63.

As shown in FIG. 17, in the self-moving device in the seventh embodiment of the present invention, a range of an angle $\gamma 1$ between the first ultrasonic sensor 61 and the third ultrasonic sensor 65 is 10° to 80°. In a preferred embodiment of the self-moving device in the seventh embodiment, the range of the angle $\gamma 1$ of intersection between the first ultrasonic sensor 61 and the third ultrasonic sensor 65 is 25° to 55°. The value range of 25° to 55° can ensure that an overlapping detection region covers a blind area. The foregoing angle between the first ultrasonic sensor 61 and the third ultrasonic sensor 65 is an angle between the first axis 611 and the third axis 651. A range of an angle $\gamma 2$ between the second ultrasonic sensor 63 and the fourth ultrasonic sensor 67 is 10° to 80°. In a preferred embodiment of the self-moving device in the seventh embodiment, the range of the angle $\gamma 2$ of intersection between the second ultrasonic sensor 63 and the fourth ultrasonic sensor 67 is 25° to 55°. The value range of 25° to 55° can ensure that an overlapping detection region covers a blind area. The foregoing angle between the second ultrasonic sensor 63 and the fourth ultrasonic sensor 67 is an angle between the second axis 631 and the fourth axis 671.

Eighth Embodiment

A self-moving device in the eighth embodiment of the present invention has a structure and control that are the same as those of the autonomous lawn mower 400 in the fourth embodiment. Details are not described herein again, and the drawings are not provided repeatedly. The drawings of the autonomous lawn mower 400 in the fourth embodiment are directly used for description.

As shown in FIG. 23, a difference between the self-moving device in the eighth embodiment of the present invention and the autonomous lawn mower 400 (including only two ultrasonic sensors) in the fourth embodiment lies in that an overlapping detection region formed by the second ultrasonic sensor 83 and the first ultrasonic sensor 81 intersecting each other at least covers a part of the distance-measurement blind area of the first ultrasonic sensor 81.

As shown in FIG. 22, in a first arrangement manner (the first arrangement manner is the same as the first arrangement manner of the autonomous lawn mower 400 in the fourth embodiment) of the self-moving device in the eighth embodiment of the present invention, the second ultrasonic sensor 83 and the third ultrasonic sensor 85 are respectively arranged at an angle from the first ultrasonic sensor 81 to form the overlapping third detection region. The third detection region at least simultaneously covers a part of a first distance-measurement blind area in the first transceiver region, so that a blind area can be shrunk or eliminated.

As shown in FIG. 24, a difference between the self-moving device in the eighth embodiment of the present invention and the autonomous lawn mower 400 in the fourth embodiment lies in that in a second arrangement manner (the second arrangement manner is the same as the second arrangement manner of the autonomous lawn mower 400 in the fourth embodiment) of the self-moving device in the eighth embodiment, the position of the ultrasonic sensor assembly 20 is moved backward relative to the front end of the housing 10. For an ultrasonic sensor having a blind area, a part or the whole of the blind area of the ultrasonic sensor falls on the housing 10. An overlapping region formed by the second ultrasonic sensor 83 and the third ultrasonic sensor 85 being respectively disposed at an angle from the first ultrasonic sensor 81 does not need to cover the whole of the distance-measurement blind area of the first ultrasonic sensor 81, and the third detection region only needs to cover the blind area that is of the first ultrasonic sensor 81 and is located at the front end of the housing 10.

As shown in FIG. 21 and FIG. 22, in the self-moving device in the eighth embodiment of the present invention, a range of an angle ε2 between the second ultrasonic sensor 83 and the first ultrasonic sensor 81 is 10° to 80°. In a preferred embodiment of the self-moving device in the eighth embodiment, the range of the angle ε2 of intersection between the second ultrasonic sensor 83 and the first ultrasonic sensor 81 is 25° to 55°. The angle of intersection between the second ultrasonic sensor 83 and the first ultrasonic sensor 81 in the value range of 25° to 55° can ensure that an overlapping detection region covers a blind area. The foregoing angle between the second ultrasonic sensor 83 and the first ultrasonic sensor 81 is an angle between the second axis 831 and the first axis 811. A range of an angle ε3 between the third ultrasonic sensor 85 and the first ultrasonic sensor 81 is 10° to 80°. In a preferred embodiment of the self-moving device in the eighth embodiment, the range of the angle ε3 of intersection between the third ultrasonic sensor 85 and the first ultrasonic sensor 81 is 25° to 55°. The angle of intersection between the third ultrasonic sensor 85 and the first ultrasonic sensor 81 in the value range of 25° to 55° can ensure that an overlapping detection region covers a blind area. The foregoing angle between the third ultrasonic sensor 85 and the first ultrasonic sensor 81 is an angle between the third axis 851 and the first axis 811.

As shown in FIG. 21, in the self-moving device in the eighth embodiment of the present invention, only two ultrasonic sensors, namely, the second ultrasonic sensor 83 and the first ultrasonic sensor 81, may be included. The second ultrasonic sensor 83 and the first ultrasonic sensor 81 intersect to form an overlapping region. The second ultrasonic sensor 83 in the distance-measurement blind area of the first ultrasonic sensor 81 may receive an echo from the obstacle. The angle ε1 between the second ultrasonic sensor 83 and the first ultrasonic sensor 81 ranges from 10° to 80°. In a preferred embodiment of the self-moving device in the eighth embodiment, the angle ε1 of intersection between the 10 second ultrasonic sensor 83 and the first ultrasonic sensor 81 ranges from 25° to 550°.

In the self-moving device in the eighth embodiment of the present invention, because in the overlapping detection region, an independent ultrasonic sensor may receive an ultrasonic echo from an obstacle, and an ultrasonic sensor that is responsible for receiving an echo from an obstacle can determine an ultrasonic echo from the obstacle without being affected by crosstalk. Based on this principle, the distance-measurement blind area of the self-moving device in the eighth embodiment can be shrunk or even eliminated, and the reachability of the self-moving device is improved. The improvement of the reachability of the self-moving device helps the self-moving device to adapt to different working conditions. Because test blind areas of the ultrasonic sensors are shrunk or eliminated, the preset distance may be set to be smaller, and an obstacle can be detected at a short distance while non-contact obstacle avoidance is implemented. For the self-moving device, a short distance may enable the lawn mower to cut more grass, thereby improving the working efficiency.

Embodiment of Resolving a Slope Problem

Figure 37:
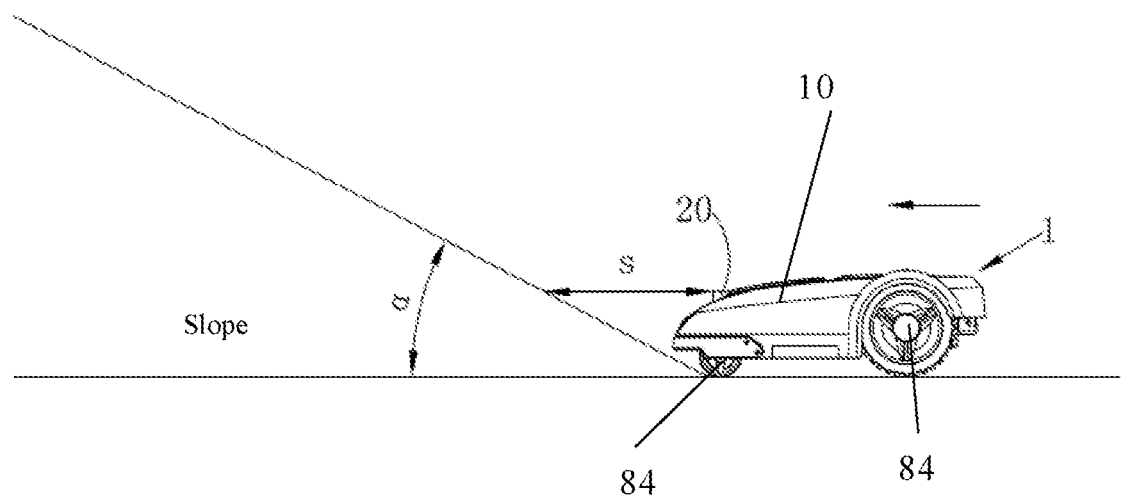
FIG. 37 is a schematic diagram when a distance between an axial center of an ultrasonic sensor and a slope is S as an autonomous lawn mower of the present invention is in a working condition of encountering a slope and reaches the foot of the slope.
Figure 38:
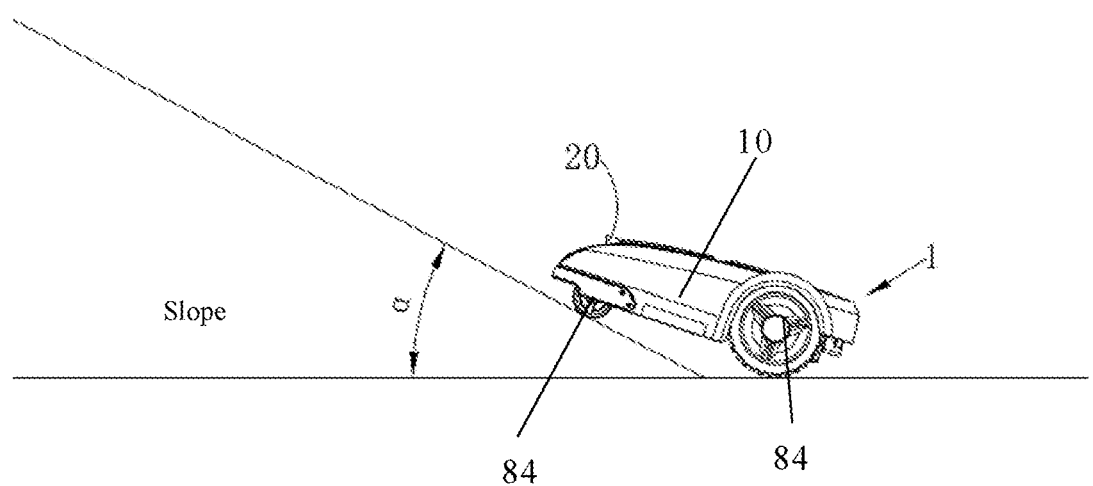
FIG. 38 is a schematic diagram when an autonomous lawn mower of the present invention is in a working condition of encountering a slope and starts to ascend the slope.
Figure 39:
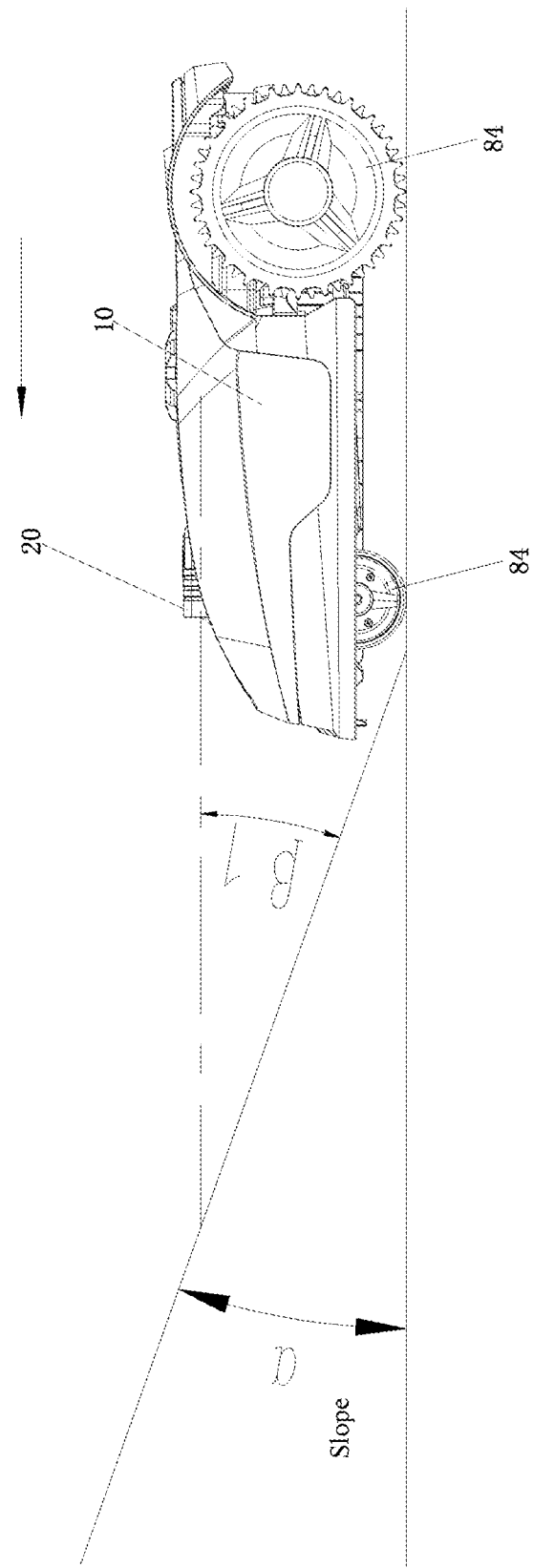
FIG. 39 is a schematic diagram of an angle between an axis of an ultrasonic sensor and a slope when an autonomous lawn mower of the present invention is in a working condition of encountering a slope and reaches the foot of the slope.
Figure 40:
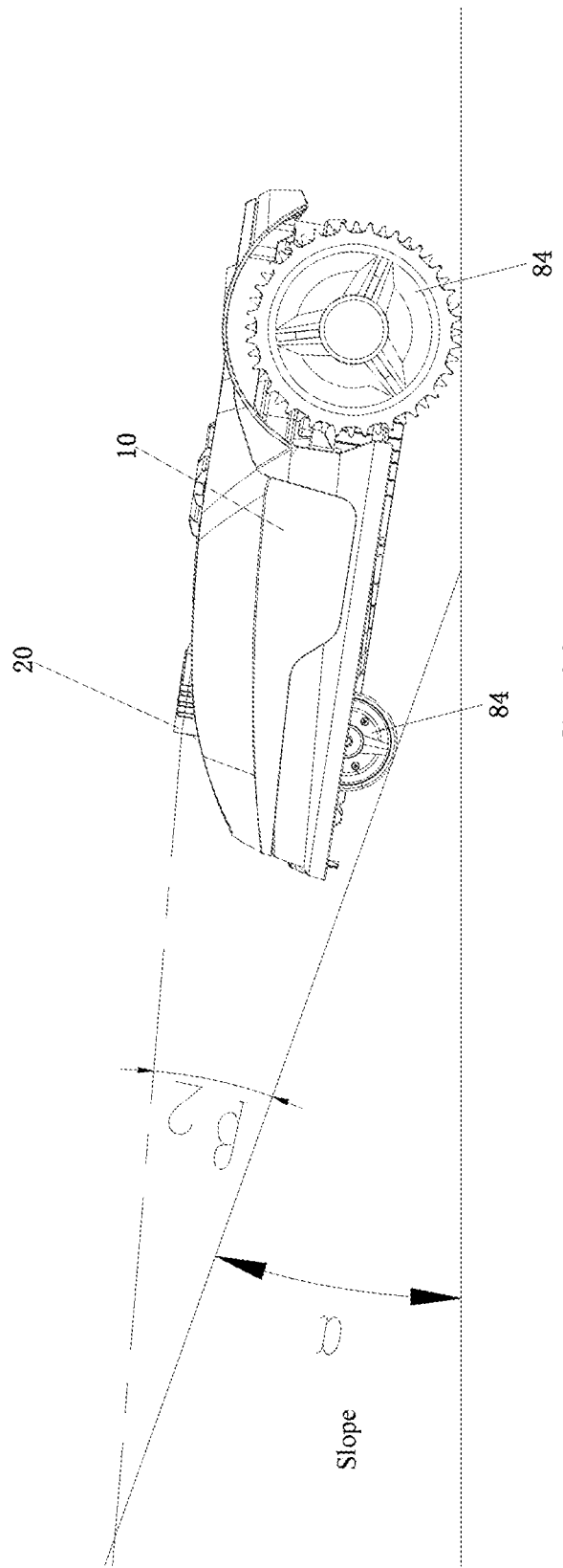
FIG. 40 is a schematic diagram of an angle between an axis of an ultrasonic sensor and a slope when an autonomous lawn mower of the present invention is in a working condition of encountering a slope and starts to ascend the slope.
Figure 41:
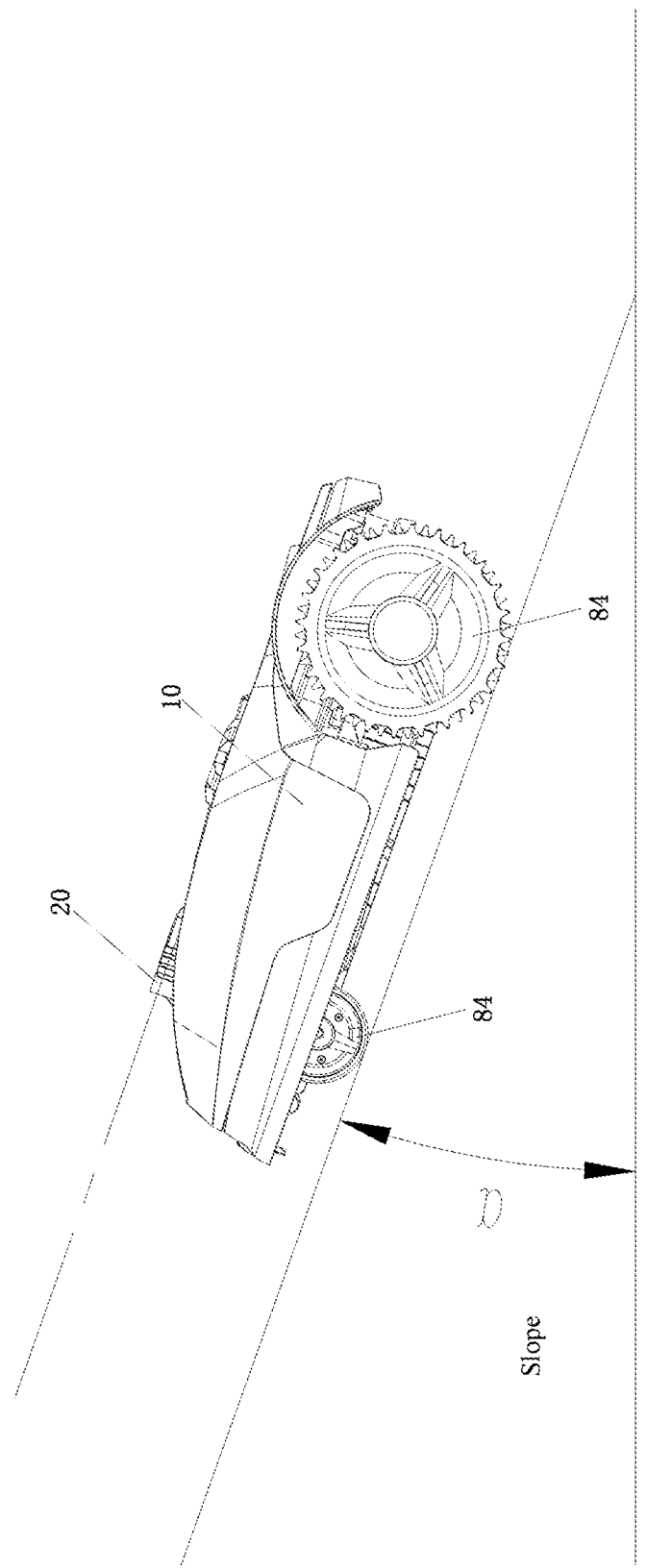
FIG. 41 is a schematic diagram when the axis of an ultrasonic sensor is parallel to the slope as an autonomous lawn mower of the present invention is in the working condition of encountering a slope and is completely on the slope.

As shown in FIG. 37 to FIG. 41, FIG. 37 to FIG. 41 are schematic diagrams of a working condition in which the self-moving device encounters a slope. An angle between an axis of a sensor and a slope in FIG. 39 is β1, and an angle between an axis of a sensor and a slope in FIG. 40 is β2. A slope whose slope angle is a exists in a forward movement direction of the self-moving device. As shown in FIG. 37, ultrasound transmitted by the ultrasonic sensor assembly 20 is blocked by the slope and is therefore reflected to the ultrasonic sensor assembly 20. A control module 30 analyzes and calculates, according to a time difference between the time when the ultrasonic sensor assembly 20 transmits a wave and the time when the ultrasonic sensor assembly 20 receives a reflected wave, a distance S between a position point where the reflected wave is generated and the self-moving device. When the sensor component 20 is disposed at a front end of a housing 10 of the self-moving device, the distance S is a distance detected by the ultrasonic sensor assembly. When the sensor component 20 is disposed at a position at a distance D from a front end of the housing 10, the distance S is a distance detected by the ultrasonic sensor assembly minus the distance D between the ultrasonic sensor and the front end of the housing 10. The control module 30 can only determine the distance S according to the time difference between transmission and reception of ultrasound but cannot determine specifically which object blocks ultrasound. The control module 30 compares a value of the distance S with a preset distance L. When S is less than or equal to L, the control module 30 controls the self-moving device to execute an obstacle-avoidance measure. The preset distance L is related to the reachability of the self-moving device. The preset distance L is specifically a smallest distance that is preset in the control module 30 and is between a front end of the housing 10 of the self-moving device and an obstacle, and is equivalent to a reachability distance of the body. Specifically, for a requirement of designing the preset distance L, refer to the foregoing.

In the prior art, because the self-moving device cannot implement short-distance detection, the value of the preset distance L is relatively large and is usually greater than the value of S. As a result, the self-moving device avoids a slope before even approaching the slope.

In another aspect, in the prior art, because an ultrasonic sensor usually has a distance-measurement blind area, the preset distance L needs to be greater than a distance-measurement blind area radius r. When the distance-measurement blind area radius r is relatively large or a slope at is relatively large, the distance S is already less than or equal to the preset distance L before the self-moving device moves to the foot position of a slope, and the control module 30 controls the self-moving device to execute an obstacle-avoidance measure. As a result, the self-moving device avoids the slope before approaching the slope. For a lawn mower, grass in a region on a slope stays uncut. The self-moving device in this embodiment of the present invention can detect an obstacle at a short distance and can directly ascend a slope without recognizing the slope. That is, the self-moving device of the present invention does not recognize a slope as an obstacle that needs to be avoided.

Figure 44:
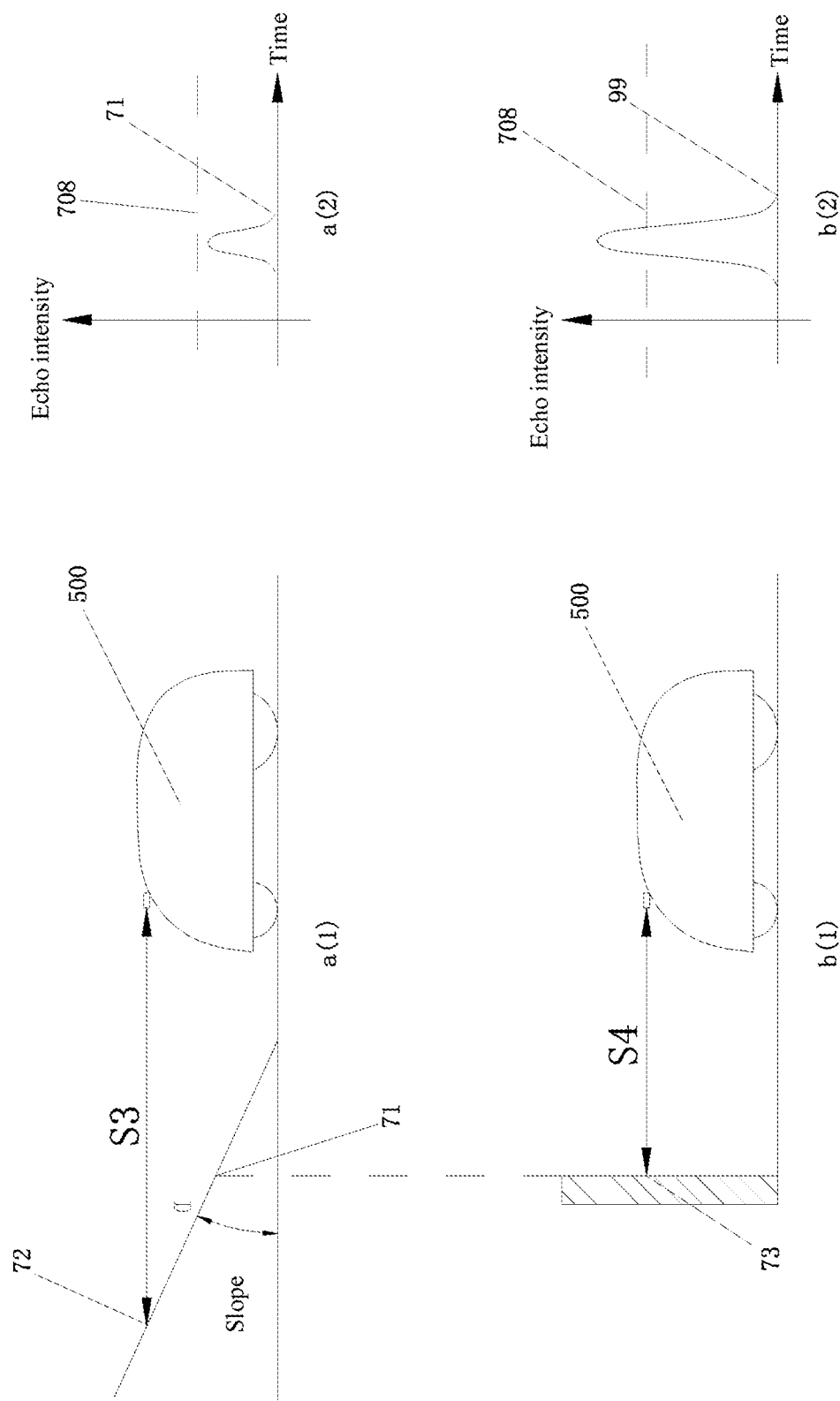
FIG. 44 is a schematic diagram of comparison between detection of a slope by an autonomous lawn mower of the present invention and detection of an ordinary obstacle at the same position by an autonomous lawn mower that has the same structure in the prior art.

As shown in FIG. 44, FIG. 44 shows cases of distance-measurement results of an ordinary obstacle and an obstacle corresponding to a slope and echo signals from the obstacles. FIG. 44a(1) shows that the self-moving device encounters a slope and a distance S3 is obtained. FIG. 44b(1) shows that the self-moving device encounters an ordinary obstacle 73 and a distance S4 is obtained. FIG. 44b(2) shows a case in which the self-moving device receives an ultrasonic echo from the obstacle 73, and a value of the intensity of the ultrasonic echo is greater than a reflected wave threshold 709. Therefore, the control module analyzes the received ultrasonic echo to determine that the obstacle 73 exists at the position. The same distance S4 corresponds to a first position 71 on the slope. However, although a field of view of the self-moving device may cover the first position 71 and the self-moving device can receive an ultrasonic echo transmitted by the first position 71, it can be learned from FIG. 44a(2) that a value of the intensity of an ultrasonic echo reflected from the first position 71 is less than the reflected wave threshold 709. Therefore, although an ultrasonic echo can be received, in practice, the control module does not consider the first position 71 as an obstacle that needs to be avoided. It can be learned from FIG. 44b(1) that a point of the obstacle detected by the self-moving device is actually at a second position 72. A distance between the second position 72 and an ultrasonic sensor of the self-moving device is S3, where S3>S4. That is, a distance actually measured by the self-moving device is relatively large in practice. Because the reachability of the self-moving device of the present invention is improved, the value of the preset distance L is relatively small. Therefore, even if the self-moving device reaches the foot of a slope, a measured distance is still greater than the preset distance L. Therefore, the self-moving device still continues to move forward to ascend the slope.

The embodiments of a slope are described below with reference to specific embodiments.

Ninth Embodiment

A self-moving device in the ninth embodiment of the present invention is identical with the self-moving device in the fifth embodiment. Details are not described herein again, and the drawings are not provided repeatedly. In the self-moving device in the ninth embodiment of the present invention, a field-of-view overlapping detection region formed by two ultrasonic sensors at an angle from each other covers blind areas, so that a distance-measurement blind area of the self-moving device can be shrunk or eliminated. The preset distance L does not need to be greater than or equal to a blind area radius r. The preset distance L may be a very small value, for example, about 5 centimeters. When the self-moving device moves to the foot of a slope, a distance S between a front end of the housing of the self-moving device and the slope is greater than the preset distance L. The self-moving device still moves forward in an original direction and ascends the slope from the foot. When the self-moving device is on the slope, the ultrasonic sensor assembly 20 has the same slope angle along with the housing 10, and ultrasound transmitted by the ultrasonic sensor assembly 20 is no longer blocked by the slope to generate reflection. Therefore, a probability that the self-moving device in this embodiment of the present invention determines a slope as an obstacle is greatly reduced, so as to avoid that the self-moving device does not enter a slope region to carry out work.

Tenth Embodiment

A self-moving device in the tenth embodiment of the present invention is identical with the self-moving device in the sixth embodiment. Details are not described herein again, and the drawings are not provided repeatedly. In the self-moving device in the tenth embodiment of the present invention, only two ultrasonic sensors are disposed in parallel, so that detection regions of the ultrasonic sensors overlap, and an overlapping detection region covers a blind area, so that the distance-measurement blind area of the self-moving device can be shrunk or eliminated. The preset distance L does not need to be greater than or equal to blind area radius r. The preset distance L may be a very small value, for example, about 5 centimeters. When the self-moving device moves to the foot of a slope, a distance S between a front end of the housing of the self-moving device and the slope is greater than the preset distance L. The self-moving device still moves forward in an original direction and ascends the slope from the foot. When the self-moving device is on the slope, the ultrasonic sensor assembly 20 has the same slope angle along with the housing 10. Ultrasound transmitted by the ultrasonic sensor assembly 20 is no longer blocked by the slope to generate reflection. Therefore, a probability that the self-moving device in this embodiment of the present invention determines a slope as an obstacle is greatly reduced, so as to avoid that the self-moving device does not enter a slope region to carry out work.

Eleventh Embodiment

A self-moving device in the eleventh embodiment of the present invention is identical with the self-moving device in the seventh embodiment. Details are not described herein again, and the drawings are not provided repeatedly. In the self-moving device in the eleventh embodiment of the present invention, an overlapping region formed by the third ultrasonic sensor 65 and the first ultrasonic sensor 61 intersecting each other covers the distance-measurement blind area of the first ultrasonic sensor 61, and an overlapping region formed by the second ultrasonic sensor 63 and the fourth ultrasonic sensor 67 intersecting each other covers the distance-measurement blind area of the second ultrasonic sensor 63. In this embodiment, in the blind area range of the first ultrasonic sensor 61, the third ultrasonic sensor 65 can accurately receive an ultrasonic echo from an obstacle. In the blind area range of the second ultrasonic sensor 63, the fourth ultrasonic sensor 67 can accurately receive an ultrasonic echo from an obstacle, so that a blind area can be shrunk or eliminated, and the reachability of the self-moving device in the eleventh embodiment is improved. Because the self-moving device in the eleventh embodiment of the present invention has desirable reachability, the preset distance L is relatively small. A distance that is detected by the self-moving device in the eleventh embodiment of the present invention and is between the self-moving device and a slope is greater than the preset distance L. Therefore, the self-moving device in the eleventh embodiment of the present invention directly implements slope ascending.

Twelfth Embodiment

A self-moving device in the twelfth embodiment of the present invention is identical with the self-moving device in the eighth embodiment. Details are not described herein again, and the drawings are not provided repeatedly. In the self-moving device in the twelfth embodiment of the present invention, because an independent ultrasonic sensor may receive an ultrasonic echo from an obstacle in an overlapping detection region, an ultrasonic sensor that is responsible for receiving an echo from an obstacle can determine an ultrasonic echo from the obstacle without being affected by crosstalk. Based on this principle, the distance-measurement blind area of the self-moving device in the twelfth embodiment can be shrunk or even eliminated, and the reachability of the self-moving device is improved. Because the self-moving device in the twelfth embodiment of the present invention has desirable reachability, the preset distance L is relatively small. A distance that is detected by the self-moving device in the twelfth embodiment of the present invention and is between the self-moving device and a slope is greater than the preset distance L. Therefore, the self-moving device in the eleventh embodiment of the present invention directly implements slope ascending.

Embodiment of Resolving a Problem of a Side Wall

Figure 45:
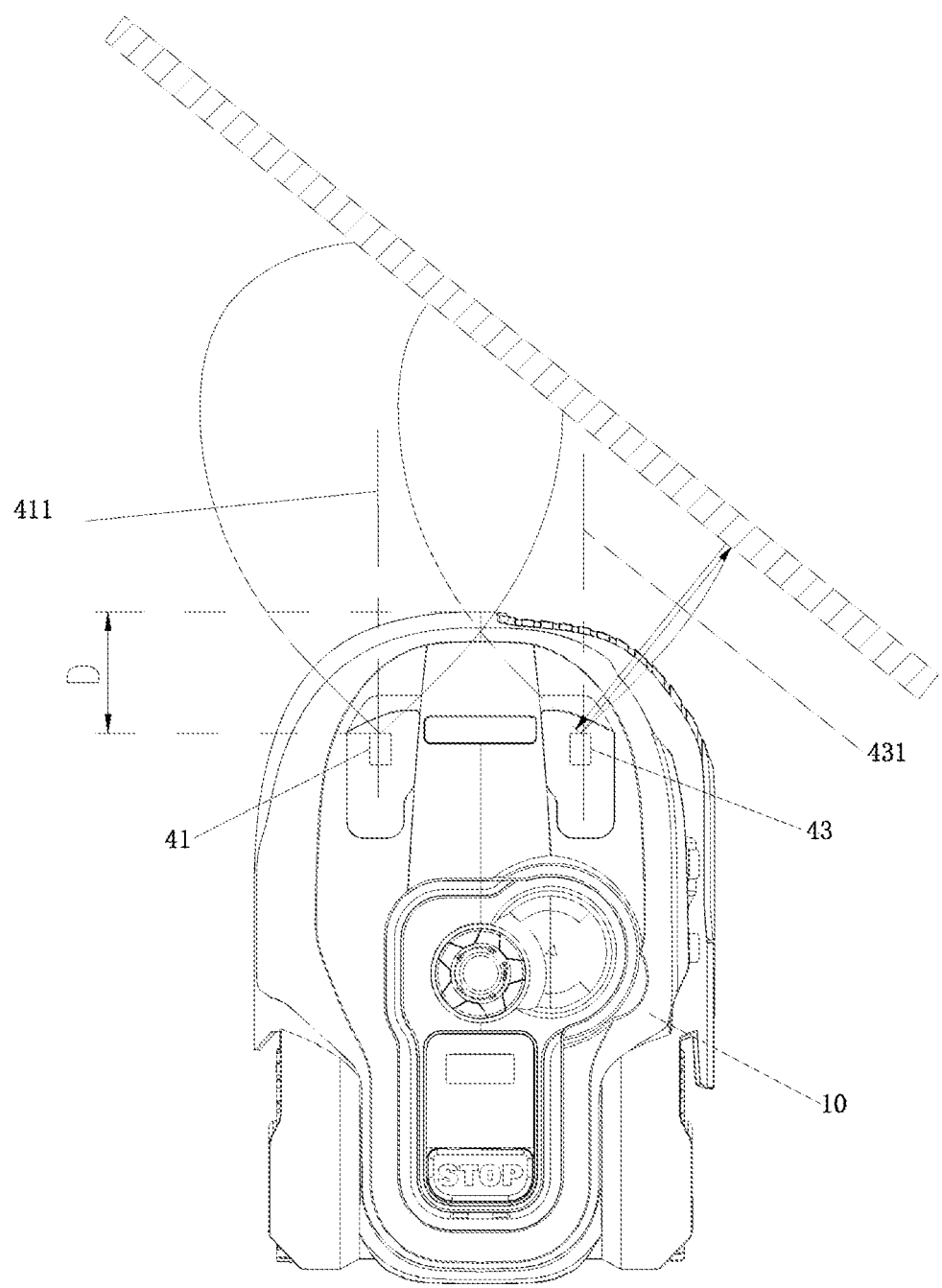
FIG. 45 is a schematic diagram of using the ultrasonic sensor assembly of the autonomous lawn mower 100 to detect a wall according to the first embodiment of the present invention.
Figure 46:
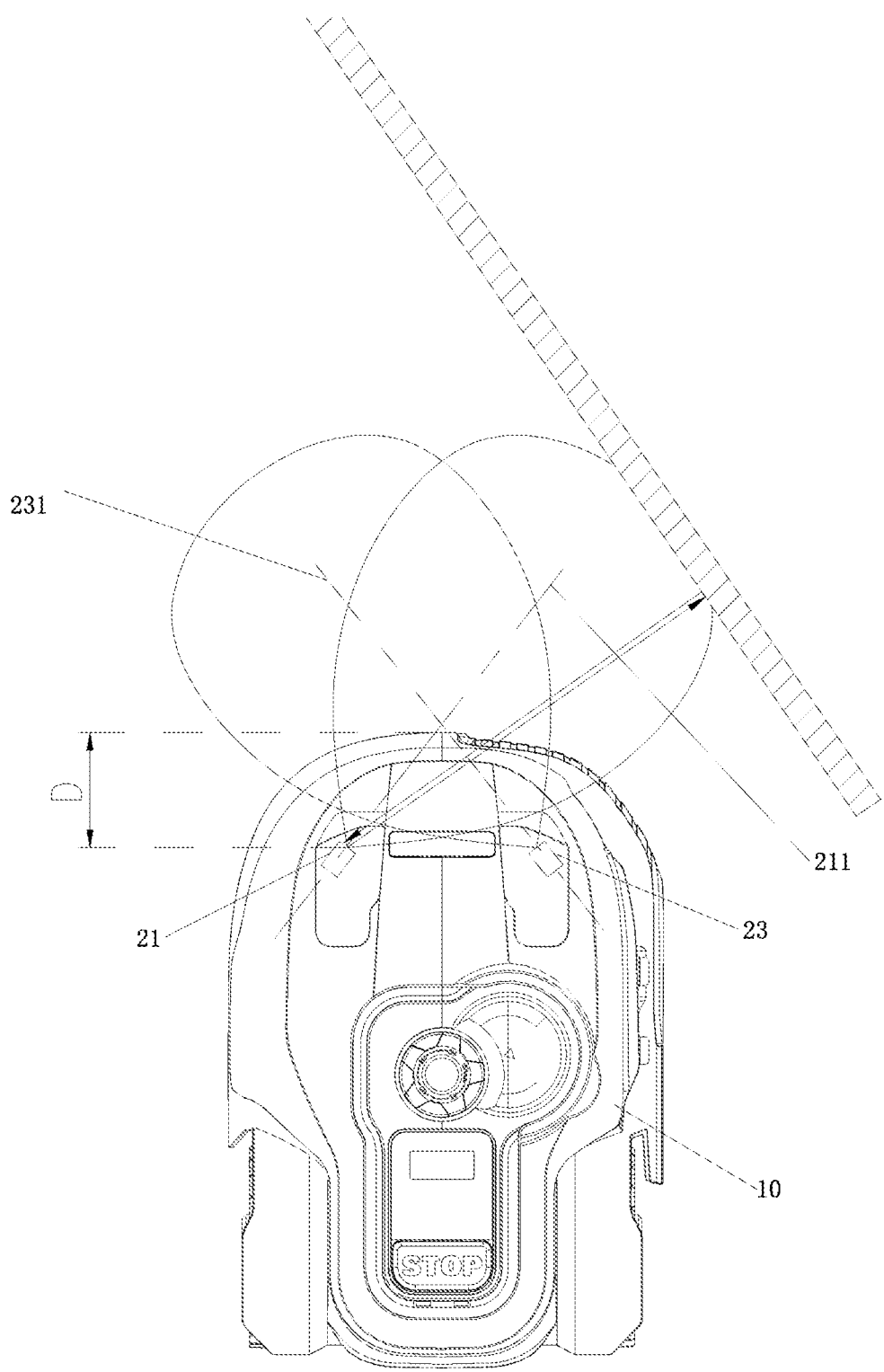
FIG. 46 is a schematic diagram of using the ultrasonic sensor assembly of the autonomous lawn mower 200 to detect a wall according to the second embodiment of the present invention.

As shown in FIG. 45 and FIG. 46, FIG. 45 and FIG. 46 are schematic diagrams of a working condition in which the self-moving device encounters a wall on an inclined side. As shown in FIG. 45, when the ultrasonic sensor is mounted forward horizontally, ultrasound sent by the ultrasonic sensor is transmitted forward, and the self-moving device cannot perform accurate recognition for a wall on an inclined side. After the ultrasound of the ultrasonic sensor is sent, the ultrasonic sensor may fail to receive an ultrasonic echo because the ultrasonic echo may be directly reflected away by the wall.

For such a special case, as shown in FIG. 46, the problem of a side wall can be resolved by using the structure of the autonomous lawn mower 100 according to the first embodiment of the present invention, that is, the solution in which at least two ultrasonic sensors are designed to be at an angle from each other. The fields of view of the two ultrasonic sensors intersect each other. Therefore, in any inclined state in which there is an angle between the self-moving device and the wall, one of the ultrasonic sensors can send ultrasound and receive an ultrasonic echo, so as to recognize the wall as an obstacle, and the forward movement direction of the self-moving device is changed. This process is repeated until neither of the two ultrasonic sensors receives an ultrasonic echo.

Embodiment of Resolving a Problem of a Narrow Channel

When a narrow channel exists in a working area, if the narrow channel has a relatively small width, because a distance for the self-moving device to adopt a responsive action needs to be greater than a blind area radius, the self-moving device turns left or right and still receives a reflected signal of ultrasound. As a result, a control module determines that the self-moving device remains in the middle of an obstacle, the self-moving device cannot pass through the narrow channel, and a function such as grass cutting or cleaning easily fails to be performed in a region near two sides of the channel.

Figure 47:
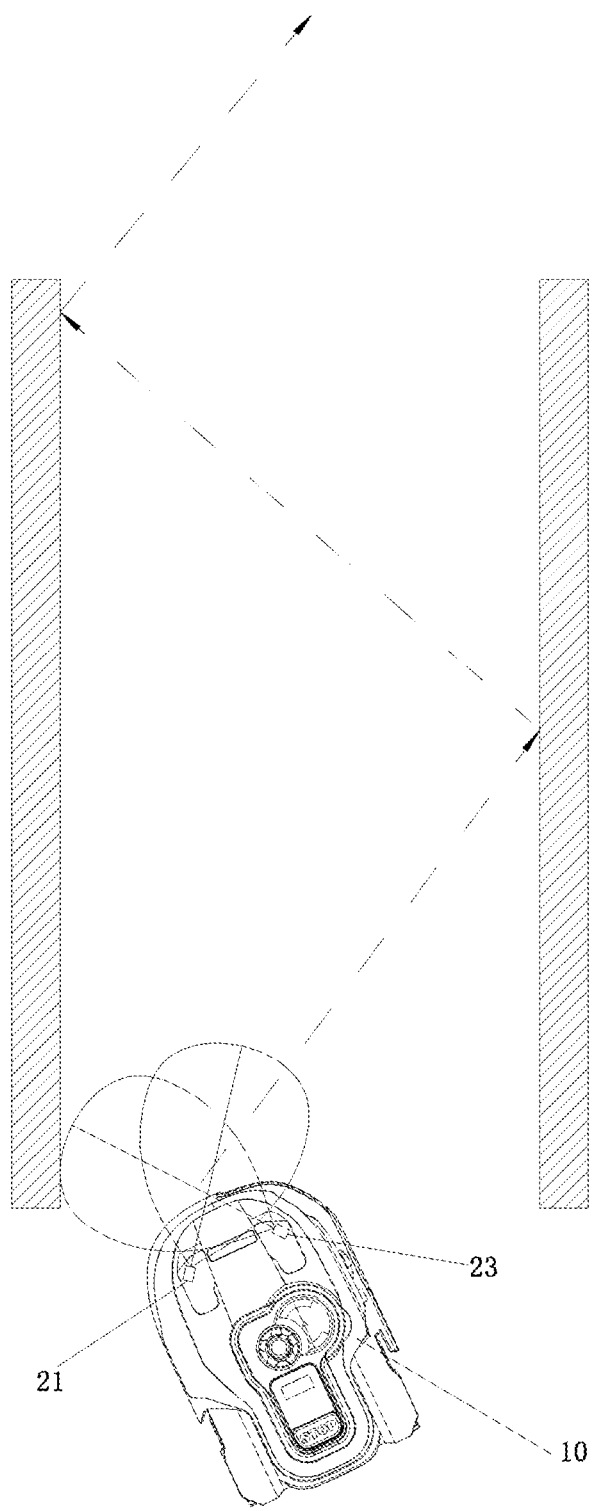
FIG. 47 is a schematic diagram of using the ultrasonic sensor assembly of the autonomous lawn mower 100 to pass through a narrow channel according to the first embodiment of the present invention.

As shown in FIG. 47, FIG. 47 is a schematic diagram of a working condition in which the self-moving device encounters a narrow channel. Compared with the prior art, if the arrangement manner of ultrasonic sensors in the autonomous lawn mower 100 according to the first embodiment of the present invention is used, that is, the solution in which at least two ultrasonic sensors are designed to be at an angle from each other is used, because fields of view of the two ultrasonic sensors intersect each other, the preset distance L is relatively small. In this case, the self-moving device may be closer to borders on two sides of the narrow channel. When the self-moving device arrives at the narrow channel, distances that are detected by the ultrasonic sensors and are between the two sides of the narrow channel and a moving robot are still greater than the preset distance L. Therefore, the moving robot can enter the narrow channel smoothly. After the moving robot enters the narrow channel, the two ultrasonic sensors are designed to be at an angle from each other, so that a forward movement direction of the moving robot can be adjusted constantly, so as to prevent the moving robot from colliding with the side walls of the narrow channel. Therefore, a probability that the self-moving device cannot pass through a narrow channel because the narrow channel has an excessively small width is reduced, and a width and a distance of a region near borders of two sides in which no work is carried out are reduced.

Embodiment of Resolving a Problem of Crosstalk Prevention

A self-moving device in a thirteenth embodiment of the present invention is identical with the autonomous lawn mower 100 in the first embodiment. Details are not described herein again, and the drawings are not provided repeatedly. A difference between the self-moving device in the thirteenth embodiment of the present invention and the autonomous lawn mower 100 in the first embodiment lies in that a physical isolating crosstalk prevention structure is provided between the first ultrasonic sensor 21 and the second ultrasonic sensor 23 of the self-moving device in the thirteenth embodiment. The crosstalk prevention structure may be an independent physical structure located between the first ultrasonic sensor 21 and the second ultrasonic sensor 23, or may be at least two physical structures that are respectively disposed outside or between the first ultrasonic sensor 21 and the second ultrasonic sensor 23.

As shown in FIG. 62, FIG. 63, and FIG. 53 to FIG. 58, the self-moving device further includes a crosstalk prevention structure 80, 89, configured to prevent ultrasound sent by one of the first ultrasonic sensor 21 and the second ultrasonic sensor 23 from being received directly by the other one of the two without being reflected by the obstacle. The crosstalk prevention structure 80, 89 is disposed between the first ultrasonic sensor 21 and the second ultrasonic sensor 23. The crosstalk prevention structure 80, 89 extends toward a front side of the housing 10 without coming into contact with an axis of an ultrasonic sensor. The crosstalk prevention structure 80, 89 extends toward a front side of the housing 10 without exceeding an intersection of projections of an axis of the first ultrasonic sensor and an axis of the second ultrasonic sensor. The crosstalk prevention structure 80, 89 is located on a front side of a connecting line between a sound wave transmission point of the first ultrasonic sensor 21 and a sound wave transmission point of the second ultrasonic sensor 23 and extends toward a front side of the housing. The crosstalk prevention structure 80, 89 includes a stop wall 801 disposed at an angle from an axis of an ultrasonic sensor.

Figure 62:
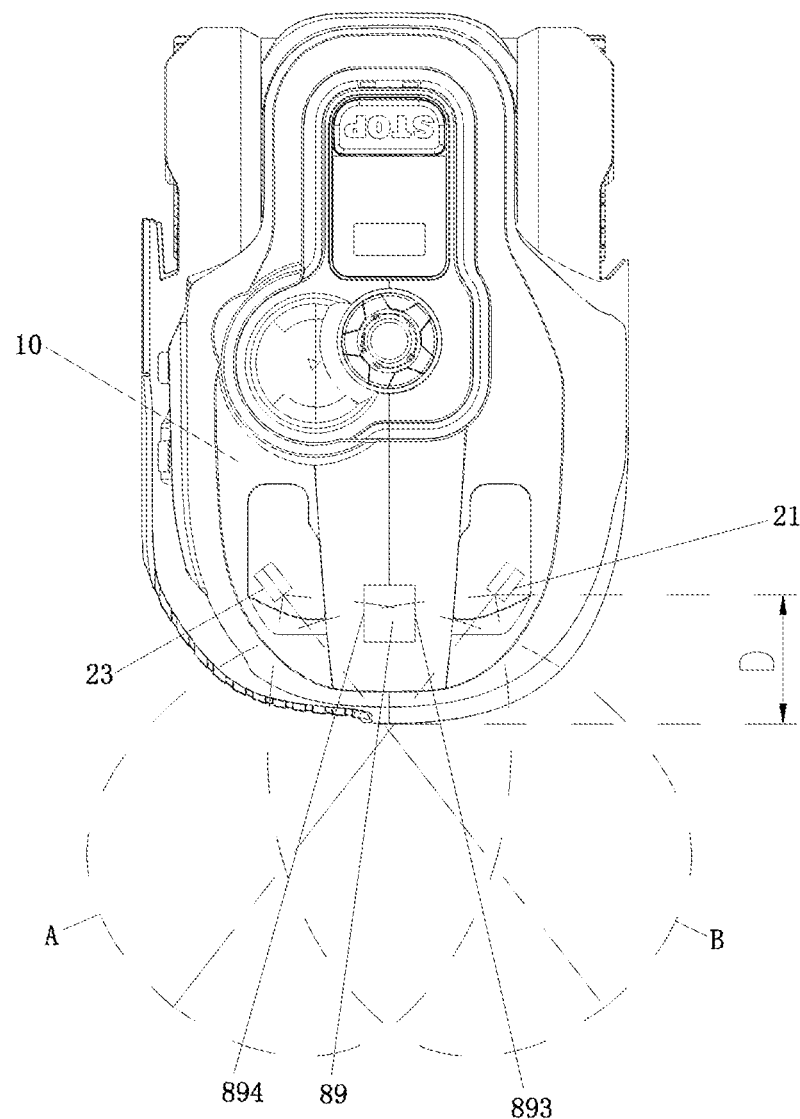
FIG. 62 is a schematic diagram of a position relationship between another crosstalk prevention structure and an ultrasonic sensor of an autonomous lawn mower according to the present invention.
Figure 63:
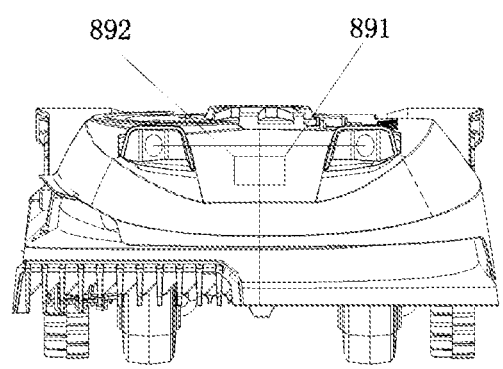
FIG. 63 is a schematic diagram of FIG. 62 from another angle.

As shown in FIG. 62 and FIG. 63, in the first embodiment of the crosstalk prevention structure 80, the crosstalk prevention structure 89 is provided between the first ultrasonic sensor 21 and the second ultrasonic sensor 23. The crosstalk prevention structure 89 includes two stop walls. One stop wall (that is, a first crosstalk prevention surface 893 below) faces the first transceiver region and partially extends into the first transceiver region. The other stop wall (that is, a second crosstalk prevention surface 894) faces the second transceiver region and partially extends into the second transceiver region. The first ultrasonic sensor 21 has a first axis 211, and the second ultrasonic sensor 23 has a second axis 231. The crosstalk prevention structure 89 has the first crosstalk prevention surface 893 facing the first ultrasonic sensor 21 and the second crosstalk prevention surface 894 facing the second ultrasonic sensor 23. The crosstalk prevention structure 89 is not beyond the first axis 211 and the second axis 231. The crosstalk prevention structure 89 has a first side 891 closest to the first axis 211 and a second side 892 closest to the second axis 231. The first side 891 is not beyond the first axis 211, and the second side 892 is not beyond the second axis 231. In this embodiment of the present invention, the first side 891 is one side of the first crosstalk prevention surface 893, and the second side 892 is one side of the second crosstalk prevention surface 894. The first crosstalk prevention surface 893 partially extends into the first transceiver region, and the second crosstalk prevention surface 894 partially extends into the second transceiver region. In this way, the crosstalk prevention structure 89 may block a transceiver region at a position where the first ultrasonic sensor 21 and the second ultrasonic sensor 23 are adjacent, so as to prevent signal crosstalk between the first ultrasonic sensor 21 and the second ultrasonic sensor 23.

As shown in FIG. 53, in the second embodiment of the crosstalk prevention structure, a crosstalk prevention structure 80 is provided on a periphery of each of the first ultrasonic sensor 21 and the second ultrasonic sensor 23, and each crosstalk prevention structure 80 has a stop wall 801. The two stop walls 801 partially extend into the first transceiver region and the second transceiver region respectively. The stop walls 801 of the first ultrasonic sensor 21 and the second ultrasonic sensor 23 correspond to the first crosstalk prevention surface 893 and the second crosstalk prevention surface 894 in the first embodiment. In this way, the crosstalk prevention structure 89 may block a transceiver region at a position where the first ultrasonic sensor 21 and the second ultrasonic sensor 23 are adjacent, thereby preventing signal crosstalk between the first ultrasonic sensor 21 and the second ultrasonic sensor 23. As shown in FIG. 2, the two crosstalk prevention structures 80 are disposed symmetrically along the housing axis 210.

FIG. 53 represents a difference between the case when a stop wall 801 is disposed and the case in which a stop wall 801 is not disposed. It can be learned from FIG. 53(a) that ultrasound sent by one ultrasonic sensor directly reaches the other adjacent ultrasonic sensor, that is, a field of view 98 of one ultrasonic sensor directly covers the other adjacent ultrasonic sensor. Because axes of the two ultrasonic sensors are disposed intersecting each other at an angle, a part of ultrasound sent by one ultrasonic sensor is directly received by the other adjacent ultrasonic sensor and causes crosstalk with ultrasound transmitted by the other adjacent ultrasonic sensor. It can be learned from FIG. 53(b) that after the stop wall 801 of the present invention is disposed, the field of view 98 formed by ultrasound sent by one ultrasonic sensor does not cover the other adjacent ultrasonic sensor, and therefore signal crosstalk between the ultrasonic sensors is avoided.

As shown in FIG. 54 to FIG. 58, the crosstalk prevention structure 80 further includes a mounting hole 802 corresponding to a sound-producing surface of an ultrasonic sensor, a top surface 803, and a virtual parallel plane 804 parallel to the top surface 803. The sound-producing surface of the ultrasonic sensor faces a mounting hole 802. The stop wall 801 includes a first stop wall 8011 and a second stop wall 8012. The first stop wall 8011 and the second stop wall 8012 have an integral structure or may have separate structures. When the first stop wall 8011 and the second stop wall 8012 have separate structures, the two structures are superimposed to implement the effect of the stop wall 801. The first stop wall has a top end. In this embodiment of the present invention, the top end is the top surface 803. The second stop wall has an upper connecting end 805. The upper connecting end 805 is lower than the top end in a vertical direction. The second stop wall 8012 extends toward a front side of the housing 10 from the upper connecting end 805, and has a gradually decreasing height in a vertical direction. A width of the first stop wall 8011 is L3. Most of ultrasound that is transmitted by an ultrasonic sensor and causes mutual crosstalk is blocked by the first stop wall 8011, and only the second stop wall 8012 is needed to block the remaining small amount of interfering ultrasound.

As shown in FIG. 54 to FIG. 58, the second stop wall 8012 has a gradually decreasing area in the forward movement direction of the self-moving device. The second stop wall 8012 has an upper connecting end 805 that is connected to the first stop wall 8011 and is lower than the top surface 803, a lower connecting end 806 that is far away from the first stop wall 8011 and is lower than the upper connecting end 805 in a vertical direction, and a connecting surface 809 connecting the upper connecting end 805 and the lower connecting end 806. The crosstalk prevention structure 80 has a front end surface 808 that is basically vertically connected to the top surface 803. The "basically vertically" here is a completely vertical state or an approximate vertical state.

In the present invention, the structures of the first stop wall 8011 and the second stop wall 8012 is disposed. The first stop wall 8011 can block most crosstalk ultrasound, and the structure of the second stop wall 8012 is lower than that of the first stop wall 8011 and blocks the remaining crosstalk ultrasound. In addition, the structure of the second stop wall 8012 is approximately triangular and has a feature of a gradually decreasing area in the forward movement direction of the self-moving device. In addition, the second stop wall 8012 extends toward a front side of the housing 10 from the upper connecting end 805, and has a gradually decreasing height in a vertical direction. The shape of the second stop wall 8012 has a unique design and a height gradually decreasing in a vertical direction. A stepped shape is used to implement crosstalk prevention with gradual transitions, so as to avoid blocking of an excessively large amount of ultrasound and implement crosstalk prevention without affecting detection of an obstacle, thereby ensuring the accuracy of detecting an obstacle at a short distance.

Figure 57:
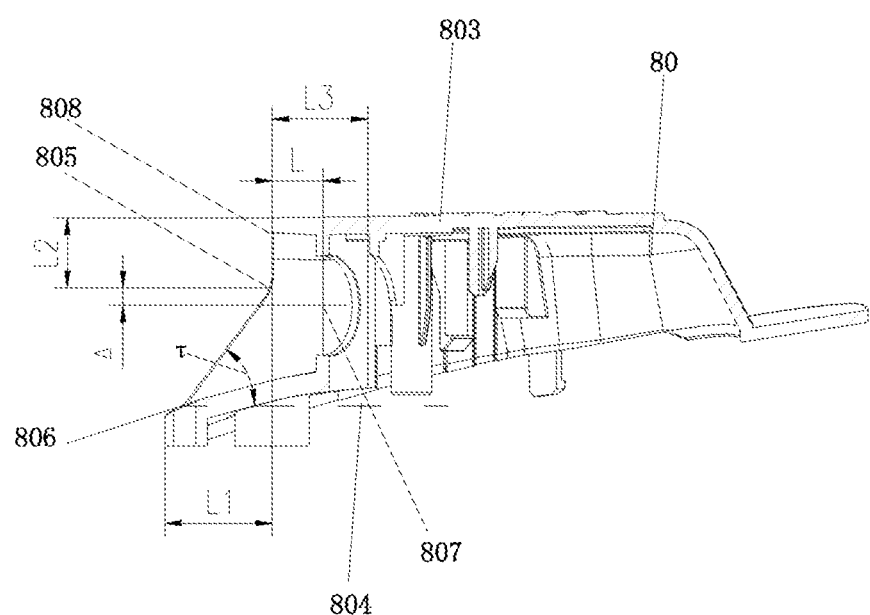
FIG. 57 is a sectional view along a line A-A in FIG. 56.

As shown in FIG. 57, the mounting hole 802 has a hole center 807. A distance L between the hole center 807 and the front end surface 808 is greater than 5 mm. A distance L2 between the upper connecting end 805 and a front end surface 808 is less than 10 mm. A distance L1 between the lower connecting end 806 and a front end surface 808 is less than 20 mm. A distance Δ between the upper connecting end 805 and a hole center 807 in a vertical direction is less than 16 mm. A range of an angle τ between the connecting surface 809 and the virtual parallel plane 804 is 35° to 55°. In the present embodiment, by using different parameter designs, it can be ensured that ultrasound sent by the first ultrasonic sensor 21 is not directly received by the second ultrasonic sensor 23 without passing through an obstacle, thereby ensuring the accuracy of recognizing an obstacle at a short distance, and in addition, the stability of an ultrasonic signal sent by the second ultrasonic sensor 23 is also ensured.

Figure 58:
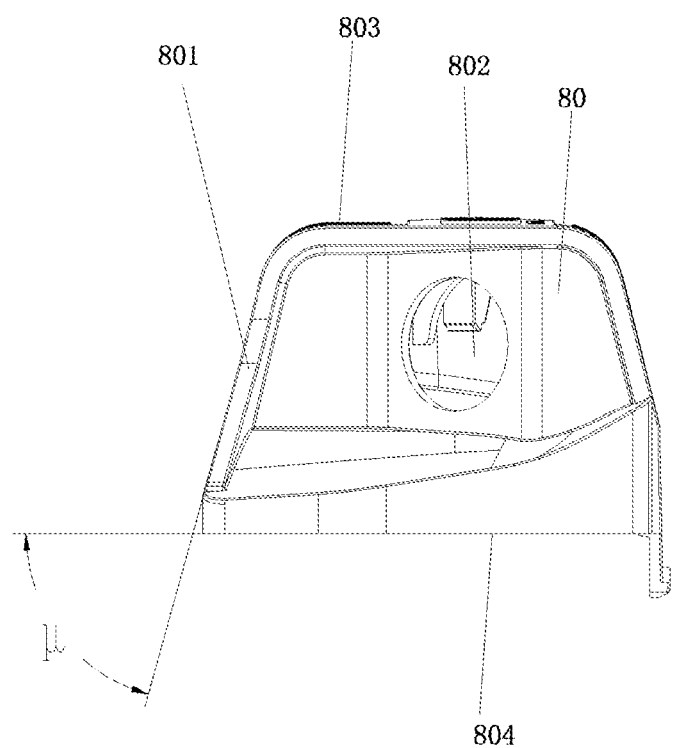
FIG. 58 is a schematic front view of a crosstalk prevention structure in an autonomous lawn mower according to the present invention.

As shown in FIG. 58, the stop wall 801 is disposed slantingly relative to the top surface 803. That is, an angle between the stop wall 801 and the top surface 80 is not equal to 90°. Because the virtual parallel plane 804 is parallel to the top surface 803, the angle μ between the virtual parallel plane 804 and the stop wall 801 is greater than 0°, and the angle μ is less than 90°, but the angle μ is not equal to 90°. In the crosstalk prevention structure 80 of the present embodiment, the stop wall 801 is disposed slantingly. The first ultrasonic sensor 21 is used as an example. When the first ultrasonic sensor 21 transmits ultrasound, because the stop wall 801 is disposed slanted, a part of ultrasound is directly transmitted from the stop wall 801 but is not reflected back to the first ultrasonic sensor 21, so that ultrasound that is directly reflected back to the first ultrasonic sensor 21 can be reduced. The ultrasound that is directly transmitted by the stop wall 801 is reduced. Therefore, even if the first ultrasonic sensor 21 receives some ultrasonic echoes reflected by the stop wall 801, intensity values of these echoes are relatively small and do not reach a reflected wave threshold for determining an obstacle. Therefore, the first ultrasonic sensor 21 does not determine an obstacle at a short distance, thereby improving the accuracy of determining an obstacle at a short distance.

In the present embodiment, a stop wall is disposed at a position where the first ultrasonic sensor 21 and the second ultrasonic sensor 23 are adjacent. In this way, when the first ultrasonic sensor 21 and the second ultrasonic sensor 23 intersect at an angle, the stop wall can prevent ultrasound transmitted by the first ultrasonic sensor 21 from being reflected by an obstacle and directly received by the second ultrasonic sensor 23, thereby ensuring the accuracy of recognizing an obstacle at a short distance. In addition, by using a flexible internal structure in the crosstalk prevention structure 80, a field-of-view transmission range of ultrasound can also be constrained when the ultrasound is just sent, so as to further prevent the ultrasound from directly contacting the housing 10 to generate an ultrasonic echo, thereby ensuring the accuracy of detecting an obstacle.

In the present embodiment, the foregoing implementation solution of the crosstalk prevention structure is applicable to a solution of the present embodiment in which two ultrasonic sensors have an intersecting layout, that is, a solution in which projections of axes of two sensors intersect.

For the foregoing non-contact obstacle-avoiding autonomous lawn mower or self-moving device of the present embodiment, at least four forms of obstacle avoidance are implemented in the embodiments of the present invention. The four forms are as follows: The control module controls the moving module to move along a preset path to keep a distance between the housing and the obstacle greater than zero. The control module controls the moving module to move along a path in a direction different from a current forward movement direction. The control module controls the moving module to move in a direction away from the obstacle. The control module recognizes that a distance between an obstacle on one side in a forward movement direction of the housing and the housing is less than a preset distance and the control module controls the moving module to move along the other side of the forward movement direction. Embodiments about the four forms of non-contact obstacle avoidance are as follows:

A self-moving device includes:

a housing;

a moving module, disposed below the housing, and configured to drive the housing to move;

a drive module, configured to drive the moving module to move; and a control module, configured to control an autonomous lawn mower, where an ultrasonic sensor assembly configured to recognize an obstacle in a forward movement direction of the self-moving device is disposed on the housing, the ultrasonic sensor assembly includes at least two ultrasonic sensors, including a first ultrasonic sensor and a second ultrasonic sensor, the first ultrasonic sensor receives and transmits ultrasound in a first transceiver region, the second ultrasonic sensor receives and transmits ultrasound in a second transceiver region, the first ultrasonic sensor and the second ultrasonic sensor are arranged on the housing at an angle from each other, so that the first transceiver region and the second transceiver region overlap partially to form three detection regions, where an overlapping part of the first transceiver region and the second transceiver region is a third detection region, a part except the overlapping part of the first transceiver region is a first detection region, and a part except the overlapping part of the second transceiver region is a second detection region, and the control module controls the moving module to move along a preset path to keep a distance between the housing and the obstacle greater than zero.

A self-moving device includes:

a housing;

a moving module, disposed below the housing, and configured to drive the housing to move;

a drive module, configured to drive the moving module to move; and a control module, configured to control an autonomous lawn mower, where an ultrasonic sensor assembly configured to recognize an obstacle in a forward movement direction of the self-moving device is disposed on the housing, the ultrasonic sensor assembly includes at least two ultrasonic sensors, including a first ultrasonic sensor and a second ultrasonic sensor, the first ultrasonic sensor receives and transmits ultrasound in a first transceiver region, the second ultrasonic sensor receives and transmits ultrasound in a second transceiver region, the first ultrasonic sensor and the second ultrasonic sensor are arranged on the housing at an angle from each other, so that the first transceiver region and the second transceiver region overlap partially to form three detection regions, where an overlapping part of the first transceiver region and the second transceiver region is a third detection region, a part except the overlapping part of the first transceiver region is a first detection region, and a part except the overlapping part of the second transceiver region is a second detection region, and the control module controls the moving module to move along a path in a direction different from a current forward movement direction.

A self-moving device includes:

a housing;

a moving module, disposed below the housing, and configured to drive the housing to move;

a drive module, configured to drive the moving module to move; and a control module, configured to control an autonomous lawn mower, where an ultrasonic sensor assembly configured to recognize an obstacle in a forward movement direction of the self-moving device is disposed on the housing, the ultrasonic sensor assembly includes at least two ultrasonic sensors, including a first ultrasonic sensor and a second ultrasonic sensor, the first ultrasonic sensor receives and transmits ultrasound in a first transceiver region, the second ultrasonic sensor receives and transmits ultrasound in a second transceiver region, the first ultrasonic sensor and the second ultrasonic sensor are arranged on the housing at an angle from each other, so that the first transceiver region and the second transceiver region overlap partially to form three detection regions, where an overlapping part of the first transceiver region and the second transceiver region is a third detection region, a part except the overlapping part of the first transceiver region is a first detection region, and a part except the overlapping part of the second transceiver region is a second detection region, and the control module controls the moving module to move in a direction away from the obstacle.

A self-moving device includes:

a housing;

a moving module, disposed below the housing, and configured to drive the housing to move;

a drive module, configured to drive the moving module to move; and a control module, configured to control an autonomous lawn mower, where an ultrasonic sensor assembly configured to recognize an obstacle in a forward movement direction of the self-moving device is disposed on the housing, the ultrasonic sensor assembly includes at least two ultrasonic sensors, including a first ultrasonic sensor and a second ultrasonic sensor, the first ultrasonic sensor receives and transmits ultrasound in a first transceiver region, the second ultrasonic sensor receives and transmits ultrasound in a second transceiver region, the first ultrasonic sensor and the second ultrasonic sensor are arranged on the housing at an angle from each other, so that the first transceiver region and the second transceiver region overlap partially to form three detection regions, where an overlapping part of the first transceiver region and the second transceiver region is a third detection region, a part except the overlapping part of the first transceiver region is a first detection region, and a part except the overlapping part of the second transceiver region is a second detection region, the control module recognizes that a distance between an obstacle on one side in a forward movement direction of the housing and the housing is less than a preset distance, and the control module controls the moving module to move along the other side of the forward movement direction.

The structure of an ultrasonic sensor or the definition of transmitted and received signals in the foregoing four manners are the same as those of the autonomous lawn mower 100 in the first embodiment. The definition of the crosstalk prevention structure is the same as the foregoing crosstalk prevention structure in the self-moving device in the thirteenth embodiment. Details are not described herein again.

Figure 59:
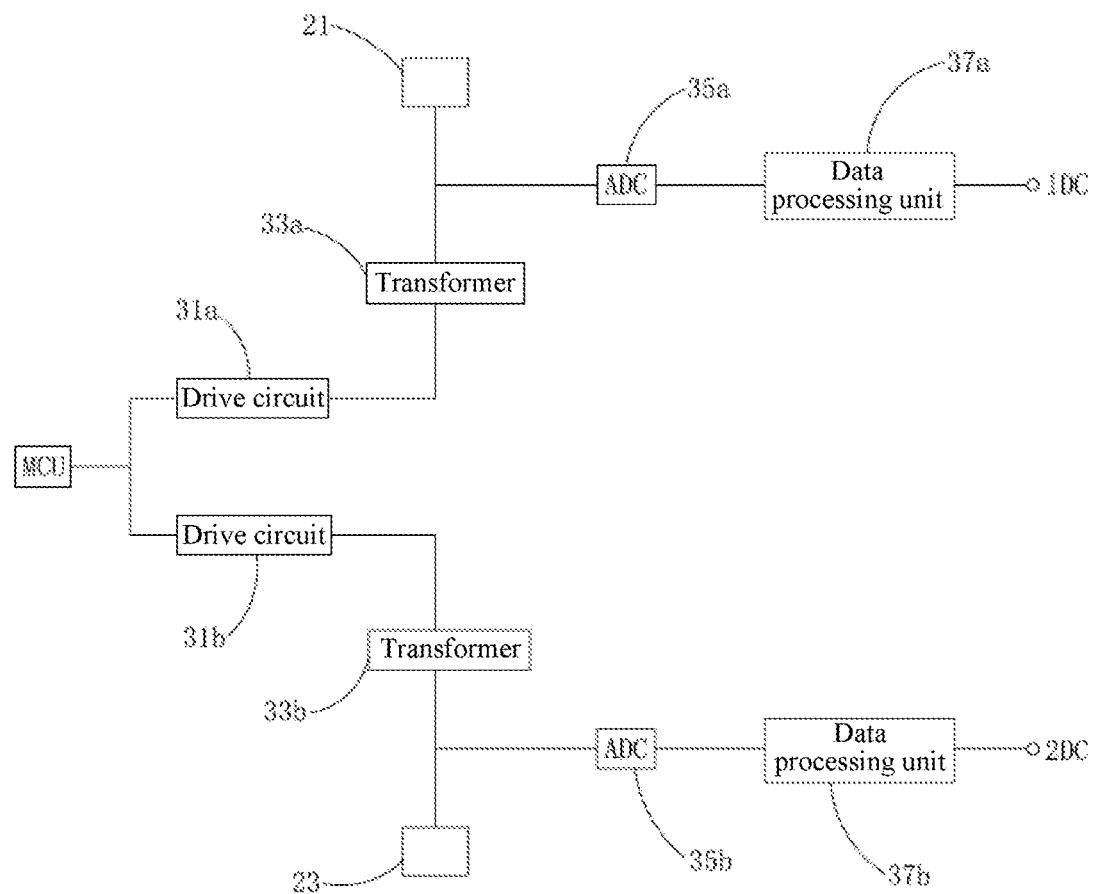
FIG. 59 is a schematic diagram of a circuit unit for controlling an ultrasonic sensor assembly by a control module according to the first embodiment.

FIG. 59 is a schematic diagram of a circuit unit for controlling an ultrasonic sensor assembly by a control module. The autonomous lawn mower 100 in the first embodiment is used as an example for description. Self-moving devices in other embodiments are the same as the autonomous lawn mower 100 or may be obtained by using the same method. The ultrasonic sensor assembly 20 includes a first ultrasonic sensor 21 and a second ultrasonic sensor 23. Each ultrasonic sensor has a respective ultrasonic transmission processing circuit and ultrasonic reception processing circuit. As shown in FIG. 44, the ultrasonic transmission processing circuit of the first ultrasonic sensor 21 includes a drive circuit 31a and a transformer 32a. An end of the drive circuit 31a is connected to a main control unit (MCU) in the control module 30. The drive circuit 31a receives a start signal of the MCU to generate a drive signal at a preset frequency. The drive signal undergoes voltage conversion by the transformer 32a and is converted into an electrical signal suitable for parameters of the first ultrasonic sensor 21. The electrical signal drives the first ultrasonic sensor 21 to transmit ultrasound at a predetermined frequency. A specific mode of the drive circuit 31a may be a single-ended burst mode or a double-ended push-pull mode, and is preferably a double-ended push-pull mode. The preset frequency of the drive signal is generally designed according to hardware parameters of a used sensor. In this embodiment, the preset frequency is in a range greater than 25 KHZ, and is preferably in a range of 57 KHZ to 60 KHZ, and is specifically, for example, 58.5 KHZ. In this embodiment, the ultrasonic transmission processing circuit of the second ultrasonic sensor 23 is the same as the ultrasonic transmission processing circuit of the first ultrasonic sensor 21. Details are not described herein again.

As shown in FIG. 59, FIG. 59 shows the circuit unit for controlling the ultrasonic sensor assembly by the control module according to an embodiment of the present invention. The ultrasonic reception processing circuit of the first ultrasonic sensor 21 includes an analog-to-digital conversion unit 35a and a data processing unit 37a. The first ultrasonic sensor 21 receives ultrasound reflected back by an obstacle, converts the ultrasound into an electrical signal, and transfers the electrical signal to the analog-to-digital conversion unit 35a. The analog-to-digital conversion unit 35a converts the analog signal into a digital signal and outputs the digital signal to the data processing unit 37a. The data processing unit 37a performs a series of processing on the digital signal to obtain a signal 1DC, transmits the 1DC to the control module 30. The control module 30 receives 1DC, and analyzes 1DC to obtain a distance from the obstacle. The data processing unit 37 mainly performs operations such as filtering, rectification, sampling or retrieval, so as to achieve functions of blocking a crosstalk signal and/or enabling a signal form of 1DC to conform to an analysis form of the control module 30. In this embodiment, the ultrasonic reception processing circuit of the second ultrasonic sensor 23 is the same as the ultrasonic reception processing circuit of the first ultrasonic sensor 21. Details are not described herein again.

Preferably, a synchronization signal is provided in the MCU. When the first ultrasonic sensor 21 transmits ultrasound, the MCU sends the synchronization signal to a reception part of the second ultrasonic sensor 23. When the first ultrasonic sensor 21 starts to transmit ultrasound, the second ultrasonic sensor 23 starts to receive ultrasound. Similarly, when the second ultrasonic sensor 23 transmits ultrasound, the MCU sends the synchronization signal to a reception part of the first ultrasonic sensor 21. When the second ultrasonic sensor 23 starts to transmit ultrasound, the first ultrasonic sensor 21 starts to receive ultrasound.

Figure 60:
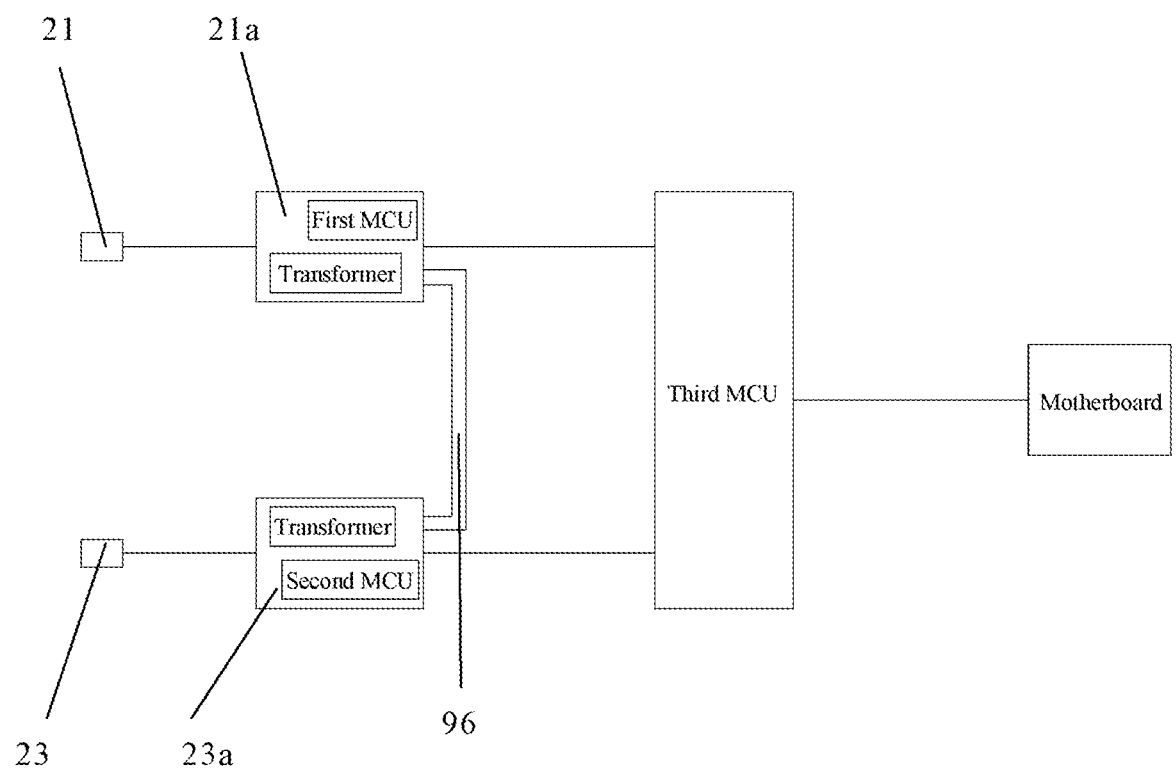
FIG. 60 is a schematic diagram of a circuit unit for controlling an ultrasonic sensor assembly by a control module according to the second embodiment.

As shown in FIG. 60, FIG. 60 shows the circuit unit for controlling the ultrasonic sensor assembly by the control module according to the second embodiment of the present invention. The autonomous lawn mower 100 in the first embodiment is used as an example for description. The first ultrasonic reception processing circuit 21a of the first ultrasonic sensor 21 includes a first MCU and a first transformer. The first MCU transmits, to a third MCU through a serial port, ultrasound that is reflected back by an obstacle and is received by the first ultrasonic sensor 21. The second ultrasonic reception processing circuit 23a of the second ultrasonic sensor 23 includes a second MCU and a second transformer. The second MCU transmits, to the third MCU through a serial port, ultrasound that is reflected back by an obstacle and is received by the second ultrasonic sensor 23. The third MCU analyzes reflected ultrasound transmitted by the first MCU and the second MCU to obtain distance and position information of the obstacle, and eventually outputs a processing result to a motherboard. The motherboard selects to perform a related logic control. The first ultrasonic reception processing circuit 21a and the second ultrasonic reception processing circuit 23a may further include a data processing unit. The data processing unit mainly performs operations such as filtering, rectification, sampling or retrieval, thereby achieving functions of blocking a crosstalk signal and/or enabling a collected signal form to conform to an analysis form of the third MCU. In this embodiment, a connecting circuit 96 is provided between the first ultrasonic reception processing circuit 21a and the second ultrasonic reception processing circuit 23a. The connecting circuit 96 is configured to implement transmission of a synchronization signal. When the first ultrasonic sensor 21 transmits ultrasound, the connecting circuit 96 sends the synchronization signal to the reception part of the second ultrasonic sensor 23. When the first ultrasonic sensor 21 starts to transmit ultrasound, the second ultrasonic sensor 23 starts to receive ultrasound. Similarly, when the second ultrasonic sensor 23 transmits ultrasound, the connecting circuit 96 sends the synchronization signal to the reception part of the first ultrasonic sensor 21. When the second ultrasonic sensor 23 starts to transmit ultrasound, the first ultrasonic sensor 21 starts to receive ultrasound. In another embodiment of the circuit unit for controlling the ultrasonic sensor assembly by the control module in the second embodiment, the first ultrasonic reception processing circuit 21a of the first ultrasonic sensor 21 may not include a transformer. A transformer may not need to be disposed at a low voltage.

In this embodiment of the present invention, the ultrasonic sensor is connected to a processing circuit board. An operational amplifier circuit for implementing the function of an amplification module and an AD conversion circuit for implementing an AD conversion function are provided on the processing circuit board. A chip that can implement the function of a data caching module and a relatively small MCU for implementing the function of a data retrieving module are provided on the circuit board. The control module has another relatively large MCU configured to implement the function of a data analysis module. The relatively large MCU can implement data analysis to generate distance information and position information. The relatively large MCU has software that can complete comparison between a set preset distance and a distance between an obstacle and an ultrasonic sensor. In other embodiments, the comparison with the preset distance may alternatively be performed by using a hardware manner such as an FPGA and a DSP. The large MCU may be disposed on the motherboard, or may be separately disposed on one circuit board. A comprehensive analysis module may be integrated on the motherboard, or may not be integrated on the motherboard. Instead, the comprehensive analysis module and the relatively large MCU are integrated on one circuit board. The main controller is disposed on the motherboard. The main controller is configured to control the movement of the self-moving device according to an existing analysis result. The analysis result may be transferred to the main controller by using hardware, or may be transferred to the main controller in a manner of an electrical signal, for example, a manner of a high electric frequency indication or a low electric frequency indication or communication. In other embodiments, one large MCU may be used to implement the functions of the relatively small MCU and the relatively large MCU in the present embodiment.

Figure 61:
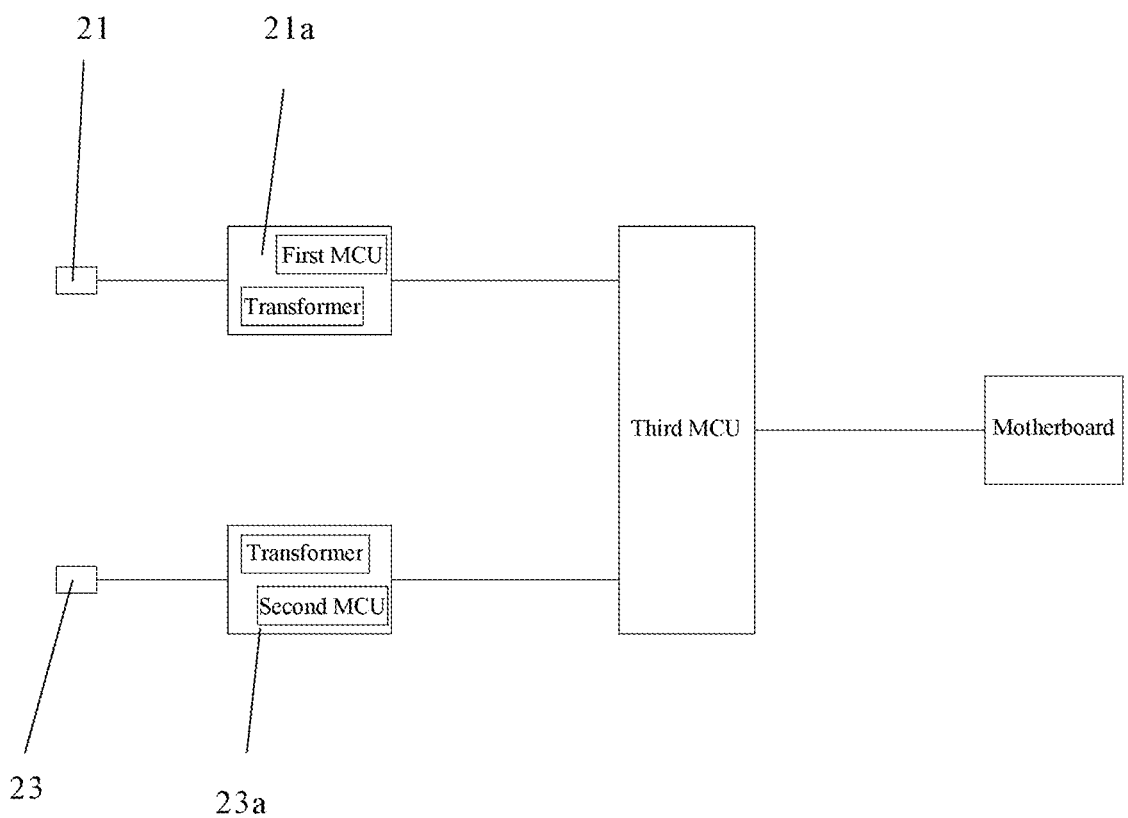
FIG. 61 is a schematic diagram of another embodiment of a circuit unit for controlling an ultrasonic sensor assembly by a control module according to the second embodiment.

As shown in FIG. 61, in another embodiment of the circuit unit for controlling the ultrasonic sensor assembly by the control module in the second embodiment, a connecting circuit may not be disposed between the first ultrasonic reception processing circuit 21a and the second ultrasonic reception processing circuit 23a, and a synchronization signal is directly provided in the second MCU. When the first ultrasonic sensor 21 transmits ultrasound, the second MCU sends the synchronization signal to the reception part of the second ultrasonic sensor 23. When the first ultrasonic sensor 21 starts to transmit ultrasound, the second ultrasonic sensor 23 starts to receive ultrasound. Similarly, when the second ultrasonic sensor 23 transmits ultrasound, the second MCU sends the synchronization signal to the reception part of the first ultrasonic sensor 21. When the second ultrasonic sensor 23 starts to transmit ultrasound, the first ultrasonic sensor 21 starts to receive ultrasound.

In the foregoing two embodiments of the circuit unit for controlling the ultrasonic sensor assembly by the control module in the second embodiment, the first MCU may directly transmit collected data to the third MCU to perform analysis processing. A data analysis unit may alternatively be disposed in the first MCU to perform preprocessing on the collected data, and the processed data is then transmitted to the second MCU to perform analysis processing again. The third MCU may send an instruction such as a pulse quantity requirement, an amplification factor requirement, an ultrasonic sending instruction, and ultrasonic echo receiving instruction to the first ultrasonic sensor 21 and the second ultrasonic sensor 23.

For the foregoing two embodiments of the circuit unit for controlling the ultrasonic sensor assembly by the control module in the second embodiment, the processing of a data packet processed by the third MCU is described with reference to the signals transmitted and received by the first ultrasonic sensor 21 and the second ultrasonic sensor 23 in the autonomous lawn mower 100 in the first embodiment. When the first ultrasonic sensor 21 sends ultrasound, the third MCU obtains an echo signal received by the first ultrasonic sensor 21 and an echo signal received by the second ultrasonic sensor 23, and the signals are referred to as the first channel of signals here. When the second ultrasonic sensor 23 sends ultrasound, the third MCU obtains an echo signal received by the second ultrasonic sensor 23 and an echo signal received by the first ultrasonic sensor 21, and the signals are referred to as a second channel of signals here. The first channel of signals and the second channel of signals include a total of four groups of ultrasonic echoes. The third MCU analyzes the four groups of ultrasonic echoes to obtain information about an obstacle. When the first ultrasonic sensor 21 continues to send ultrasound, the third MCU obtains an echo signal received by the first ultrasonic sensor 21 and an echo signal received by the second ultrasonic sensor 23, and the signals are referred to as a third channel of signals here. The second channel of signals and the third channel of signals include a total of four groups of ultrasonic echoes. The third MCU analyzes the four groups of ultrasonic echoes to obtain information about an obstacle. For example, this process is repeated, and the third MCU keeps performing obstacle analysis by using four groups of ultrasonic echoes that are obtained after the first ultrasonic sensor 21 and the second ultrasonic sensor 23 send ultrasound respectively.

The introduction of the foregoing circuit unit is also applicable to the self-moving devices in the foregoing thirteen embodiments of the present invention. An example of two ultrasonic sensors is used in FIG. 60 and FIG. 61. If there is a plurality of ultrasonic sensors, a plurality of circuits is connected to the third MCU. For an instruction for sending ultrasound, the third MCU provides a corresponding instruction. For a principle followed when a plurality of ultrasonic sensors transmits and receives signals, for example, if there is an overlapping detection region, signals are sent successively and alternately in time. Details are not described herein again.

Figure 64:
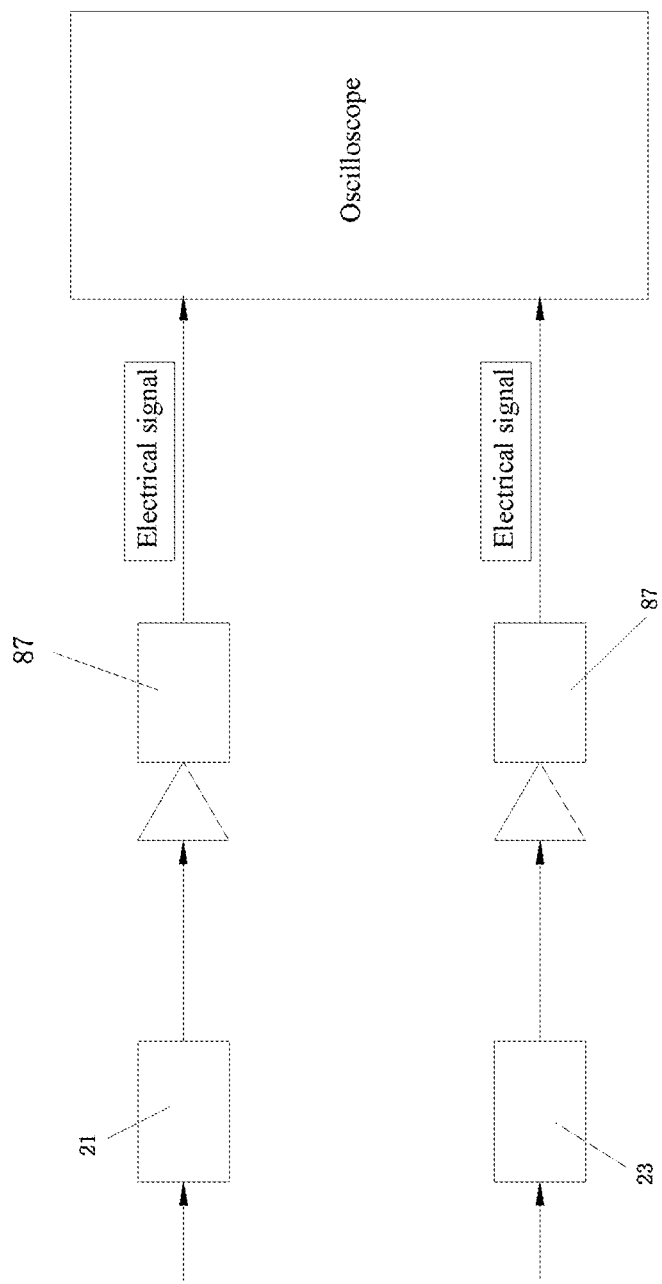
FIG. 64 is a schematic diagram of a method for detecting transmitted and received signals of an ultrasonic sensor of an autonomous lawn mower according to the present invention.

As shown in FIG. 64, the self-moving device in this embodiment of the present invention may use a test method to know transmission and reception of signals by the ultrasonic sensor assembly. The autonomous lawn mower 100 in the first embodiment is used as an example for description. A specific test method is as follows: The first ultrasonic sensor 21 of the self-moving device is connected to a receiving apparatus 87 that can receive an ultrasonic signal, the second ultrasonic sensor 23 is connected to another receiving apparatus 87 that can receive an ultrasonic signal, and the two receiving apparatuses 87 are then connected to an oscilloscope. Electrical signals transferred by the receiving apparatus 87 to the oscilloscope are displayed on the oscilloscope. By using the time at which the two receiving apparatuses 87 receive ultrasonic signals, it can be determined whether the first ultrasonic sensor 21 and the second ultrasonic sensor 23 transmit signals successively and alternately in time. An object may further be used to block ultrasound transmitted by the first ultrasonic sensor 21 to observe whether there is an impact on a signal received by the second ultrasonic sensor 23, that is, whether there is an impact on a signal output result of the second ultrasonic sensor 23. If there is an impact, it is proved that the second ultrasonic sensor 23 receives an ultrasonic echo of the ultrasound sent by the first ultrasonic sensor 21. That is, it can be proved that when the first ultrasonic sensor 21 sends ultrasound, the second ultrasonic sensor 23 simultaneously receives an ultrasonic echo reflected back from the ultrasound sent by the first ultrasonic sensor 21. A test method of the second ultrasonic sensor 23 is the same as that of the first ultrasonic sensor 21. Details are not repeated again. An obstacle may further be used to make a movement right in front of the machine, and reception of echo signals by the first ultrasonic sensor 21 and the second ultrasonic sensor 23 is observed. If both the first ultrasonic sensor 21 and the second ultrasonic sensor 23 can receive an ultrasonic echo in some regions, it is proved that the fields of view of the first ultrasonic sensor 21 and the second ultrasonic sensor 23 overlap. That is, the first ultrasonic sensor 21 and the second ultrasonic sensor 23 have an overlapping detection region, and the obstacle is in the overlapping detection region. The ranges of the fields of view of the first ultrasonic sensor 21 and the second ultrasonic sensor 23 may further be known by using this method of ultrasonic echoes. When an obstacle is very close to a front end of the self-moving device, the position of a blind area of an ultrasonic sensor may further be known by using a waveform display on the oscilloscope.

Figure 65:
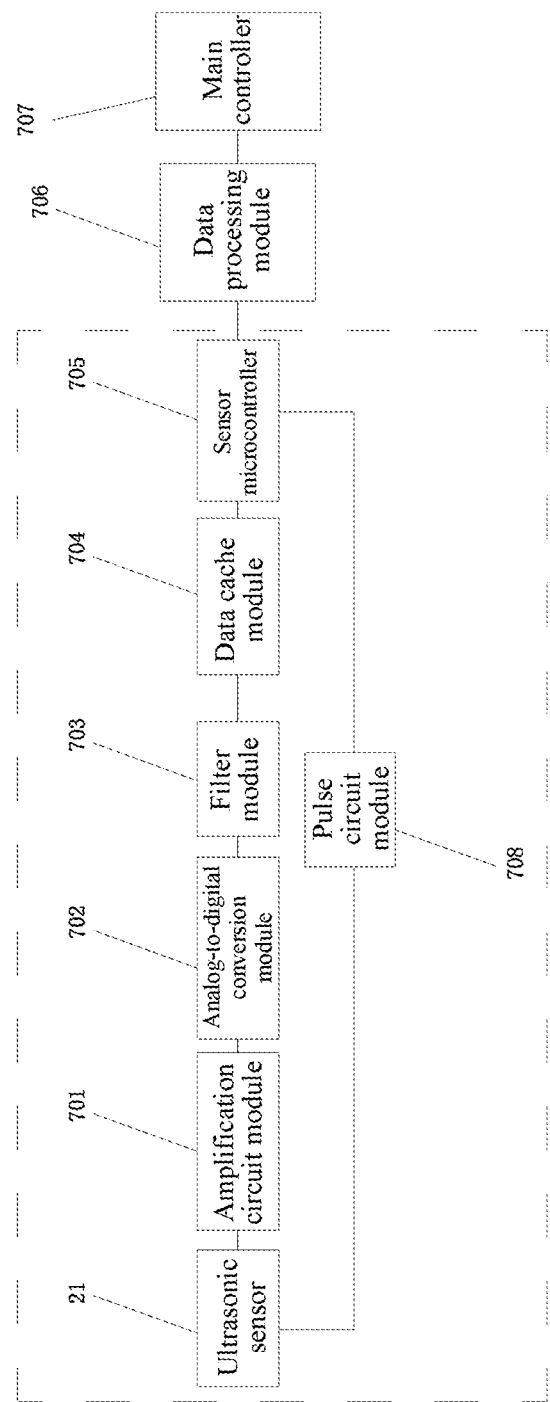
FIG. 65 is a control block diagram according to the present invention.

As shown in FIG. 65, FIG. 65 is a control block diagram of the self-moving device according to the present invention. The first ultrasonic sensor 21 in the autonomous lawn mower 100 in the first embodiment is used as an example, and the control of an ultrasonic sensor in other embodiments is the same as the control of the first ultrasonic sensor 21. A sensor microcontroller 705 conveys an instruction to the pulse circuit module 708. The pulse circuit module 708 conveys an instruction for sending ultrasound to the ultrasonic sensor 21. The ultrasonic sensor receives the instruction to send ultrasound. The ultrasonic sensor receives an echo from an obstacle. After an amplification circuit module 701 performs amplification processing, an analog-to-digital conversion module 702 performs analog-to-digital conversion processing, and the filtering module 703 performs filter processing, data obtained after processing enters the data cache module 704. The sensor microcontroller 705 transfers the data in data cache module 704 to the data processing module 706 for data analysis. An analysis result is then fed back to a main controller 707 for execution. A dotted line in FIG. 65 represents that the part is a control module related to the ultrasonic sensor assembly. The control block diagram of the self-moving device is applicable to the description of the autonomous lawn mower or the self-moving device in the foregoing thirteen embodiments of the present invention, and is also applicable to the embodiments of obstacle avoidance of the foregoing four forms, that is: the control module controls a moving module to move along a preset path to keep a distance between the housing and the obstacle greater than zero; the control module controls the moving module to move along a path in a direction different from a current forward movement direction; the control module controls the moving module to move in a direction away from the obstacle; the control module recognizes that a distance between an obstacle on one side in a forward movement direction of the housing and the housing is less than a preset distance, and the control module controls the moving module to move along the other side of the forward movement direction.

Figure 66:
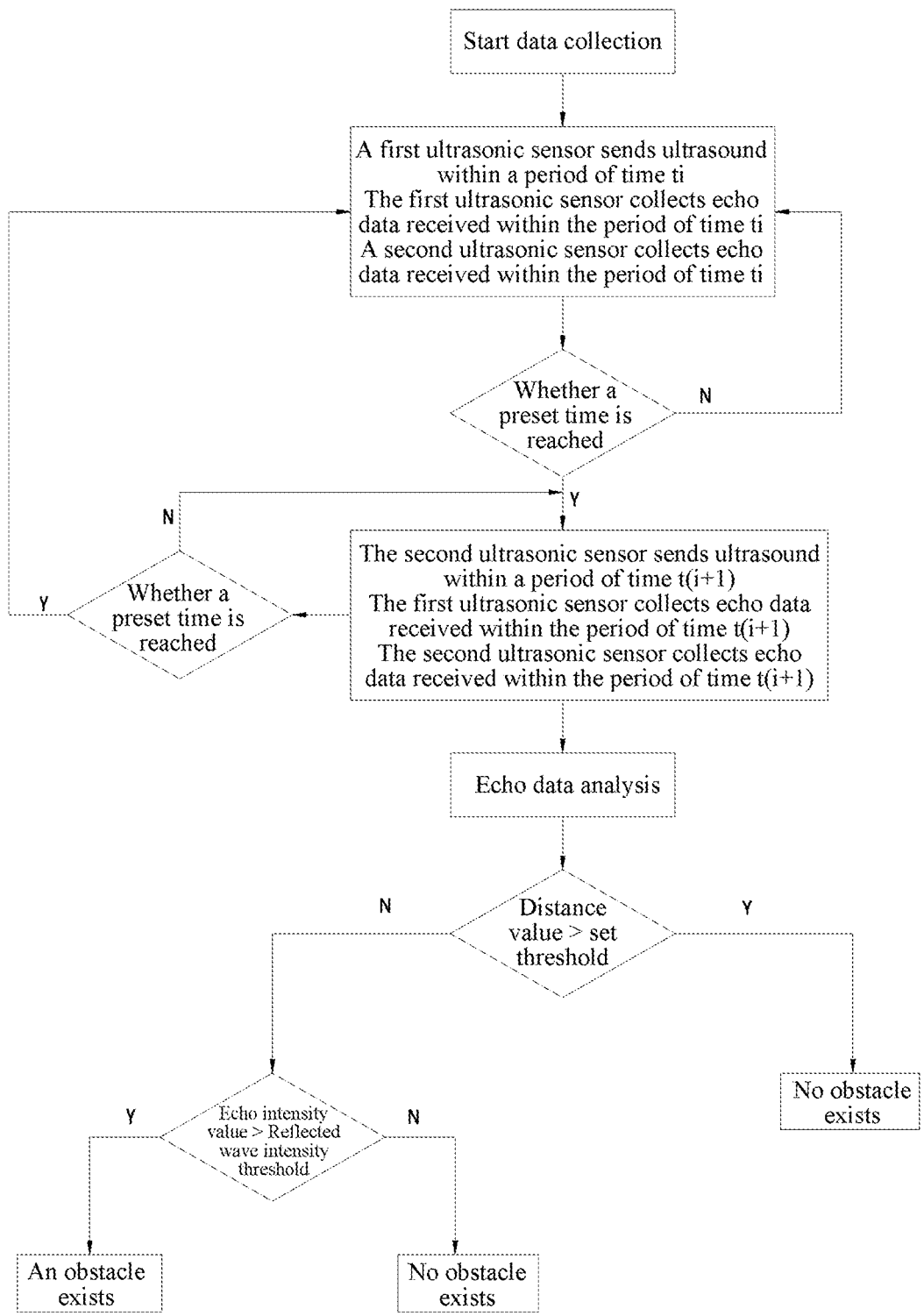
FIG. 66 is a flowchart of a method for recognizing an obstacle by an autonomous lawn mower according to the present invention.

As shown in FIG. 66, FIG. 66 is a flowchart of a method for recognizing an obstacle by a control module 30 in a self-moving device according to the present invention. The autonomous lawn mower 100 in the first embodiment is used for description. Self-moving devices in other embodiments use corresponding method replacements according to different quantities of ultrasonic sensors and different manners of sending ultrasound (alternate transmission or simultaneous transmission).

As shown in FIG. 66, a method for recognizing an obstacle by the self-moving device is provided. The self-moving device includes a control module and a first ultrasonic sensor.

The control method includes the following steps:

S11: starting data collection;

S12: sending, by the ultrasonic sensor, ultrasound, and receiving an echo from an obstacle;

S13: performing analysis according to the echo from the obstacle to obtain a distance from the obstacle and intensity of the echo; and S14: comparing the distance from the obstacle with a preset distance and comparing the intensity of the echo with a reflected wave threshold to determine a condition of the obstacle.

When the self-moving device includes a first ultrasonic sensor 21 and a second ultrasonic sensor 23, a method for receiving an echo from an obstacle includes the following steps:

S111: starting data collection;

S112: sending, by one of the first ultrasonic sensor 21 and the second ultrasonic sensor 23, ultrasound within a period of time ti, and receiving, by the first ultrasonic sensor 21 and the second ultrasonic sensor 23, echoes from the obstacle within the period of time ti, to obtain an $i^{th}$ group of echoes from the obstacle;

S113: transmitting, by the other one of the first ultrasonic sensor 21 and the second ultrasonic sensor 23, ultrasound within a period of time t(i+1) following the period of time ti, and receiving, by the first ultrasonic sensor 21 and the second ultrasonic sensor 23, echoes from the obstacle within the period of time t(i+1), to obtain an $(i+1)^{th}$ group of echoes from the obstacle;

S114: analyzing the $(i+1)^{th}$ group of echoes from the obstacle and the $i^{th}$ group of echoes from the obstacle to obtain the distance from the obstacle and the intensity of the echo; and S115: comparing the distance from the obstacle with the preset distance and comparing the intensity of the echo with the reflected wave threshold to determine the condition of the obstacle.

when i=1, the control method includes the following steps:

S11: starting data collection;

S12: controlling, by the control module, the first ultrasonic sensor 21 to send ultrasound in a first period of time, and receiving, by the first ultrasonic sensor 21 and the second ultrasonic sensor 23, an echo from the obstacle in the first period of time, to obtain the first group of echoes from the obstacle;

S13: controlling, by the control module, the second ultrasonic sensor 23 to transmit ultrasound in a second period of time following the first period of time, and receiving, by the first ultrasonic sensor 21 and the second ultrasonic sensor 23, an echo from the obstacle in the second period of time, to obtain the second group of echoes from the obstacle; and S14: performing, by the control module, distance analysis and echo intensity analysis by combining the first group of echoes from the obstacle and the second group of echoes from the obstacle, and comparing a distance obtained through analysis with a preset distance and comparing an echo intensity value obtained through analysis with a reflected wave threshold to obtain information about the obstacle.

When signals are transmitted successively in time, i=2, the control method includes the following steps:

S11: starting data collection;

S12: controlling, by the control module, the first ultrasonic sensor 21 to send ultrasound in a first period of time, and receiving, by the first ultrasonic sensor 21 and the second ultrasonic sensor 23, an echo from the obstacle in the first period of time, to obtain the first group of echoes from the obstacle;

S13: controlling, by the control module, the second ultrasonic sensor 23 to transmit ultrasound in a second period of time following the first period of time, and receiving, by the first ultrasonic sensor 21 and the second ultrasonic sensor 23, an echo from the obstacle in the second period of time, to obtain the second group of echoes from the obstacle;

S14: performing, by the control module, distance analysis and echo intensity analysis by combining the first group of echoes from the obstacle and the second group of echoes from the obstacle, and comparing a distance obtained through analysis with a preset distance and comparing an echo intensity value obtained through analysis with a reflected wave threshold to obtain information about the obstacle;

S15: controlling, by the control module, the first ultrasonic sensor 21 to send ultrasound in a third period of time, receiving, by the first ultrasonic sensor 21 and the second ultrasonic sensor 23, an echo from an obstacle in the third period of time, to obtain the third group of echoes from the obstacle; and S16: performing, by the control module, distance analysis and echo intensity analysis by combining the third group of echoes from the obstacle and the second group of echoes from the obstacle, and comparing a distance obtained through analysis with a preset distance and comparing an echo intensity value obtained through analysis with a reflected wave threshold to obtain information about the obstacle.

When signals are transmitted successively in time, and i=2, the control method includes the following steps:

S11: starting data collection;

S12: controlling, by the control module, the first ultrasonic sensor 21 to send ultrasound in a first period of time, and receiving, by the first ultrasonic sensor 21 and the second ultrasonic sensor 23, an echo from the obstacle in the first period of time, to obtain the first group of echoes from the obstacle;

S13: controlling, by the control module, the second ultrasonic sensor 23 to transmit ultrasound in a second period of time following the first period of time, and receiving, by the first ultrasonic sensor 21 and the second ultrasonic sensor 23, an echo from the obstacle in the second period of time, to obtain the second group of echoes from the obstacle;

S14: performing, by the control module, distance analysis and echo intensity analysis by combining the first group of echoes from the obstacle and the second group of echoes from the obstacle, and comparing a distance obtained through analysis with a preset distance and comparing an echo intensity value obtained through analysis with a reflected wave threshold to obtain information about the obstacle;

S15: controlling, by the control module, the first ultrasonic sensor 21 to send ultrasound in a third period of time, and receiving, by the first ultrasonic sensor 21 and the second ultrasonic sensor 23, an echo from an obstacle in the third period of time, to obtain the third group of echoes from the obstacle;

S16: performing, by the control module, distance analysis and echo intensity analysis by combining the third group of echoes from the obstacle and the second group of echoes from the obstacle, and comparing a distance obtained through analysis with a preset distance and comparing an echo intensity value obtained through analysis with a reflected wave threshold to obtain information about the obstacle;

S17: controlling, by the control module, the second ultrasonic sensor 23 to transmit ultrasound in a fourth period of time following the third period of time, and receiving, by the first ultrasonic sensor 21 and the second ultrasonic sensor 23, an echo from an obstacle in the fourth period of time, to obtain the fourth group of echoes from the obstacle; and S18: performing, by the control module, distance analysis and echo intensity analysis by combining the fourth group of echoes from the obstacle and the third group of echoes from the obstacle, and comparing a distance obtained through analysis with a preset distance and comparing an echo intensity value obtained through analysis with a reflected wave threshold to obtain information about the obstacle.

As can be deduced from the foregoing examples, the control module performs distance analysis and echo intensity analysis each time by using an $(i+1)^{th}$ group of echoes from the obstacle obtained within the period of time $t(i+1)$ and a $ti^{th}$ group of echoes from the obstacle obtained within a previous period of time ti, and comparing a distance obtained through analysis with a preset distance and comparing an echo intensity value obtained through analysis with a reflected wave threshold to obtain information about the obstacle. The period of time ti and the period of time $t(i+1)$ are respectively period of times within which the first ultrasonic sensor 21 and the second ultrasonic sensor 23 transmit signals and as the period of times elapse, the first ultrasonic sensor 21 and the second ultrasonic sensor 23 send ultrasound successively.

A method for comparing the distance from the obstacle with the preset distance and comparing the intensity of the echo with the reflected wave threshold to determine the condition of the obstacle in the foregoing steps S14 and S115 is: when a value of the distance obtained through analysis is greater than the specified threshold, determining that there is no obstacle.

A method for comparing the distance from the obstacle with the preset distance and comparing the intensity of the echo with the reflected wave threshold to determine the condition of the obstacle in the foregoing steps S14 and S115 is: when a value of the distance obtained through analysis is less than the specified threshold and a value of the intensity of the echo obtained through analysis is less than the reflected wave threshold, determining that there is no obstacle.

A method for comparing the distance from the obstacle with the preset distance and comparing the intensity of the echo with the reflected wave threshold to determine the condition of the obstacle in the foregoing steps S14 and S115 is: when a value of the distance obtained through analysis is less than the specified threshold but a value of the intensity of the echo obtained through analysis is greater than the reflected wave threshold, determining that there is an obstacle.

In the foregoing step S13, the processing of the echoes from the obstacle includes:

adjusting an amplification factor for an ultrasonic echo analog signal;

performing analog-to-digital conversion on the signal obtained after the amplification factor is adjusted; and performing digital filtering on the signal obtained after analog-to-digital conversion.

There is a particular relationship among the voltage, the pulse quantity, and a field of view of an ultrasonic sensor. When the voltage is larger, the pulse quantity is larger, and a range of the field of view is wider. However, the voltage has a limit value. The limit value of the voltage is a value of a maximum voltage that the sensor can withstand and is determined by characteristics of the sensor.

Although only several embodiments of the present invention are described and illustrated in this specification, a person skilled in the art should easily foresee other means or structures used to perform the functions described here or obtain the structures described here. All such variations or changes should be considered falling within the scope of the present embodiments.

What is claimed is:

1. An autonomous lawn mower, comprising:
a housing;
a moving module, disposed below the housing, and configured to drive the housing to move;
a drive module, configured to drive the moving module to move;
an ultrasonic sensor assembly configured to recognize an obstacle in a forward movement direction of the autonomous lawn mower is disposed on the housing, the ultrasonic sensor assembly comprises at least two ultrasonic sensors, comprising a first ultrasonic sensor and a second ultrasonic sensor, the first ultrasonic sensor receives and transmits ultrasound in a first transceiver region, the second ultrasonic sensor receives and transmits ultrasound in a second transceiver region, and the first ultrasonic sensor and the second ultrasonic sensor are arranged on the housing and directed toward one another such that the first transceiver region and the second transceiver region overlap partially to form three detection regions, wherein the portion where the first transceiver region and the second transceiver region overlap each other is a third detection region, the portion of the first transceiver region that doesn't overlap with the second transceiver region is a first detection region, the portion of the second transceiver region that doesn't overlap with the first transceiver region is a second detection region; and
wherein when a distance between an obstacle detected by the ultrasonic sensor assembly and the autonomous lawn mower is less than a preset distance, the autonomous lawn mower executes a preset obstacle-avoidance measure to avoid the obstacle.

2. The autonomous lawn mower according to claim 1, wherein the first ultrasonic sensor has a first axis, the second ultrasonic sensor has a second axis, and the angle between the first axis and the second axis ranges from 60° to 110°.

3. The autonomous lawn mower according to claim 2, wherein the angle between the first axis and the second axis ranges from 70° to 90°.

4. The autonomous lawn mower according to claim 1, wherein the first ultrasonic sensor has a first axis, the second ultrasonic sensor has a second axis, the housing has a housing axis, and the angle between the first axis and the housing axis ranges from 10° to 80°, the angle between the second axis and the housing axis ranges from 10° to 80°.

5. The autonomous lawn mower according to claim 4, wherein the angle between the first axis and the housing axis ranges from 25° to 55°, the angle between the second axis and the housing axis ranges from 25° to 55°.

6. The autonomous lawn mower according to claim 1, wherein the third detection region at least covers both a part of a first distance-measurement blind area in the first transceiver region and a part of a second distance-measurement blind area in the second transceiver region.

7. The autonomous lawn mower according to claim 1, wherein an ultrasonic beam pattern for recognizing an obstacle in a forward movement direction of the autonomous lawn mower is noncircular, a tangent plane is formed by an axis perpendicular to the ultrasonic beam pattern to obtain a waveform surface, the waveform surface has a major axis direction and a minor axis direction, the major axis direction is mounted to be basically parallel to a bottom surface of the autonomous lawn mower, and the minor axis direction is mounted to be basically perpendicular to the bottom surface of the autonomous lawn mower.

8. The autonomous lawn mower according to claim 1, wherein the ultrasonic sensor assembly comprises an ultrasonic sensor configured to transmit and receive ultrasound, a PCB board, and a protection case for fixing the PCB board and the ultrasonic sensor, the ultrasonic sensor has an outward sound-producing surface, the protection case has an end surface, and the sound-producing surface is level with the end surface or is concave relative to the end surface to be disposed in the protection case.

9. The autonomous lawn mower according to claim 1, wherein the first ultrasonic sensor has a sound beam axis, and the sound beam axis is arranged horizontally.

10. The autonomous lawn mower according to claim 9, wherein the first transceiver region has a first border line near a front end of the housing, the housing has a neighboring wall adjacent to the first transceiver region, and an upper surface of the neighboring wall is lower than the first border line.

11. The autonomous lawn mower according to claim 1, wherein the autonomous lawn mower further comprises a crosstalk prevention structure, configured to prevent ultrasound sent by one of the first ultrasonic sensor and the second ultrasonic sensor from being received directly by the other one of the two without being reflected by the obstacle.

12. The autonomous lawn mower according to claim 11, wherein the crosstalk prevention structure is disposed between the first ultrasonic sensor and the second ultrasonic sensor.

13. The autonomous lawn mower according to claim 11, wherein the crosstalk prevention structure extends toward a front side of the housing without coming into contact with an axis of an ultrasonic sensor.

14. The autonomous lawn mower according to claim 11, wherein the crosstalk prevention structure extends toward a front side of the housing without exceeding an intersection of projections of an axis of the first ultrasonic sensor and an axis of the second ultrasonic sensor.

15. The autonomous lawn mower according to claim 11, wherein the crosstalk prevention structure is located on a front side of a connecting line between a sound wave transmission point of the first ultrasonic sensor and a sound wave transmission point of the second ultrasonic sensor and extends toward a front side of the housing.

16. A self-moving device, comprising:
a housing;
a moving module, disposed below the housing, and configured to drive the housing to move;
a drive module, configured to drive the moving module to move; and
an ultrasonic sensor assembly configured to recognize an obstacle in a forward movement direction of the self-moving device is disposed on the housing, the ultrasonic sensor assembly comprises at least two ultrasonic sensors, comprising a first ultrasonic sensor and a second ultrasonic sensor, the first ultrasonic sensor receives and transmits ultrasound in a first transceiver region, the second ultrasonic sensor receives and transmits ultrasound in a second transceiver region, the first ultrasonic sensor and the second ultrasonic sensor are arranged on the housing and directed toward one another such that the first transceiver region and the second transceiver region overlap partially to form three detection regions, wherein the portion where the first transceiver region and the second transceiver region overlap each other is a third detection region, the portion of the first transceiver region that doesn't overlap with the second transceiver region is a first detection region, the portion of the second transceiver region that doesn't overlap with the first transceiver region is a second detection region, and the moving module moves the self-moving device along a preset path to keep a distance between the housing and the obstacle greater than zero.

17. A self-moving device, comprising:
a housing;
a moving module, disposed below the housing, and configured to drive the housing to move;
a drive module, configured to drive the moving module to move; and
an ultrasonic sensor assembly configured to recognize an obstacle in a forward movement direction of the self-moving device is disposed on the housing, the ultrasonic sensor assembly comprises at least two ultrasonic sensors, comprising a first ultrasonic sensor and a second ultrasonic sensor, the first ultrasonic sensor receives and transmits ultrasound in a first transceiver region, the second ultrasonic sensor receives and transmits ultrasound in a second transceiver region, the first ultrasonic sensor and the second ultrasonic sensor are arranged on the housing and directed toward one another such that the first transceiver region and the second transceiver region overlap partially to form three detection regions, wherein the portion where the first transceiver region and the second transceiver region overlap each other is a third detection region, the portion of the first transceiver region that doesn't overlap with the second transceiver region is a first detection region, the portion of the second transceiver region that doesn't overlap with the first transceiver region is a second detection region, and the moving module moves the self-moving device along a path in a direction different from a current forward movement direction.

\* \* \* \* \*